US008488889B2

(12) United States Patent
Moriya et al.

(10) Patent No.: US 8,488,889 B2
(45) Date of Patent: Jul. 16, 2013

(54) IMAGE ENCODER AND IMAGE DECODER, IMAGE ENCODING METHOD AND IMAGE DECODING METHOD, IMAGE ENCODING PROGRAM AND IMAGE DECODING PROGRAM, AND COMPUTER READABLE RECORDING MEDIUM RECORDED WITH IMAGE ENCODING PROGRAM AND COMPUTER READABLE RECORDING MEDIUM RECORDED WITH IMAGE DECODING PROGRAM

(75) Inventors: Yoshimi Moriya, Chiyoda-ku (JP);
Shunichi Sekiguchi, Chiyoda-ku (JP);
Kazuo Sugimoto, Chiyoda-ku (JP);
Yoshihisa Yamada, Chiyoda-ku (JP);
Koutarou Asai, Chiyoda-ku (JP);
Tokumichi Murakami, Chiyoda-ku (JP); Yuichi Idehara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1031 days.

(21) Appl. No.: 11/931,503

(22) Filed: Oct. 31, 2007

(65) Prior Publication Data
US 2008/0130747 A1 Jun. 5, 2008

Related U.S. Application Data

(62) Division of application No. 11/912,680, filed as application No. PCT/JP2006/312159 on Jun. 16, 2006.

(30) Foreign Application Priority Data

| Jul. 22, 2005 | (JP) | 2005-212601 |
| Oct. 7, 2005 | (JP) | 2005-294767 |
| Oct. 7, 2005 | (JP) | 2005-294768 |
| Dec. 28, 2005 | (JP) | 2005-377638 |
| Mar. 27, 2006 | (JP) | 2006-085210 |

(51) Int. Cl.
*G06K 9/46* (2006.01)

(52) U.S. Cl.
USPC .............................................. 382/232

(58) Field of Classification Search
USPC .............................................. 382/232
See application file for complete search history.

(56) References Cited

U.S. PATENT DOCUMENTS 6,493,385 B1  12/2002 Sekiguchi et al.
6,862,320 B1 *  3/2005 Isu et al. ................. 375/240.27
(Continued)

FOREIGN PATENT DOCUMENTS

EP   1 509 045 A2   2/2005
JP   02/285816 A   11/1990
(Continued)

OTHER PUBLICATIONS

U.S. Appl. No. 11/931,756, filed Oct. 31, 2007, Moriya, et al.

(Continued)

*Primary Examiner* — Jingge Wu
(74) *Attorney, Agent, or Firm* — Birch, Stewart, Kolasch & Birch, LLP.

(57) ABSTRACT

An image encoder including: a predicted-image generating unit that generates a predicted image in accordance with a plurality of prediction modes indicating predicted-image generating methods; a prediction-mode judging unit that evaluates prediction efficiency of a predicted image outputted from the predicted-image generating unit to judge a predetermined prediction mode; and an encoding unit that subjects an output of the prediction-mode judging unit to variable-length encoding. The prediction-mode judging unit judges, on the basis of a predetermined control signal, which one of a common prediction mode and a separate prediction mode is used for respective color components forming the input image signal, and multiplexes information on the control signal on a bit stream, multiplexes, when the common prediction mode is used, common prediction mode information on the bit stream, and multiplexes, when the common prediction mode is not used, prediction mode information for each of the color components on the bit stream.

2 Claims, 79 Drawing Sheets

U.S. PATENT DOCUMENTS

| | | | |
|---|---|---|---|
| 2002/0114392 A1* | 8/2002 | Sekiguchi et al. | 375/240.15 |
| 2004/0218671 A1 | 11/2004 | Haraguchi et al. | |
| 2005/0013370 A1* | 1/2005 | Kim et al. | 375/240.16 |
| 2005/0069211 A1* | 3/2005 | Lee et al. | 382/239 |
| 2005/0135484 A1 | 6/2005 | Lee et al. | |
| 2005/0152452 A1* | 7/2005 | Suzuki | 375/240.16 |
| 2005/0271288 A1* | 12/2005 | Suzuki et al. | 382/239 |
| 2006/0233251 A1* | 10/2006 | Kim et al. | 375/240.12 |
| 2006/0239349 A1* | 10/2006 | Shibayama | 375/240.12 |

FOREIGN PATENT DOCUMENTS

| | | |
|---|---|---|
| JP | 5-316363 A | 11/1993 |
| JP | 10-013859 A | 1/1998 |
| JP | 2005 39743 | 2/2005 |
| JP | 2005 349755 | 12/2005 |
| JP | 2006 203909 | 8/2006 |
| KR | 2005-0039057 A | 4/2005 |
| WO | WO 03/101117 A1 | 12/2003 |

OTHER PUBLICATIONS

Woo-Shik Kim; "Adaptive Residue Trasnform and Sampling", Joint Video Team (JVT); Document JVT-K018; Germany Mar. 15-19, 2004; pp. 1-5.

Chen, et al.; "Analysis, Fast Algorithm, and VLSI Architecture Design for H.264/AVC Intra Frame Coder"; IEEE Transactions on Circuits and Systems for Video Technology, vol. 15, No. 3, Mar. 2005; pp. 378-401; XP011127214.

Haoping Yu, "Performance Improved 4:4:4 Coding for MPEG4-Part10/H.264"; Document :JVT-O013; XP030005961; 15 Meeting: Busan, KR Apr. 16-22, 2005; pp. 1-17.

Wedi, et al.; "Intra only 4:4:4 coding for H.264/AVC FRExt"; Document: JVT-P088; XP 030006125; 16th Meeting: Poznan, PL, Jul. 24-29, 2005; pp. 1-11.

ITU-T Recommendation H. 264, "Advanced Video Coding for Generic Audiovisual Services", International Telecommunication Union, Mar. 2005.

* cited by examiner

FIG. 4
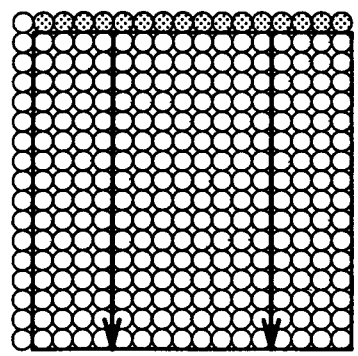
intra16 × 16_pred_mode=0
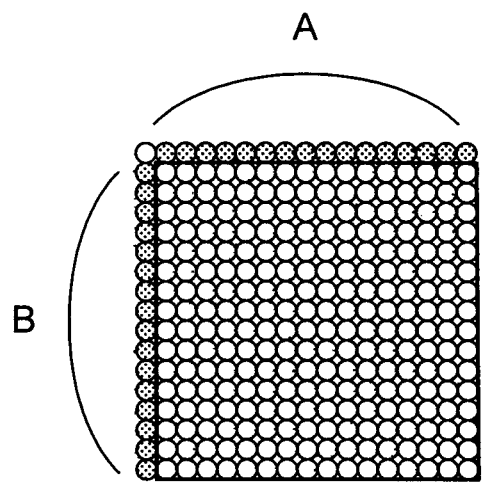
intra16 × 16_pred_mode=2
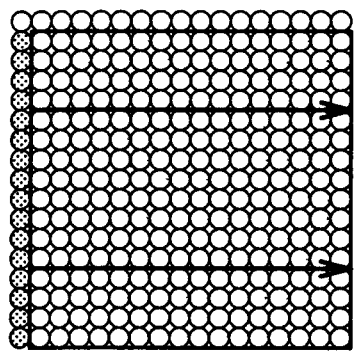
intra16 × 16_pred_mode=1
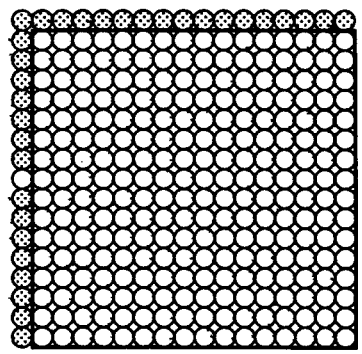
intra16 × 16_pred_mode=3

FIG. 18
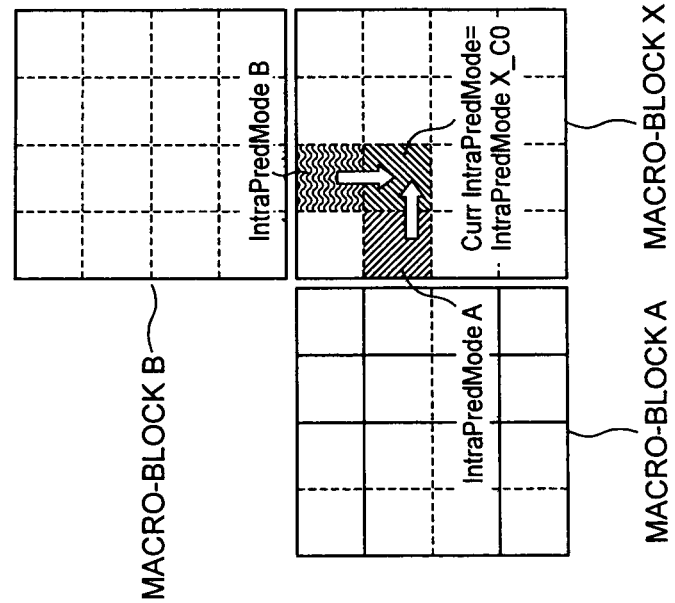
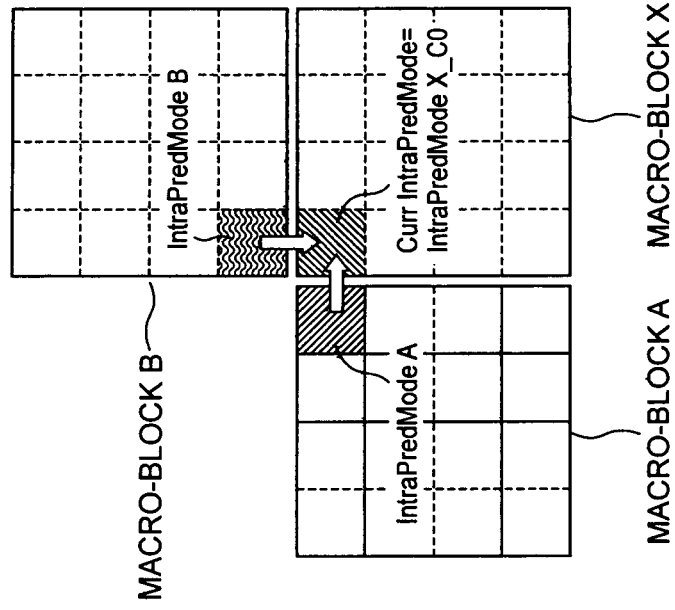

FIG. 26

| CLASS | IntraPredModeA | IntraPredModeB | PredCurrentraPredMode |
|---|---|---|---|
| 0 | 0 | 0 | 0 |
|  | 0 | 1 | 0 |
|  | 0 | 2 | 0 |
|  | 0 | 3 | 0 |
|  | 0 | 4 | 0 |
|  | 0 | 5 | 0 |
|  | 0 | 6 | 0 |
|  | 0 | 7 | 0 |
|  | 0 | 8 | 0 |
|  | 1 | 0 | 0 |
|  | 1 | 1 | 1 |
|  | 1 | 2 | 1 |
|  | 1 | 3 | 1 |
|  | 1 | 4 | 1 |
|  | 1 | 5 | 1 |
|  | 1 | 6 | 1 |
|  | 1 | 7 | 1 |
|  | 1 | 8 | 1 |
|  | 2 | 0 | 0 |
|  | 2 | 1 | 1 |
|  | 2 | 2 | 2 |
|  | 2 | 3 | 2 |
|  | 2 | 4 | 2 |
|  | 2 | 5 | 2 |
|  | 2 | 6 | 2 |
|  | 2 | 7 | 2 |
|  | 2 | 8 | 2 |

| CLASS | IntraPredModeA | IntraPredModeB | PredCurrentraPredMode |
|---|---|---|---|
| 1 | 3 | 0 | 0 |
|  | 3 | 1 | 8 |
|  | 3 | 2 | 2 |
|  | 3 | 3 | 3 |
|  | 3 | 4 | 2 |
|  | 3 | 5 | 2 |
|  | 3 | 6 | 2 |
|  | 3 | 7 | 7 |
|  | 3 | 8 | 8 |
|  | 4 | 0 | 0 |
|  | 4 | 1 | 1 |
|  | 4 | 2 | 2 |
|  | 4 | 3 | 2 |
|  | 4 | 4 | 4 |
|  | 4 | 5 | 5 |
|  | 4 | 6 | 6 |
|  | 4 | 7 | 2 |
|  | 4 | 8 | 2 |
|  | 5 | 0 | 0 |
|  | 5 | 1 | 2 |
|  | 5 | 2 | 2 |
|  | 5 | 3 | 2 |
|  | 5 | 4 | 5 |
|  | 5 | 5 | 5 |
|  | 5 | 6 | 5 |
|  | 5 | 7 | 2 |
|  | 5 | 8 | 2 |
|  | 6 | 0 | 0 |
|  | 6 | 1 | 6 |
|  | 6 | 2 | 2 |
|  | 6 | 3 | 2 |
|  | 6 | 4 | 6 |
|  | 6 | 5 | 6 |
|  | 6 | 6 | 6 |
|  | 6 | 7 | 2 |
|  | 6 | 8 | 6 |
|  | 7 | 0 | 7 |
|  | 7 | 1 | 8 |
|  | 7 | 2 | 2 |
|  | 7 | 3 | 7 |
|  | 7 | 4 | 2 |
|  | 7 | 5 | 2 |
|  | 7 | 6 | 2 |
|  | 7 | 7 | 7 |
|  | 7 | 8 | 8 |
|  | 8 | 0 | 0 |
|  | 8 | 1 | 8 |
|  | 8 | 2 | 2 |
|  | 8 | 3 | 8 |
|  | 8 | 4 | 2 |
|  | 8 | 5 | 2 |
|  | 8 | 6 | 2 |
|  | 8 | 7 | 8 |
|  | 8 | 8 | 8 |

FIG. 28

| CurrIntraPredMode | BINARY SEQUENCE | | | | |
|---|---|---|---|---|---|
| 0 | 1 | 0 | | | |
| 1 | 0 | 0 | | | |
| 2 | 0 | 1 | 0 | | |
| 3 | 1 | 1 | 0 | | |
| 4 | 0 | 1 | 1 | 0 | |
| 5 | 1 | 1 | 1 | 0 | |
| 6 | 0 | 1 | 1 | 1 | 0 |
| 7 | 1 | 1 | 1 | 1 | |
| 8 | 0 | 1 | 1 | 1 | 1 |

FIG. 29

| CurrIntraPredMode | BINARY SEQUENCE | | | | |
|---|---|---|---|---|---|
| 2 | 0 | | | | |
| 0 | 1 | 0 | 0 | | |
| 1 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |

FIG. 47
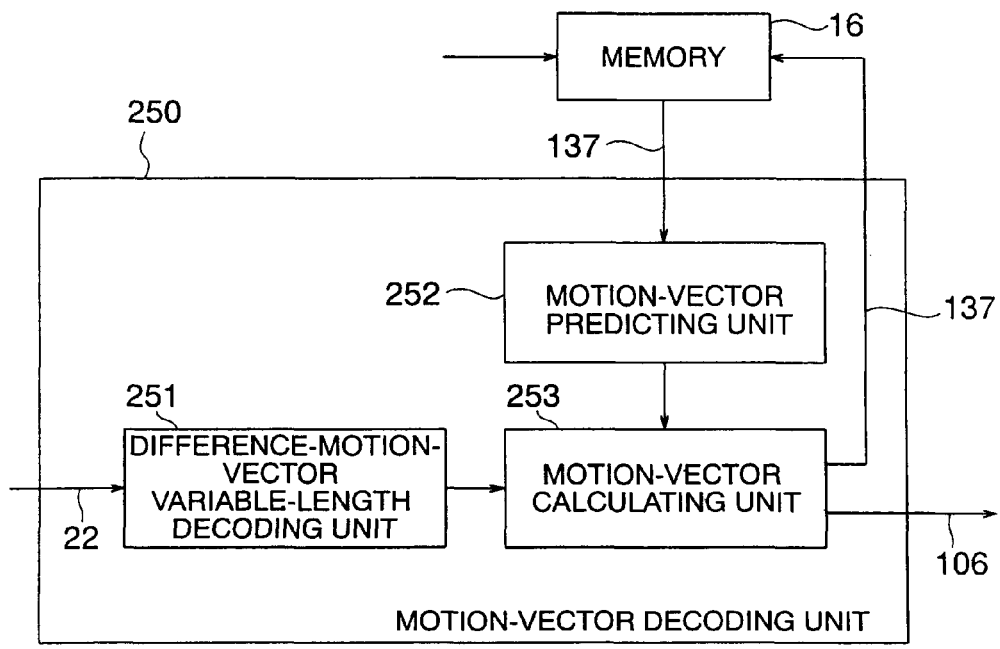
FIG. 48
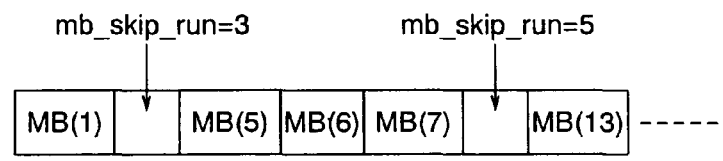
(a) WHEN ADAPTIVE HUFFMAN ENCODING IS USED
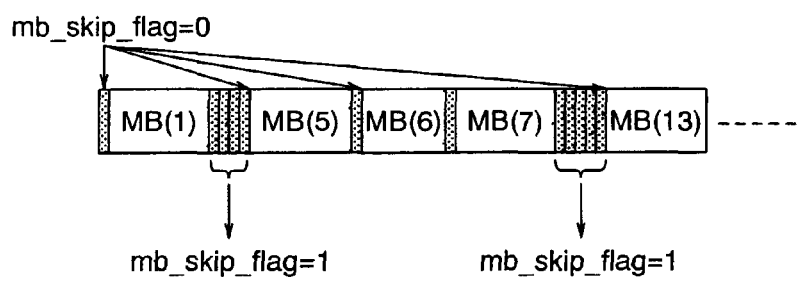
(b) WHEN ADAPTIVE ARITHMETIC ENCODING IS USED (a) WHEN CURRENT MACRO-BLOCK IS ENCODED BY COMMON HEADER FOR C0, C1, AND C2

(b) WHEN CURRENT MACRO-BLOCK IS ENCODED BY SEPARATE HEADER FOR EACH OF C0, C1, AND C2

FIG. 85

Table7-5-Meaning of primary_pic_type(EXCERPT FROM STANDARD)

| Primary_pic_type | slice_type values that may be present in the primary coded picture |
|---|---|
| 0 | I |
| 1 | I,P |
| 2 | I,P,B |
| 3 | SI |
| 4 | SI,SP |
| 5 | I,SI |
| 6 | I,SI,P,SP |
| 7 | I,SI,P,SP,B |

IN THIS CASE ONE PICTURE (ONE COLOR COMPONENT)
IS DEFINED AS ONE ACCESS UNIT

IMAGE ENCODER AND IMAGE DECODER, IMAGE ENCODING METHOD AND IMAGE DECODING METHOD, IMAGE ENCODING PROGRAM AND IMAGE DECODING PROGRAM, AND COMPUTER READABLE RECORDING MEDIUM RECORDED WITH IMAGE ENCODING PROGRAM AND COMPUTER READABLE RECORDING MEDIUM RECORDED WITH IMAGE DECODING PROGRAM

TECHNICAL FIELD

The present invention relates to a digital image signal encoder, a digital image signal decoder, a digital image signal encoding method, and a digital image signal decoding method, which are used for an image compressing and encoding technique, a compressed image data transmission technique, and the like.

BACKGROUND ART

Conventionally, international standard video encoding systems such as MPEG and ITU-TH.26× are adopted mainly on condition that a standardized input signal format called a "4:2:0" format is used. The 4:2:0 format represents a format for transforming a color moving image signal such as RGB into a luminance component (Y) and two color difference components (Cb and Cr) and reducing the number of samples of the color difference components to a half both in horizontal and vertical directions with respect to the number of samples of the luminance component. Since visibility of degradation for the color difference components is low compared with that for the luminance component, the conventional international standard video encoding system is adopted on condition that an amount of information on an object of encoding is reduced by performing down-sampling of the color difference components as described above before encoding is performed. On the other hand, according to the increase in resolution and the increase in gradation of a video display in recent years, a system for encoding an image with samples identical with the luminance components without down-sampling the color difference components is examined. A format in which the number of samples of the luminance components and the number of samples of the color difference components are identical is called a 4:4:4 format. In MPEG-4 AVC (ISO/IEC 14496-10)/ITU-T_H.264 standard (hereinafter referred to as AVC), for an encoding system for inputting the 4:4:4: format, a "high 444 profile" is decided. While the conventional 4:2:0 format is adopted on condition that the color difference components are down-sampled and is limited to color space definitions of Y, Cb, and Cr, there is no distinction of a sample ratio among color components in the 4:4:4 format, so it is possible to directly use R, G, and B other than Y, Cb, and Cr and use other multiple color space definitions. In the video encoding system in which the 4:2:0 format is used, since the color spaces are fixed as Y, Cb, and Cr, it is unnecessary to take into account types of color spaces during encoding processing. However, the AVC high 4:4:4: profile is a system in which the color space definition affects encoding processing itself. On the other hand, in the present high 4:4:4 profile, compatibility with other profiles for encoding the 4:2:0 format defined by the Y, Cb, and Cr spaces is taken into account. Thus, it cannot be said that the present high 4:4:4 profile is designed to optimize compression efficiency thereof.

Non-patent Document 1: MPEG-4 AVC (ISO/IEC 14496-10)/ITU-TH.264 standard

DISCLOSURE OF THE INVENTION

Problems to be Solved by the Invention

For example, in a high 4:2:0 profile for encoding an AVC 4:2:0 format, in a macro-block region composed of luminance components of 16×16 pixels, both color difference components Cb and Cr corresponding to the luminance components are 8×8 pixel blocks. Spatial prediction (intra-prediction) in which a peripheral sample value in an identical picture is used is adopted for intra-macro-block encoding in the high 4:2:0 profile. Separate intra-prediction modes are used for the luminance components and the color difference components. A mode having the highest prediction efficiency is selected out of nine types shown in FIG. 3 as the intra-prediction mode for the luminance components and a mode having the highest prediction efficiency is selected out of four types shown in FIG. 9 as the intra-prediction mode for both of the color components Cb and Cr (it is impossible to use separate prediction modes for Cb and Cr). In motion compensation prediction in the high 4:2:0 profile, block size information used as a unit of motion compensation prediction, reference image information used for prediction, and motion vector information for each block are multiplexed only for the luminance components. Motion compensation prediction is performed for the color difference components using information the same as the information used for the motion compensation prediction for the luminance components. The system as described above is valid under the premise of the color space definition that contribution of the color difference components is small compared with the luminance components that substantially contribute to representation of a structure (texture) of an image in the 4:2:0 format. However, the present high 4:4:4 profile is only a system obtained by simply expanding an intra-prediction mode for color difference of the 4:2:0 format even in a state in which a block size of a color difference signal per one macro-block is expanded to 16×16 pixels. As in the 4:2:0 format, regarding one component as a luminance component, only information on one component is multiplexed to perform motion compensation prediction using an inter-prediction mode, reference image information, and motion vector information common to the three components. Thus, it cannot be said that the present high 4:4:4 format is not always an optimum prediction method in the 4:4:4 format in which the respective color components equally contribute to structural representation of an image signal.

Thus, it is an object of the present invention to provide an encoder, a decoder, an encoding method, a decoding method, and programs for executing these methods, and recording media having these programs recorded therein with improved optimality in encoding a moving image signal in which there is no distinction of sample ratios among color components like the 4:4:4 format as described in the related art.

Means for Solving the Problems

An image encoder according to the present invention includes:
a predicted-image generating unit that generates a predicted image in accordance with a plurality of prediction modes indicating predicted-image generating methods;

a prediction-mode judging unit that evaluates prediction efficiency of a predicted image outputted from the predicted-image generating unit to judge a predetermined prediction mode; and an encoding unit that subjects an output of the prediction-mode judging unit to variable-length encoding, in which the prediction-mode judging unit judges, on the basis of a predetermined control signal, which one of a common prediction mode and a separate prediction mode is used for respective color components forming the input image signal, and multiplexes information on the control signal on a bit stream, multiplexes, when the common prediction mode is used, common prediction mode information on the bit stream, and multiplexes, when the common prediction mode is not used, prediction mode information for each of the color components on the bit stream.

Effects of the Invention

According to the image encoder, the image decoder, the image encoding method, the image decoding method, the programs for executing these methods, and the recording media having these programs recorded therein of the invention, in performing encoding making use of not only the fixed color spaces such as Y, Cb, and Cr but also various color spaces, it is possible to flexibly select intra-prediction mode information and inter-prediction mode information used in the respective color components, and it is possible to perform optimum encoding processing even when a definition of the color spaces are diversified.

BRIEF DESCRIPTION OF THE DRAWINGS

FIG. 4 is a diagram for explaining a predicted-image generating method of an intra 16×16 prediction mode evaluated by the spatial prediction unit 2 of FIG. 1, FIG. 18 is a diagram for explaining parameters of intra-prediction mode encoding processing of a C0 component according to a third embodiment, FIG. 26 is a diagram for explaining tabulated rules of predicted value setting according to the fifth embodiment, FIG. 28 is a diagram for explaining a binary sequence structure of CurrIntraPredMode according to the sixth embodiment, FIG. 29 is a diagram for explaining another binary sequence structure of CurrIntraPredMode according to the sixth embodiment, FIG. 47 is a diagram for explaining a structure of a motion vector decoding unit, FIG. 48 is a diagram for explaining a state of a bit stream syntax.

FIG. 85 is a diagram for explaining information on a picture encoding type at the time when picture data in an access unit starting with an AUD NAL unit is encoded.

DESCRIPTION OF SYMBOLS

Figure 1:
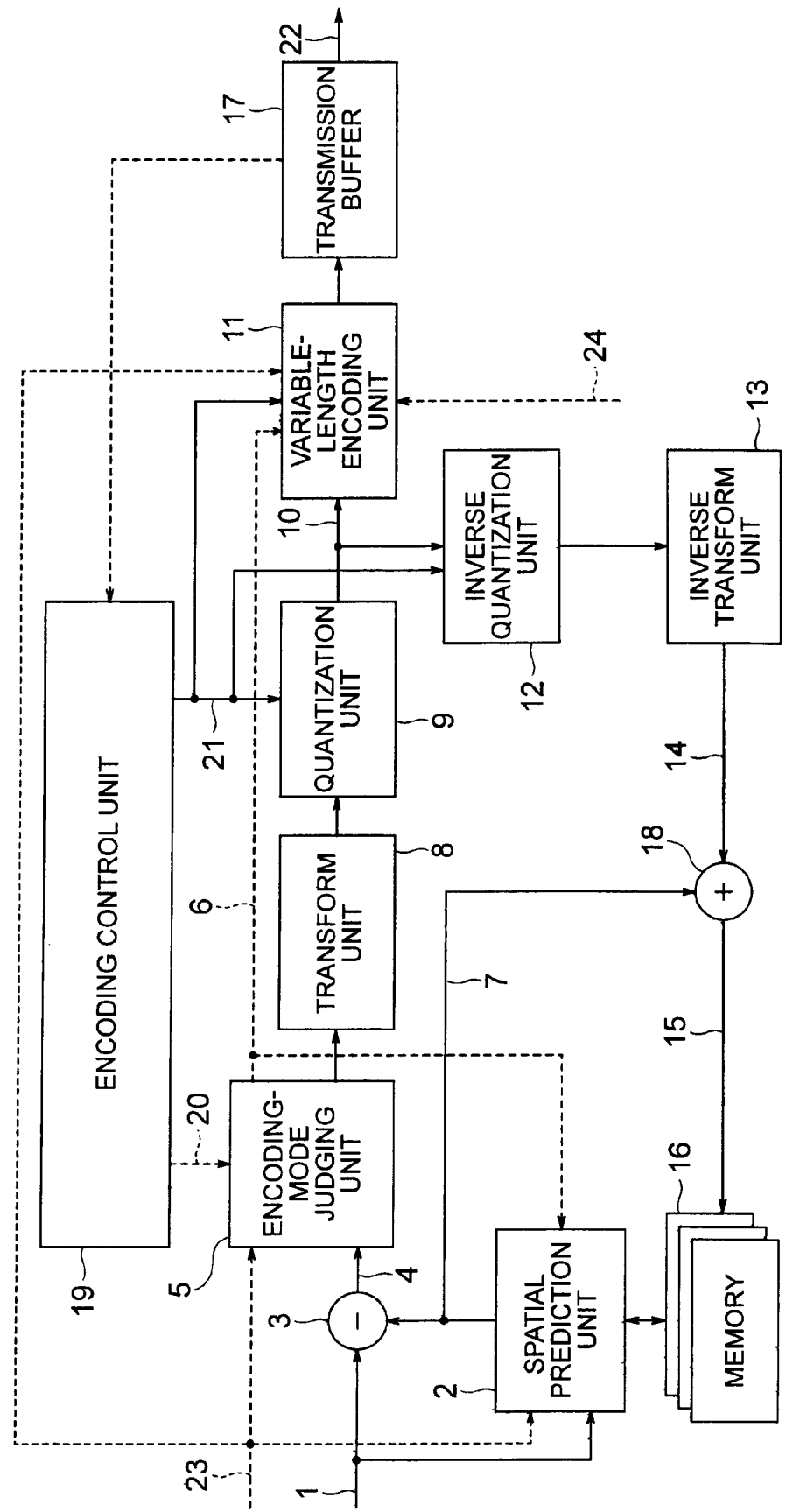
FIG. 1 is a diagram for explaining a structure of a video encoder according to a first embodiment.

| | |
|---|---|
| 1 | input video signal |
| 2 | spatial prediction unit |
| 3 | subtracter |
| 4 | prediction difference signal |
| 5 | encoding-mode judging unit |
| 6 | encoding mode |
| 7 | predicted image |
| 8 | transform unit |
| 9 | quantization unit |
| 10 | quantized transform coefficient |
| 11 | variable-length encoding unit |
| 11a | context-model determining unit |
| 11b | binarizing unit |
| 11c | occurrence-probability generating unit |
| 11d | encoding unit |
| 11e | encoded value |
| 11f | context model |
| 11g | occurrence probability information storing memory |
| 11h | occurrence probability state |
| 12 | inverse quantization unit |
| 13 | inverse transform unit |
| 14 | local decoding prediction difference signal |
| 15 | local decoded image (interim decoded image) |
| 16 | memory |
| 17 | transmission buffer |
| 18 | adder |
| 19 | encoding control unit |
| 20 | weight coefficient |
| 21 | quantization parameter |
| 22 | video stream |
| 23 | intra-prediction mode common-use identification flag |
| 24 | de-blocking filter control flag |
| 25 | variable-length decoding unit |
| 25a | decoding unit |
| 25b | restored value of the bin |
| 26 | de-blocking filter |
| 27 | decoded image |
| 28 | intra-encoding mode |
| 29 | basic intra-prediction mode |
| 30 | extended intra-prediction mode |
| 31 | extended intra-prediction mode table indication flag |
| 32 | transform block size identification flag |
| 33 | intra-encoding mode common-use identification flag |
| 34 | intra-encoding mode |
| 35 | intra-prediction mode |
| 36 | intra-prediction mode indication flag |
| 102 | motion-compensation predicting unit |
| 106 | macro-block type/sub-macro-block type |
| 123 | inter-prediction mode common-use identification flag |
| 123b | motion vector common-use identification flag |
| 123c | macro-block header common-use identification flag |
| 128 | basic macro-block type |
| 128b | macro-block type |
| 129 | basic sub-macro-block type |
| 129b | sub-macro-block type |
| 130 | extended macro-block type |
| 131 | extended sub-macro-block type |
| 132 | basic reference image identification number |
| 132b | reference image identification number |
| 133 | basic motion vector information |
| 134 | extended reference identification number |
| 135 | extended motion vector information |
| 136 | profile information |
| 137 | motion vector |
| 138, 138a, 138b, 138c | skip indication information |
| 139a, 139b, 139c | header information |
| 140a, 140b, 140c | transform coefficient data |
| 141 | intra-prediction mode |
| 142 | transform coefficient effectiveness/ineffectiveness indication information |
| 143 | occurrence probability state parameter common-use identification flag |
| 144 | intra-color-difference prediction mode |
| 111 | motion vector predicting unit |
| 112 | difference motion vector calculating unit |
| 113 | difference motion vector variable-length encoding unit |
| 250 | motion vector decoding unit |
| 251 | difference-motion-vector variable-length decoding unit |
| 252 | motion-vector predicting unit |
| 253 | motion-vector calculating unit |
| 301 | color-space transform unit |
| 302 | converted video signal |
| 303 | encoder |
| 304 | color space transform method identification information |
| 305 | bit stream |
| 306 | decoder |
| 307 | decoded image |
| 308 | inverse-color-space transform unit |
| 310 | transform unit |
| 311 | color space transform method identification information |
| 312 | inverse transform unit |
| 422a, 422b0, 422b1, 422b2, 422c | video stream |
| 423 | common encoding/independent encoding identification signal |
| 427a, 427b | decoded image |
| 461 | predicting unit |
| 462 | de-blocking filter |
| 463 | predicted overhead information |
| 464 | converted block size designation flag |
| 465 | color-space transform unit |
| 466 | inverse color-space transform unit |
| 467 | signaling information |
| 501, 601 | switch |
| 502 | color-component separating unit |
| 503a | first picture encoding unit |
| 503b0, 503b1, 503b2 | second picture encoding unit |
| 504 | multiplexing unit |
| 602 | color-component judging unit |
| 603a | first picture decoding unit |
| 603b0, 603b1, 603b2 | second picture decoding unit |
| 610 | upper header analyzing unit |
| 4611a, 4611b, 4611c | changing unit |
| 4612 | luminance-signal intra-predicting unit |
| 4613 | color-difference-signal intra-predicting unit |
| 4614 | luminance-signal inter-predicting unit |
| 4615 | color-difference-signal inter-predicting unit |

BEST MODE FOR CARRYING OUT THE INVENTION

First Embodiment

In a first embodiment, an encoder that performs encoding closed in a frame by a unit obtained by equally dividing a video frame inputted in a 4:4:4 format into rectangular regions (macro-blocks) of 16×16 pixels, and a decoder corresponding to the encoder will be explained. Characteristics peculiar to the invention are given to the encoder and the decoder on the basis of an encoding system adopted in the MPEG-4 AVC(ISO/IEC 14496-10)/ITU-TH.264 standard, which is a Non-Patent Document 1.

Figure 2:
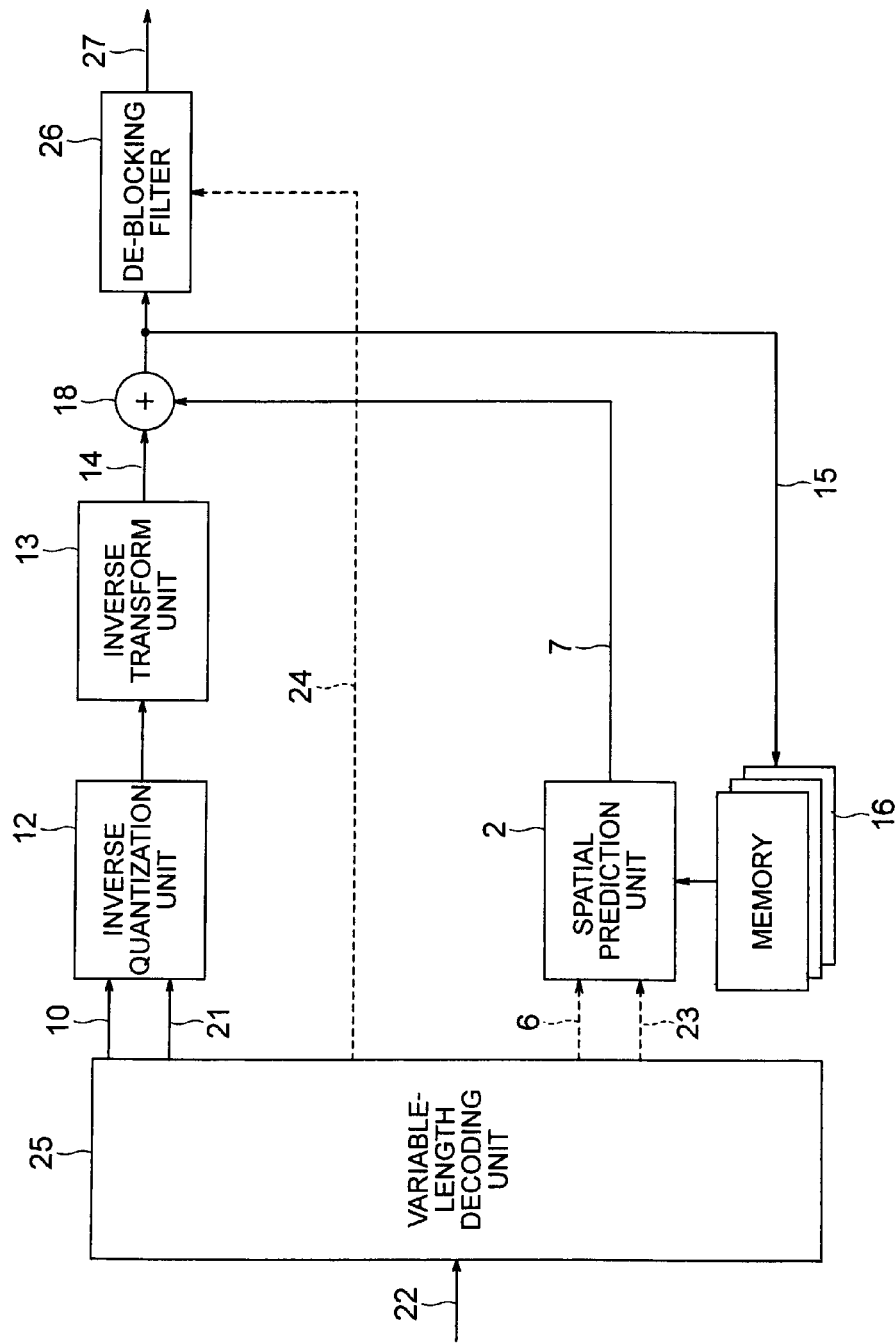
FIG. 2 is a diagram for explaining a structure of the video decoder according to the first embodiment.

A structure of a video encoder in the first embodiment is shown in FIG. 1. A structure of a video decoder in the first embodiment is shown in FIG. 2. In FIG. 2, components denoted by reference numerals identical with those of components of the encoder in FIG. 1 are the identical components.

Operations of the entire encoder and the entire decoder, intra-prediction mode judgment processing and intra-prediction decoding processing, which are characteristic operations in the first embodiment, will be explained on the basis of those figures.

1. Outline of Operations of the Encoder

Figure 10:
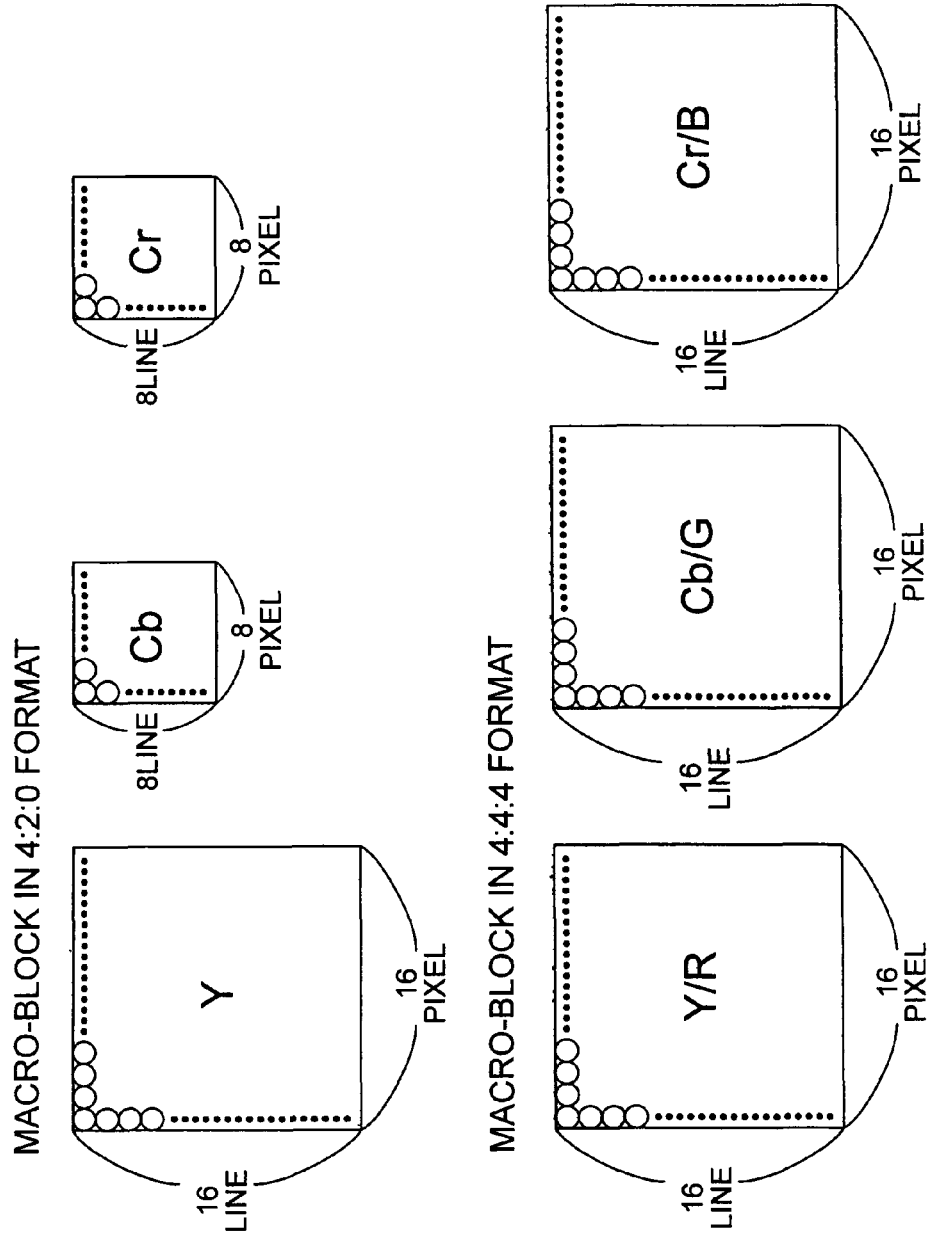
FIG. 10 is a diagram for explaining conventional and present macro-blocks.

In the encoder in FIG. 1, respective video frames are inputted as an input video signal 1 in the 4:4:4 format. The video frames inputted are inputted to the encoder in macro-block units obtained by dividing three color components into blocks of 16 pixels×16 pixels of an identical size and arranging the blocks as shown in FIG. 10.

First, a spatial prediction unit 2 performs intra-prediction processing for each of the color components in the macro-block units using a local decoded image 15 stored in a memory 16. Three memories are prepared for the respective color components (although the three memories are prepared in the explanation of this embodiment, the number of memories may be changed as appropriate depending on actual implementation). As modes of intra-prediction, there are an intra 4×4 prediction mode for performing spatial prediction in which, by a unit of a block of 4 pixels×4 lines shown in FIG. 3, adjacent pixels of the block are used and an intra 16×16 prediction mode for performing spatial prediction in which, by a unit of a macro-block of 16 pixels×16 lines shown in FIG. 4, adjacent pixels of the macro-block are used.

(a) Intra 4×4 Prediction Mode

Figure 3:
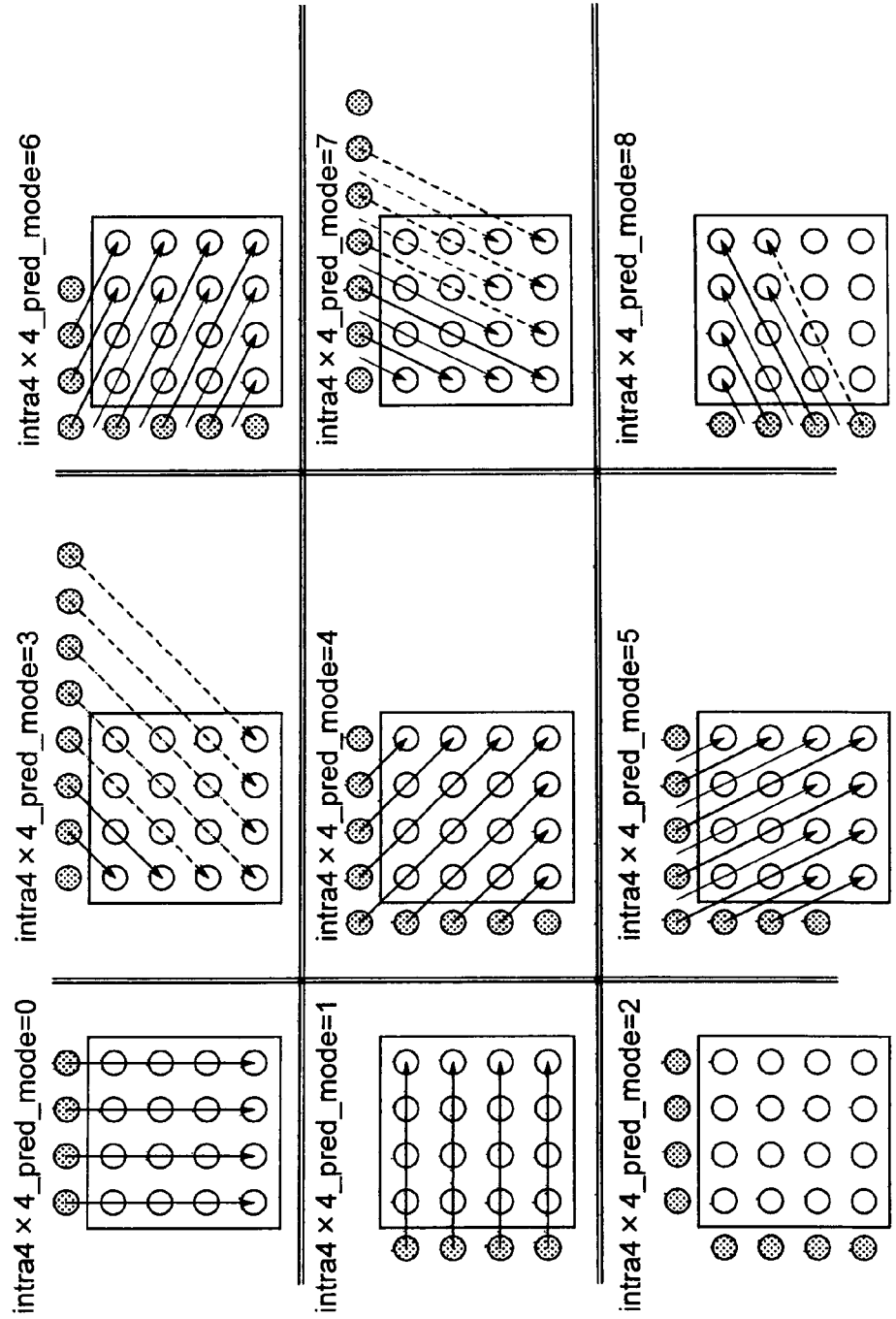
FIG. 3 is a diagram for explaining a predicted-image generating method of an intra 4×4 prediction mode evaluated by a spatial prediction unit 2 of FIG. 1.

A 16×16 pixel block of a luminance signal in a macro-block is divided into sixteen blocks formed by 4×4 pixel blocks. Any one of nine modes shown in FIG. 3 is selected in 4×4 pixel block units. Pixels of blocks (upper left, above, upper right, and left) around the block already encoded, subjected to local decoding processing, and stored in the memory 16 are used for predicted image generation.

Intra4×4_pred_mode=0: The adjacent pixel above is used as a predicted image as it is.

Intra4×4_pred_mode=1: The adjacent pixel on the left is used as a predicted image as it is.

Intra4×4_pre_mode=2: An average value of adjacent eight pixels is used as a predicted image.

Intra4×4_pred_mode=3: A weighted average is calculated every two to three pixels from adjacent pixels and used as a predicted image (corresponding to an edge at 45 degrees to the right).

Intra4×4_pred_mode=4: A weighted average is calculated every two to three pixels from adjacent pixels and used as a predicted image (corresponding to an edge at 45 degrees to the left).

Intra4×4_pred_mode=5: A weighted average is calculated for every two to three pixels from adjacent pixels and used as a predicted image (corresponding to an edge at 22.5 degrees to the left).

Intra4×4_pred_mode=6: A weighted average is calculated every two to three pixels from adjacent pixels and used as a predicted image (corresponding to an edge at 67.5 degrees to the left).

Intra4×4_pred_mode=7: A weighted average is calculated every two to three pixels from adjacent pixels and used as a predicted image (corresponding to an edge at 22.5 degrees to the right).

Intra4×4_pred_mode=8: A weighted average is calculated every two to three pixels from adjacent pixels and used as a predicted image (corresponding to an edge at 112.5 degrees to the left).

When the intra 4×4 prediction mode is selected, sixteen pieces of mode information are necessary for each macro-block. Therefore, in order to reduce a code amount of the mode information itself, making use of the fact that the mode information has a high correlation with a block adjacent thereto, prediction encoding is performed based on mode information on the adjacent block.

(b) Intra 16×16 Prediction Mode

The intra 16×16 prediction encoding mode is a mode for predicting 16×16 pixel blocks equivalent to a macro-block size at a time. Any one of the four modes shown in FIG. 4 is selected in macro-block units. In the same manner as the intra 4×4 prediction mode, pixels of blocks (upper left, above, and left) around the block already encoded, subjected to local decoding processing, and stored in the memory 16 are used for predicted image generation.

Intra16×16_pred_mode=0: Sixteen pixels on the lowermost side of the upper macro-block are used as a predicted image.

Intra16×16_pred_mode=1: Sixteen pixels on the rightmost side of the left macro-block are used as a predicted image.

Intra16×16_pred_mode=2: An average value of thirty-two pixels in total including sixteen pixels on the lowermost side of the upper macro-block (an A part in FIG. 4) and sixteen pixels on the leftmost side of the left macro-block (a B part in FIG. 4) is used as a predicted image.

Intra16×16_pred_mode=3: A predicted image is obtained by predetermined arithmetic operation processing (weighted addition processing corresponding to a pixel used and a pixel position predicted) using thirty-one pixels in total including a pixel at the lower right corner of the macro-block on the upper left, fifteen pixels on the lowermost side of the upper macro-block (a part excluding void pixels), and fifteen pixels on the rightmost side of the left macro-block (a part excluding void pixels).

The video encoder in the first embodiment is characterized by changing an intra-prediction processing method for the three color components on the basis of an intra-prediction mode common-use identification flag 23. This point will be described in detail in 2 below.

The spatial prediction unit 2 executes prediction processing on all modes or sub-sets shown in FIGS. 3 and 4 to obtain a prediction difference signal 4 using a subtracter 3. Prediction efficiency of the prediction difference signal 4 is evaluated by an encoding-mode judging unit 5. A prediction mode in which optimum prediction efficiency is obtained for a macro-block set as a prediction object is outputted as an encoding mode 6 from the prediction processing executed by the spatial prediction unit 2. The encoding mode 6 includes respective kinds of prediction mode information (the Intra4×4_pred_mode or the Intra16×16_pred_mode) used for a prediction unit region together with judgment information (equivalent to an intra-encoding mode in FIG. 6) indicating whether the intra 4×4 prediction mode or the intra 16×16 prediction mode is used. The prediction unit region is equivalent to a 4×4 pixel block in the case of the intra 4×4_pred_mode and is equivalent to a 16×16 pixel block in the case of the intra 16×16 prediction mode. In selecting the encoding mode 6, a weight coefficient 20 for each encoding mode set by the judgment of an encoding control unit 19 may be taken into account. The optimum prediction difference signal 4 obtained by using the encoding mode 6 in the encoding-mode judging unit 5 is outputted to a transform unit 8. The transform unit 8 transforms the prediction difference signal 4 inputted into a transform coefficient and outputs the transform coefficient to a quantization unit 9. The quantization unit 9 quantizes the transform coefficient inputted on the basis of a quantization parameter 21 set by the encoding control unit 19 and outputs the transform coefficient to a variable-length encoding unit 11 as a quantized transform coefficient 10. The quantized transform coefficient 10 is subjected to entropy encoding by means such as Huffman encoding or arithmetic encoding in the variable-length encoding unit 11. The quantized transform coefficient 10 is restored to a local decoding prediction difference signal 14 through an inverse quantization unit 12 and an inverse transform unit 13. The quantized transform coefficient 10 is added to a predicted image 7, which is generated on the basis of the encoding mode 6, by an adder 18 to generate the local decoded image 15. The local decoded image 15 is stored in the memory 16 to be used in intra-prediction processing after that. A de-blocking filter control flag 24 indicating whether a de-blocking filter is applied to the macro-block is also inputted to the variable-length encoding unit 11 (In the prediction processing carried out by the spatial prediction unit 2, since pixel data before being subjected to the de-blocking filter is stored in the memory 16, de-blocking filter processing itself is not necessary for encoding processing. However, the de-blocking filter is performed according to an indication of the de-blocking filter control flag 24 on the decoder side to obtain a final decoded image).

The intra-prediction mode common-use identification flag 23, the quantized transform coefficient 10, the encoding mode 6, and the quantization parameter 21 inputted to the variable-length encoding unit 11 are arrayed and shaped as a bit stream in accordance with a predetermined rule (syntax) and outputted to a transmission buffer 17. The transmission buffer 17 smoothes the bit stream according to a band of a transmission line to which the encoder is connected and readout speed of a recording medium and outputs the bit stream as a video stream 22. Transmission buffer 17 outputs feedback information to the encoding control unit 19 according to a bit stream accumulation state in the transmission buffer 17 and controls an amount of generated codes in encoding of video frames after that.

2. Intra-Prediction Mode Judgment Processing in the Encoder

Figure 5:
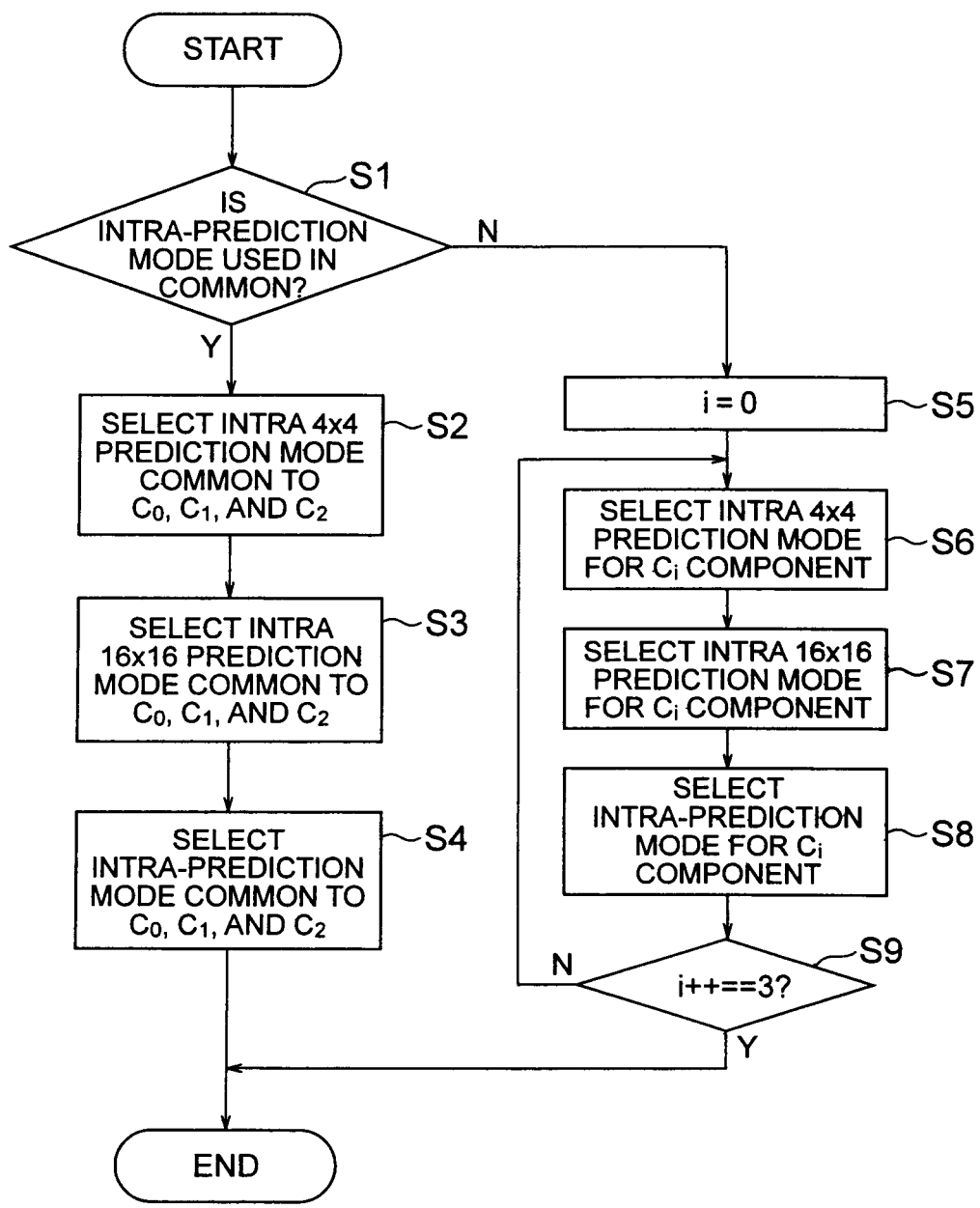
FIG. 5 is a flowchart for explaining a procedure of intra-prediction mode judgment processing performed in the video encoder of FIG. 1.

The intra-prediction mode judgment processing, which is a characteristic of the encoder in the first embodiment, will be described in detail. This processing is carried out by a unit of the macro-block in which three color components are arranged. The processing is performed mainly by the spatial prediction unit 2 and the encoding-mode judging unit 5 in the encoder in FIG. 1. A flowchart showing a flow of the processing is shown in FIG. 5. Image data of the three color components forming the block are hereinafter referred to as C0, C1, and C2.

First, the encoding mode judging unit 5 receives the intra-prediction mode common-use identification flag 23 and judges, on the basis of a value of the intra-prediction mode common-use identification flag 23, whether an intra-prediction mode common to C0, C1, and C2 is used (Step S1 in FIG. 5). When the intra-prediction mode is used in common, the encoding-mode judging unit 5 proceeds to Step S2 and subsequent steps. When the intra-prediction mode is not used in common, the encoding-mode judging unit 5 proceeds to Step S5 and subsequent steps.

When the intra-prediction mode is used in common for C0, C1, and C2, the encoding-mode judging unit 5 notifies the spatial prediction unit 2 of all intra 4×4 prediction modes that can be selected. The spatial prediction unit 2 evaluates prediction efficiencies of all the 4×4 prediction modes and selects an optimum intra 4×4 prediction mode common to C0, C1, and C2 (Step S2). Subsequently, the encoding-mode judging unit 5 notifies the spatial prediction unit 2 of all intra 16×16 prediction modes that can be selected. The spatial prediction unit 2 evaluates prediction efficiencies of all the intra 16×16 prediction modes and selects an optimum intra 16×16 prediction mode common to C0, C1, and C2 (Step S3). The encoding-mode judging unit 5 finally selects an optimum mode in terms of prediction efficiency in the modes obtained in Steps S2 and S3 (Step S4) and ends the processing.

When the intra-prediction mode is not used in common for C0, C1, and C2 and best modes are selected for C0, C1, and C2, respectively, the encoding-mode judging unit 5 notifies the spatial prediction unit 2 of all intra 4×4 prediction modes that can be selected for Ci (i<=0<3) components. The spatial prediction unit 2 evaluates prediction efficiencies of all the intra 4×4 prediction modes and selects an optimum intra 4×4 prediction mode in the Ci (i<=0<3) components (Step S6). Similarly, the spatial prediction unit 2 selects an optimum intra 16×16 prediction mode (Step S7). Finally, in Step S8, the spatial prediction unit 2 judges an optimum intra prediction mode in the Ci (i<=0<3) components.

As a standard for prediction efficiency evaluation of a prediction mode performed in the spatial prediction unit 2, for example, it is possible to use rate/distortion cost given by $Jm=Dm+\lambda Rm$ ($\lambda$: positive number). Dm is encoding distortion or a prediction error amount in a case in which an intra-prediction mode m is applied. The encoding distortion is obtained by applying the intra-prediction mode m to calculate a prediction error and decoding a video from a result obtained by transforming and quantizing the prediction error to measure an error with respect to a signal before encoding. The prediction error amount is obtained by calculating a difference between a predicted image and a signal before encoding in the case in which the intra-prediction mode m is applied and quantizing a level of the difference. For example, a sum of absolute distance (SAD) is used. Rm is a generated code amount in the case in which the intra-prediction mode m is applied. In other words, Jm is a value defining tradeoff between a code amount and a degree of deterioration in the case in which the intra-prediction mode m is applied. The intra-prediction mode m giving minimum Jm gives an optimum solution.

Figure 6:
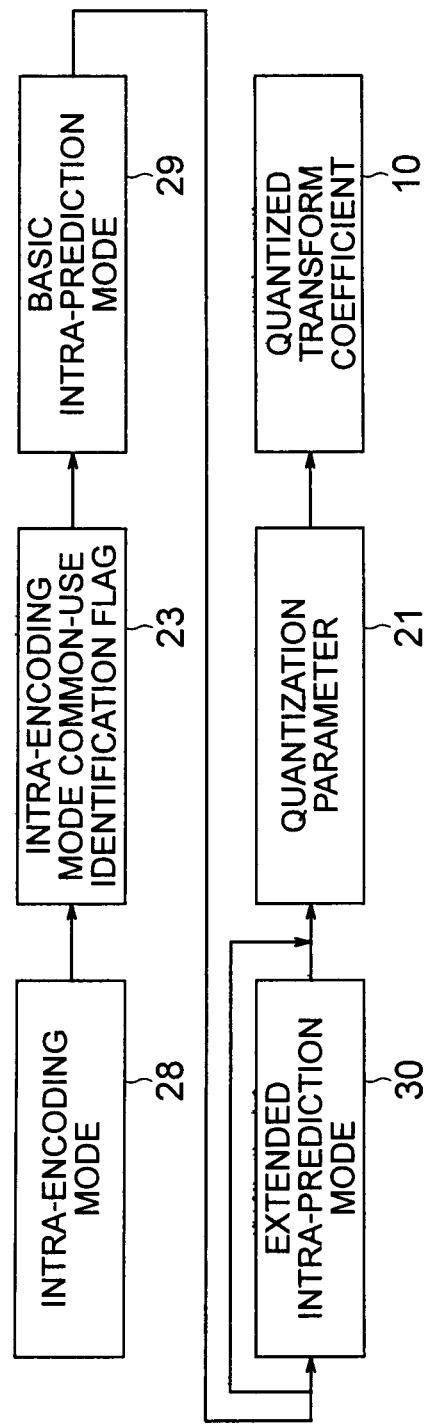
FIG. 6 is a diagram for explaining a data array of a video bit stream outputted from the video encoder according to the first embodiment.

When the encoder performs the processing in Step S2 and the subsequent steps, one piece of information on an intra-prediction mode is allocated to a macro-block including three color components. On the other hand, when the encoder performs the processing in Step S5 and the subsequent steps, intra-prediction mode information is allocated to the color components, respectively. Therefore, since the pieces of information on intra-prediction modes allocated to the macro-block are different, it is necessary to multiplex the intra-prediction mode common-use identification flag 23 on a bit stream and allow the decoder to recognize whether the encoder has performed the processing steps in Step S2 and the subsequent steps or has performed the processing steps in Step S5 and the subsequent steps. A data array of such a bit stream is shown in FIG. 6.

In the figure, a data array of a bit stream at a level of a macro-block is shown. An intra-encoding mode 28 indicates information for discriminating intra 4×4 and intra 16×16, and a basic intra-prediction mode 29 indicates common intra-prediction mode information in a case in which the intra-prediction mode common-use identification flag 23 indicates "common to C0, C1, and C2". The Basic intra-prediction mode 29 indicates intra-prediction mode information for C0 when the intra-prediction mode common-use information flag 23 indicates "not common to C0, C1, and C2". An extended intra-prediction mode 30 is multiplexed only when the intra-prediction mode common-use identification flag 23 indicates "not common to C0, C1, and C2". The extended intra-prediction mode 30 indicates intra-prediction mode information for C1 and C2. Subsequently, the quantization parameter 21 and the quantized transform coefficient 10 are multiplexed. The encoding mode 6 in FIG. 1 is a general term of the intra-encoding mode 28 and the intra-prediction modes (basic and extended) (although the de-blocking filter control flag 24 inputted to the variable-length encoding unit 11 in FIG. 1 is not included in FIG. 6, the de-blocking filter control flag 24 is omitted because the flag is not a component necessary for explaining the characteristics of the first embodiment).

In the 4:2:0 format adopted in the conventional video encoding standard, the definition of color spaces is fixed to Y, Cb, and Cr. In the 4:4:4 format, the definition of color spaces is not limited to Y, Cb, and Cr, but it is possible to use various color spaces. By forming the intra-prediction mode information as shown in FIG. 6, it is possible to perform optimum encoding processing even when the definition of color spaces of the input video signal 1 is diversified. For example, when color spaces are defined by RGB, a structure of a video texture equally remains in respective components of R, G, and B. Thus, by using common intra-prediction mode information, it is possible to reduce redundancy of the intra-prediction mode information itself and improve encoding efficiency. On the other hand, when color spaces are defined by Y, Cb, and Cr, a structure of a video texture is integrated in Y. Thus, the common intra-prediction mode does not always give an optimum result. Thus, it is possible to obtain optimum encoding efficiency by adaptively using the extended intra-prediction mode 30.

3. Outline of Operations of the Decoder

The decoder in FIG. 2 receives the video stream 22 conforming to the array in FIG. 6 outputted from the encoder in FIG. 1, performs decoding processing by a unit of a macro-block in which three color components have an identical size (the 4:4:4 format), and restores respective video frames.

First, the variable-length decoding unit 25 is inputted with the stream 22, decodes the stream 22 in accordance with a predetermined rule (syntax), and extracts information including the intra-prediction mode common-use identification flag 23, the quantized transform coefficient 10, the encoding mode 6, and the quantization parameter 21. The quantized transform coefficient 10 is inputted to the inverse quantization unit 12 together with the quantization parameter 21 and inverse quantization processing is performed. Subsequently, an output of the inverse quantization unit 12 is inputted to the inverse transform unit 13 and restored to the local decoding prediction difference signal 14. On the other hand, the encoding mode 6 and the intra-prediction mode common-use identification flag 23 are inputted to the spatial prediction unit 2. The spatial prediction unit 2 obtains the predicted image 7 in accordance with these pieces of information. A specific procedure for obtaining the predicted image 7 will be described later. The local decoding prediction difference signal 14 and the predicted image 7 are added by the adder 18 to obtain an interim decoded image 15 (this is completely the same signal as the local decoded image 15 in the encoder). The interim decoded image 15 is written back to the memory 16 to be used for intra-prediction of a macro-block after that. Three memories are prepared for the respective color components (although the three memories are prepared in the explanation of this embodiment, the number of memories may be changed as appropriate according to a design). The de-blocking filter 26 is caused to act on the interim decoded image 15 on the basis of an indication of the de-blocking filter control flag 24 decoded by the variable-length decoding unit 25 to obtain a final decoded image 27.

4. Intra-Prediction Decoding Processing in the Decoder

The intra-predicted image generation processing, which is a characteristic of the decoder in the first embodiment, will be described in detail. This processing is carried out by a unit of the macro-block in which three color components are arranged. The processing is performed mainly by the variable-length decoding unit 25 and the spatial prediction unit 2 of the decoder in FIG. 2. A flowchart showing a flow of the processing is shown in FIG. 7.

Figure 7:
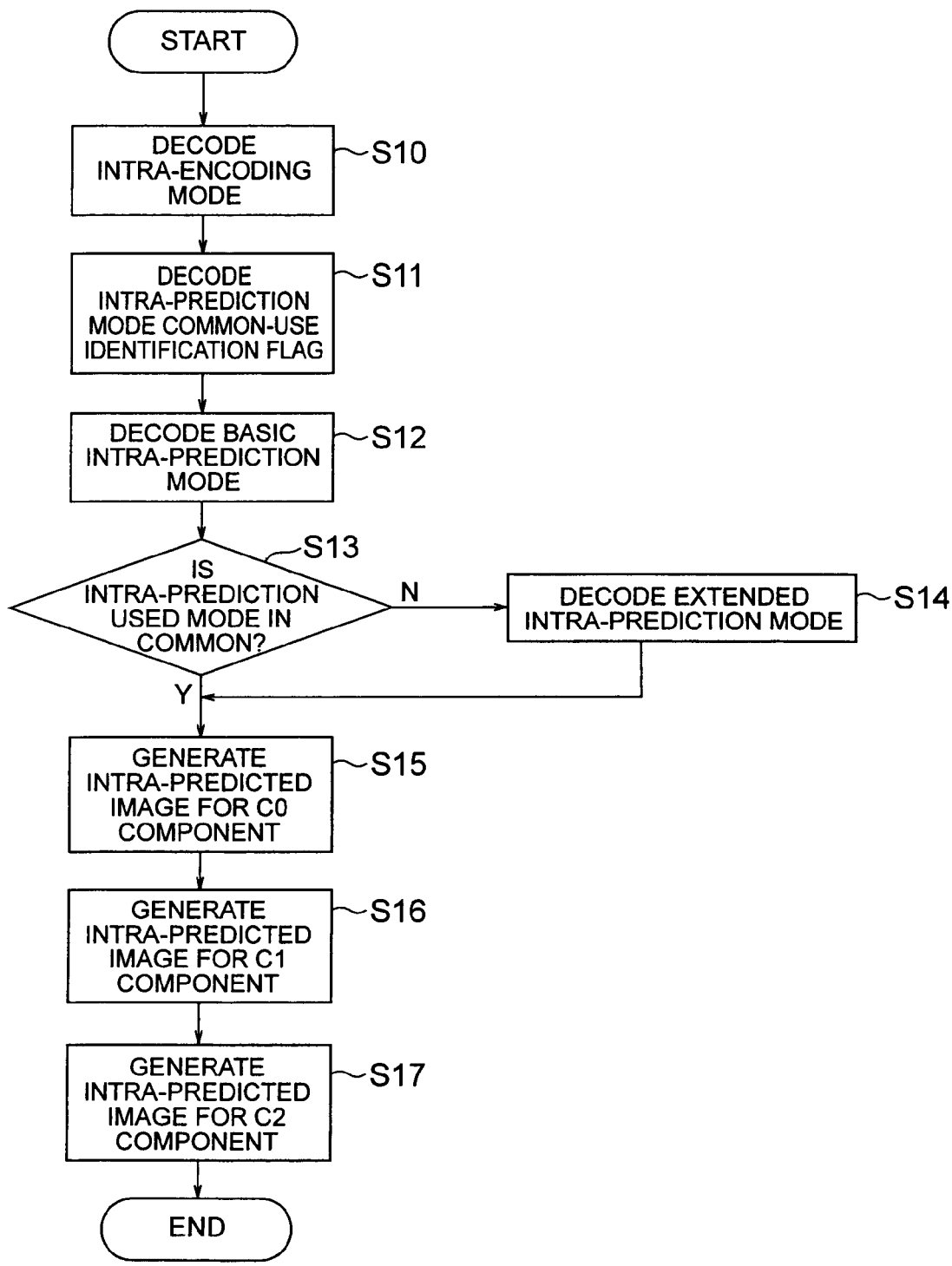
FIG. 7 is a flowchart for explaining a procedure of intra-prediction decoding processing performed in the video decoder of FIG. 2.

Steps S10 to S14 in the flowchart in FIG. 7 are performed by the variable-length decoding unit 25. The video stream 22, which is an input to the variable-length decoding unit 25, conforms to the data array in FIG. 6. In Step S10, the variable-length decoding unit 25 decodes the intra-encoding mode 28 of the data in FIG. 6 first. Subsequently, the variable-length decoding unit 25 decodes the intra-prediction mode common-use identification flag 23 (Step S11). Moreover, the variable-length decoding unit 25 decodes the basic intra-prediction mode 29 (Step S12). In Step S13, the variable-length decoding unit 25 judges whether the intra-prediction mode is used in common for C0, C1, and C2 using a result of the intra-prediction mode common-use identification flag 23. When the intra-prediction mode is used in common, the variable-length decoding unit 25 uses the basic intra-prediction mode 29 for all of C0, C1, and C2. When the intra-prediction mode is not used in common, the variable-length decoding unit 25 uses the basic intra-prediction mode 29 as a mode for C0 and decodes the extended intra-prediction mode 30 (Step S14) to obtain mode information on C1 and C2. Since the encoding mode 6 for the respective color components is set through the processing steps, the variable-length decoding unit 25 outputs the encoding mode 6 to the spatial prediction unit 2 and obtains intra-predicted images of the respective color components in accordance with the Steps S15 to S17. A process for obtaining the intra-predicted images conforms to the procedures in FIGS. 3 and 4 and is the same as the processing performed by the encoder in FIG. 1.

Figure 8:
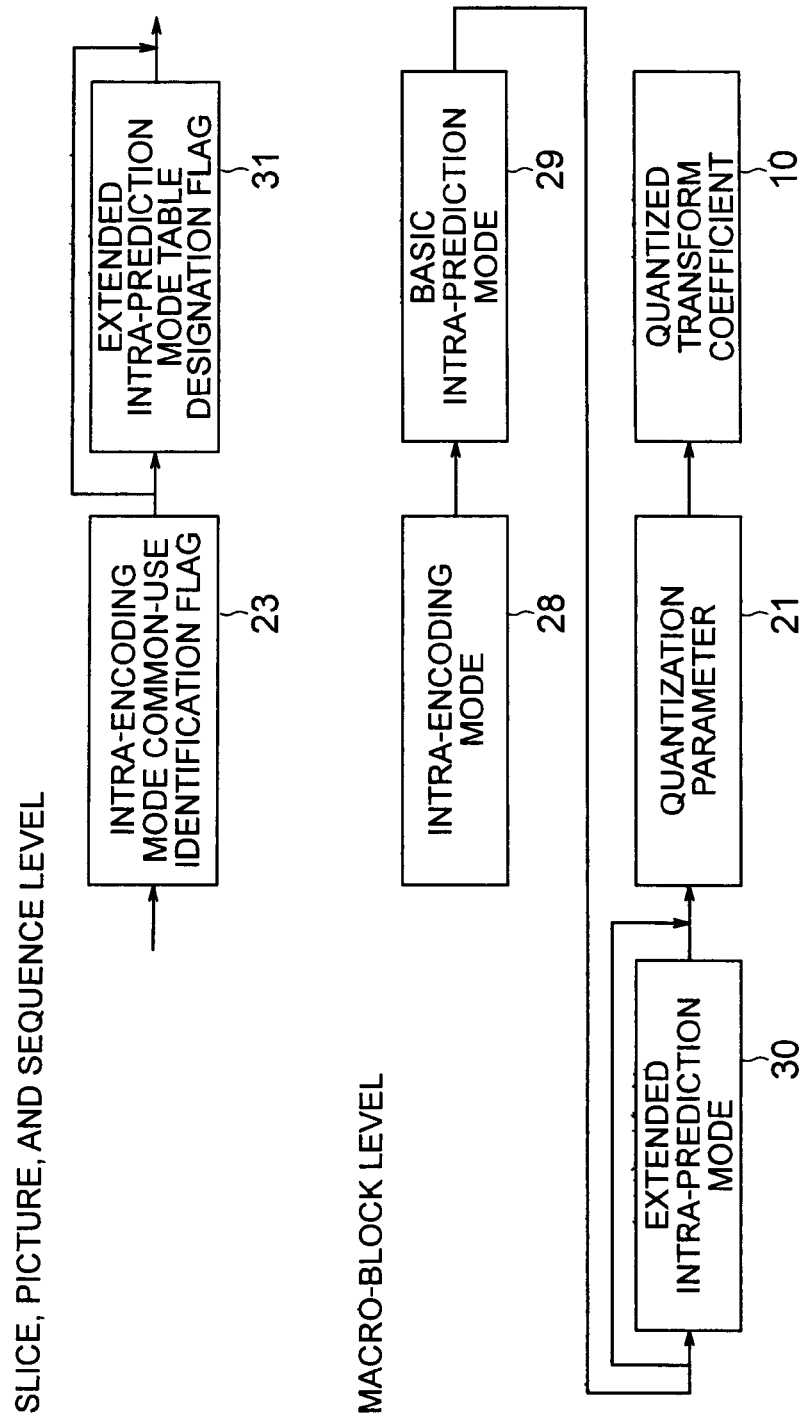
FIG. 8 is a diagram for explaining a mode of another data array of the video bit stream outputted from the video encoder according to the first embodiment.
Figure 9:
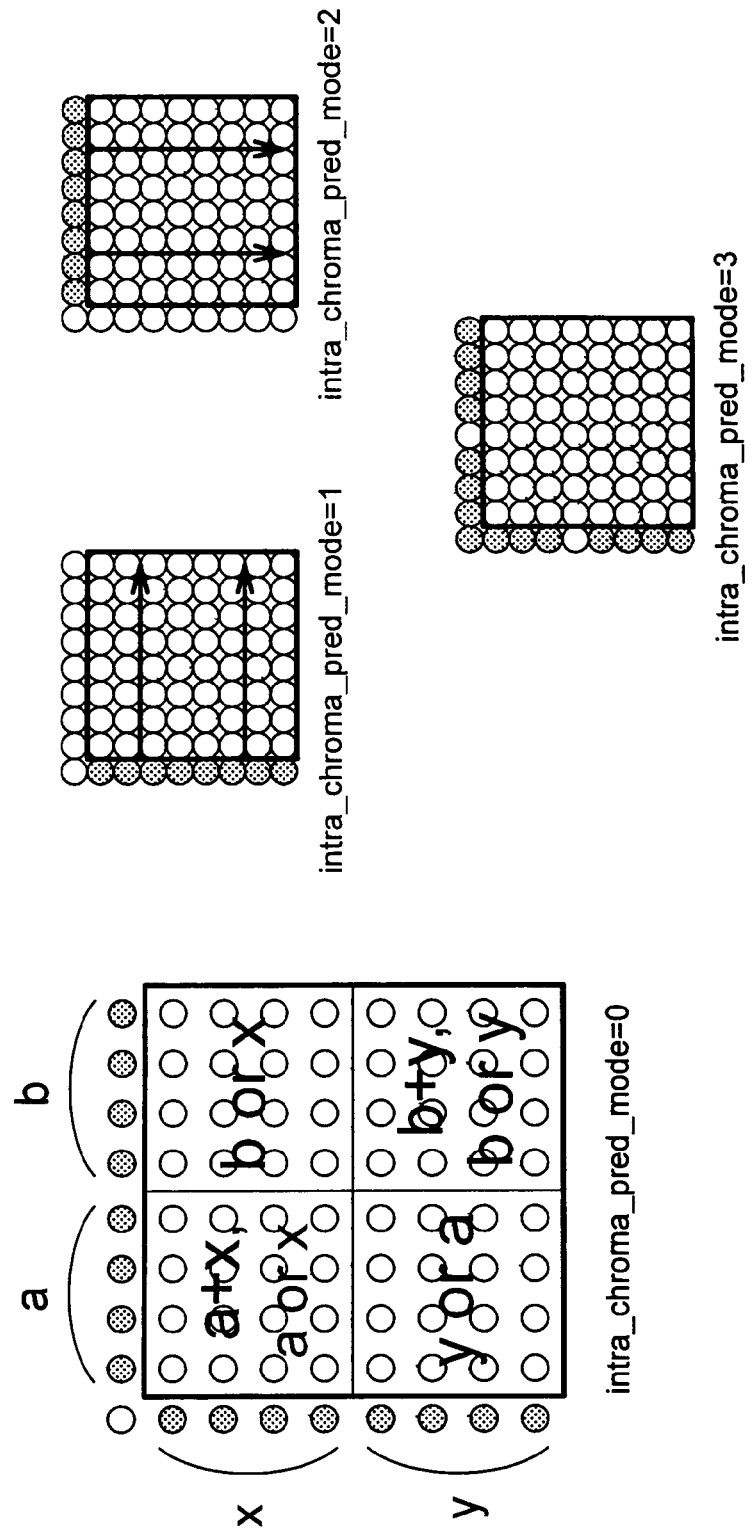
FIG. 9 is a diagram for explaining a predicted-image generating method of an intra-prediction mode adapted to color difference components in an AVC standard.

Variations of the bit stream data array in FIG. 6 are shown in FIG. 8. In FIG. 7, the intra-prediction mode common-use identification flag 23 is multiplexed as a flag located in an upper data layer such as a slice, a picture, or a sequence rather than a flag at a macro-block level. An extended intra-prediction mode table indication flag 31 is provided for enabling to select a code table defining a code word of the extended intra-prediction mode 30 out of a plurality of code tables. Consequently, when it is possible to secure sufficient prediction efficiency according to change in the upper layer equal to or higher than the slice, it is possible to reduce an overhead bit without multiplexing the intra-prediction mode common-use identification flag 23 at the macro-block level every time the processing is performed. Concerning the extended intra-prediction mode 30, since the extended intra-prediction mode table indication flag 31 is provided, it is possible to select a definition of a prediction mode specified for the C1 and C2 components instead of a definition identical with that of the basic intra-prediction mode 29. This makes it possible to perform encoding processing adapted to a definition of color spaces. For example, in encoding of the 4:2:0 format of the AVC, an intra-prediction mode set different from luminance (Y) is defined for a color difference component (Cb and Cr). In the 4:2:0 format, a color difference signal in a macro-block is a signal of 8 pixel×8 lines. Any one of four modes shown in FIG. 9 is selected in macro-block units to perform decoding processing. Although there are two kinds of Cb and Cr as color difference signals, the same mode is used. Except DC prediction of intra_chroma_pred_mode=0, prediction processing is the same as that in the intra 16×16 prediction mode in FIG. 4. In the DC prediction, an 8×8 block is divided into four 4×4 blocks and positions of pixels, for each of which an average value is calculated, are changed for each of the blocks to perform the processing. In a block marked "a+x, a or x" in the figure, an average value is calculated using eight pixels of "a" and "x" when it is possible to use both a pixel "a" and a pixel "x", using four pixels of "a" when it is possible to use only the pixel "a", and using only four pixels of "x" when it is possible to use only the pixel "x". The average value is used as the predicted image 7. A value 128 is used as the predicted image 7 when it is impossible to use both the pixels "a" and "x". In a block marked "b or x", an average value is calculated using four pixels of "b" when it is possible to use an image "b" and using four pixels of "x" when it is possible to use only a pixel "x".

In this way, when it is necessary to change a set of intra-prediction modes according to characteristics of color components, it is possible to obtain more optimum encoding efficiency according to a structure like the syntax in FIG. 8.

Second Embodiment

In a second embodiment, another encoder that performs encoding closed in a frame by a unit obtained by equally dividing a video frame inputted in a 4:4:4 format into rectangular regions (macro-blocks) of 16×16 pixels and a decoder corresponding to the encoder will be explained. As in the first embodiment, characteristics peculiar to the invention are given to the encoder and the decoder on the basis of the encoding system adopted in the MPEG-4 AVC(ISO/IEC 14496-10)/ITU-TH.264 standard, which is the Non-Patent Document 1.

Figure 11:
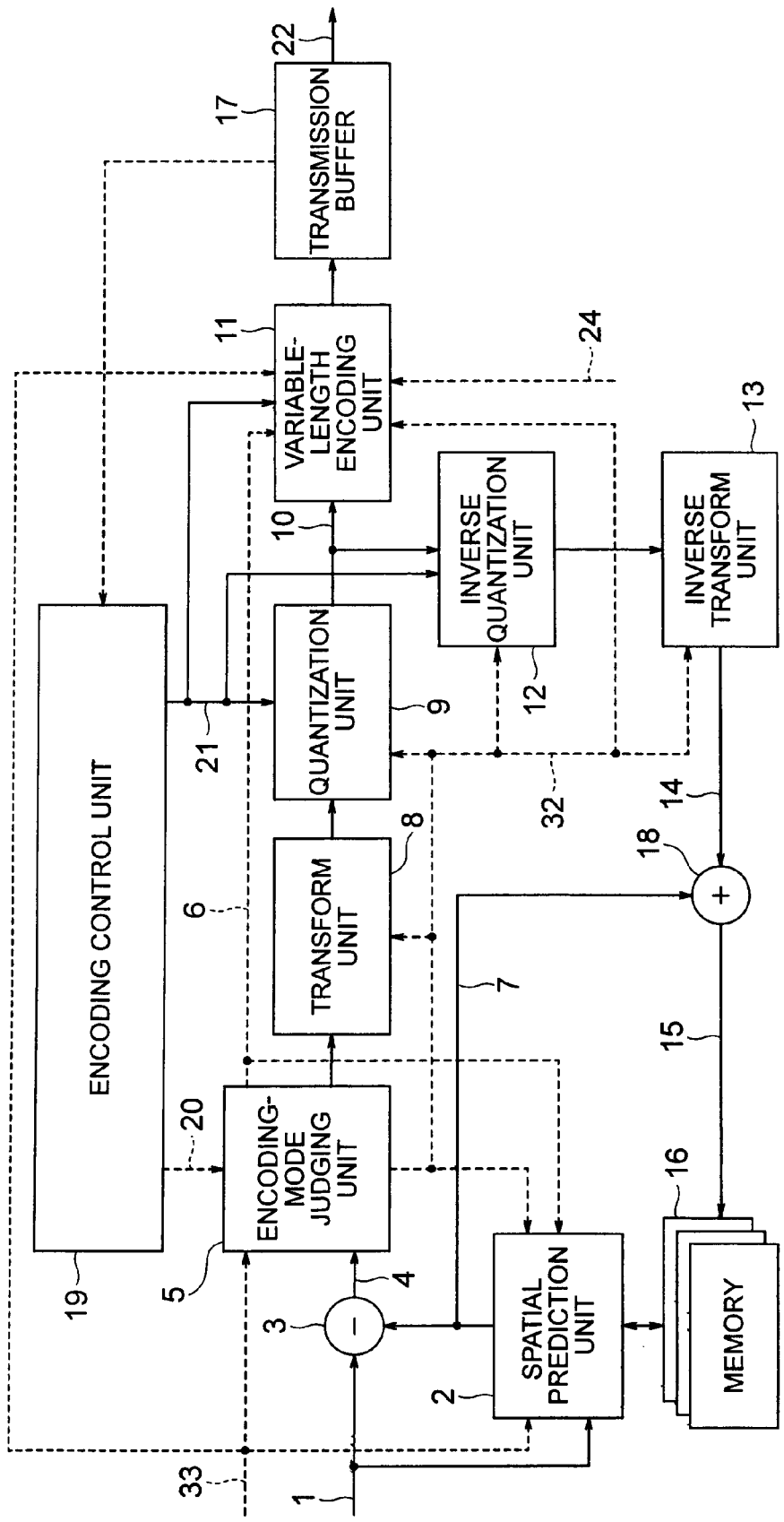
FIG. 11 is a diagram for explaining a structure of a video encoder according to a second embodiment.
Figure 12:
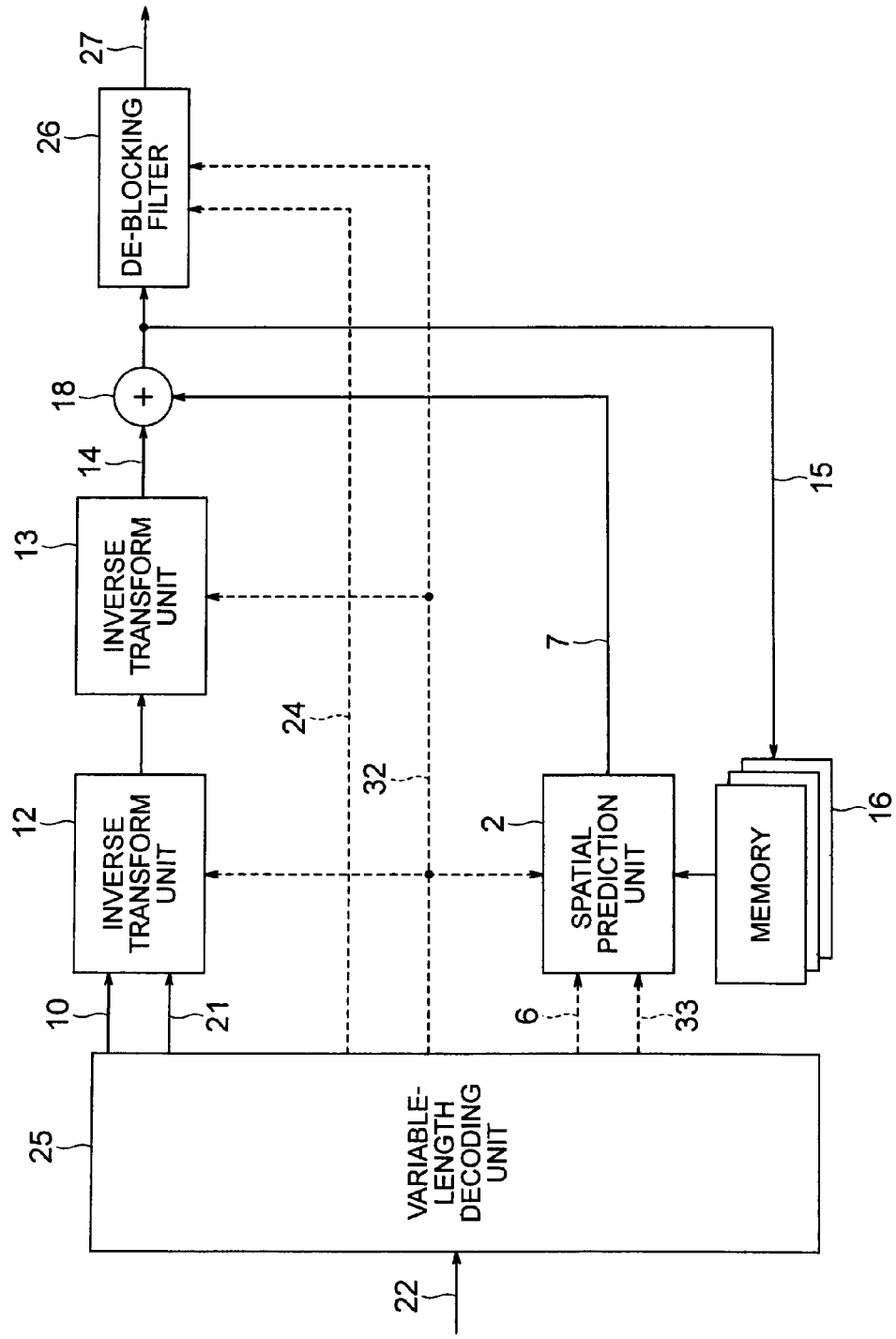
FIG. 12 is a diagram for explaining a structure of the video decoder according to the second embodiment.

A structure of a video encoder in the second embodiment is shown in FIG. 11. A structure of a video decoder in the second embodiment is shown in FIG. 12. In FIG. 11, components denoted by reference numerals identical with those of components of the encoder in FIG. 1 are the identical components. In FIG. 12, components denoted by reference numerals identical with those of components of the encoder in FIG. 11 are the identical components. In FIG. 11, reference numeral 32 denotes a transform block size identification flag, and 33 denotes an intra-encoding mode common-use identification flag.

Operations of the entire encoder and the entire decoder in the second embodiment, intra-encoding/prediction mode judgment processing and intra-prediction decoding processing, which are characteristic operations in the second embodiment, will be explained on the basis of those figures.

1. Outline of Operations of the Encoder

In the encoder in FIG. 11, respective video frames are inputted as the input video signal 1 in the 4:4:4 format. The video frames inputted are inputted to the encoder in units obtained by dividing three color components into macro-blocks of an identical size and arranging the blocks as shown in FIG. 10.

The spatial prediction unit 2 performs intra-prediction processing for each of color components by a unit of the macro-block using the local decoded image 15 stored in the memory 16. As modes of intra-prediction, there are an intra 4×4 prediction mode for performing spatial prediction in which, by a unit of a block of 4 pixels×4 lines shown in FIG. 3, adjacent pixels of the block are used, an intra 8×8 prediction mode for performing spatial prediction in which, by a unit of a block of 8 pixels×8 lines shown in FIG. 13, adjacent pixels of the block are used, and an intra 16×16 prediction mode for performing spatial prediction in which, by a unit of a macro-block of 16 pixels×16 lines shown in FIG. 4, adjacent pixels of the macro-block are used. In the encoder in the second embodiment, the intra 4×4 prediction mode and the intra 8×8 prediction mode are changed over and used in accordance with a state of the transform block size identification flag 32. It is possible to represent, using an intra-encoding mode as in FIG. 6, which of intra-prediction modes of 4×4 prediction, 8×8 prediction, and 16×16 prediction is used to encode a certain macro-block. In the encoder in the second embodiment, as the intra-encoding modes, two kinds of encoding modes, namely, an intra N×N prediction encoding mode (N is 4 or 8) for performing encoding using the intra 4×4 prediction mode or the intra 8×8 prediction mode and an intra 16×16 prediction encoding mode for performing encoding using the intra 16×16 prediction mode are provide. The intra-encoding modes will be described below, respectively.

(a) Intra N×N Prediction Encoding Mode

The Intra N×N prediction encoding mode is a mode for performing encoding while selectively changing the intra 4×4 prediction mode for dividing a 16×16 pixel block of a luminance signal in a macro-block into sixteen blocks formed by 4×4 pixel blocks and separately selecting a prediction mode for each of the 4×4 pixel blocks and the intra 8×8 prediction mode for dividing a 16×16 pixel block of a luminance signal in a macro-block into four blocks formed by 8×8 pixel blocks and separately selecting a prediction mode for each of the 8×8 pixel blocks. The change of the intra 4×4 prediction mode and the intra 8×8 prediction mode is associated with a state of the transform block size identification flag 32. This point will be described later. Concerning the intra 4×4 prediction mode, as explained in the first embodiment, any one of the nine modes shown in FIG. 3 is selected in 4×4 pixel block units. Pixels of blocks (upper left, above, upper right, and left) around the block already encoded, subjected to local decoding processing, and stored in the memory 16 are used for predicted image generation.

Figure 13:
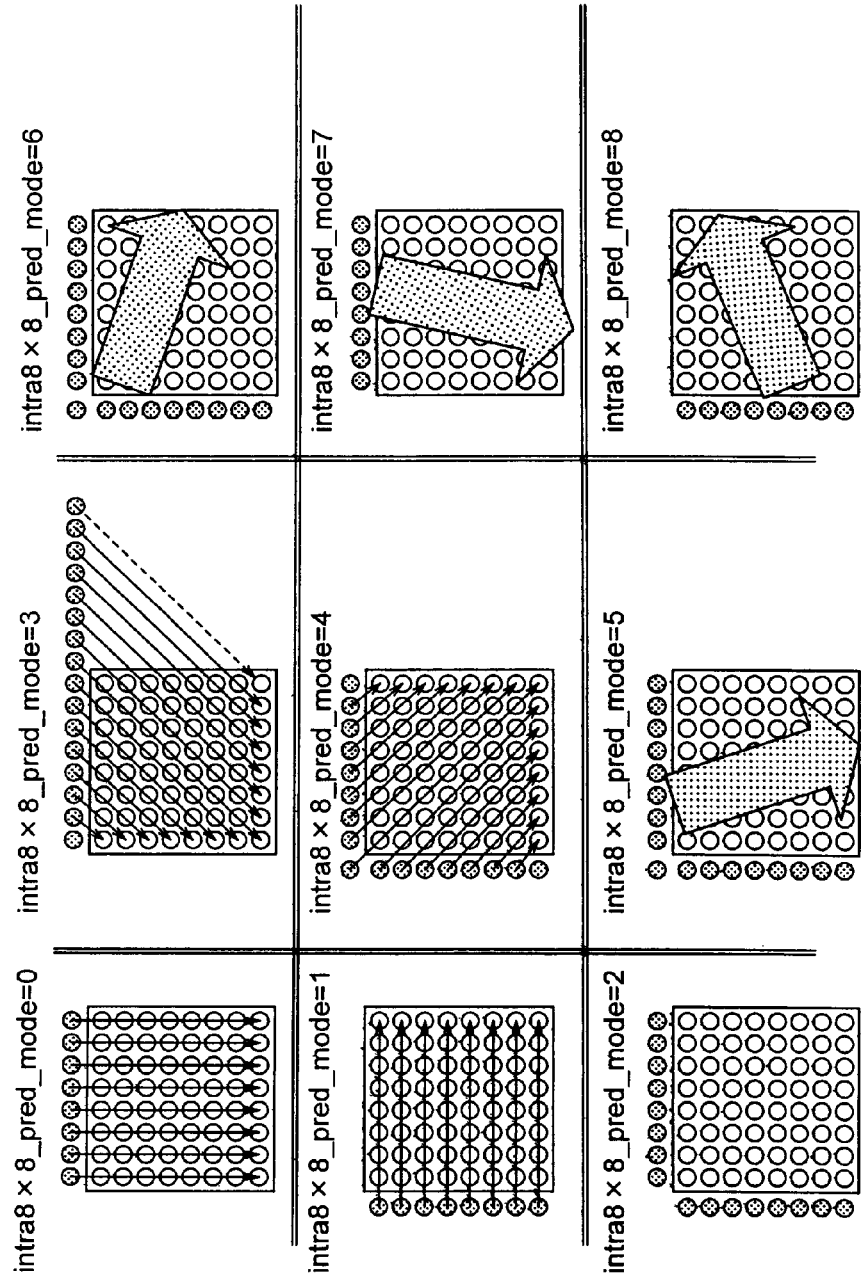
FIG. 13 is a diagram for explaining a predicted-image generating method of an intra 8×8 prediction mode evaluated by the spatial prediction unit 2 of FIG. 11.

On the other hand, in the intra 8×8 prediction mode, any one of nine modes shown in FIG. 13 is selected in 8×8 pixel block units. As it is evident from comparison with FIG. 3, the intra 8×8 prediction mode is obtained by changing the prediction method of the intra 4×4 prediction mode to be adapted to the 8×8 pixel block.

Intra8×8_pred_mode=0: The adjacent pixel above is used as a predicted image as it is.

Intra8×8_pred_mode=1: The adjacent pixel on the left is used as a predicted image as it is.

Intra8×8_pre_mode=2: An average value of adjacent eight pixels is used as a predicted image.

Intra8×8_pred_mode=3: A weighted average is calculated every two to three pixels from adjacent pixels and used as a predicted image (corresponding to an edge at 45 degrees to the right).

Intra8×8_pred_mode=4: A weighted average is calculated every two to three pixels from adjacent pixels and used as a predicted image (corresponding to an edge at 45 degrees to the left).

Intra8×8_pred_mode=5: A weighted average is calculated for every two to three pixels from adjacent pixels and used as a predicted image (corresponding to an edge at 22.5 degrees to the left).

Intra8×8_pred_mode=6: A weighted average is calculated every two to three pixels from adjacent pixels and used as a predicted image (corresponding to an edge at 67.5 degrees to the left).

Intra8×8_pred_mode=7: A weighted average is calculated every two to three pixels from adjacent pixels and used as a predicted image (corresponding to an edge at 22.5 degrees to the right).

Intra8×8_pred_mode=8: A weighted average is calculated every two to three pixels from adjacent pixels and used as a predicted image (corresponding to an edge at 112.5 degrees to the left).

When the intra 4×4 prediction mode is selected, sixteen pieces of mode information are necessary for each macro-block. Therefore, in order to reduce a code amount of the mode information itself, making use of the fact that the mode information has a high correlation with a block adjacent thereto, prediction encoding is performed based on mode information on the adjacent block. Similarly, when the intra 8×8 prediction mode is selected, making use of the fact that the intra-prediction mode has a high correlation with a block adjacent thereto, prediction encoding is performed based on mode information on the adjacent block.

(b) Intra 16×16 Prediction Encoding Mode

The intra 16×16 prediction encoding mode is a mode for predicting 16×16 pixel blocks equivalent to a macro-block size at a time. Any one of the four modes shown in FIG. 4 is selected in macro-block units. In the same manner as the intra 4×4 prediction mode, pixels of blocks (upper left, above, and left) around the block already encoded, subjected to local decoding processing, and stored in the memory 16 are used for predicted image generation. Mode types are as explained with reference to FIG. 4 in the first embodiment. In the intra 16×16 prediction encoding mode, a variable block size is always 4×4. However, sixteen DCs (DC components, average values) in 4×4 block units are collected. Transform at two stages for, first, performing 4×4 block transform in the units and transforming an AC component remaining after removing the DC components for each 4×4 block is applied.

The video encoder in the second embodiment is characterized in that intra prediction/transform/encoding methods for the three color components are changed on the basis of the intra-encoding mode common-use identification flag 33. This point will be described in detail in 2 below.

The spatial prediction unit 2 performs evaluation of an intra-prediction mode on the basis of an indication of the intra-encoding mode common-use identification flag 33 for signals of three color components inputted. The intra-encoding mode common-use identification flag 33 indicates that an intra-encoding mode for each of the three color components inputted or the same intra-encoding mode is separately allocated to all the three components. This is because of the background described below.

In the 4:4:4 format, it is also possible to directly use RGB for color spaces other than the Y, Cb, and Cr color spaces conventionally used for encoding. In the Y, Cb, and Cr color spaces, components depending on a texture structure of a video are removed from signals of Cb and Cr. It is highly probable that an optimum intra-encoding method changes between the Y component and the two components of Cb and Cr. (Actually, in an encoding system for encoding the 4:2:0 format of AVC/H.264 such as a high 4:2:0 profile, designs of intra-prediction modes used for the Y component and the Cb and Cr components are different). On the other hand, when encoding is performed in the RGB color spaces, unlike the Y, Cb, and Cr color spaces, removal of a texture structure among the color components is not performed and a correlation among signal components on an identical space is high. Thus, it is likely that it is possible to improve encoding efficiency by making it possible to select an intra-encoding mode in common. This point depends on a definition of color spaces and, moreover, depends on characteristics of a video even if specific color spaces are used. It is desirable that an encoding system itself can adaptively cope with such characteristics of video signals. Thus, in this embodiment, the intra-encoding mode common-use identification flag 33 is provided in the encoding apparatus to make it possible to perform flexible encoding for a 4:4:4 format video.

The spatial prediction unit 2 executes prediction processing for respective color components on all the intra prediction mode shown in FIGS. 3, 4, and 13 or a predetermined subset according to a state of the intra-encoding mode common-use identification flag 33 set as described above and obtains the prediction difference signal 4 using the subtracter 3. Prediction efficiency of the prediction difference signal 4 is evaluated by the encoding-mode judging unit 5. The encoding-mode judging unit 5 selects an intra-prediction mode with which optimum prediction efficiency is obtained for an object macro-block from the prediction processing executed by the spatial prediction unit 2. When the intra N×N prediction is selected, the encoding-mode judging unit 5 outputs the intra N×N prediction encoding mode as the encoding mode 6. When a prediction mode is the intra 4×4 prediction, the encoding-mode judging unit 5 sets the transform block size identification flag 32 in "transform in the 4×4 block size". When a prediction mode is the intra 8×8 prediction, the encoding-mode judging unit 5 sets the transform block size identification flag 32 in "transform in the 8×8 block size". Various methods are conceivable as a method of determining the transform block size identification flag 32. In the encoding apparatus in the second embodiment, as a basic method, in order to set a block size in transforming a residual obtained by the intra N×N prediction, after an optimum intra N×N prediction mode is set by the encoding-mode judging unit 5, the transform block size identification flag 32 is determined according to an N value of the mode. For example, a transform block size is set as an 8×8 pixel block when the intra 4×4 prediction mode is used. Then, it is highly likely that spatial continuity of a prediction signal is cut by a unit of 4×4 blocks in the prediction difference signal 4 obtained as a result of prediction. Useless high-frequency components are generated. Thus, an effect of concentration of signal power by transform decreases. If the transform block size is set as 4×4 pixel block according to a prediction mode, such a problem does not occur.

When the intra 16×16 prediction is selected by the encoding-mode judging unit 5, the encoding-mode judging unit 5 outputs the intra 16×16 prediction encoding mode as the encoding mode 6. In selecting the encoding mode 6, the weight coefficient 20 for each encoding mode set by the judgment of the encoding control unit 19 may be taken into account.

The prediction difference signal 4 obtained by the encoding mode 6 is outputted to the transform unit 8. The transform unit 8 transforms the prediction difference signal inputted into a transform coefficient and outputs the transform coefficient to the quantization unit 9. The quantization unit 9 quantizes the transform coefficient inputted on the basis of the quantization parameter 21 set by the encoding control unit 19 and outputs the transform coefficient to the variable-length encoding unit 11 as the quantized transform coefficient 10.

When the transform block size is in 4×4 block units, the prediction difference signal 4 inputted to the transform unit 8 is divided in 4×4 block units, subjected to transform, and quantized by the quantization unit 9. When the transform block size is in 8×8 block units, the prediction difference signal 4 inputted to the transform unit 8 is divided in 8×8 block units, subjected to transform, and quantized by the quantization unit 9.

The quantized transform coefficient 10 is subjected to entropy encoding by means such as Huffman encoding or arithmetic encoding in the variable-length encoding unit 11. The quantized transform coefficient 10 is restored to a local decoding prediction difference signal 14 through the inverse quantization unit 12 and the inverse transform unit 13 in the block size based on the transform block size identification flag 32. The quantized transform coefficient 10 is added to a predicted image 7, which is generated on the basis of the encoding mode 6, by the adder 18 to generate the local decoded image 15. The local decoded image 15 is stored in the memory 16 to be used in intra-prediction processing after that. The de-blocking filter control flag 24 indicating whether a de-blocking filter is applied to the macro-block is also inputted to the variable-length encoding unit 11 (In the prediction processing carried out by the spatial prediction unit 2, since pixel data before being subjected to the de-blocking filter is stored in the memory 16, de-blocking filter processing itself is not necessary for encoding processing. However, the de-blocking filter is performed according to an indication of the de-blocking filter control flag 24 on the decoder side to obtain a final decoded image).

The intra-encoding mode common-use identification flag 33, the quantized transform coefficient 10, the encoding mode 6, and the quantization parameter 21 inputted to the variable-length encoding unit 11 are arrayed and shaped as a bit stream in accordance with a predetermined rule (syntax) and outputted to a transmission buffer 17. The transmission buffer 17 smoothes the bit stream according to a band of a transmission line to which the encoder is connected and readout speed of a recording medium and outputs the bit stream as the video stream 22. Transmission buffer 17 outputs feedback information to the encoding control unit 19 according to a bit stream accumulation state in the transmission buffer 17 and controls an amount of generated codes in encoding of video frames after that.

2. Intra-Encoding/Prediction Mode Judgment Processing in the Encoder

Figure 14:
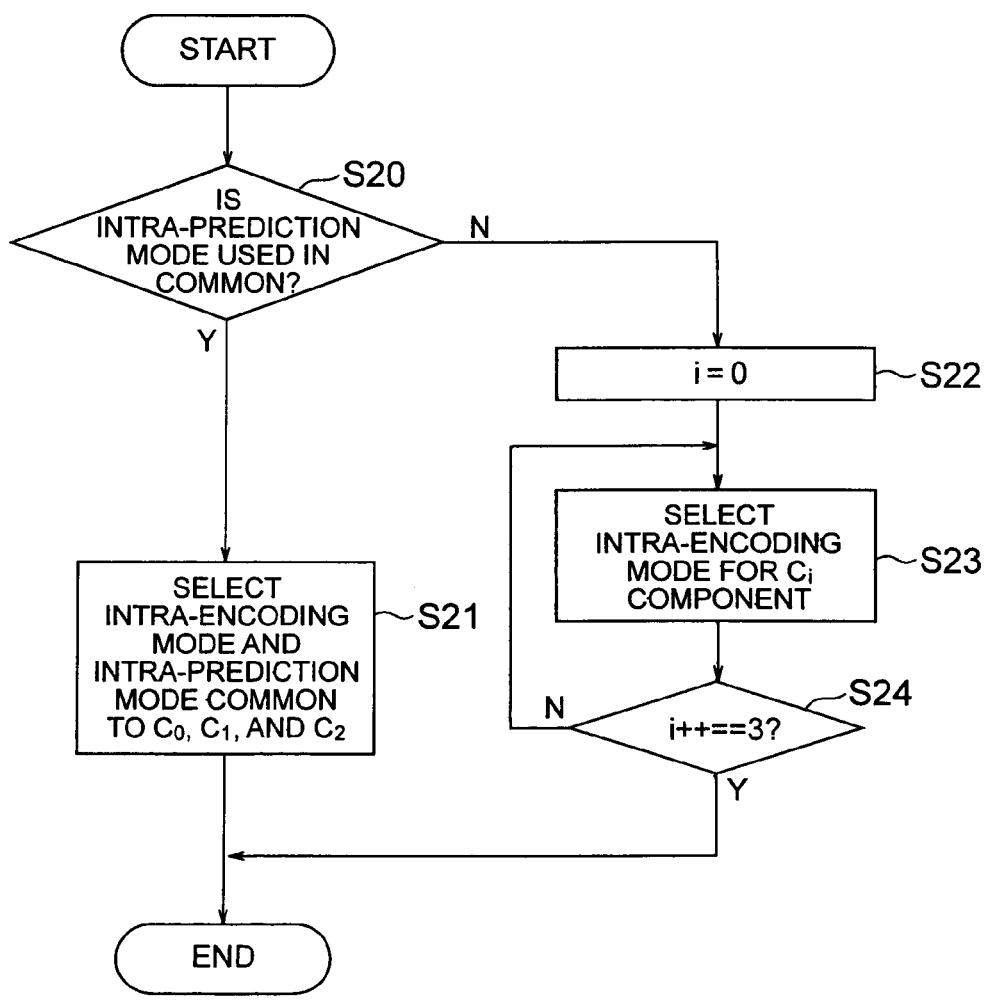
FIG. 14 is a flowchart for explaining a procedure of intra-encoding mode judgment processing performed in the video encoder of FIG. 11.

The intra-encoding mode and the intra-encoding/prediction mode judgment processing, which is a characteristic of the encoder in the second embodiment, will be described in detail. This processing is carried out by a unit of the macro-block in which three color components are arranged. The processing is performed mainly by the spatial prediction unit 2 and the encoding-mode judging unit 5 in the encoder of FIG. 11. A flowchart showing a flow of the processing is shown in FIG. 14. Image data of the three color components forming the block are hereinafter referred to as C0, C1, and C2.

First, the encoding mode judging unit 5 receives the intra-encoding mode common-use identification flag 33 and judges, on the basis of a value of the intra-encoding mode common-use identification flag 33, whether an intra-encoding mode common to C0, C1, and C2 is used (Step S20 in FIG. 14). When the intra-prediction mode is used in common, the encoding-mode judging unit 5 proceeds to Step S21 and subsequent steps. When the intra-prediction mode is not used in common, the encoding-mode judging unit 5 proceeds to Step S22 and subsequent steps.

When the intra-encoding mode is used in common for C0, C1, and C2, the encoding-mode judging unit 5 notifies the spatial prediction unit 2 of all intra-prediction modes (intra N×N prediction and intra 16×16 prediction) that can be selected. The spatial prediction unit 2 evaluates prediction efficiencies of all the prediction modes and selects an optimum intra-encoding mode and intra-prediction mode for all the components (Step S21).

On the other hand, when optimum intra-encoding modes are selected for C0, C1, and C2, respectively, the encoding-mode judging unit 5 notifies the spatial prediction unit 2 of all intra-prediction modes (intra N×N prediction and intra 16×16 prediction) that can be selected for Ci (i<=0<3) components. The spatial prediction unit 2 evaluates prediction efficiencies of all the intra-prediction modes and selects an optimum intra 4×4 prediction mode in the Ci (i<=0<3) components (Step S23).

When the spatial prediction unit 2 selects the intra 4×4 prediction mode as a mode for giving optimum prediction efficiency in Steps S21 and S23 described above, the transform block size identification flag 32 is set in "transform in the 4×4 block size". When the spatial prediction unit 2 is selects the intra 8×8 prediction mode as a mode for giving optimum prediction efficiency, the transform block size identification flag 32 is set in "transform in the 8×8 block size".

As a criteria for prediction efficiency evaluation of a prediction mode performed in the spatial prediction unit 2, for example, it is possible to use rate/distortion cost given by $Jm=Dm+\lambda Rm$ ($\lambda$: positive number). Dm is encoding distortion or a prediction error amount in the case in which an intra-prediction mode m is applied. The encoding distortion is obtained by applying the intra-prediction mode m to calculate a prediction error and decoding a video from a result obtained by transforming and quantizing the prediction error to measure an error with respect to a signal before encoding. The prediction error amount is obtained by calculating a difference between a predicted image and a signal before encoding in the case in which the intra-prediction mode m is applied and quantizing a level of the difference. For example, a sum of absolute distance (SAD) is used. Rm is a generated code amount in the case in which the intra-prediction mode m is applied. In other words, Jm is a value defining tradeoff between a code amount and a degree of deterioration in the case in which the intra-prediction mode m is applied. The intra-prediction mode m giving minimum Jm gives an optimum solution.

When the encoder performs the processing in Step S21 and the subsequent steps, one piece of information on an intra-encoding mode is allocated to a macro-block including three color components. On the other hand, when the encoder performs the processing in Step S22 and the subsequent steps, intra-encoding mode information is allocated to the color components (three in total), respectively. Therefore, since the pieces of information on intra-prediction modes allocated to the macro-block are different, it is necessary to multiplex the intra-encoding mode common-use identification flag 23 on a bit stream and allow the decoder to recognize whether the encoder has performed the processing steps in Step S21 and the subsequent steps or has performed the processing steps in Step S23 and the subsequent steps. A data array of such a bit stream is shown in FIG. 15.

Figure 15:
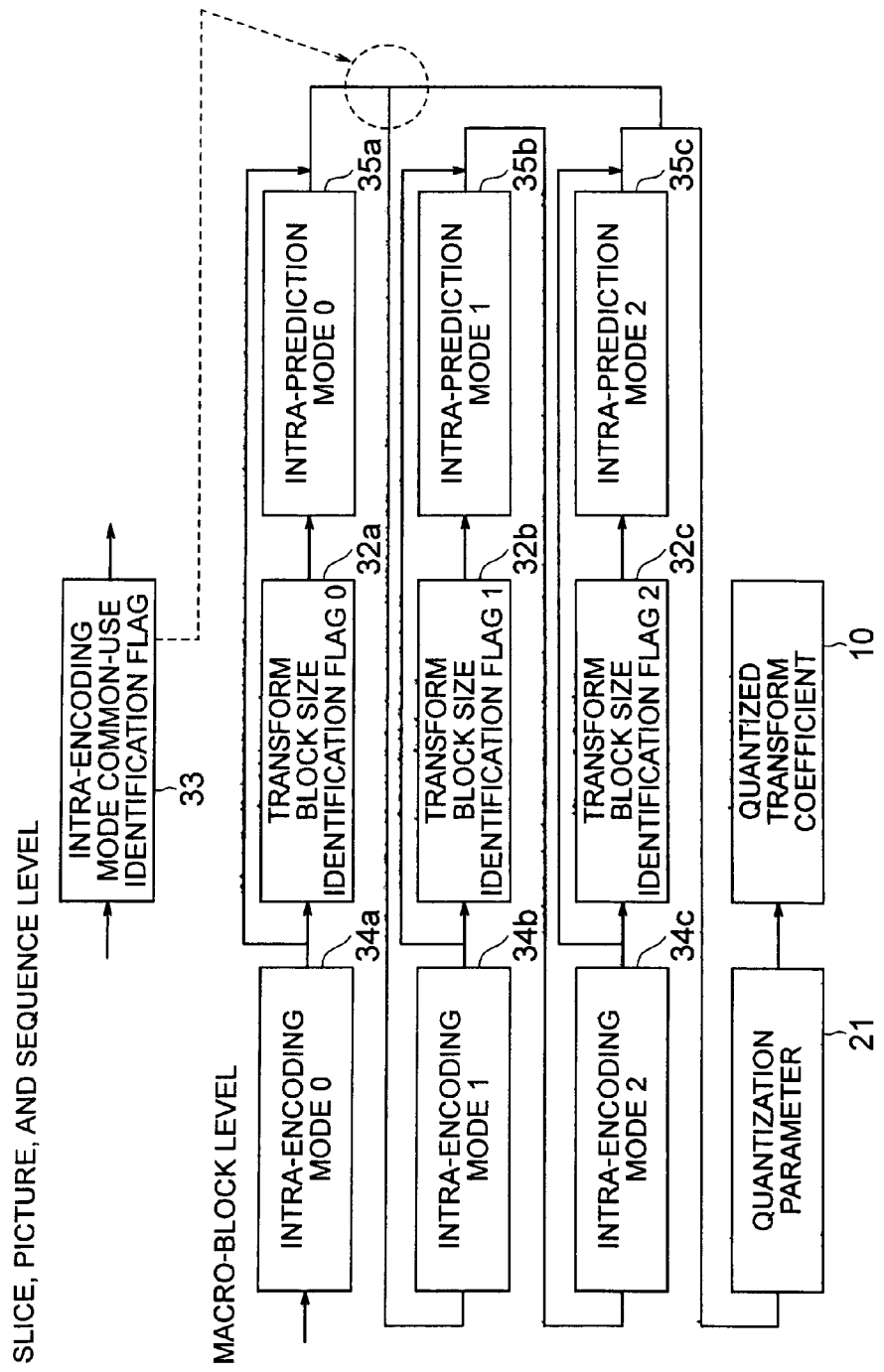
FIG. 15 is a diagram for explaining a data array of a video bit stream outputted from the video encoder according to the second embodiment.

In FIG. 15, intra-encoding modes 0(34a), 1(34b), and 2(34c) multiplexed on the bit stream at the macro-block level indicate the encoding modes 6 for the C0, C1, and C2 components, respectively. When an intra-encoding mode is the intra N×N prediction encoding mode, the transform block size identification flag 32 and the information on the intra prediction mode are multiplexed on the bit stream. On the other hand, when the intra-encoding mode is the 16×16 prediction encoding mode, the information on the intra-prediction mode is encoded as a part of the intra-encoding mode information. The information on the transform block side identification flag 32 and the intra prediction mode are not multiplexed on the bit stream. When the intra-encoding mode common-use flag 33 is "common to C0, C1, and C2", the intra-encoding modes 1(34b) and 2(34c), transform block size identification flags 1(32b) and 2(32c), and intra-prediction modes 1(35b) and 2(35c) are not multiplexed on the bit stream (a circle part of a dotted line in FIG. 15 indicates a branch of the bit stream). In this case, the intra-encoding mode 0(34a), a transform block side identification flag 0(32a), and an intra-prediction mode 0(35a) function as encoding information common to all the color components. In an example shown in FIG. 15, the intra-encoding mode common-use identification flag 33 is multiplexed as bit stream data at a level higher than the macro block such as a slice, a picture, or a sequence. In particular, when the intra-encoding mode common-use identification flag 33 is used as in the example described in the second embodiment, since the color spaces often does not change throughout the sequence, it is possible to attain the object by multiplexing the intra-encoding mode common-use identification flag 33 on a sequence level.

Figure 16:
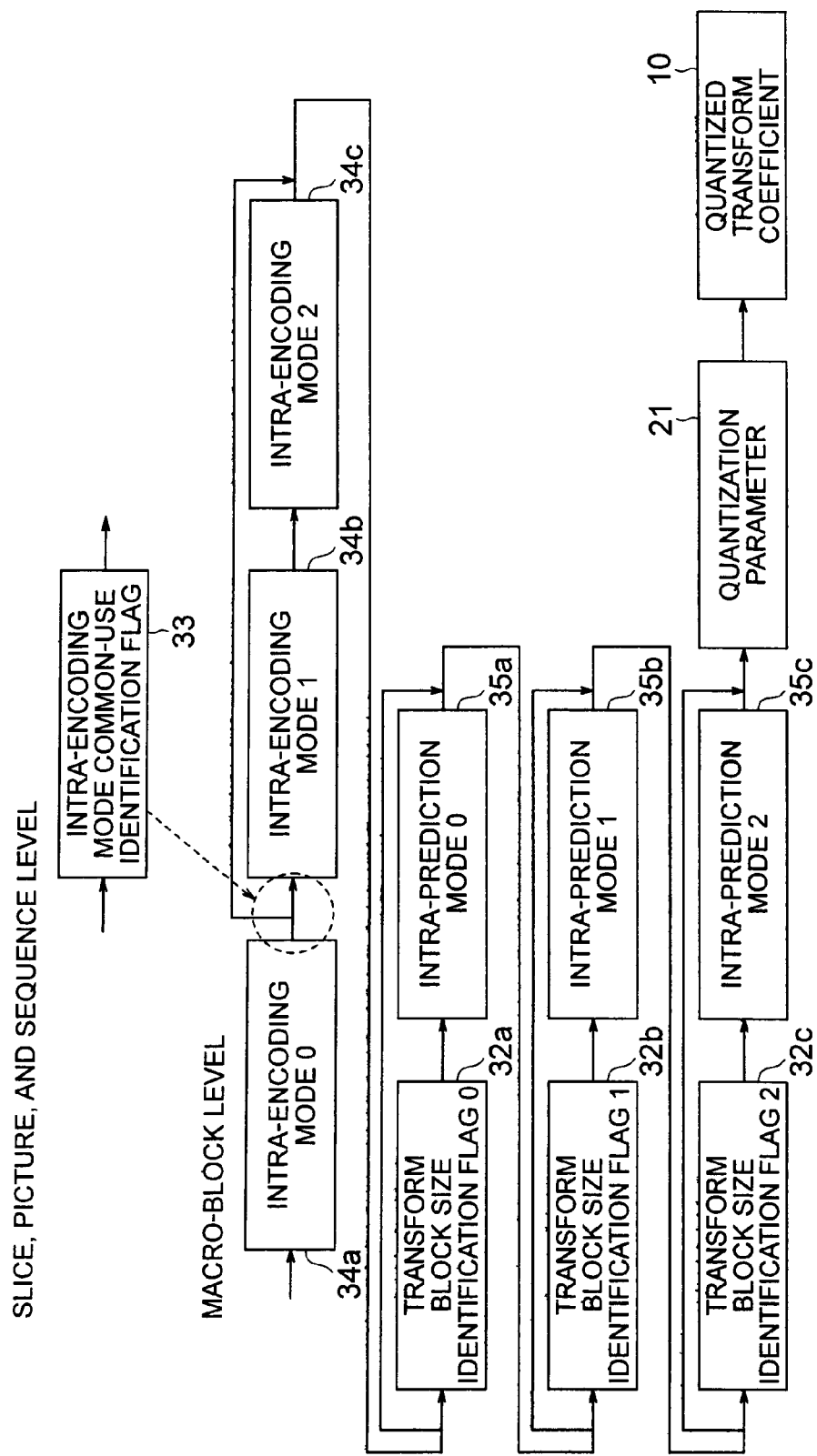
FIG. 16 is a diagram for explaining another data array of the video bit stream outputted from the video encoder according to the second embodiment.

In the second embodiment, the intra-encoding mode common-use identification flag 33 is used to indicate "common to all the components". However, the intra-encoding mode common-use identification flag 33 may be used to indicate, according to a color space definition of the input video signal 1, for example, "common to specific two components such as C1 and C2" (in the case of Y, Cb, and Cr or the like, it is highly possible to use the intra-prediction mode in common for Cb and Cr). When a common-use range of the intra-encoding mode common-use identification flag 33 is limited to only the intra-encoding mode and the intra N×N prediction mode is used, a transform block size and an N×N prediction mode may be independently selected for each of color components (FIG. 16). With a syntax structure shown in FIG. 16, it is possible to change a prediction method for each of color components and improve prediction efficiency while using encoding mode information in common for a video of a complicated pattern that requires the N×N prediction.

If the information on the intra-encoding mode common-use identification flag 33 is known by some means in both the encoder and the decoder in advance, the information on the intra-encoding mode common-use identification flag 33 does not have to be transmitted on a bit stream of a video. In that case, for example, in the encoder, the intra-encoding mode common-use identification flag 33 may be formed to perform encoding fixedly for some value or may be transmitted separately from the bit stream of the video.

3. Outline of Operations of the Decoder

The decoder in FIG. 12 receives the video stream 22 conforming to the array in FIG. 15 outputted from the encoder in FIG. 11, performs decoding processing by a unit of a macro-block in which three color components have an identical size (the 4:4:4 format), and restores respective video frames.

First, the variable-length decoding unit 25 is inputted with the stream 22, decodes the stream 22 in accordance with a predetermined rule (syntax), and extracts information including the intra-encoding mode common-use identification flag 33, the quantized transform coefficient 10, the encoding mode 6, and the quantization parameter 21. The quantized transform coefficient 10 is inputted to the inverse quantization unit 12 together with the quantization parameter 21 and inverse quantization processing is performed. Subsequently, an output of the inverse quantization unit 12 is inputted to the inverse transform unit 13 and restored to the local decoding prediction difference signal 14. On the other hand, the encoding mode 6 and the intra-encoding mode common-use identification flag 33 are inputted to the spatial prediction unit 2. The spatial prediction unit 2 obtains the predicted image 7 in accordance with those pieces of information. A specific procedure for obtaining the predicted image 7 will be described later. The local decoding prediction difference signal 14 and the predicted image 7 are added by the adder 18 to obtain the interim decoded image 15 (this is completely the same signal as the local decoded image 15 in the encoder). The interim decoded image 15 is written back to the memory 16 to be used for intra-prediction of a macro-block after that. Three memories are prepared for the respective color components. The de-blocking filter 26 is caused to act on the interim decoded image 15 on the basis of an indication of the de-blocking filter control flag 24 decoded by the variable-length decoding unit 25 to obtain the final decoded image 27.

4. Intra-Prediction Decoding Processing in the Decoder

The intra-predicted image generation processing, which is a characteristic of the decoder in the second embodiment, will be described in detail. This processing is carried out by a unit of the macro-block in which three color components are arranged. The processing is performed mainly by the variable-length decoding unit 25 and the spatial prediction unit 2 of the decoder in FIG. 12. A flowchart showing a flow of the processing is shown in FIG. 17.

Figure 17:
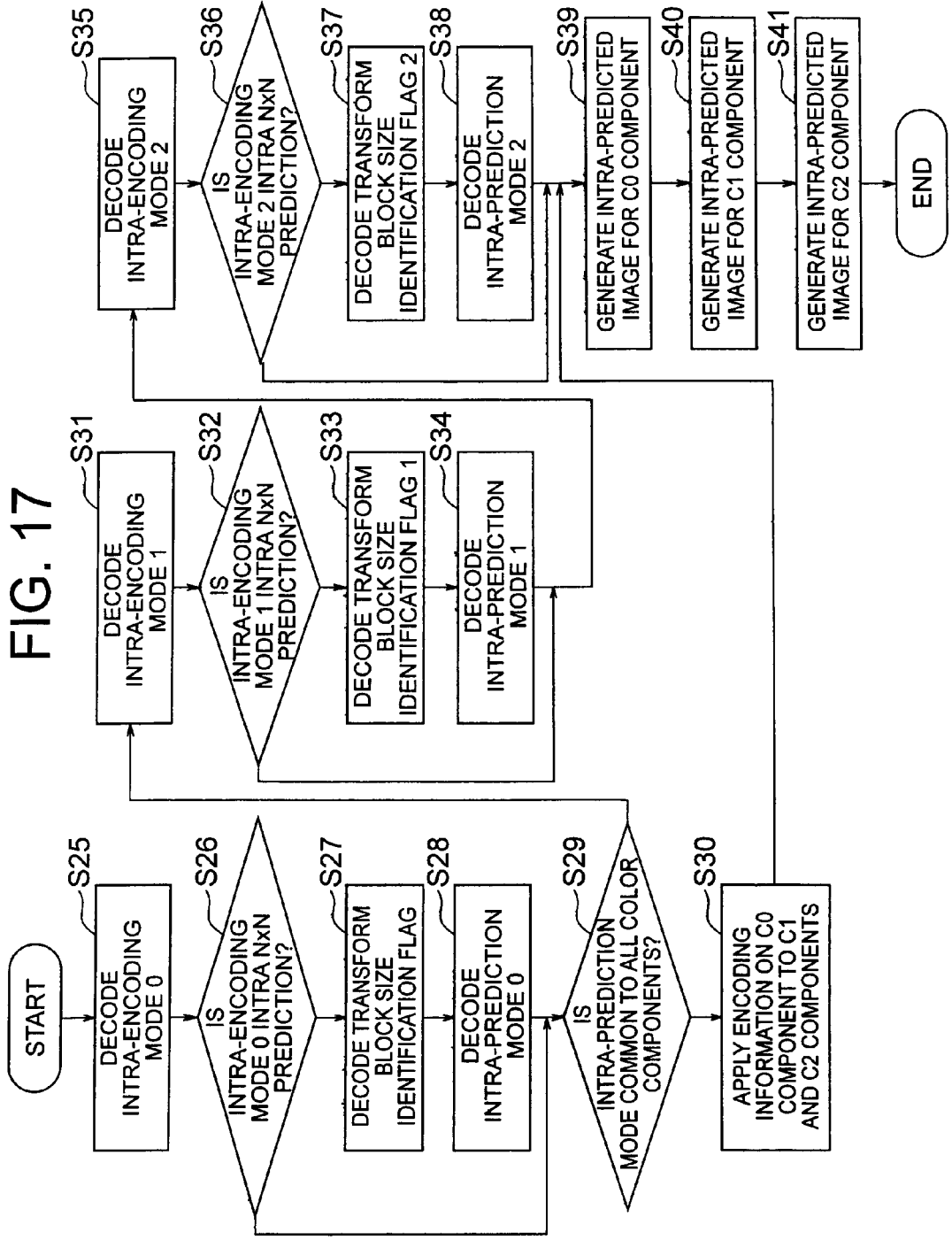
FIG. 17 is a flowchart for explaining a procedure of intra-prediction decoding processing performed in the video decoder of FIG. 12.

Steps S25 to S38 in the flowchart in FIG. 17 are performed by the variable-length decoding unit 25. The video stream 22 inputted to the variable-length decoding unit 25 conforms to the data array in FIG. 15. In Step S25, first, the intra-encoding mode 0(34a) (corresponding to the C0 component) of the data in FIG. 15 is decoded. As a result, when the intra-encoding mode 0(34a) is the "intra N×N prediction", the variable-length decoding unit 25 decodes the transform block size identification flag 0(32a) and the intra-prediction mode 0(35a) (Steps S26 and S27). Subsequently, when it is judged that intra-encoding/prediction mode information is common to all the color components on the basis of a state of the intra-encoding mode common-use identification flag 33, the variable-length decoding unit 25 sets the intra-encoding mode 0(34a), the transform block size identification flag 0(32a), and the intra-prediction mode 0(35a) as encoding information used for the C1 and the C2 components (Steps S29 and S30). Processing in macro-block units is shown in FIG. 17. The intra-encoding mode common-use identification flag 33 used for the judgment in Step S29 is read out from the bit stream 22 by the variable-length decoding unit 25 at a layer level equal to or higher than a slice before the variable-length decoding unit 25 enters the process of START in FIG. 17.

When it is judged in Step S29 in FIG. 17 that the intra-encoding/prediction mode information is encoding for each of color components, in the following Steps S31 to S38, the variable-length decoding unit 25 decodes the intra-encoding/prediction mode information for the C1 and the C2 components. The encoding modes 6 for the respective color components are set through the processing steps and outputted to the spatial prediction unit 2 to obtain intra-predicted images for the respective color components in accordance with Steps S39 to S41. The process for obtaining the intra-predicted images conforms to the procedures in FIGS. 3, 4, and 13 and is the same as the processing performed by the encoder in FIG. 11.

As described above, if the information on the intra-encoding mode common-use identification flag 33 is known by some means in both the encoder and the decoder in advance, the decoder may perform decoding, for example, with a fixed value in advance rather than analyzing a value of the intra-encoding mode common-use identification flag 33 from a bit stream of a video or may be transmit the information separately from the bit stream of the video.

In the 4:2:0 format adopted in the conventional video encoding standard, the definition of color spaces is fixed to Y, Cb, and Cr. In the 4:4:4 format, the definition of color spaces is not limited to Y, Cb, and Cr, but it is possible to use various color spaces. By forming the encoding information on an intra-macro-block as shown in FIGS. 15 and 16, it is possible to perform optimum encoding processing according to a definition of color spaces of the input video signal 1 and characteristics of a video signal. In addition, it is possible to uniquely interpret a bit stream obtained as a result of such encoding processing to perform video decoding and reproduction processing.

Third Embodiment

In the third embodiment, another example of the structures of the encoder in FIG. 11 and the decoder in FIG. 12 is described. As in the first embodiment, the characteristics peculiar to the invention are given to the encoder and the decoder on the basis of an encoding system adopted in the MPEG-4 AVC(ISO/IEC 14496-10)/ITU-TH.264 standard, which is a Non-Patent Document 1. A video encoder in the third embodiment is different from the encoder of the second embodiment explained with reference to FIG. 11 only in operations of the variable-length encoding unit 11. A video decoder in the third embodiment is different from the decoder of the second embodiment explained with reference to FIG. 12 only in operations of the variable-length decoding unit 25. Otherwise the video encoder and the video decoder perform operations the same as those in the second embodiment. Only the differences will be explained.

1. Encoding Procedure for Intra-Prediction Mode Information in the Encoder

In the encoder in the second embodiment, the variable-length encoding unit 11 indicates a data array on a bit stream for information on the intra N×N prediction mode but does not specifically indicate an encoding procedure for the information. In this embodiment, a specific method of the encoding procedure is described. This embodiment is characterized in that, in particular, entropy encoding in which a correlation of values among color components is used is performed for intra N×N prediction modes obtained in respective color components taking into account the case in which values of the intra N×N prediction modes have a high correlation among the color components.

Figure 19:
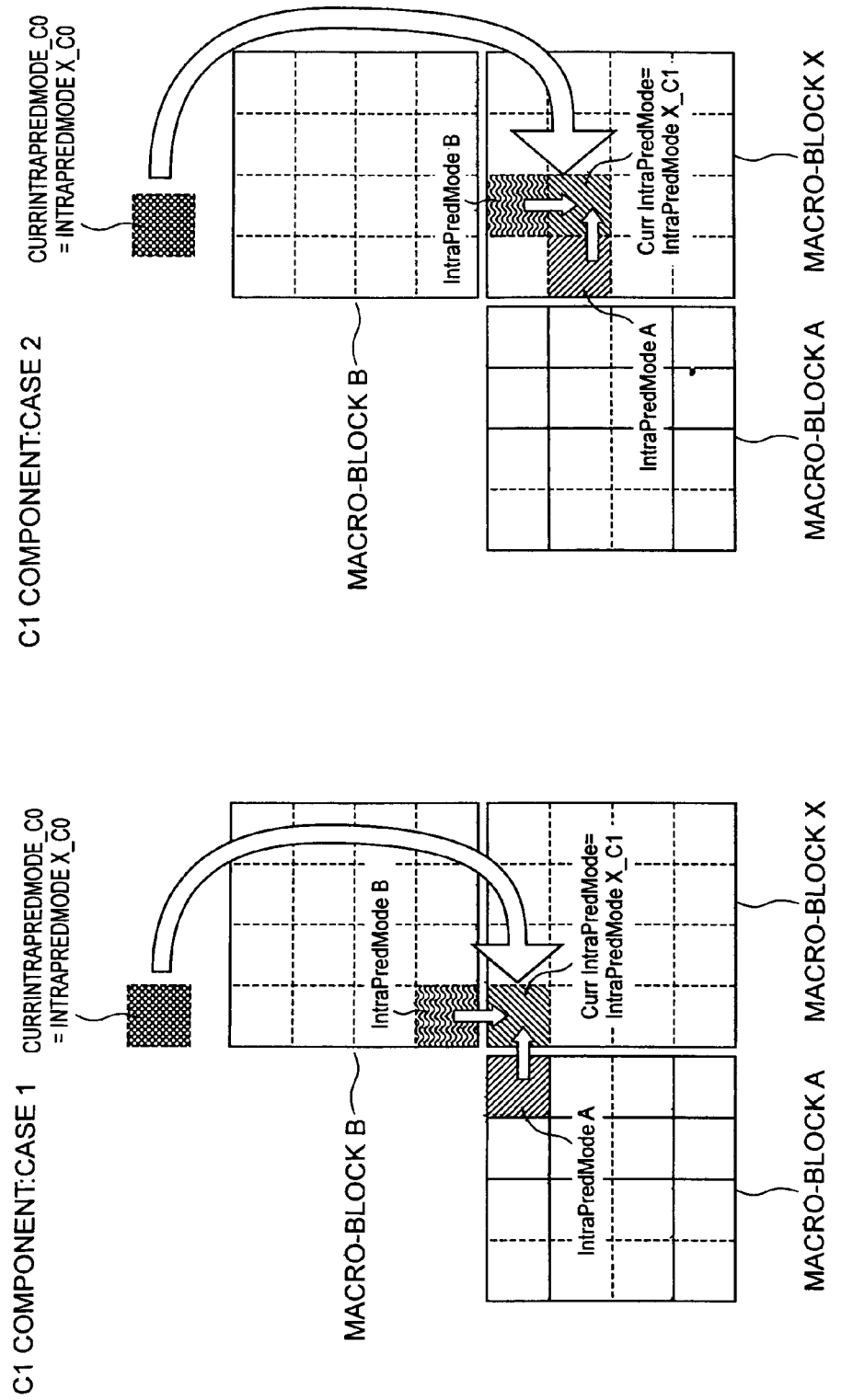
FIG. 19 is a diagram for explaining parameters of the intra-prediction mode encoding processing of a C1 component according to the third embodiment.
Figure 20:
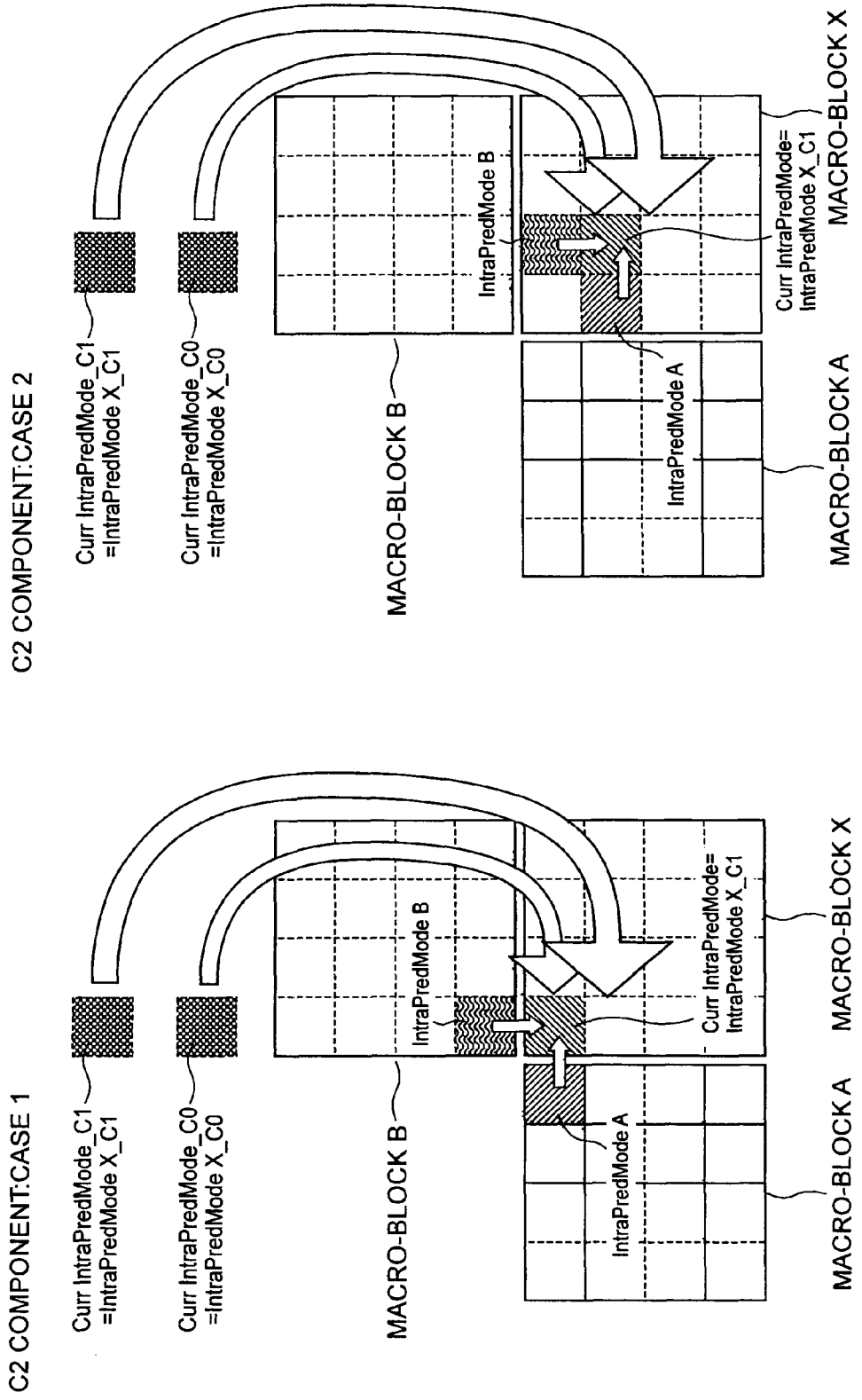
FIG. 20 is a diagram for explaining parameters of the intra-prediction mode encoding processing of a C2 component according to the third embodiment.

The following explanation is on condition that the bit stream array in the format in FIG. 16 is adopted. For simplification of the explanation, a value of the intra-encoding mode common-use identification flag 33 is set to be used in common for C0, C1, and C2, the intra-encoding mode is the intra N×N prediction mode, and transform block sizes 0 to 2 are the 4×4 block. In this case, all the intra-prediction modes 0 to 2 (35a to 35c) are the intra 4×4 prediction mode. In FIGS. 18 to 20, a current macro-block to be encoded is X. A macro-block on the left of the current macro-block is a macro-block A and a macro-block right above the current macro-block is a macro-block B.

Figure 21:
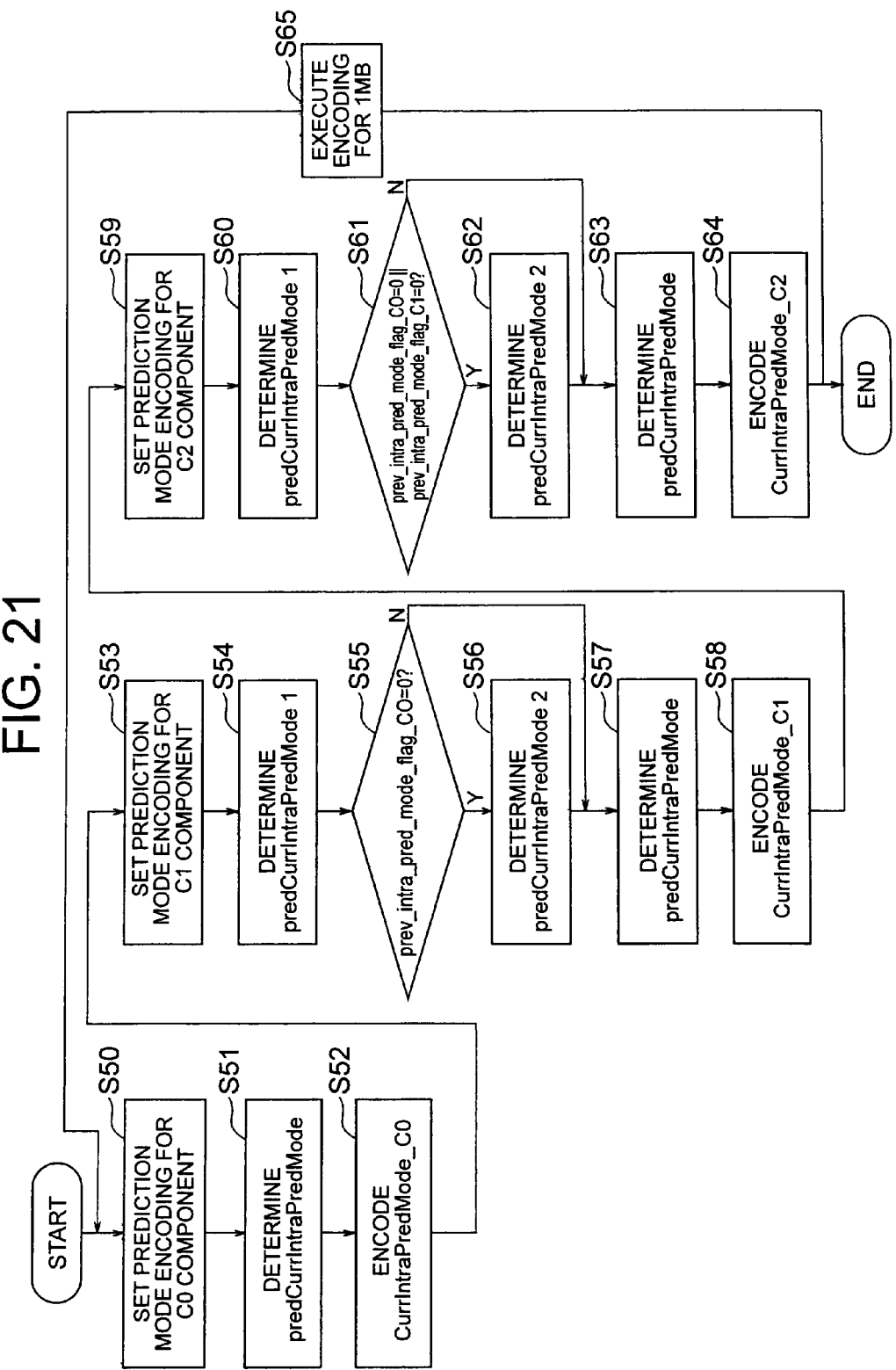
FIG. 21 is a flowchart showing a flow of the intra-prediction mode encoding processing according to the third embodiment.
Figure 22:
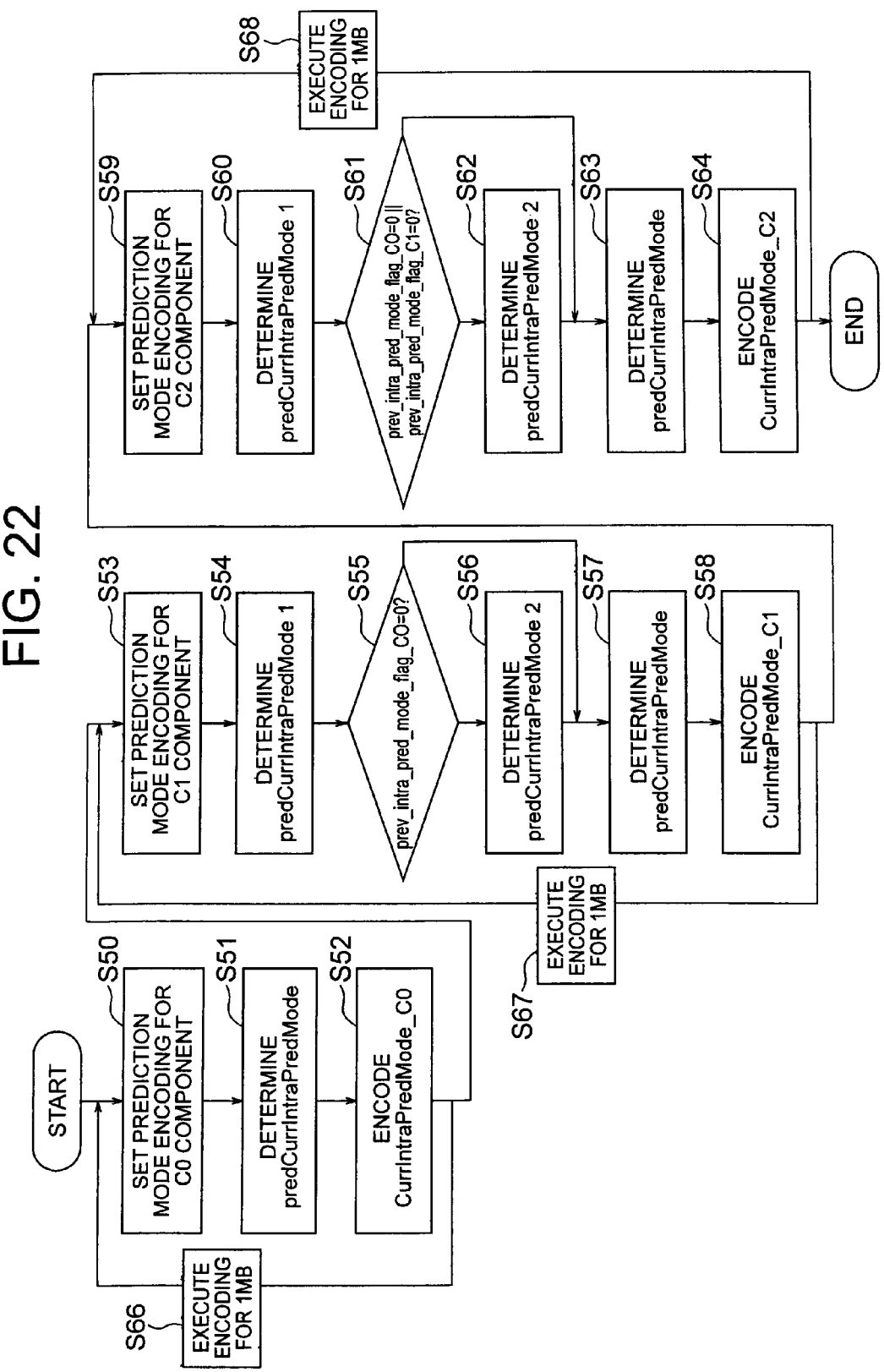
FIG. 22 is a flowchart showing another flow of the intra-prediction mode encoding processing according to the third embodiment.

As diagrams for explaining an encoding procedure for respective color components C0, C1, and C2, FIGS. 18 to 20 are used. Flowcharts of the procedure are shown in FIGS. 21 and 22.

A state of the C0 component of the macro-block X is shown in FIG. 18. The 4×4 block to be encoded is referred to as a block X and 4×4 blocks on the left of and above the block X are referred to as a block A and a block B, respectively. There are two cases according to a position of the 4×4 block to be encoded. In a case 1, the 4×4 blocks on the left of and above the 4×4 block to be encoded are on the outside of the current macro-block X, or, belong to the macro-block A or the macro-block B. In a case 2, the 4×4 blocks on the left of and above the 4×4 block to be encoded are on the inside of the current-macro block X, or, belong to the macro-block X. In both the cases, one intra 4×4 prediction mode is allocated to each of the 4×4 block X in the macro-block X. This intra 4×4 prediction mode is CurrIntraPredMode. The intra 4×4 prediction mode of the block A is IntraPredModeA and the intra 4×4 prediction mode of the block B is IntraPredModeB. Both IntraPredModeA and IntraPredModeB are information already encoded at a point when the block X is encoded. In encoding an intra 4×4 prediction mode of a certain block X, first, the variable-length encoding unit 11 performs allocation of these parameters (Step S50 in FIG. 21).

The variable-length encoding unit 11 sets a predicted value predCurrIntraPredMode for CurrIntraPredMode of the block X according to the following equation (Step S51).

predCurrIntraPredMode=Min(IntraPredModeA,IntraPredModeB)

The variable-length encoding unit 11 performs encoding of CurrIntraPredMode of the C0 component. Here, if CurrIntraPredMode=predCurrIntraPredMode, the variable-length encoding unit 11 encodes a 1-bit flag (prev_intra_pred_mode_flag) indicating that CurrIntraPredMode is the same as the predicted value. If CurrIntraPredMode!=predCurrIntraPredMode, the variable-length encoding unit 11 compares CurrIntraPredMode and predCurrIntraPredMode. When CurrIntraPredMode is smaller, the variable-length encoding unit 11 encodes CurrIntraPredMode as it is. When CurrIntraPredMode is larger, the variable-length encoding unit 11 encodes CurrIntraPredMode-1 (Step S52).

```
if(CurrIntraPredMode == predCurrIntraPredMode)
{
    prev_intra_pred_mode_flag = 1;
}
else
{
    prev_intra_pred_mode_flag = 0;
    if( CurrIntraPredMode < predCurrIntraPredMode)
        rem_intra_pred_mode = CurrIntraPredMode;
    else
        rem_intra_pred_mode = CurrIntraPredMode - 1;
}
Encode prev_intra_pred_mode_flag;
If(prev_intra_pred_mode_flag == 0)
    Encode rem_intra_pred_mode;
```

An encoding procedure for the C1 component will be described with reference to FIG. 19. First, in the same manner as the encoding procedure for the C0 component, the variable-length encoding unit 11 sets near encoding parameters such as IntraPredModeA and IntraPredModeB according to a position of the block X (Step S53).

The variable-length encoding unit 11 sets a predicted value candidate 1 predCurrIntraPredMode1 for CurrIntraPredMode of the block X according to the following equation (Step S54).

predCurrIntraPredMode1=Min(IntraPredModeA,IntraPredModeB)

If prev_intra_pred_mode_flag=1 in the C0 component, the variable-length encoding unit 11 adopts this predCurrIntraPredMode1 as predCurrIntraPredMode in the block X of the C1 component as it is. This is because of the following reason.

The adoption of prev_intra_pred_mode_flag=1 in the identical block position of the C0 component means that a correlation among prediction modes is high in a near image region in the C0 component. In such a case, in the case of an RGB signal or the like from which a correlation of texture structures has not been completely removed between the C0 component and the C1 component, it is highly likely that, also in the C1 component, a correlation is high among near image regions as in the C0 component. Therefore, the variable-length encoding unit 11 judges that a predicted value of the C1 component does not depend on the intra 4×4 prediction mode of the C0 component.

On the other hand, in the C0 component, when prev_intra_pred_mode_flag=0, or, rem_intra_pred_mode is encoded (Step S55), the variable-length encoding unit 11 sets CurrIntraPredMode of the C0 component as a predicted value candidate 2 (Step S56). This means that predCurrIntraPredMode2=CurrIntraPredMode_C0

This is set as a predicted value candidate because of the following background. Encoding of rem_intra_pred_mode in the C0 component means that a correlation of intra prediction among near image regions is low in the C0 component. In that case, it is anticipated that a correlation among near image regions is also low in the C1 component. It is likely that intra-prediction modes in an identical block position in different color components give better predicted values.

The variable-length encoding unit 11 finally sets a predicted value of CurrIntraPredMode in the block X of the C1 component as a value of one of predCurrIntraPredMode1 and predCurrIntraPredMode2 (Step S57). Which of the values is used is additionally encoded by a 1-bit flag (pred_flag). However, pred_flag is encoded only when CurrIntraPredMode coincide with the predicted value. When CurrIntraPredMode does not coincide with the predicted value (when rem_intra_pred_mode is encoded), predCurrINtraPredMode1 is used as the predicted value.

The procedure described above is described as expressions as follows.

```
If( prev_intra_pred_mode_flag_C0 == 1 )
{
    predCurrIntraPredMode = Min( IntraPredModeA,
IntraPredModeB );
}
else
{
    predCurrIntraPredMode1 = Min( IntraPredModeA,
    IntraPredModeB );
    predCurrIntraPredMode2 = CurrIntraPredMode_C0;
    if( CurrIntraPredMode    == predCurrIntraPredMode1 )
    {
      prev_intra_pred_mode_flag = 1;
      pred_flag = 0;    // Use the predicted value candidate 1
    }
    else if(CurrIntraPredMode    == predCurrIntraPredMode2 )
{
    prev_intra_pred_mode_flag = 1;
    pred_flag = 1; // Use the predicted value candidate 2
    }
    else
{
prev_intra_pred_mode_flag = 0;
        if( CurrIntraPredMode < predCurrIntraPredMode1 )
            rem_intra_pred_mode = CurrIntraPredMode;
        else
            rem_intra_pred_mode = CurrIntraPredMode - 1;
}
}
Encode prev_intra_pred_mode_flag ;
if(prev_intra_pred_mode_flag == 1)
    Encode pred_flag;
else // If(prev_intra_pred_mode_flag == 0)
    Encode rem_intra_pred_mode ;
```

As a result, prev_intra_pred_mode_flag, pred_flag, and rem_intra_pred_mode are encoded as encoded data (Step S58).

An encoding procedure for the C2 component will be described with reference to FIG. 20. First, in the same manner as the encoding procedure for the C0 and C1 components, the variable-length encoding unit 11 sets near encoding parameters such as IntraPredModeA and IntraPredModeB according to a position of the block X (Step S59).

The variable-length encoding unit 11 sets a predicted value candidate 1 predCurrIntraPredMode1 for CurrIntraPredMode of the block X according to the following equation (Step S60).

predCurrIntraPredMode1=Min(IntraPredModeA,IntraPredModeB)

If prev_intra_pred_mode_flag=1 in both the C0 and C1 components, the variable-length encoding unit 11 adopts this predCurrIntraPredMode1 as predCurrIntraPredMode in the block X of the C1 component as it is. This is because of the following reason. The adoption of prev_intra_pred_mode_flag=1 in the identical block position of the C0 and C1 components means that a correlation among prediction modes is high in a near image region in the C0 and C1 components. In such a case, in the case of an RGB signal or the like from which a correlation of texture structures has not been completely removed between the C0 component, the C1 component and the C2 component, it is highly likely that, also in the C2 component, a correlation is high among near image regions as in the C0 and C1 components. Therefore, the variable-length encoding unit 11 judges that a predicted value of the C2 component does not depend on the intra 4×4 prediction mode of the C0 and C1 components.

On the other hand, in the C0 or C1 components, when prev_intra_pred_mode_flag=0, or, rem_intra_pred_mode is encoded (Step S61), the variable-length encoding unit 11 sets CurrIntraPredMode of the C0 or C1 components as a predicted value candidate 2 (Step S62). This means that If (prev_intra_pred_mode_flag_C0==0 && pred_intra_pred_mode_flag_C1==1) predCurrIntraPred Mode2= CurrIntraPredMode_C0;

else if ( prev_intra_pred_ mode_flag_C0==1&& pred_intra_pred_mode_flag_C==0)

predCurrIntraPredMode2=CurrIntraPredMode_C1;

else predCurrIntraPredMode2=CurrIntraPredMode_C1;

This is set as a predicted value candidate because of the following background. Encoding of rem_intra_pred_mode in the C0 or C1 components means that a correlation of intra prediction among near image regions in the C0 or C1 components. In that case, it is anticipated that a correlation among near image regions is also low in the C2 component. It is likely that intra-prediction modes in an identical block position in different color components give better predicted values. According to this idea, when rem_intra_pred_mode is encoded in both the C0 and C1 components, current intra-prediction modes of both C0 and C1 can be a candidate of a predicted value. However, the current intra-prediction mode of the C1 component is adopted as a predicted value. This is because, when YUV color spaces are inputted, it is highly likely that C0 is treated as luminance and C1/C2 is treated as a color difference and, in that case, it is considered that C1 is closer to a prediction mode of C2 than C0. In the case of input of RGB color spaces, it is not such a significant factor whether C0 is selected or C1 is selected. It is considered that, in general, it is appropriate to adopt the C1 component as a predicted value (the C2 component may be adopted as a predicted value depending on a design).

The variable-length encoding unit 11 finally sets a predicted value of CurrIntraPredMode in the block X of the C2 component as a value of one of predCurrIntraPredMode1 and predCurrIntraPredMode2 (Step S63). Which of the values is used is additionally encoded by a 1-bit flag (pred_flag).

The procedure described above is described as expressions as follows.

```
If( prev_intra_pred_mode_flag_C0 == 1 &&
prev_intra_pred_mode_flag == 1 )
{
     predCurrIntraPredMode = Min( IntraPredModeA,
IntraPredModeB );
}
else
{
     predCurrIntraPredMode1 = Min( IntraPredModeA,
IntraPredModeB );
If( prev_intra_pred_mode_flag_C0 == 0 &&
pred_intra_pred_mode_flag_C1 == 1 )
predCurrIntraPredMode2 = CurrIntraPredMode_C0;
else if(prev_intra_pred_mode_flag_C0 == 1 &&
     pred_intra_pred_mode_flag_C1 == 0 )predCurrIntraPredMode2 =
CurrIntraPredMode_C1;
     else
  predCurrIntraPredMode2 = CurrIntraPredMode_C1;
        if( CurrIntraPredMode == predCurrIntraPredMode1 )
        {
            prev_intra_pred_mode_flag = 1;
            pred_flag = 0;    // Use the predicted value candidate 1
        }
        else if(CurrIntraPredMode == predCurrIntraPredMode2 )
    {
            prev_intra_pred_mode_flag = 1;
            pred_flag = 1; // Use the predicted value candidate 2
        }
        else
    {
  prev_intra_pred_mode_flag = 0;
        if( CurrIntraPredMode < predCurrIntraPredMode1 )
            rem_intra_pred_mode = CurrIntraPredMode;
        else
            rem_intra_pred_mode = CurrIntraPredMode – 1;
}
}
Encode prev_intra_pred_mode_flag ;
if(prev_intra_pred_mode_flag == 1)
    Encode pred_flag;
    else // If(prev_intra_pred_mode_flag == 0)
    Encode rem_intra_pred_mode ;
```

As a result, prev_intra_pred_mode_flag, pred_flag, and rem_intra_pred_mode are encoded as encoded data (Step S64).

It is possible to define the encoding procedure described above for the intra 8×8 prediction mode in the same manner. By encoding the intra N×N prediction mode in such a procedure, it is possible to make use of a correlation between the intra N×N prediction mode and a prediction mode selected in other color components and it is possible to reduce a code amount of the prediction mode itself and improve encoding efficiency.

A difference between FIG. 21 and FIG. 22 is whether the encoding processing for an intra-prediction mode per MB is separately performed for each of color components or collectively performed. In the case of FIG. 21, the variable-length encoding unit 11 performs encoding of respective color components by a unit of a 4×4 block and arrays sixteen patterns of the blocks collected in a bit stream (Step S65). In the case of FIG. 22, the variable-length encoding unit 11 collectively encodes sixteen 4×4 blocks of the respective color components and arrays the blocks in a bit stream for each of the color components (Steps S66, S67, and S68).

In the procedure described above, pred_flag is information that is effective only when prev_intra_pred_mode_flag is 1. However, pred_flag may also be effective when prev_intra_pred_mode_flag is 0. That is, with the C1 component as an example, encoding may be performed in a procedure described below.

```
If( prev_intra_pred_mode_flag_C0 == 1 )
    {
        predCurrIntraPredMode = Min( IntraPredModeA, IntraPredModeB );
    if( CurrIntraPredMode == predCurrIntraPredMode )
        {
            prev_intra_pred_mode_flag = 1;
        }
        Else{
         if( CurrIntraPredMode < predCurrIntraPredMode )
             rem_intra_pred_mode = CurrIntraPredMode;
          else
             rem_intra_pred_mode = CurrIntraPredMode – 1;
        }
    }
    else
    {
        predCurrIntraPredMode1 = Min( IntraPredModeA,
            IntraPredModeB );
        predCurrIntraPredMode2 = CurrIntraPredMode_C0;
    if( CurrIntraPredMode     == predCurrIntraPredMode1 )
    {
        prev_intra_pred_mode_flag = 1;
        pred_flag = 0;    // Use the predicted value candidate 1
    }
    else if(CurrIntraPredMode     == predCurrIntraPredMode2 )
    {
        prev_intra_pred_mode_flag = 1;
        pred_flag = 1;    // Use the predicted value candidate 2
    }
else
{
prev_intra_pred_mode_flag = 0;
if( | CurrIntraPredMode – predCurrIntraPredMode1 | <
        | CurrIntraPredMode    predCurrIntraPredMode2 | )
    {
        pred_flag = 0;
        predCurrIntraPredMode = predCurrIntraPredMode1;
    }
Else
    {
        pred_flag = 1;
        predCurrIntraPredMode = predCurrIntraPredMode2;
    }
        if( CurrIntraPredMode < predCurrIntraPredMode )
            rem_intra_pred_mode = CurrIntraPredMode;
        else
            rem_intra_pred_mode = CurrIntraPredMode – 1;
    }
}
Encode prev_intra_pred_mode_flag ;
If(prev_intra_pred_mode_flag_C0 == 0)
Encode pred_flag;
If(prev_intra_pred_mode_flag == 0)
    Encode rem_intra_pred_mode ;
```

In this method, when rem_intra_pred_mode is encoded in an intra-prediction mode in a block in an identical position of the C0 component, pred_flag is always encoded. However, even when prev_intra_pred_mode_flag=0, it is possible to use a more highly accurate predicted value. Thus, it is possible to expect improvement of encoding efficiency. Further, pred_flag may be encoded without depending on whether rem_intra_pred_mode is encoded in the intra-prediction mode in the block in the identical position of the C0 component. In this case, an intra-prediction mode of the C0 component is always used as a predicted value candidate.

That is, expressions in this case are as described below.

```
If( prev_intra_pred_mode_flag_C0 == 1 )
{
    predCurrIntraPredMode = Min( IntraPredModeA, IntraPredModeB );
    if( CurrIntraPredMode    == predCurrIntraPredMode )
        {
            prev_intra_pred_mode_flag = 1;
        }
        Else{
            if( CurrIntraPredMode < predCurrIntraPredMode )
                rem_intra_pred_mode = CurrIntraPredMode;
            else
                rem_intra_pred_mode = CurrIntraPredMode - 1;
        }
}
else
{
    predCurrIntraPredMode1 = Min( IntraPredModeA,
        IntraPredModeB );
    predCurrIntraPredMode2 = CurrIntraPredMode_C0;
    if( CurrIntraPredMode    == predCurrIntraPredMode1 )
    {
        prev_intra_pred_mode_flag = 1;
        pred_flag = 0;   // Use the predicted value candidate 1
    }
    else if(CurrIntraPredMode == predCurrIntraPredMode2 )
    {
        prev_intra_pred_mode_flag = 1;
        pred_flag = 1; // Use the predicted value candidate 2
    }
    else
    {
    prev_intra_pred_mode_flag = 0;
    if( | CurrIntraPredMode - predCurrIntraPredMode1 | <
            | CurrIntraPredMode predCurrIntraPredMode2 | )
    {
        pred_flag = 0;
        predCurrIntraPredMode = predCurrIntraPredMode1;
    }
    Else
    {
        pred_flag = 1;
        predCurrIntraPredMode = predCurrIntraPredMode2;
    }
        if( CurrIntraPredMode < predCurrIntraPredMode )
            rem_intra_pred_mode = CurrIntraPredMode;
        else
            rem_intra_pred_mode = CurrIntraPredMode - 1;
    }
}
Encode prev_intra_pred_mode_flag ;
If(prev_intra_pred_mode_flag_C0 == 0)
Encode pred_flag;
If(prev_intra_pred_mode_flag == 0)
    Encode rem_intra_pred_mode ;
```

The flag pred_flag may be set by a unit of a macro-block or a sequence rather than in 4×4 block units. When pred_flag is set in macro-block units, the predicted value candidate 1 or the predicted value candidate 2 is used in common for all 4×4 blocks in the macro-block. Thus, it is possible to further reduce overhead information transmitted as pred_flag. Since it is set, according to an input color space definition, which of the predicted value candidate 1 or the predicted value candidate 2 is used, it is possible to set pred_flag by a unit of a sequence. In this case, it is unnecessary to transmit pred_flag for each macro-block either. Thus, it is possible to further reduce the overhead information.

2. Decoding Procedure for Intra-Prediction Mode Information in the Decoder

In the decoder in the second embodiment, the variable-length encoding unit 25 indicates a data array on a bit stream for information on the intra N×N prediction mode but does not specifically indicate a decoding procedure for the information. In the third embodiment, a specific method of the decoding procedure is described. The third embodiment is characterized in that, in particular, a bit stream, which is subjected to the entropy encoding in which a correlation of values among color components is used, is decoded for intra N×N prediction modes obtained in respective color components taking into account the case in which values of the intra N×N prediction modes have a high correlation among the color components.

Figure 23:
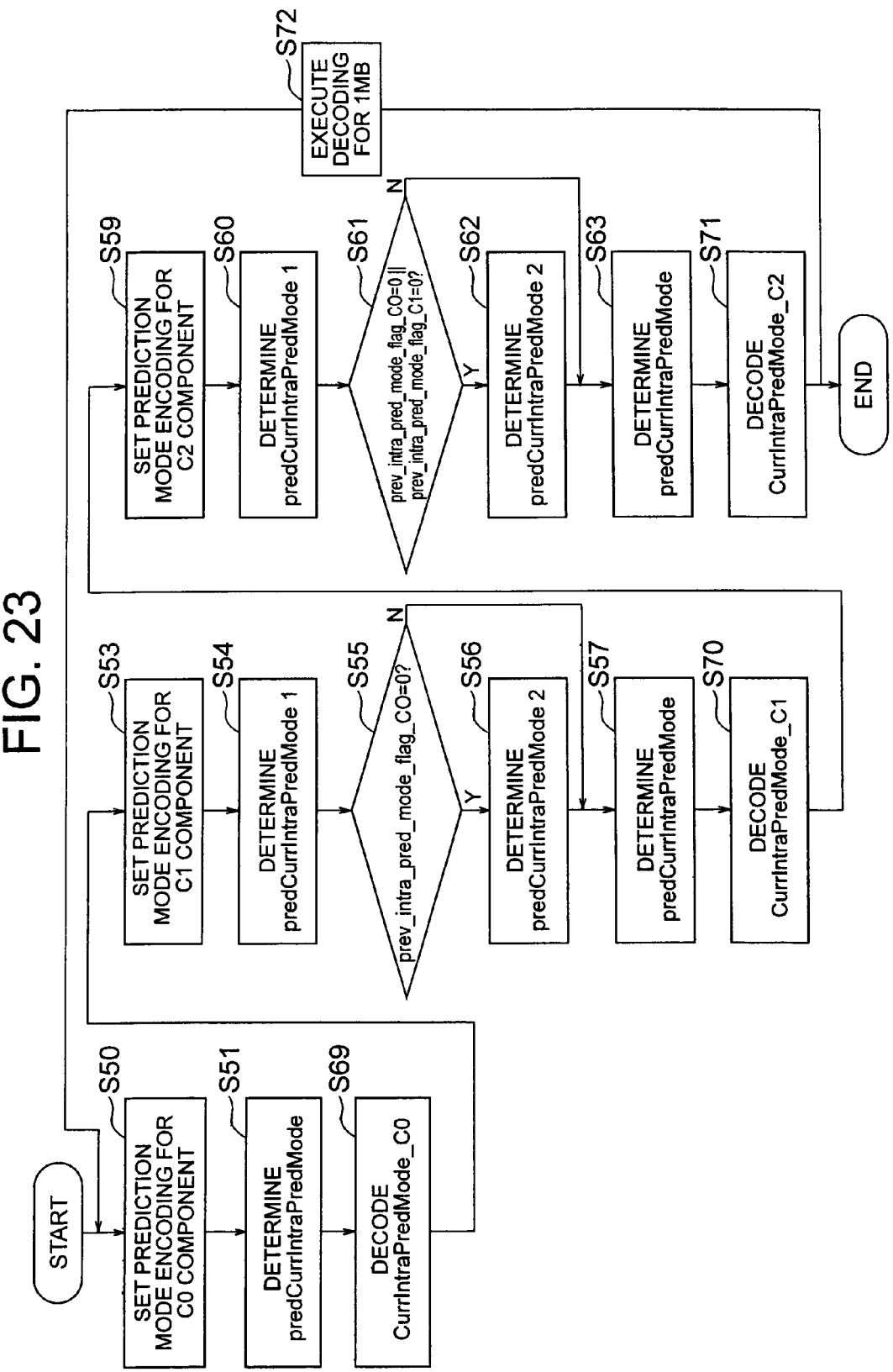
FIG. 23 is a flowchart showing a flow of the intra-prediction mode decoding processing according to the third embodiment.

The following explanation is on condition that the bit stream array in the format in FIG. 16 is adopted. To limit the explanation to a decoding procedure for an intra-prediction mode, a value of the intra-encoding mode common-use identification flag 33 in a bit stream is set to be used in common for C0, C1, and C2. The intra N×N prediction mode is designated as the intra-encoding mode. The 4×4 block is designated as transform block sizes 0 to 2. In this case, all the intra-prediction modes 0 to 2 (35a to 35c) are the intra 4×4 prediction mode. As in the encoder, the relation in FIGS. 18 to 20 is used for the decoder. In the decoder, a current macro-block to be subjected to decoding is X. A macro-block on the left of the current macro-block is a macro-block A and a macro-block right above the current macro-block is a macro-block B. A flowchart of a decoding procedure is shown in FIG. 23. In FIG. 23, steps denoted by reference symbols the same as those in FIGS. 21 and 22 indicate that processing is the same as the processing of the encoder is executed.

A state of the C0 component of the macro-block X is shown in FIG. 18. There are two cases according to a position of the 4×4 block to be decoded. In a case 1, the 4×4 blocks on the left of and above the 4×4 block to be decoded are on the outside of the current macro-block X, or, belong to the macro-block A or the macro-block B. In a case 2, the 4×4 blocks on the left of and above the 4×4 block to be decoded are on the inside of the current-macro block X, or, belong to the macro-block X. The 4×4 block to be decoded is referred to as a block X and 4×4 blocks on the left of and above the block X are referred to as a block A and a block B, respectively. In both the cases, one intra 4×4 prediction mode is allocated to each of the 4×4 block X in the macro-block X. This intra 4×4 prediction mode is CurrIntraPredMode. The intra 4×4 prediction mode of the block A is IntraPredModeA and the intra 4×4 prediction mode of the block B is IntraPredModeB. Both IntraPredModeA and IntraPredModeB are information already decoded at a point when the block X is encoded. In decoding an intra 4×4 prediction mode of a certain block X, first, the variable-length decoding unit 25 performs allocation of these parameters (Step S50).

The variable-length decoding unit 25 sets a predicted value predCurrIntraPredMode for CurrIntraPredMode of the block X according to the following equation (Step S51).

$$predCurrIntraPredMode = Min(IntraPredModeA, IntraPredModeB)$$

The variable-length decoding unit 25 decodes a 1-bit flag (prev_intra_pred_mode_flag) indicating whether CurrIntraPredMode=predCurrIntraPredMode. Prev_intra_pred_mode_flag=1 means that CurrIntraPredMode=predCurrIntraPredMode. Otherwise, the variable-length decoding unit 25 decodes information on (prev_intra_pred_mode_flag=0) and rem_intra_pred_mode from the bit stream. When rem_intra_pred_mode and predCurrIntraPredMode are compared to find that rem_intra_ pred_mode is smaller, CurrIntraPredMode=rem_ intra_ pred_ mode is set. When CurrIntraPredMode is larger, CurrIntra PredMode=rem_intra_pred_mode+1 is set (Step S65).

These procedures are summarized as follows.

```
predCurrIntraPredMode = Min( IntraPredModeA, IntraPredModeB );
Decode prev_intra_pred_mode_flag;
if(prev_intra_pred_mode_flag == 1)
{
    CurrIntraPredMode == predCurrIntraPredMode;
}
else
{
    Decode rem_intra_pred_mode;
    if(rem_intra_pred_mode < predCurrIntraPredMode )
        CurrIntraPredMode = rem_intra_pred_mode;
    else
        CurrIntraPredMode = rem_intra_pred_mode + 1;
}
```

An decoding procedure for the C1 component will be described with reference to FIG. 19. First, in the same manner as the decoding procedure for the C0 component, the variable-length decoding unit 25 sets near encoding parameters such as IntraPredModeA and IntraPredModeB according to a position of the block X (Step S53).

The variable-length decoding unit 25 sets a predicted value candidate 1 predCurrIntraPredMode1 for CurrIntraPredMode of the block X according to the following equation (Step S54).

predCurrIntraPredMode1=Min(IntraPredModeA,IntraPredModeB)

If prev_intra_pred_mode_flag=1 in the C0 component, this predCurrIntraPredMode1 is adopted as predCurrIntraPredMode in the block X of the C1 component as it is. A reason for this is the same as the reason explained about the encoder.

On the other hand, when prev_intra_pred_mode_flag=0 in the C0 component, or, when rem_intra_pred_mode is decoded (Step S55), the variable-length decoding unit 25 sets CurrIntraPredMode of the C0 component as the predicted value candidate 2 (Step S56). This means that predCurrIntraPredMode2=CurrIntraPredMode_C0

This is set as a predicted value candidate because of a background the same as the reason explained about encoder.

The variable-length decoding unit 25 finally sets a predicted value of CurrIntraPredMode in the block X of the C1 component as a value of one of predCurrIntraPredMode1 and predCurrIntraPredMode2 (Step S57). Which of the values is used is additionally decoded by a 1-bit flag (pred_flag). However, pred_flag is decoded only when CurrIntraPredMode coincide with the predicted value. When CurrIntraPredMode does not coincide with the predicted value (when rem_intra_pred_mode is decoded), predCurrINtraPredMode1 is used as the predicted value.

After the predicted value candidate 1, the predicted value candidate 2, prev_intra_pred_mode_flag, pred_flag, and rem_intra_pred_mode are given, with the following procedure, the variable-length decoding unit 25 decodes CurrIntraPredMode (Step S66).

```
if( prev_intra_pred_mode_flag_C0 == 1 )
{
    pred_flag = 0;   // In this case, pred_flag is not included in
    the bit stream.
    predCurrIntraPredMode = Min( IntraPredModeA, IntraPredModeB );
    Decode prev_intra_pred_mode_flag;
    if(prev_intra_pred_mode_flag == 1)
    {
        CurrIntraPredMode == predCurrIntraPredMode;
    }
    else
    {
        Decode rem_intra_pred_mode;
        if(rem_intra_pred_mode < predCurrIntraPredMode )
            CurrIntraPredMode = rem_intra_pred_mode;
        else
            CurrIntraPredMode = rem_intra_pred_mode + 1;
    }
}
else
{
    predCurrIntraPredMode1 = Min( IntraPredModeA, IntraPredModeB );
    predCurrIntraPredMode2 = CurrIntraPredMode_C0;
    Decode prev_intra_pred_mode_flag;
    if(prev_intra_pred_mode_flag == 1)
    {
        Decode pred_flag;
    If( pred_flag == 0 )
            predCurrIntraPredMode = predCurrIntraPredMode1;
        Else
            predCurrIntraPredMode = predCurrIntraPredMode2;
        CurrIntraPredMode == predCurrIntraPredMode;
    }
    else
    {
        predCurrIntraPredMode = predCurrIntraPredMode1;
        Decode rem_intra_pred_mode;
        if(rem_intra_pred_mode < predCurrIntraPredMode )
            CurrIntraPredMode = rem_intra_pred_mode;
        else
            CurrIntraPredMode = rem_intra_pred_mode + 1;
    }
}
```

A decoding procedure for the C2 component will be described with reference to FIG. 20. First, in the same manner as the encoding procedure for the C0 and C1 components, the variable-length decoding unit 25 sets near encoding parameters such as IntraPredModeA and IntraPredModeB according to a position of the block X (Step S59).

The variable-length decoding unit 25 sets a predicted value candidate 1 predCurrIntraPredMode1 for CurrIntraPredMode of the block X according to the following equation (Step S60).

predCurrIntraPredMode1=Min(IntraPredModeA,IntraPredModeB)

If prev_intra_pred_mode_flag=1 in both the C0 and C1 components, this predCurrIntraPredMode1 is adopted as predCurrIntraPredMode in the block X of the C1 component as it is. A reason for this is the same as the reason explained about the encoder.

On the other hand, when prev_intra_pred_mode_flag=0 in the C0 or C1 components, or, when rem_intra_pred_mode is decoded (Step S61), the variable-length decoding unit 25 sets CurrIntraPredMode of the C0 or C1 components as the predicted value candidate 2 (Step S62).

```
If( prev_intra_pred_mode_flag_C0 == 0 &&
    pred_intra_pred_mode_flag_C1 == 1 )
    predCurrIntraPredMode2 = CurrIntraPredMode_C0;
else if(prev_intra_pred_mode_flag_C0 == 1 &&
    pred_intra_pred_mode_flag_C1 ==
    0 )predCurrIntraPredMode2 = CurrIntraPredMode_C1;
    else
    predCurrIntraPredMode2 = CurrIntraPredMode_C1;
```

This is set as a predicted value candidate because of a background the same as the reason explained about encoder.

The variable-length decoding unit 25 finally sets a predicted value of CurrIntraPredMode in the block X of the C2 component as a value of one of predCurrIntraPredMode1 and predCurrIntraPredMode2 (Step S63). Which of the values is used is additionally decoded by a 1-bit flag (pred_flag). However, pred_flag is decoded only when CurrIntraPredMode coincide with the predicted value. When CurrIntraPredMode does not coincide with the predicted value (when rem_intra_pred_mode is decoded), predCurrINtraPredMode1 is used as the predicted value.

After the predicted value candidate 1, the predicted value candidate 2, prev_intra_pred_mode_flag, pred_flag, and rem_intra_pred_mode are given, with the following procedure, the variable-length decoding unit 25 decodes CurrIntraPredMode (Step S71).

```
if(prev_intra_pred_mode_flag_C0 == 1 &&
prev_intra_pred_mode_flag_C1 == 1 )
{
  pred_flag = 0;    // In this case, pred_flag is not included in the bit
stream.
  predCurrIntraPredMode = Min( IntraPredModeA, IntraPredModeB );
    Decode prev_intra_pred_mode_flag;
    if(prev_intra_pred_mode_flag == 1)
    {
      CurrIntraPredMode == predCurrIntraPredMode;
    }
  else
    {
      Decode rem_intra_pred_mode;
      if(rem_intra_pred_mode < predCurrIntraPredMode )
        CurrIntraPredMode = rem_intra_pred_mode;
      else
        CurrIntraPredMode = rem_intra_pred_mode + 1;
    }
}
else
{
  predCurrIntraPredMode1 = Min( IntraPredModeA,
IntraPredModeB );
  If( prev_intra_pred_mode_flag_C0 == 0 &&
pred_intra_pred_mode_flag_C1 == 1 )
  predCurrIntraPredMode2 = CurrIntraPredMode_C0;
  else if(prev_intra_pred_mode_flag_C0 == 1 &&
pred_intra_pred_mode_flag_C1 == 0 )predCurrIntraPredMode2 =
CurrIntraPredMode_C1;
  else
  predCurrIntraPredMode2 = CurrIntraPredMode_C1;
    Decode prev_intra_pred_mode_flag;
    if(prev_intra_pred_mode_flag == 1)
    {
      Decode pred_flag;
  If( pred_flag == 0 )
      predCurrIntraPredMode = predCurrIntraPredMode1;
    Else
      predCurrIntraPredMode = predCurrIntraPredMode2;
    CurrIntraPredMode == predCurrIntraPredMode;
    }
  else
    {
      predCurrIntraPredMode = predCurrIntraPredMode1;
      Decode rem_intra_pred_mode;
      if(rem_intra_pred_mode < predCurrIntraPredMode )
        CurrIntraPredMode = rem_intra_pred_mode;
      else
        CurrIntraPredMode = rem_intra_pred_mode + 1;
    }
}
```

It is possible to define the decoding procedure described above for the intra 8×8 prediction mode in the same manner. By decoding the intra N×N prediction mode in such a procedure, it is possible to reduce a code amount of a prediction mode itself and decode a bit stream with improved encoding efficiency making use of a correlation between the intra N×N prediction mode and prediction modes selected in the other color components.

In the procedure described above, pred_flag is information decoded only when prev_intra_pred_mode_flag is 1. However, pred_flag may also be decoded when prev_intra_pred_mode_flag is 0.

That is, with the C1 component as an example, encoding may be performed in a procedure described below.

```
if( prev_intra_pred_mode_flag_C0 == 1 )
{
  predCurrIntraPredMode = Min( IntraPredModeA, IntraPredModeB );
    Decode prev_intra_pred_mode_flag;
    if(prev_intra_pred_mode_flag == 1)
    {
      CurrIntraPredMode == predCurrIntraPredMode;
    }
  else
    {
      Decode rem_intra_pred_mode;
      if(rem_intra_pred_mode < predCurrIntraPredMode )
        CurrIntraPredMode = rem_intra_pred_mode;
      else
        CurrIntraPredMode = rem_intra_pred_mode + 1;
    }
}
else
{
  predCurrIntraPredMode1 = Min( IntraPredModeA,
IntraPredModeB );
  predCurrIntraPredMode2 = CurrIntraPredMode_C0;
  Decode prev_intra_pred_mode_flag;
  Decode pred_flag;
If( pred_flag == 0 )
    predCurrIntraPredMode = predCurrIntraPredMode1;
  Else
    predCurrIntraPredMode = predCurrIntraPredMode2;
    if(prev_intra_pred_mode_flag == 1)
    {
      CurrIntraPredMode == predCurrIntraPredMode;
    }
  else
    {
      Decode rem_intra_pred_mode;
      if(rem_intra_pred_mode < predCurrIntraPredMode )
        CurrIntraPredMode = rem_intra_pred_mode;
      else
        CurrIntraPredMode = rem_intra_pred_mode + 1;
    }
}
```

An effect of this method is the same as described in the encoding procedure on the corresponding side of the encoder. Further, pred_flag may be decoded without depending on whether rem_intra_pred_mode is decoded in the intra-prediction mode in the block in the identical position of the C0 component. In this case, an intra-prediction mode of the C0 component is always used as a predicted value candidate.

That is, expressions in this case are as described below.

```
predCurrIntraPredMode1 = Min( IntraPredModeA, IntraPredModeB );
predCurrIntraPredMode2 = CurrIntraPredMode_C0;
Decode prev_intra_pred_mode_flag;
Decode pred_flag;
If( pred_flag == 0 )
    predCurrIntraPredMode = predCurrIntraPredMode1;
Else
    predCurrIntraPredMode = predCurrIntraPredMode2;
if(prev_intra_pred_mode_flag == 1)
{
```

```
    CurrIntraPredMode == predCurrIntraPredMode;
}
else
{
    Decode rem_intra_pred_mode;
    if(rem_intra_pred_mode < predCurrIntraPredMode )
        CurrIntraPredMode = rem_intra_pred_mode;
    else
        CurrIntraPredMode = rem_intra_pred_mode + 1;
}
```

As described in the explanation of the encoder, pred_flag may be included in a bit stream by a unit of a macro-block or a sequence rather than in 4×4 block units. When pred_flag is set in macro-block units, the predicted value candidate 1 or the predicted value candidate 2 is used in common for all 4×4 blocks in the macro-block. Thus, overhead information of pred_flag, which is to be decoded, is reduced. Since it is set, according to an input color space definition, which of the predicted value candidate 1 or the predicted value candidate 2 is used, it is possible to set pred_flag by a unit of a sequence. In this case, it is unnecessary to transmit pred_flag for each macro-block either. Thus, the overhead information is further reduced.

Fourth Embodiment

Figure 24:
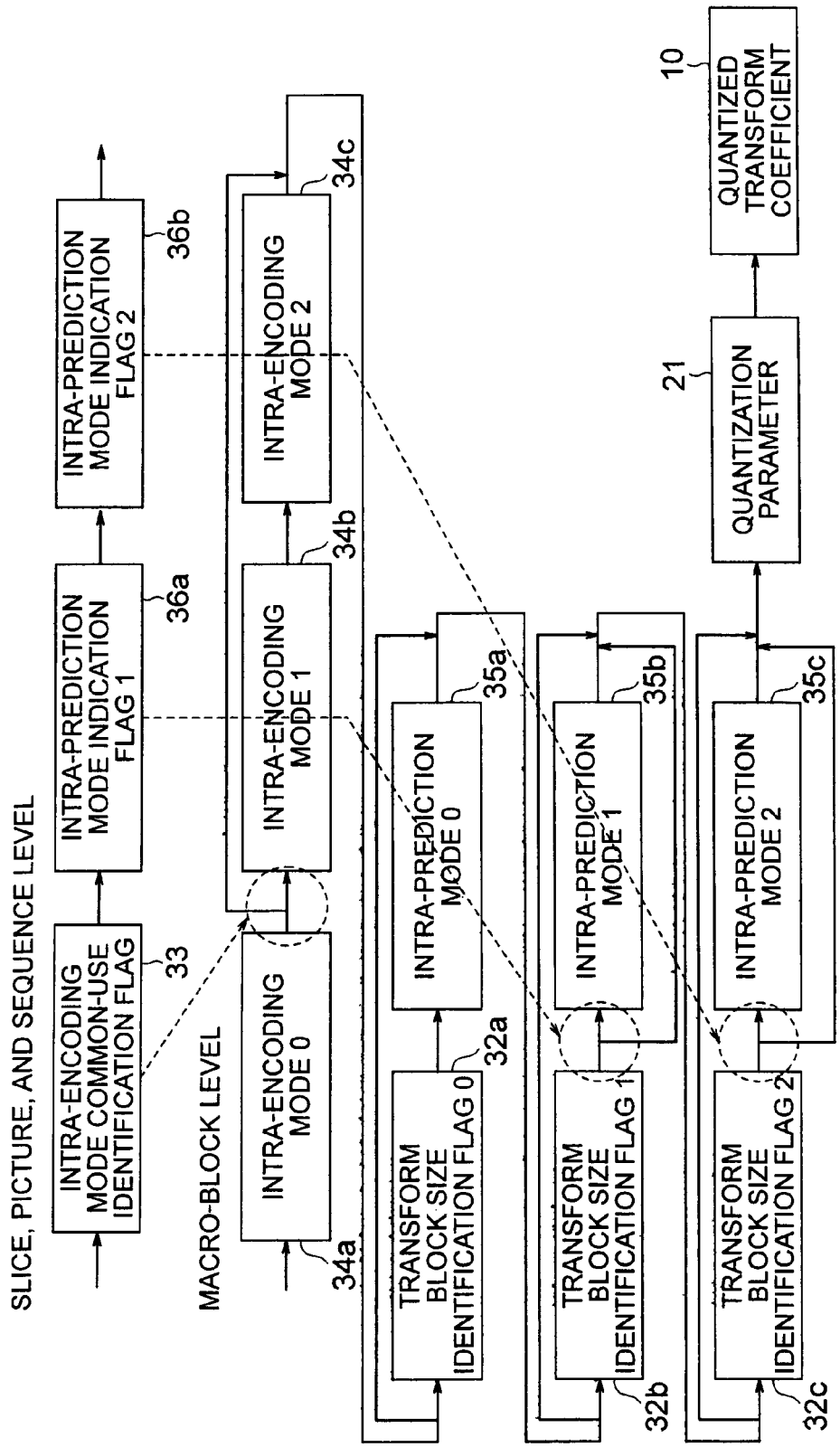
FIG. 24 is a diagram for explaining another data array of a video bit stream outputted from a video encoder according to a fourth embodiment.

The bit stream of the format in FIG. 16 is explained in the second embodiment. In the explanation of the second embodiment, when an intra-encoding mode indicates the "intra N×N prediction", intra-prediction modes of the respective color components C0, C1, and C2 are recognized as the intra 4×4 prediction mode or the intra 8×8 prediction mode according to values of the transform block size identification flags 0 to 2 (32a to 32c). In the fourth embodiment, as shown in FIG. 24, this bit stream array is changed to transmit, for the C1 and the C2 components, intra-prediction mode indication flags 1 and 2 (36a and 36b) at a sequence level. An intra-prediction mode indication flag is effective when the intra N×N prediction mode is selected in the intra-encoding mode and a transform block size identification flag indicates the 4×4 transform, that is, in the case of the intra 4×4 prediction mode. The intra prediction mode indication flag makes it possible to change over the following two states according to this value.
State 1: For the C1 or the C2 component, the intra 4×4 prediction mode to be used is separately selected from the nine modes in FIG. 3 and encoded.
State 2: For the C1 or the C2 component, the intra 4×4 prediction mode is limited to the DC prediction, that is, intra4×4_pred_mode=2 in FIG. 3 and intra-prediction mode information is not encoded.

For example, when encoding is performs in the color spaces like Y, Cb, and Cr and in the case of a high-resolution video such as the HDTV or videos with higher resolution, a 4×4 block corresponds to an extremely small image area. In this case, it may be more efficient to fix prediction mode information itself to one piece of information and not to transmit prediction mode information, which forms overhead, than to give a room for selecting as many as nine prediction modes to component such as the Cb and Cr components that do not specifically hold a texture structure of an image. By performing such a bit stream array, it is possible to perform optimum encoding corresponding to characteristics of input color spaces and characteristics of a video.

The decoder that receives the bit stream of the format in FIG. 24 decodes the intra-prediction mode indication flags (36a and 36b) in the variable-length decoding unit 25 and distinguishes whether a bit stream is encoded in the state 1 or the state 2 according to values of the intra-prediction mode indication flags. Consequently, the decoder judges, for the C1 or the C2 component, whether the intra 4×4 prediction mode is decoded from the bit stream or the DC prediction, that is, intra4×4_pred_mode=2 in FIG. 3 is fixedly applied.

In the fourth embodiment, in the state 2, for the C1 or the C2 components, the intra 4×4 prediction mode is limited to intra4×4_pred_mode=2. However, prediction mode information only has to be fixed to one or may be other prediction modes. The state 2 may be set to use, for the C1 or the C2 component, the intra 4×4 prediction mode the same as that for C0. In this case, since it is unnecessary to encode the intra 4×4 prediction mode for the C1 or the C2 component, it is possible to reduce overhead bits.

Fifth Embodiment

In the fifth embodiment, another example of the structures of the encoder in FIG. 11 and the decoder in FIG. 12 is described. As in the other embodiments, the characteristics peculiar to the invention are given to the encoder and the decoder in the fifth embodiment on the basis of an encoding system adopted in the MPEG-4 AVC(ISO/IEC 14496-10)/ITU-TH.264 standard, which is a Non-Patent Document 1. A video encoder in the fifth embodiment is different from the encoder in FIG. 11 explained in the second and the third embodiments only in operations of the variable-length encoding unit 11. A video decoder in the fifth embodiment is different from the decoder in FIG. 12 explained in the second and the third embodiments only in operations of the variable-length decoding unit 25. Otherwise the video encoder and the video decoder perform operations the same as those in the second and the third embodiments. Only the differences will be explained.

1. Encoding Procedure for Intra-Prediction Mode Information in the Encoder

Figure 25:
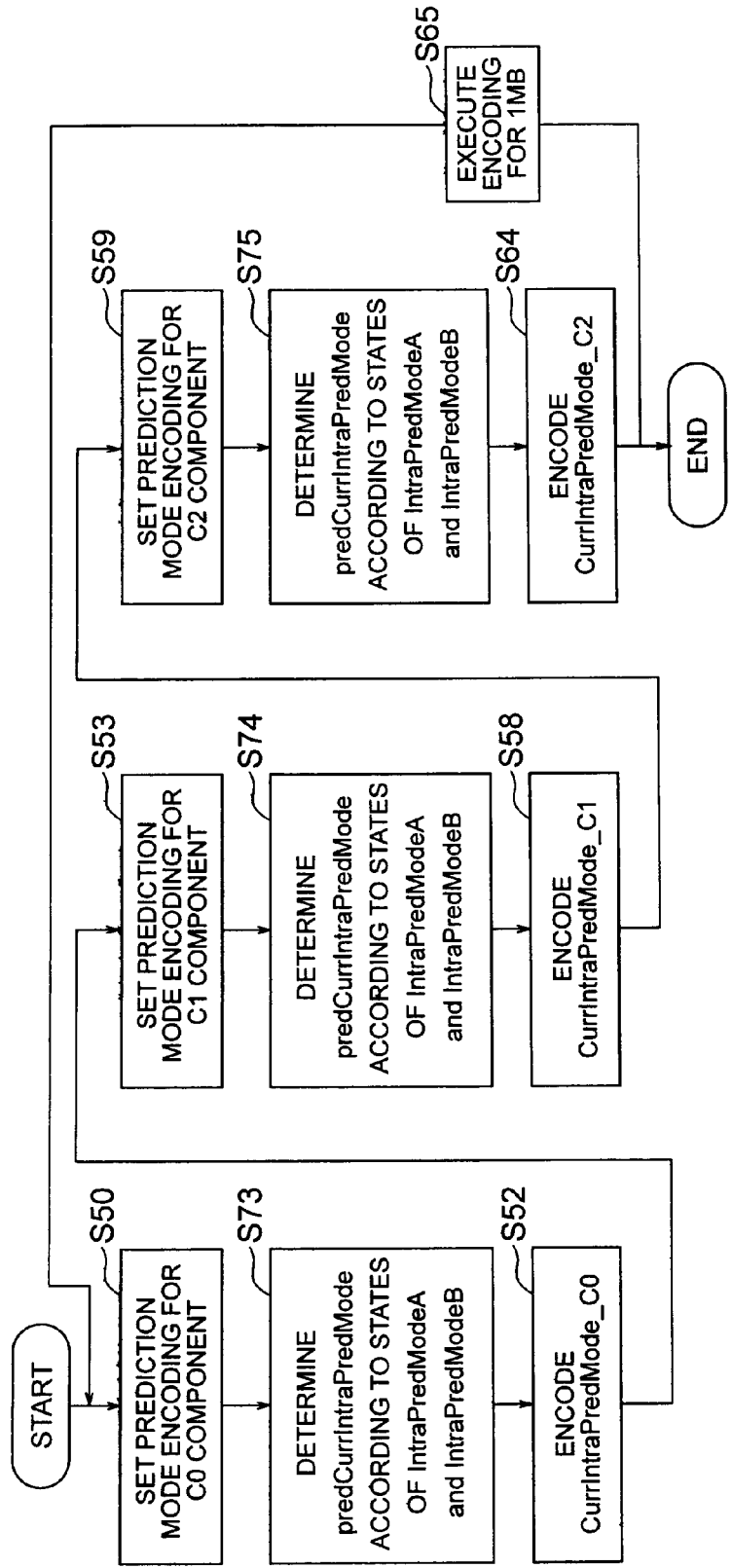
FIG. 25 is a flowchart showing another flow of intra-prediction mode encoding processing according to a fifth embodiment.

In the encoder in the third embodiment, the specific encoding method for intra N×N prediction mode information in the bit stream in the format in FIG. 16 by the variable-length encoding unit 11 is described. In the fifth embodiment, another specific method of the encoding procedure is described. The fifth embodiment is characterized in that, in particular, paying attention to the fact that a value of the intra N×N prediction mode reflects a structure of a texture serving as an image pattern, a method of performing adaptive prediction within a near pixel region in an identical color component is given. The following explanation is on condition that the bit stream array of the format in FIG. 16 is adopted. In the fifth embodiment, the intra N×N prediction mode information for the respective components of C0, C1, and C2 are independently encoded for each of the color components. An encoding method for the C0 component is also applied to C1 and C2. For simplification of the explanation, only the encoding method for the C0 component will be explained. A value of the intra-encoding mode common-use identification flag 33 is set to use the intra-encoding mode in common for C0, C1, and C2. The intra-encoding mode is the intra N×N prediction mode and the transform block size identification flags 0 to 2 (32a to 32c) are the 4×4 block. In this case, all the intra-prediction modes 0 to 2 (35a to 35c) are the intra 4×4 prediction mode. As a diagram for explaining the encoding procedure for the intra N×N prediction mode information on the C0 component, FIG. 18 is used. In FIG. 18, a current block to be encoded is X. A macro-block on the left of the current block is a macro-block A and a macro-block right above the current macro-block is a macro-block B. A flowchart of the encoding procedure is shown in FIG. 25.

In the third embodiment, a smaller value of IntraPredModeA and IntraPredModeB is uniquely allocated as the predicted value predCurrIntraPredMode for the intra 4×4 prediction modes CurrIntraPredMode allocated to the 4×4 blocks X, respectively, in FIG. 18. This is the method adopted in the present AVC/H.264 standard as well. As a value of the intra N×N prediction mode increases, a predicted image generation system becomes a more complicated mode involving pixel interpolation that takes into account directionality of an image pattern. This is because a small value is allocated to a mode with high adaptability to a general image pattern. When a bit rate is low, since a code amount increment of a prediction mode more substantially affects mode selection than an increment of distortion, this system is useful for encoding efficiency of the entire encoder. However, conversely, when a bit rate is relatively high, since an increment of distortion more substantially affects mode selection than an increment of a code amount of the prediction mode, it cannot be always said that a smaller value of IntraPredModeA and IntraPredModeB is optimum. On the basis of such observation, in the fifth embodiment, accuracy of a predicted value is improved by adapting this predicted value setting according to states of IntraPredModeA and IntraPredModeB as explained below. In this procedure, as a value with which CurrIntraPredMode can be estimated most efficiently in terms of an image pattern, the variable-length encoding unit 11 sets predCurrIntraPredMode on the basis of states of IntraPredModeA and IntraPredModeB (Steps S73, S74, and S75).

(1) When both IntraPredModeA and IntraPredModeB are in a range of 0 to 2, MIN(IntraPredModeA, IntraPredModeB) is set as predCurrIntraPredMode.

(2) When IntraPredModeA or IntraPredModeB is 3 or more and when directions of prediction of IntraPredModeA and IntraPredModeB are completely different (e.g., IntraPredModeA is 3 and IntraPredModeB is 4), DC prediction (intra4×4_pred_mode=2) is set as predCurrIntraPredMode.

(3) When IntraPredModeA or IntraPredModeB is 3 or more and when directions of prediction are the same (e.g., IntraPredModeA is 3 and IntraPredModeB is 7 (prediction from the upper right in both IntraPredModeA and IntraPredModeB)), a prediction mode interpolating a pixel (in the above-mentioned example, 7) is set as predCurrIntraPredMode.

As in the third embodiment, the variable-length encoding unit 11 performs preparation processing for encoding such as IntraPredModeA and IntraPredModeB in advance (Steps S50, S53, and S59). As a result, predCurrIntraPredMode is uniquely derived from values of IntraPredModeA and IntraPredModeB. Tabulated rules of this predicted value setting are shown in FIG. 26. In FIG. 26, shaded parts indicate cases in which the conventional rules of MIN(IntraPredModeA, IntraPredModeB) are not complied with and a better predicted value is judged from continuity of an image pattern. In the procedure (1), a table of a class 0 is used. In (2) and (3), a table of a class 1 is used.

After predCurrIntraPredMode is set as a result of the procedure, the variable-length encoding unit 11 executes the remaining encoding procedure for the C0 component described in the third embodiment to complete encoding (Steps S52, S58, and S64).

```
if(CurrIntraPredMode == predCurrIntraPredMode)
{
    prev_intra_pred_mode_flag = 1;
}
else
{
    prev_intra_pred_mode_flag = 0;
    if( CurrIntraPredMode < predCurrIntraPredMode)
        rem_intra_pred_mode = CurrIntraPredMode;
    else
        rem_intra_pred_mode = CurrIntraPredMode - 1;
}
Encode prev_intra_pred_mode_flag;
If(prev_intra_pred_mode_flag == 0)
    Encode rem_intra_pred_mode;
```

It is possible to define the encoding procedure described above for the intra 8×8 prediction mode in the same manner. By encoding the intra N×N prediction mode in such a procedure, it is possible to make better use of a correlation of a prediction mode in a near pixel region in an identical color component and it is possible to reduce a code amount of the prediction mode itself and improve encoding efficiency.

2. Decoding Procedure for Intra-Prediction Mode Information in the Decoder

In the decoder in the third embodiment, one of specific decoding procedures for information on the intra N×N prediction mode in the variable-length decoding unit 25 is described for the bit stream in the format in FIG. 16. In the fifth embodiment, another specific method of the decoding procedure is described. The fifth embodiment is characterized in that, in particular, paying attention to the fact that a value of the intra N×N prediction mode reflects a structure of a texture serving as an image pattern, adaptive prediction is performed within a near pixel region in an identical color component to decode an encoded bit stream.

The following explanation is on condition that the bit stream array of the format in FIG. 16 is adopted. For simplification of the explanation, a value of the intra-encoding mode common-use identification flag 33 in a bit stream is set to use the intra-encoding mode in common for C0, C1, and C2. The intra N×N prediction mode is designated as the intra-encoding mode and the 4×4 block is designated as the transform block size identification flags 0 to 2 (32a to 32c). In this case, all the intra-prediction modes 0 to 2 (35a to 35c) are the intra 4×4 prediction mode. As in the encoder, in the decoder, only the C0 component will be explained using the relation in FIG. 18 (C1 and C2 are independently decoded in the equivalent procedure). In the decoder, a current macro-block to be subjected to decoding is X. A macro-block on the left of the current block is a macro-block A and a macro-block right above the current macro-block is a macro-block B.

In the third embodiment, as described in the explanation of the encoder, a smaller value of IntraPredModeA and IntraPredModeB is uniquely allocated as a predicted value predCurrIntraPredMode for the intra 4×4 prediction modes CurrIntraPredMode allocated to the 4×4 blocks X, respectively, in FIG. 18. On the other hand, in the decoder in the fifth embodiment, predCurrIntraPredMode is determined using the table in FIG. 26 in a procedure completely the same as the procedure described as the encoding procedure. Since IntraPredModeA and IntraPredModeB are already decoded and known, it is possible to perform processing completely the same as the encoding procedure.

A procedure after that is equivalent to the decoding procedure for the C0 component described in the third embodiment. These procedures are summarized as follows.

```
Decode prev_intra_pred_mode_flag;
if(prev_intra_pred_mode_flag == 1)
{
    CurrIntraPredMode == predCurrIntraPredMode;
}
else
{
   Decode rem_intra_pred_mode;
   if(rem_intra_pred_mode < predCurrIntraPredMode )
      CurrIntraPredMode = rem_intra_pred_mode;
   else
      CurrIntraPredMode = rem_intra_pred_mode + 1;
}
```

It is possible to define the decoding procedure described above for the intra 8×8 prediction mode in the same manner. By decoding the intra N×N prediction mode in such a procedure, it is possible to more efficiently make use of a correlation of prediction modes in a near pixel region of an identical color component to decode an encoded bit stream with a code amount of a prediction mode itself reduced.

In the example described above, predCurrIntraPredMode is set fixedly using the table in FIG. 26 to perform encoding and decoding. However, intra-prediction modes most easily occurring for states of IntraPredModeA and IntraPredModeB may be encoded and decoded while being updated one after another. For example, in a combination of "class=0, IntraPredModeA=0, IntraPredModeB=0, predCurrIntraPredMode=0" in FIG. 26, in the embodiment described above, predCurrIntraPredMode is always 0 when IntraPredModeA=0 and IntraPredModeB=0. However, since a video signal itself is an unstationary signal, there is no guarantee that this combination is the best depending on contents of a video. In the worst case, it is not completely unlikely that predCurrIntraPredMode is not hit as a predicted value in most cases throughout the video. Therefore, for example, frequency of CurrIntraPredMode that occurs in the case of IntraPredModeA=0 and IntraPredModeB=0 is counted and, every time encoding and decoding of CurrIntraPredMode end, predCurrIntraPredMode is updated in a prediction mode having highest occurrence frequency with respect to states of IntraPredModeA and IntraPredModeB. With such a constitution, it is possible to set a predicted value used for encoding and decoding of CurrIntraPredMode to an optimum value in light of the video contents.

Sixth Embodiment

In the sixth embodiment, another example of the structures of the encoder in FIG. 11 and the decoder in FIG. 12 is described. As in the other embodiments, the characteristics peculiar to the invention are given to the encoder and the decoder in the sixth embodiment on the basis of an encoding system adopted in the MPEG-4 AVC(ISO/IEC 14496-10)/ITU-TH.264 standard, which is a Non-Patent Document 1. A video encoder in the sixth embodiment is different from the encoder in FIG. 11 explained in the second, the third, and the fifth embodiments only in operations of the variable-length encoding unit 11. A video decoder in the sixth embodiment is different from the decoder in FIG. 12 explained in the second, the third, and the fifth embodiments only in operations of the variable-length decoding unit 25. Otherwise the video encoder and the video decoder perform operations the same as those in the second, the third, and the fifth embodiments. Only the differences will be explained.

1. Encoding Procedure for Intra-Prediction Mode Information in the Encoder

Figure 27:
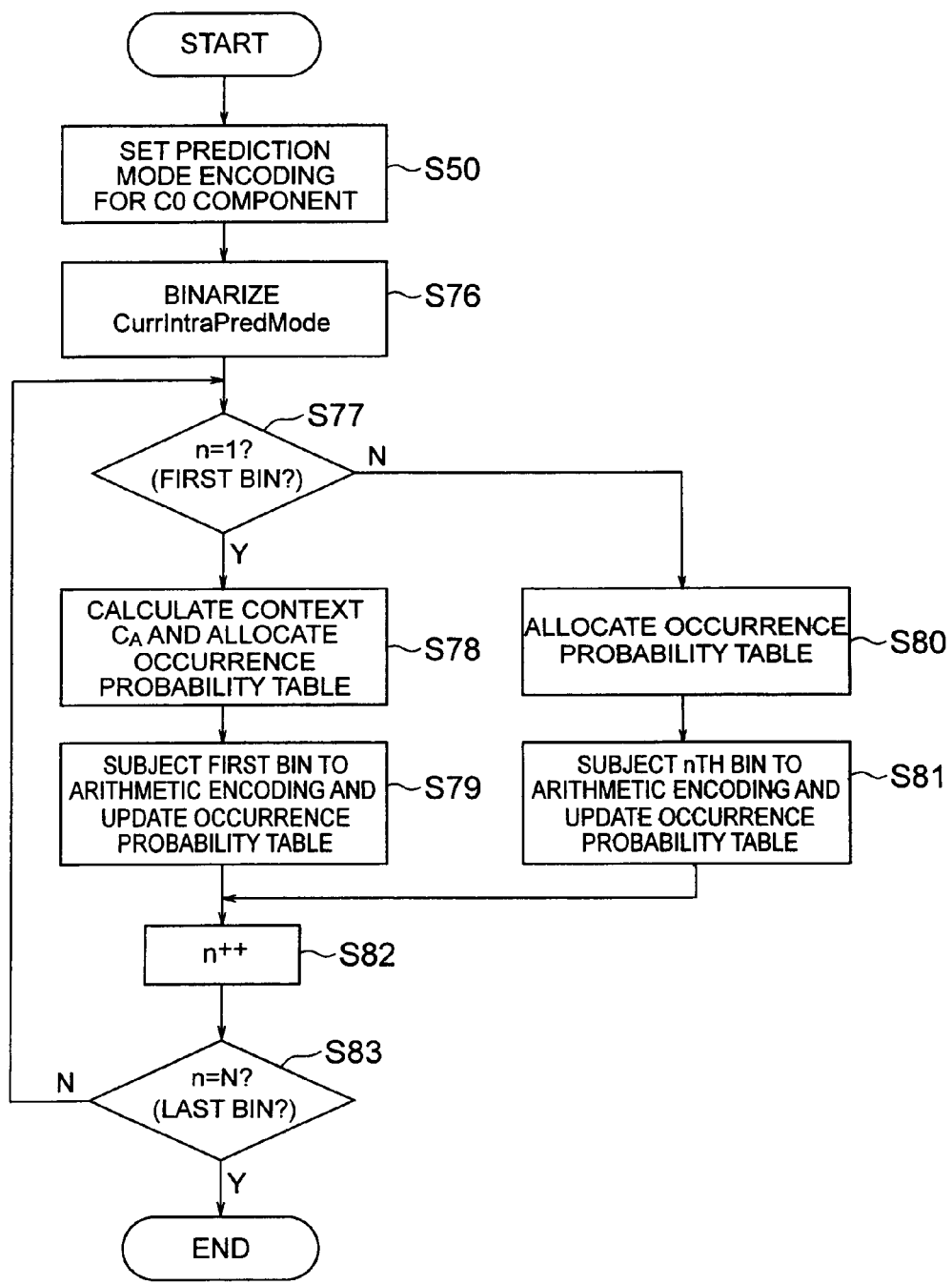
FIG. 27 is a flowchart showing an encoding procedure according to a sixth embodiment.

In the encoder in the third and the fifth embodiments, the specific encoding method for intra N×N prediction mode information in the bit stream in the format in FIG. 16 variable-length encoding unit 11 is described. In the sixth embodiment, another specific method of the encoding procedure is described. The sixth embodiment is characterized in that, in particular, paying attention to the fact that a value of the intra N×N prediction mode reflects a structure of a texture serving as an image pattern, a method of performing adaptive arithmetic encoding within a near pixel region in an identical color component is given. The following explanation is on condition that the bit stream array of the format in FIG. 16 is adopted. In the sixth embodiment, the intra N×N prediction mode information for the respective components of C0, C1, and C2 are independently encoded for each of the color components. An encoding method for the C0 component is also applied to C1 and C2. For simplification of the explanation, only the encoding method for the C0 component will be explained. A value of the intra-encoding mode common-use identification flag 33 is set to use the intra-encoding mode in common for C0, C1, and C2. The intra-encoding mode is the intra N×N prediction mode and the transform block size identification flags 0 to 2 (32a to 32c) are the 4×4 block. In this case, all the intra-prediction modes 0 to 2 (35a to 35c) are the intra 4×4 prediction mode. As a diagram for explaining the encoding procedure for the intra N×N prediction mode information on the C0 component, FIG. 18 is used. In FIG. 18, a current block to be encoded is X. A macro-block on the left of the current block is a macro-block A and a macro-block right above the current macro-block is a macro-block B. A flowchart of the encoding procedure is shown in FIG. 27.

In the third and the fifth embodiments, a smaller value of IntraPredModeA and IntraPredModeB is uniquely allocated as the predicted value predCurrIntraPredMode for the intra 4×4 prediction modes CurrIntraPredMode allocated to the 4×4 blocks X, respectively, in FIG. 18. When a predicted value is equal to the value, prev_intra_pred_mode_flag is set to 1 and encoding in the intra 4×4 prediction mode for the block X is finished. When a predicted value is different from the value, a code is transmitted in rem_intra_pred_mode. In this embodiment, CurrIntraPredMode is directly subjected to arithmetic encoding making use of states of IntraPredModeA and IntraPredModeB. In this case, an encoding procedure conforming to the context adaptive binary arithmetic encoding adopted in the AVC/H.264 standard is used.

First, the variable-length encoding unit 11 represents CurrIntraPredMode of an encoding object as a binary digit in accordance with a format shown in FIG. 28 (Step S76). A first bin of the binary sequence is a code for classifying CurrIntraPredMode as vertical direction prediction or horizontal direction prediction (see FIG. 3). In this example, DC prediction (intra4×4_pred_mode=2) is classified as the horizontal direction prediction. However, the DC prediction (intra4×4_pred_mode=2) may be classified as the vertical direction prediction. A second bin gives a Terminate bit to prediction mode values considered to have highest frequency of appearance in the vertical direction and the horizontal direction, respectively. Third and subsequent bins are subjected to code configuration to be subsequently Terminated from one with highest frequency of appearance among remaining prediction mode values (The second and subsequent bins of the binary sequence configuration in FIG. 28 are desirably set according to a probability of occurrence of symbols in a process of actual image data encoding).

The variable-length encoding unit 11 executes the arithmetic encoding while sequentially selecting, for the respective bins of the binary sequence, (0,1) occurrence probability tables to be used. In the encoding of the first bin, the variable-length encoding unit 11 sets a context used for the arithmetic encoding as follows (Step S78).

Context $A(C_A)$: A flag intra_pred_direction_flag binary-representing whether an intra-prediction mode is vertical direction prediction or horizontal direction prediction is defined for IntraPredModeA and IntraPredModeB. The following four states are set as context values.

$C_A$=(intra_pred_direction_flag for IntraPred-ModeA==1)+(intra_pred_direction_flag for IntraPredModeB==1):

For example, when intra4×4_pred_mode takes values 0, 3, 5, and 7 in FIG. 3, intra_pred_direction_flag is classified as the vertical direction prediction (=0). When intra4×4_pred_mode takes values 1, 2, 4, 6, and 8, intra_pred_direction_flag is classified as the horizontal direction prediction (=1). Conditional probabilities of CurrIntraPredMode based on states of IntraPredModeA and IntraPredModeB are calculated in advance and initial occurrence probability tables of (0,1) set on the basis of the conditional probabilities are allocated to the four states of $C_A$, respectively. By forming the context in this way, it is possible to more accurately estimate a conditional occurrence probability of the first bin and improve efficiency of arithmetic encoding. The variable-length encoding unit 11 selects an occurrence probability table of the first bin according to a value of $C_A$ and executes arithmetic encoding. The variable-length encoding unit 11 updates the occurrence probability table with an encoding value (Step S79).

Initial occurrence probability table of (0,1) set according to occurrence probabilities of the respective prediction mode values are allocated to the second and subsequent bins in advance. Subsequently, the variable-length decoding unit 25 performs binary arithmetic decoding and occurrence probability table update in the same manner as those for the first bin.

It is possible to define the encoding procedure described above for the intra 8×8 prediction mode in the same manner. By encoding the intra N×N prediction mode in such a procedure, it is possible to apply adaptive arithmetic encoding to encoding of prediction mode information making use of a correlation of prediction modes in a near pixel region of an identical color component. Thus, it is possible to improve encoding efficiency.

2. Decoding Procedure for Intra-Prediction Mode Information in the Decoder

In the decoder in the third and the fifth embodiments, one of specific decoding procedures for information on the intra N×N prediction mode in the variable-length decoding unit 25 is described for the bit stream in the format in FIG. 16. In the sixth embodiment, another specific method of the decoding procedure is described. The sixth embodiment is characterized in that, in particular, paying attention to the fact that a value of the intra N×N prediction mode reflects a structure of a texture serving as an image pattern, adaptive arithmetic encoding is performed within a near pixel region in an identical color component to decode an encoded bit stream.

The following explanation is on condition that the bit stream array of the format in FIG. 16 is adopted. For simplification of the explanation, a value of the intra-encoding mode common-use identification flag 33 in a bit stream is set to use the intra-encoding mode in common for C0, C1, and C2. The intra N×N prediction mode is designated as the intra-encoding mode and the 4×4 block is designated as the transform block size identification flags 0 to 2 (32a to 32c). In this case, all the intra-prediction modes 0 to 2 (35a to 35c) are the intra 4×4 prediction mode. As in the encoder, in the decoder, only the C0 component will be explained using the relation in FIG. 18 (C1 and C2 are independently decoded in the equivalent procedure). In the decoder, a current macro-block to be subjected to decoding is X. A macro-block on the left of the current block is a macro-block A and a macro-block right above the current macro-block is a macro-block B.

In the third and the fifth embodiments, as described in the explanation of the encoder, a smaller value of IntraPredModeA and IntraPredModeB is uniquely allocated as the predicted value predCurrIntraPredMode for the intra 4×4 prediction modes CurrIntraPredMode allocated to the 4×4 blocks X, respectively, in FIG. 18. When prev_intra_pred_mode_flag is decoded and a value there of is 1, predCurrIntraPredMode is adopted as CurrIntraPredMode. When prev_intra_pred_mode_flag is zero, rem_intra_pred_mode is decoded to restore an intra 4×4 prediction mode of the block X is restored. On the other hand, in this embodiment, CurrIntraPredMode is directly subjected to arithmetic decoding making use of states of IntraPredModeA and IntraPredModeB. In this case, a decoding procedure conforming to a context adaptive binary arithmetic decoding adopted in the AVC/H.264 standard is used.

CurrIntraPredMode to be subjected to decoding is encoded as a binary sequence in accordance with the format shown in FIG. 28. This sequence is sequentially subjected to binary arithmetic decoding from the left end. As explained in the encoding procedure in the sixth embodiment, a first bin of the binary sequence is a code for classifying CurrIntraPredMode as vertical direction prediction or horizontal direction prediction (see FIG. 3). Second and subsequent bins are subjected to code configuration to be subsequently Terminated from one with highest frequency of appearance among prediction mode values. A reason for this code configuration is as described in the encoding procedure.

In a decoding process, first, in decoding of the first bin, the variable-length decoding unit 25 sets $C_A$ the same as that in the context used in the encoding procedure. The variable-length decoding unit 25 selects an occurrence probability table according to a value of $C_A$ and executes arithmetic decoding to restore the first bin. The variable-length decoding unit 25 updates the occurrence probability table with a decoding value.

Initial occurrence probability table of (0,1) set according to occurrence probabilities of the respective prediction mode values are allocated to the second and subsequent bins in advance. Subsequently, the variable-length decoding unit 25 performs binary arithmetic decoding and occurrence probability table update in the same manner as those for the first bin. Since the binary sequence in FIG. 28 is formed to make it possible to uniquely specify the respective prediction mode values, CurrIntraPredMode is decoded when a predetermined number of bins are restored.

It is possible to define the decoding procedure described above for the intra 8×8 prediction mode in the same manner. By decoding the intra N×N prediction mode in such a procedure, it is possible to decode an encoded bit stream with a code amount of a prediction code itself reduced according to arithmetic encoding that makes use of a correlation of prediction modes in a near pixel region of an identical color component.

In the example described above, other variations of the table in FIG. 28 are conceivable. For example, a method of forming a binary sequence in FIG. 29 may be adopted. Here, a context B described below is used for the first bin.

Context $B(C_B)$: A flag intra_dc_pred_flag binary-representing whether an intra-prediction mode is vertical DC prediction is defined for IntraPredModeA and IntraPredModeB. The following four states are set as context values.

$C_A$=(intra_dc_pred_flag for IntraPredModeA==1)+
(intra_dc_pred_flag for IntraPredModeB==1);

In FIG. 3, when intra4×4_pred_mode takes a value 2, intra_dc_pred_flag is set to 1. When intra4×4-pred_mode takes other values, intra_dc_pred_flag is set to 0. Conditional probabilities of CurrIntraPredMode based on states of IntraPredModeA and IntraPredModeB are calculated in advance and initial occurrence probability tables of values (0,1) of the first bin set on the basis of the conditional probabilities are allocated to the four states of $C_B$, respectively. In FIG. 29, the first bin is designed to take a value 0 when CurrIntraPredMode is DC prediction and takes a value 1 when CurrIntraPredMode is other than DC prediction. The context $A(C_A)$ described above is used for the second bin. By forming the context in this way, it is possible to more accurately estimate conditional occurrence probabilities for both the first bin and the second bin and improve efficiency of arithmetic encoding.

Seventh Embodiment

In the seventh embodiment, an encoder that performs encoding using inter-frame prediction by a unit obtained by equally dividing a video frame inputted in the 4:4:4 format into rectangular regions (macro-blocks) of 16×16 pixels and a decoder corresponding to the encoder will be explained. The characteristics peculiar to the invention are given to the encoder and the decoder on the basis of the encoding system adopted in the MPEG-4 AVC(ISO/IEC 14496-10)/ITU-TH.264 standard.

Figure 30:
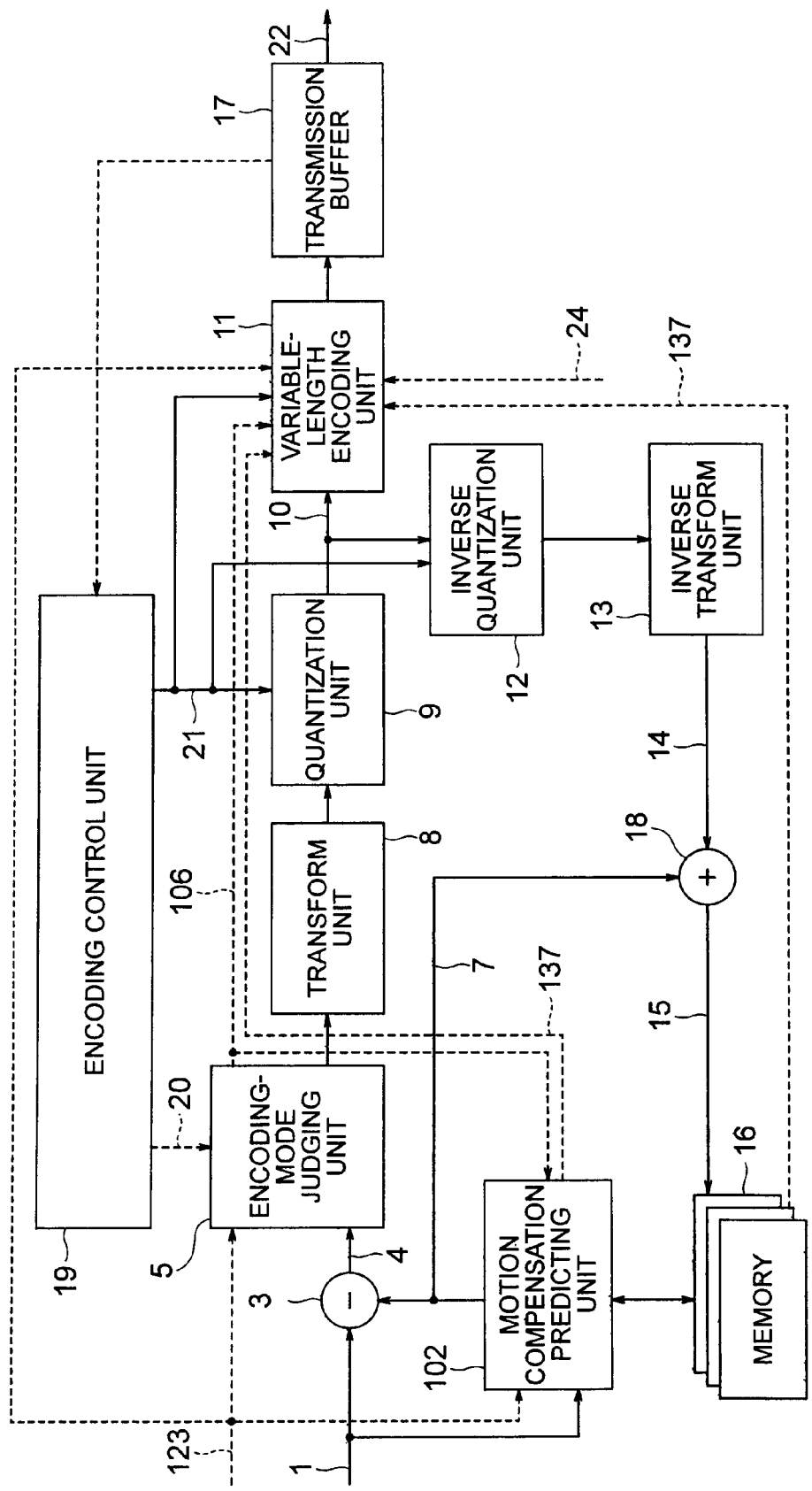
FIG. 30 is a diagram for explaining a structure of a video encoder according to a seventh embodiment.
Figure 31:
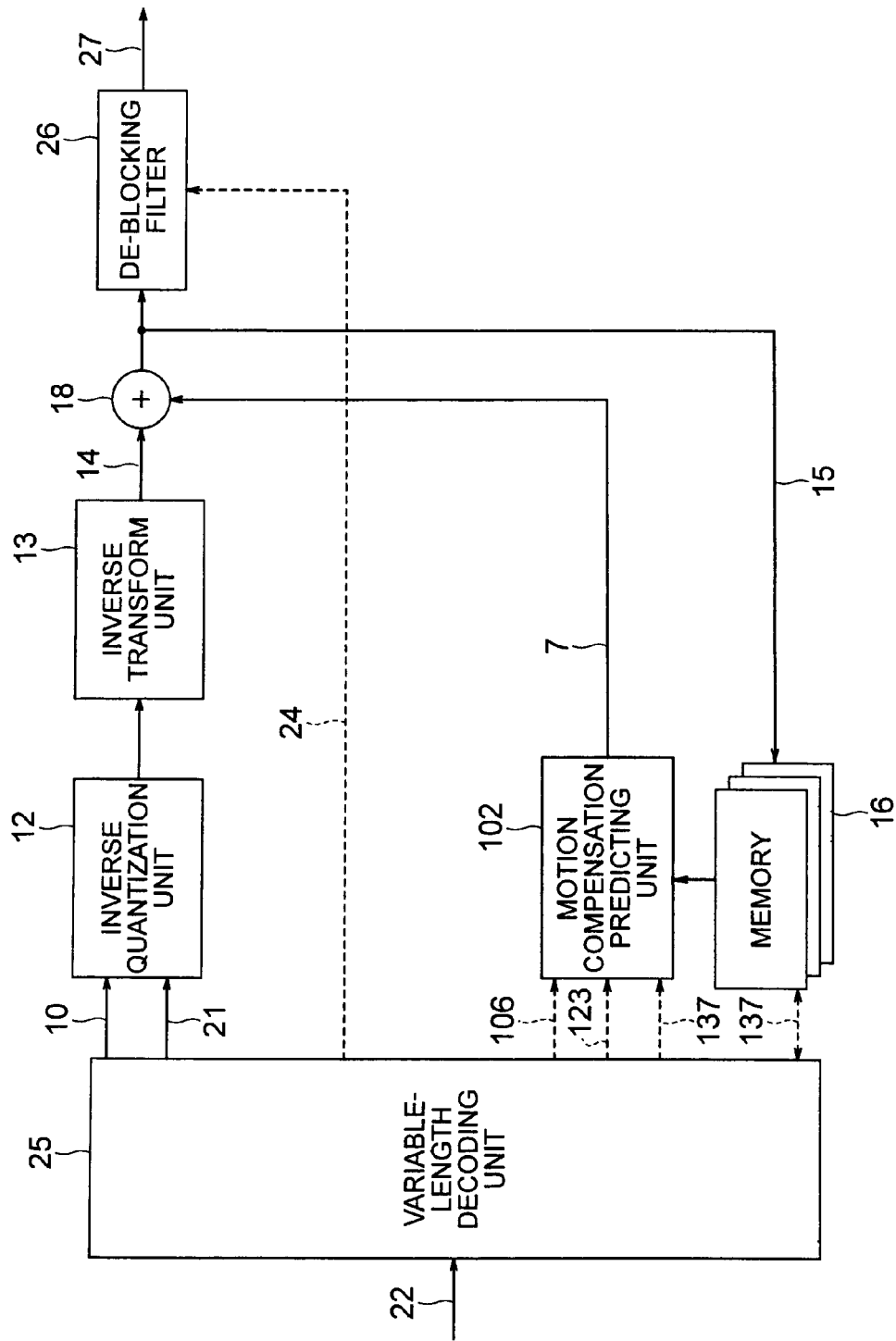
FIG. 31 is a diagram for explaining a structure of a video decoder according to the seventh embodiment.

A structure of a video encoder in the seventh embodiment is shown in FIG. 30. A structure of a video decoder in the seventh embodiment is shown in FIG. 31. In FIG. 31, components denoted by reference numerals the same as those of the encoder in FIG. 30 are the identical components.

Operations of the entire encoder and the entire decoder and inter-prediction mode judgment processing and motion compensation prediction decoding processing, which are characteristic operations of the seventh embodiment, will be explained on the basis of these figures.

1. Outline of Operations of the Encoder

In the encoder in FIG. 30, respective video frames are inputted as an input video signal 1 in the 4:4:4 format. The video frames inputted are inputted to the encoder in block units obtained by dividing three color components into macro-blocks of an identical size and arranging the blocks as shown in FIG. 10.

First, a motion-compensation predicting unit 102 selects a reference image of one frame out of motion compensation prediction reference image data of one frame or more stored in the memory 16 and performs motion compensation prediction processing for each of color components by a unit of the macro-block. Three memories are prepared for the respective color components (although the three memories are prepared in the explanation of this embodiment, the number of memories may be changed as appropriate according to a design). As block sizes for performing motion compensation prediction, seven types are prepared. First, in macro-block units, as shown in FIG. 32(a) to 32(d), it is possible to select any one of sizes 16×16, 16×8, 8×16, and 8×8. When 8×8 is selected, as shown in FIG. 32(e) to (h), it is possible to select any one of sizes 8×8, 8×4, 4×8, and 4×4 for each of 8×8 blocks. Information on the size selected is outputted as a macro-block type and size information in 8×8 block units is outputted as a sub-macro-block type. An identification number and motion vector information on a reference image selected for each of the blocks are outputted.

The video encoder in the seventh embodiment is characterized by changing a motion compensation prediction processing method for the three color components on the basis of an inter-prediction mode common-use identification flag 123. This point will be described in detail in 2 below.

Figure 32:
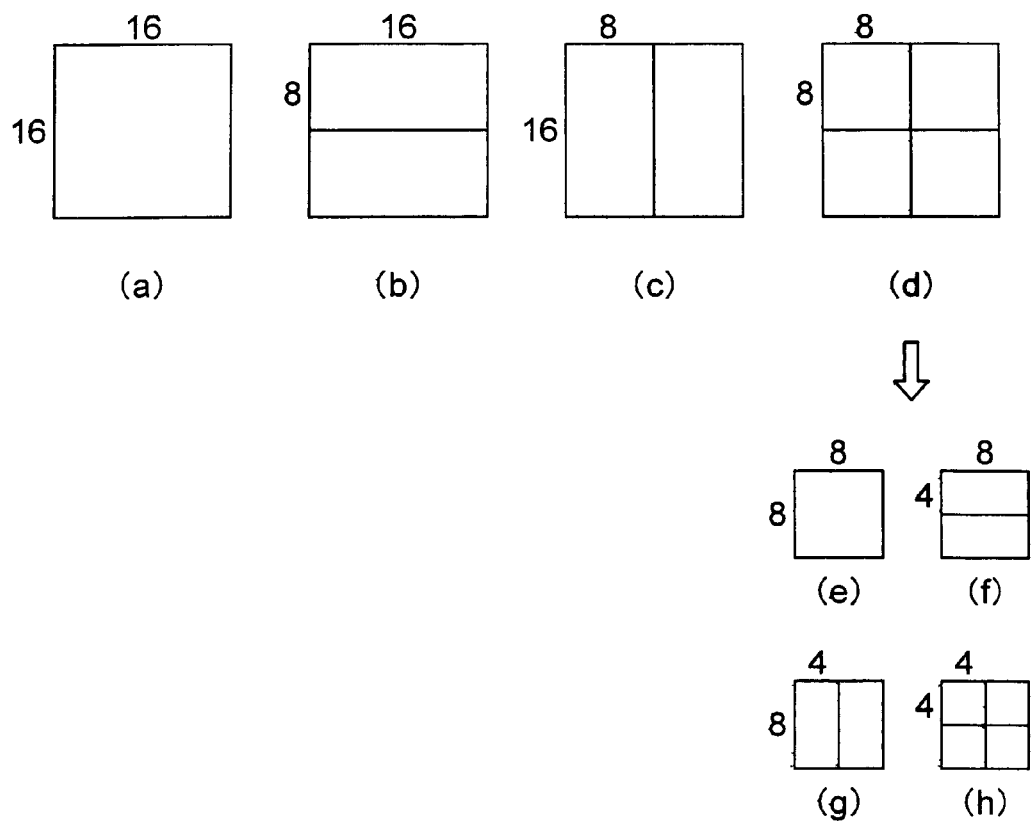
FIG. 32 is a diagram for explaining a unit of a macro-block.

The motion-compensation predicting unit 102 executes motion compensation prediction processing on all block sizes or sub-block sizes shown in FIG. 32, all motion vectors 137 in a predetermined search range, and selectable one or more reference images to obtain a prediction difference signal 4 according to the motion vectors 137, the one reference image, and the subtracter 3. The encoding-mode judging unit 5 evaluates prediction efficiency of the prediction difference signal 4 and outputs a macro-block type/sub-macro-block type 106, the motion vector 137, and an identification number of the reference image, with which optimum prediction efficiency is obtained, to a macro-block to be subjected to prediction from the prediction processing executed by the motion-compensation predicting unit 102. In selecting the macro-block type/sub-macro-block type 106, the weight coefficient 20 for each type set by the judgment of the encoding control unit 19 may be taken into account. The motion-compensation predicting unit 102 outputs the prediction difference signal 4 obtained by motion compensation prediction based on the type, the motion vector 137, and the reference image selected to the transform unit 8. The transform unit 8 transforms the prediction difference signal 4 inputted into a transform coefficient and outputs the transform coefficient to the quantization unit 9. The quantization unit 9 quantizes the transform coefficient inputted on the basis of the quantization parameter 21 set by the encoding control unit 19 and outputs the transform coefficient to the variable-length encoding unit 11 as the quantized transform coefficient 10. The quantized transform coefficient 10 is subjected to entropy encoding by means such as Huffman encoding or arithmetic encoding in the variable-length encoding unit 11. The quantized transform coefficient 10 is restored to a local decoding prediction difference signal 14 through the inverse quantization unit 12 and the inverse transform unit 13. The quantized transform coefficient 10 is added to the predicted image 7, which is generated on the basis of the macro-block type/sub-macro-block type 106, the motion vector 137, and the reference image selected, by the adder 18 to generate the local decoded image 15. The local decoded image 15 is stored in the memory 16 to be used in motion compensation prediction processing after that. The de-blocking filter control flag 24 indicating whether a de-blocking filter is applied to the macro-block is also inputted to the variable-length encoding unit 11 (In the prediction processing carried out by the motion-compensation predicting unit 102, since pixel data before being subjected to the de-blocking filter is stored in the memory 16, de-blocking filter processing itself is not necessary for encoding processing. However, the de-blocking filter is performed according to an indication of the de-blocking filter control flag 24 on the decoder side to obtain a final decoded image).

The inter-prediction mode common-use identification flag 123, the quantized transform coefficient 10, the macro-block type/sub-macro-block type 106, the motion vector 137, an identification number of the reference image, and the quantization parameter 21 inputted to the variable-length encoding unit 11 are arrayed and shaped as a bit stream in accordance with a predetermined rule (syntax) and outputted to a transmission buffer 17. The transmission buffer 17 smoothes the bit stream according to a band of a transmission line to which the encoder is connected and readout speed of a recording medium and outputs the bit stream as a video stream 22. Transmission buffer 17 outputs feedback to the encoding control unit 19 according to a bit stream accumulation state in the transmission buffer 17 and controls an amount of generated codes in encoding of video frames after that.

2. Inter-Prediction Mode Judgment Processing in the Encoder

Figure 33:
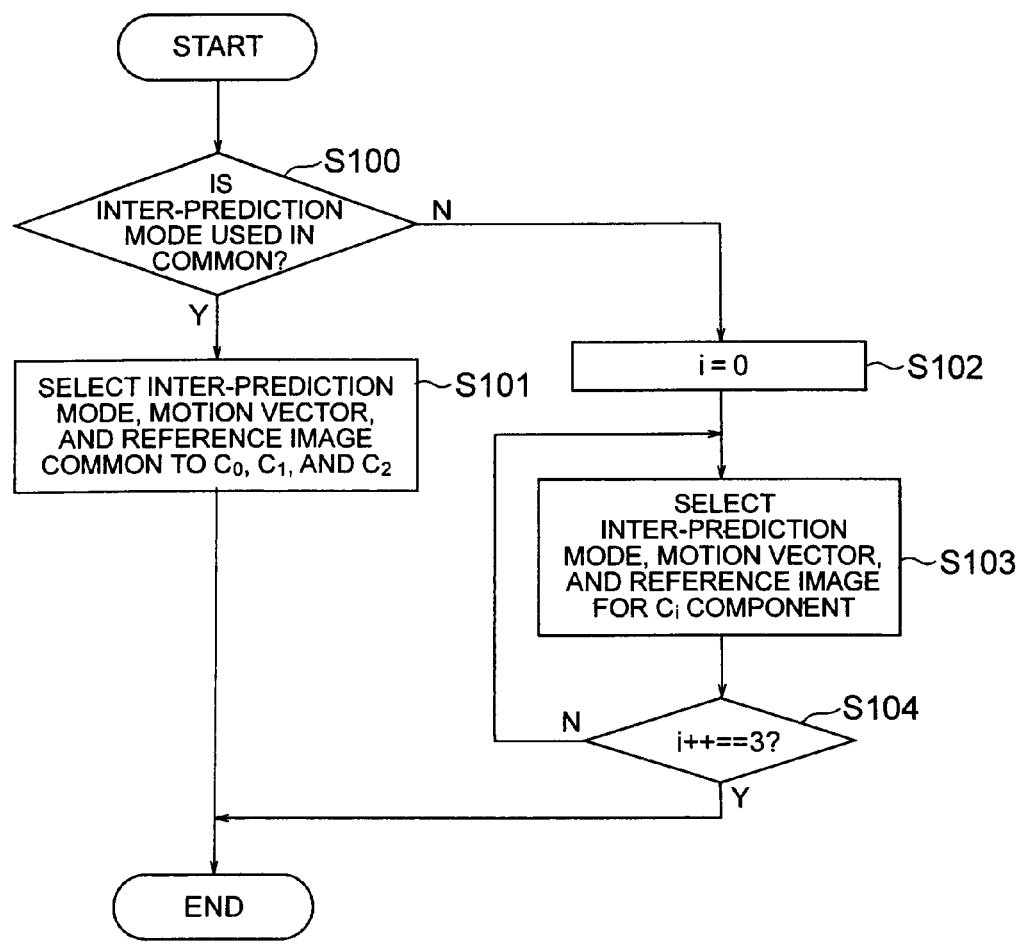
FIG. 33 is a flowchart showing a flow of inter-prediction mode judgment processing according to the seventh embodiment.

Inter-prediction mode judgment processing, which is a characteristic of the encoder in the seventh embodiment, will be described in detail. In the following description, an inter-prediction mode indicates a block size serving as a unit of the motion vector compensation, that is, a macro-block type/sub-macro-block type. The inter-prediction mode judgment processing means processing for selecting a macro-block type/sub-macro-block type, a motion vector, and a reference image. The processing is carried out by a unit of a macro-block obtained by arranging the three color components. The processing is performed mainly by the motion-compensation predicting unit 102 and the encoding-mode judging unit 5 in the encoder in FIG. 30. A flowchart showing a flow of the processing is shown in FIG. 33. Image data of three color components forming a block are hereinafter referred to as C0, C1, and C2.

First, the encoding-mode judging unit 5 receives the inter-prediction mode common-use identification flag 123 and judges, on the basis of a value of the inter-prediction mode common-use identification flag 123, whether a common inter-prediction mode, a common motion vector 137, and a common reference image are used for C0, C1, and C2 (Step S100 in FIG. 33). When the inter-prediction mode, the motion vector 137, and the reference image are used in common, the encoding-mode judging unit 5 proceeds to Step S101 and subsequent steps. Otherwise, the encoding-mode judging unit 5 proceeds to Step S102 and subsequent steps.

When the inter-prediction mode, the motion vector 137, and the reference image are used in common for C0, C1, and C2, the encoding-mode judging unit 5 notifies the motion-compensation predicting unit 102 of all inter-prediction modes, motion vector search ranges, and reference images that can be selected. The motion-compensation predicting unit 102 evaluates prediction efficiencies of all of the inter-prediction modes, motion vector search ranges, and reference images and selects an optimum inter-prediction mode, an optimum motion vector 137, and an optimum reference images common to C0, C1, and C2 (Step S101).

When the inter-prediction mode, the motion vector 137, and the reference image are not used in common for C0, C1, and C2 and best modes are selected for C0, C1, and C2, respectively, the encoding-mode judging unit 5 notifies the motion-compensation predicting unit 102 of all inter-prediction modes, motion vector search ranges, and reference images that can be selected for Ci (i<=0<3) components. The motion-compensation predicting unit 102 evaluates prediction efficiencies of all of the inter-prediction modes, motion vector search ranges, and reference images and selects an optimum inter-prediction mode, an optimum motion vector 137, and an optimum reference image in Ci (i<=0<3) components (Steps S102, S103, and S104).

As a criteria for prediction efficiency evaluation of a prediction mode performed in the motion-compensation predicting unit 102, for example, it is possible to use rate/distortion cost given by $J_{m,v,r}=D_{m,v,r}+\lambda R_{m,v,r}$ (X: positive number). $D_{m,v,r}$ is encoding distortion or a prediction error amount in the case in which an inter-prediction mode m, motion vectors v in a predetermined range, and a reference image r are applied. The encoding distortion is obtained by applying the inter-prediction mode m, the motion vectors v, and the reference image r to calculate a prediction error and decoding a video from a result obtained by transforming and quantizing the prediction error to measure an error with respect to a signal before encoding. The prediction error amount is obtained by calculating a difference between a predicted image and a signal before encoding in the case in which the inter-prediction mode m, the motion vectors v, and the reference image r are applied and quantizing a level of the difference. For example, a sum of absolute distance (SAD) is used. $R_{m,v,r}$ is a generated code amount in the case in which the inter-prediction mode m, the motion vectors v, and the reference image r are applied. In other words, $J_{m,v,r}$ is a value defining tradeoff between a code amount and a degree of deterioration in the case in which the inter-prediction mode m, the motion vectors v, and the reference image r are applied. The inter-prediction mode m giving minimum $J_{m,v,r}$, the motion vectors v, and the reference image r give an optimum solution.

When the encoder performs the processing in Step S101 and the subsequent steps, a pair of pieces of information on an inter-prediction mode, the motion vectors 137, and the reference image are allocated to a macro-block including three color components. On the other hand, when the encoder performs the processing in Step S102 and the subsequent steps, inter-prediction mode information, the motion vectors 137, and the reference image are allocated to the color components, respectively. Therefore, since the pieces of information on inter-prediction modes, the motion vectors 137, and the reference image allocated to the macro-block are different, it is necessary to multiplex the inter-prediction mode common-use identification flag 123 on a bit stream and allow the decoder to recognize whether the encoder has performed the processing steps in Step S101 and the subsequent steps or has performed the processing steps in Step S102 and the subsequent steps. A data array of such a bit stream is shown in FIG. 34.

Figure 34:
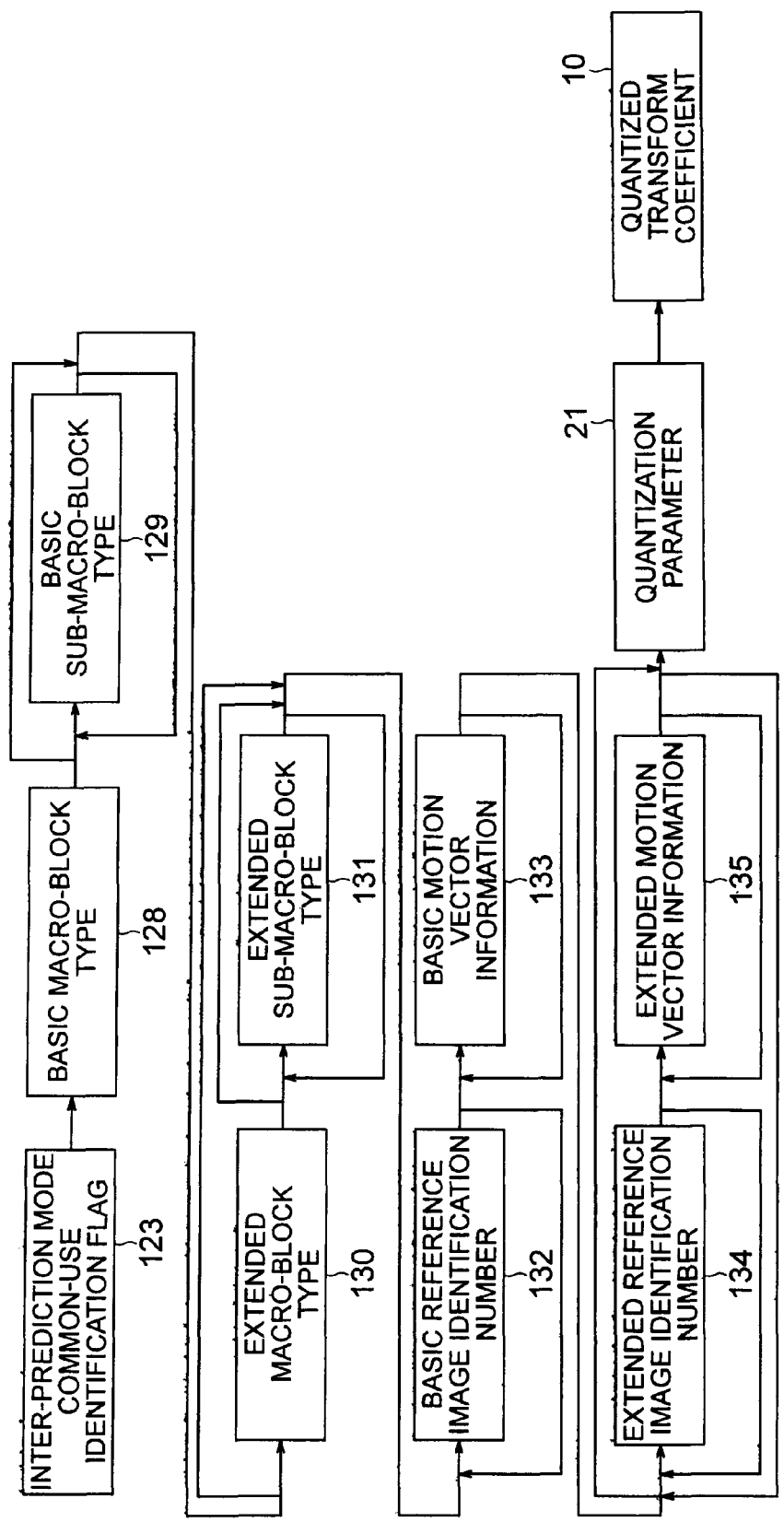
FIG. 34 is a diagram for explaining a data array of a video stream outputted from the video encoder according to the seventh embodiment.

A data array of a bit stream at a level of a macro-block is shown in FIG. 34. A macro-block type indicates intra or inter and includes information serving as a unit of motion compensation at the time of the inter mode. A sub-macro-block type is multiplexed only when an 8×8 block size is selected in the macro-block type and includes a block size information for each of 8×8 block sizes. A basic macro-block type 128 and a basic sub-macro-block type 129 indicate a common macro-block type and a common sub-macro-block type when the inter-prediction mode common-use identification flag 123 indicates "common to C0, C1, and C2". Otherwise, the basic macro-block type 128 and the basic sub-macro-block type 129 indicate a macro-block type and a sub-macro-block type for C0. An extended macro-block type 130 and an extended sub-macro-block type 131 are multiplexed for C1 and C2, respectively, only when the inter-prediction mode common-use identification flag 123 indicates "not common to C0, C1, and C2". The macro-block type 130 and an extended sub-macro-block type 131 indicate a macro-block type and a sub-macro-block type for C1 and C2.

A reference image identification number is information for specifying a reference image selected for each block equal to or larger than the 8×8 block size serving as a monition compensation unit. At the time of the inter-frame, since a reference image that can be selected is one frame, one reference image identification number is multiplexed for each block. A pair of pieces of motion vector information is multiplexed on motion vector information for each block serving as a motion compensation unit. The number of reference image identification numbers and pieces of motion vector information that need to be multiplexed is equivalent to the number of blocks serving as units of motion compensation included in a macro-block. When the inter-prediction mode common-use identification flag 123 indicates "common to C0, C1, and C2", a basic reference image identification number 132 and basic motion vector information 133 indicate a common reference image identification number and common motion vector information. Otherwise, the basic reference image identification number 132 and the basic motion vector information 133 indicate a reference image identification number and motion vector information for C0. An extended reference image identification number 134 and extended motion vector information 135 are multiplexed for C1 and C2, respectively, only when the inter-prediction mode common-use identification flag 123 indicates "not common to C0, C1, and C2". The extended reference image identification number 134 and the extended motion vector information 135 indicate a reference image identification number and motion vector information for C1 and C2.

Subsequently, the quantization parameter 21 and the quantized transform coefficient 10 are multiplexed (Although the de-blocking filter control flag 24 inputted to the variable-length encoding unit 11 in FIG. 30 is not included in FIG. 34, the de-blocking filter control flag 24 is omitted because the flag is not a component necessary for explaining the characteristics of the seventh embodiment).

In the 4:2:0 format adopted in the conventional video encoding standard, the definition of color spaces is fixed to Y, Cb, and Cr. In the 4:4:4 format, the definition of color spaces is not limited to Y, Cb, and Cr and it is possible to use various color spaces. By forming the inter-prediction mode information as shown in FIG. 34, it is possible to perform optimum encoding processing even when the definition of color spaces of the input video signal 1 is diversified. For example, when color spaces are defined by RGB, in a region where a structure of a video texture equally remains in respective components of R, G, and B, by using common inter-prediction mode information and common motion vector information, it is possible to reduce redundancy of the inter-prediction mode information and the motion vector information itself and improve encoding efficiency. On the other hand, when color spaces are defined by Y, Cb, and Cr, a structure of a video texture is integrated in Y. Thus, the common inter-prediction mode does not always give an optimum result. Thus, it is possible to obtain optimum encoding efficiency by adaptively using the extended intra-prediction mode 30. On the other hand, for example, in a region (the R component is 0) without any tinge of red, an optimum inter-prediction mode and optimum vector information for the R component and optimum inter-prediction mode and optimum motion vector information for the G and the B components should be different. Thus, it is possible to obtain optimum encoding efficiency by adaptively making use of an extended inter-prediction mode, extended reference image identification information, and extended motion vector information.

3. Outline of Operations of the Decoder

The decoder in FIG. 31 receives the video stream 22 conforming to the array in FIG. 34 outputted from the encoder in FIG. 30, performs decoding processing by a unit of a macro-block in which three color components have an identical size (the 4:4:4 format), and restores respective video frames.

First, the variable-length decoding unit 25 is inputted with the stream 22, decodes the video stream 22 in accordance with a predetermined rule (syntax), and extracts information including the inter-prediction mode common-use identification flag 123, the quantized transform coefficient 10, the macro-block type/sub-macro-block type 106, the identification number of the reference image, motion vector information, and the quantization parameter 21. The quantized transform coefficient 10 is inputted to the inverse quantization unit 12 together with the quantization parameter 21 and inverse quantization processing is performed. Subsequently, an output of the inverse quantization unit 12 is inputted to the inverse transform unit 13 and restored to the local decoding prediction difference signal 14. On the other hand, the macro-block type/sub-macro-block type 106 and the inter-prediction mode common-use identification flag 123 are inputted to the motion-compensation predicting unit 102. The motion-compensation predicting unit 102 obtains the predicted image 7 in accordance with these pieces of information. A specific procedure for obtaining the predicted image 7 will be described later. The local decoding prediction difference signal 14 and the predicted image 7 are added by the adder 18 to obtain an interim decoded image 15 (this is completely the same signal as the local decoded image 15 in the encoder). The interim decoded image 15 is written back to the memory 16 to be used for motion-compensation prediction of a macro-block after that. Three memories are prepared for the respective color components (although the three memories are prepared in the explanation of this embodiment, the number of memories may be changed as appropriate according to a design). The de-blocking filter 26 is caused to act on the interim decoded image 15 on the basis of an indication of the de-blocking filter control flag 24 decoded by the variable-length decoding unit 25 to obtain a final decoded image 27.

2. Inter-Prediction Decoding Processing in the Decoder

The decoder in FIG. 31 receives the video stream 22 conforming to the array in FIG. 34 outputted from the encoder in FIG. 30, performs decoding processing by a unit of a macro-block with an identical size (the 4:4:4 format) for three color components, and restores respective video frames.

Figure 35:
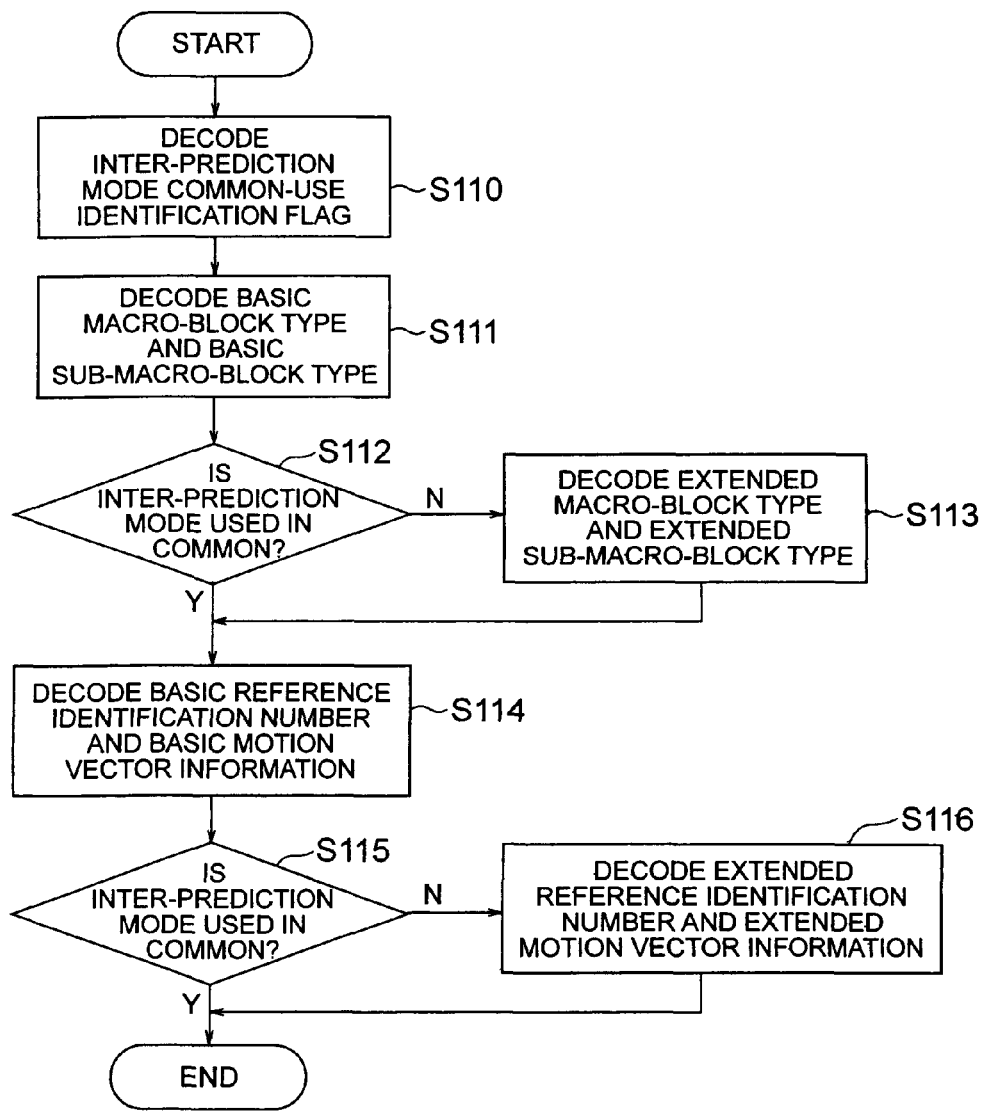
FIG. 35 is a flowchart showing a flow of processing performed by a variable length decoding unit 25 according to the seventh embodiment.

The inter-predicted image generation processing, which is a characteristic of the decoder in the seventh embodiment, will be described in detail. This processing is carried out by a unit of the macro-block in which three color components are arranged. The processing is performed mainly by the variable-length decoding unit 25 and the motion-compensation predicting unit 102 in the decoder in FIG. 31. A flowchart of a flow of processing performed by the variable-length decoding unit 25 of the processing is shown in FIG. 35.

The video stream 22 inputted to the variable-length decoding unit 25 conforms to a data array in FIG. 34. In Step S110, the variable-length decoding unit 25 decodes the inter-prediction mode common-use identification flag 123 of the data in FIG. 34 (Step S110). The variable-length decoding unit 25 further decodes the basic macro-block type 128 and the basic sub-macro-block type 129 (Step S111). In Step S112, the variable-length decoding unit 25 judges whether an inter-prediction mode is used in common for C0, C1, and C2 using a result of the inter-prediction mode common-use identification flag 123. When the inter-prediction mode is used in common for C0, C1, and C2 (Yes in Step S112), the variable-length decoding unit 25 uses the basic macro-block type 128 and the basic sub-macro-block type 129 for all of C0, C1, and C2. Otherwise (No in Step S112), the variable-length decoding unit 25 uses the basic macro-block type 128 and the basic sub-macro-block type 129 as a mode for C0. The variable-length decoding unit 25 decodes the extended macro-block type 130 and the extended sub-macro-block type 131 for C1 and C2, respectively (Step S113), to obtain inter-prediction mode information for C1 and C2. The variable-length decoding unit 25 decodes the basic reference image identification number 132 and the basic motion vector information 133 (Step S114).

When the inter-prediction mode common-use identification flag 123 indicates "used in common for C0, C1, and C2" (Yes in Step S115), the variable-length decoding unit 25 uses the basic reference image identification number 132 and the basic motion vector information 133 for all of C0, C1, and C2. Otherwise (No in Step S115), the variable-length decoding unit 25 uses the basic reference image identification number 132 and the basic motion vector information 133 as information for C0. The variable-length decoding unit 25 decodes the extended reference image identification number 134 and the extended motion vector information 135 for C1 and C2, respectively (Step S116). The macro-block types 106, the reference image identification numbers, and the motion vector information for the respective color components are set through the processing steps. Thus, the variable-length decoding unit 25 outputs the macro-block types 106, the reference image identification numbers, and the motion vector information to the motion-compensation predicting unit 102 to obtain motion compensated predicted images of the respective color components.

Figure 36:
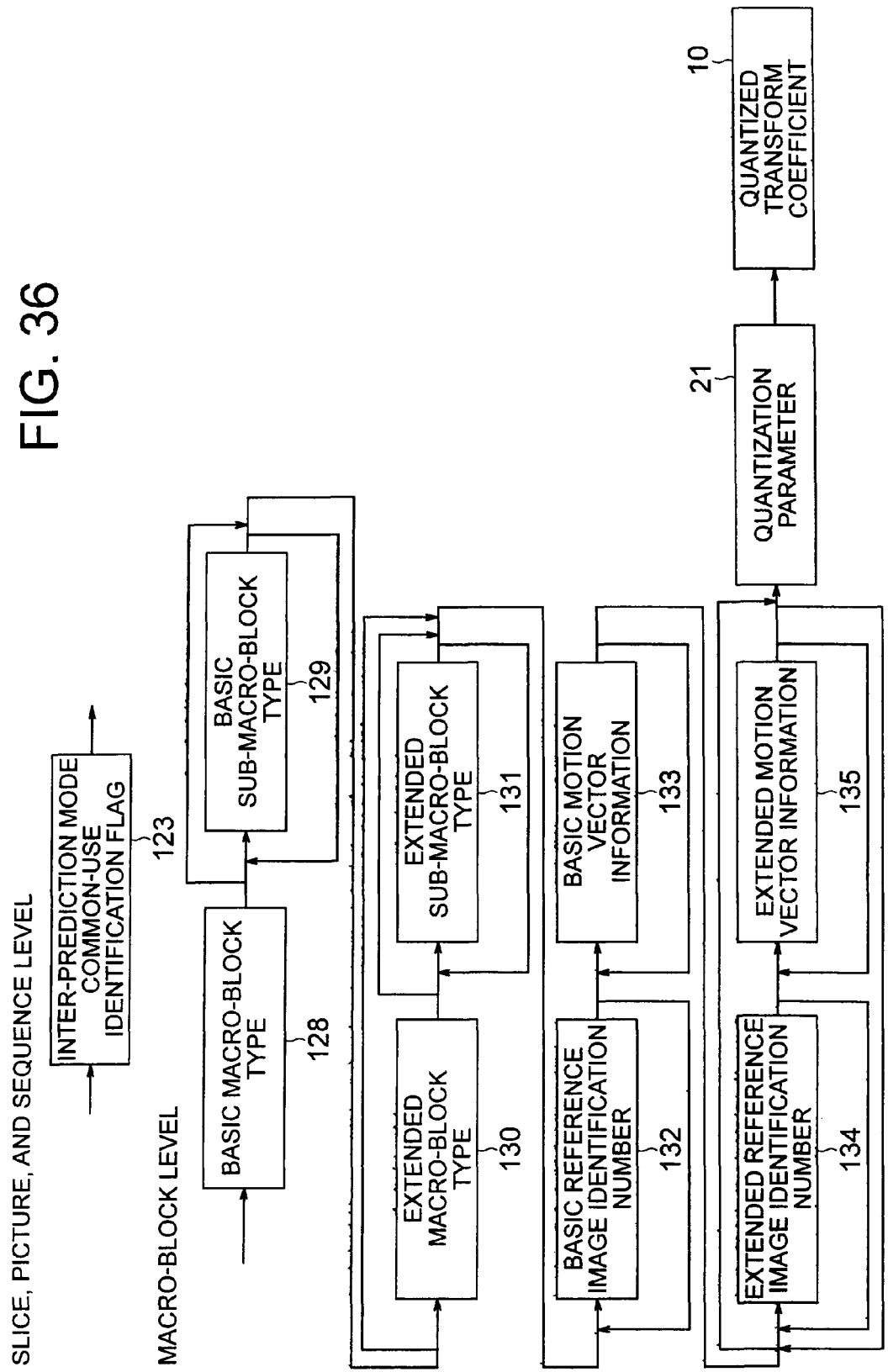
FIG. 36 is a diagram for explaining another data array of the video stream outputted from the video encoder according to the seventh embodiment.

Variations of the bit stream data array in FIG. 34 are shown in FIG. 36. In FIG. 36, the inter-prediction mode common-use identification flag 123 is multiplexed as a flag located in an upper data layer such as a slice, a picture, or a sequence rather than a flag at a macro-block level. Consequently, when it is possible to secure sufficient prediction efficiency according to change in the upper layer equal to or higher than the slice, it is possible to reduce an overhead bit without multiplexing the prediction mode common-use identification flag 123 at the macro-block level every time the processing is performed.

Figure 37:
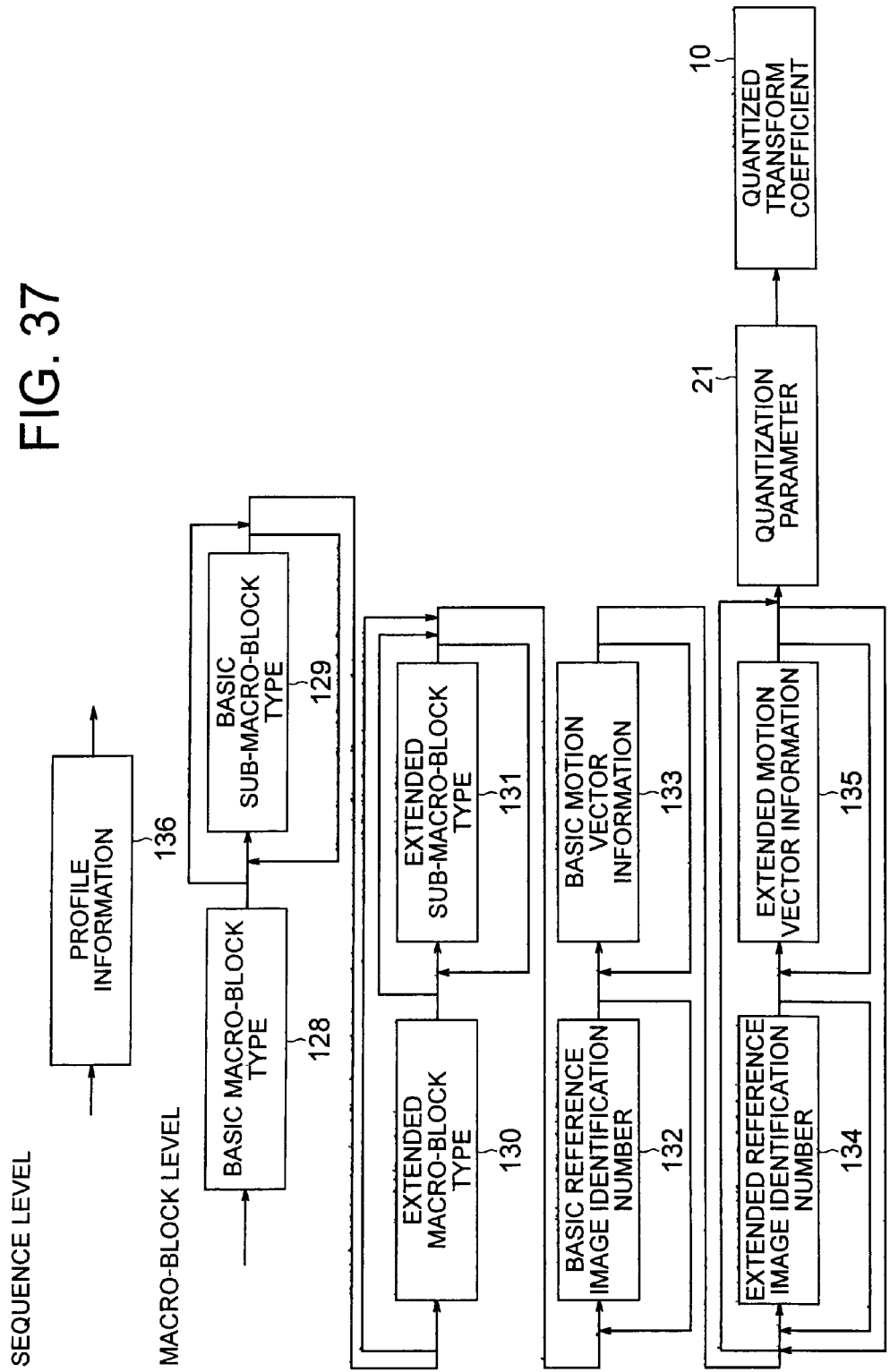
FIG. 37 is a diagram for explaining another data array of the video stream outputted from the video encoder according to the seventh embodiment.

In FIGS. 34 and 36, the inter-prediction mode common-use identification flag 123 is multiplexed on each macro-block or an upper data layer such as a slice, a picture, or a sequence. When encoding is performed in the 4:4:4 format without multiplexing the inter-prediction mode common-use identification flag 123, different inter-prediction modes and motion vector information may always be used for the respective components. An array of bit stream data in that case is shown in FIG. 37. In FIG. 37, the inter-prediction mode common-use identification flag 123 is not present and profile information 136 indicating that an input image of the 4:4:4 format is treated is multiplexed on an upper data layer such as a sequence. The extended macro-block type 130, the extended sub-macro-block type 131, the extended reference image identification number 134, and the extended motion vector information 135 are multiplexed according to a result of decoding of the profile information.

Eighth Embodiment

In the seventh embodiment, the macro-block type/sub-macro-block type, the motion vector, and the reference image can be varied for each of the color components. In the eighth embodiment, a video encoder and a video decoder characterized by being able to set a macro-block type/sub-macro-block type common to the respective components and vary only a motion vector for each of the components will be described. Structures of the video encoder and the video decoder in the eighth embodiment are the same as FIGS. 30 and 31 in the seventh embodiment. However, the structures are different in that a motion vector common-use identification flag 123b is used instead of the inter-prediction mode common-use identification flag 123.

1. Inter-Prediction Mode Judgment Processing in the Encoder

The inter-prediction mode judgment processing, which is a characteristic of the encoder in the eighth embodiment, will be described in detail focusing on processing different from the processing in the seventh embodiment.

2. Inter-Prediction Mode Judgment Processing in the Encoder

Figure 38:
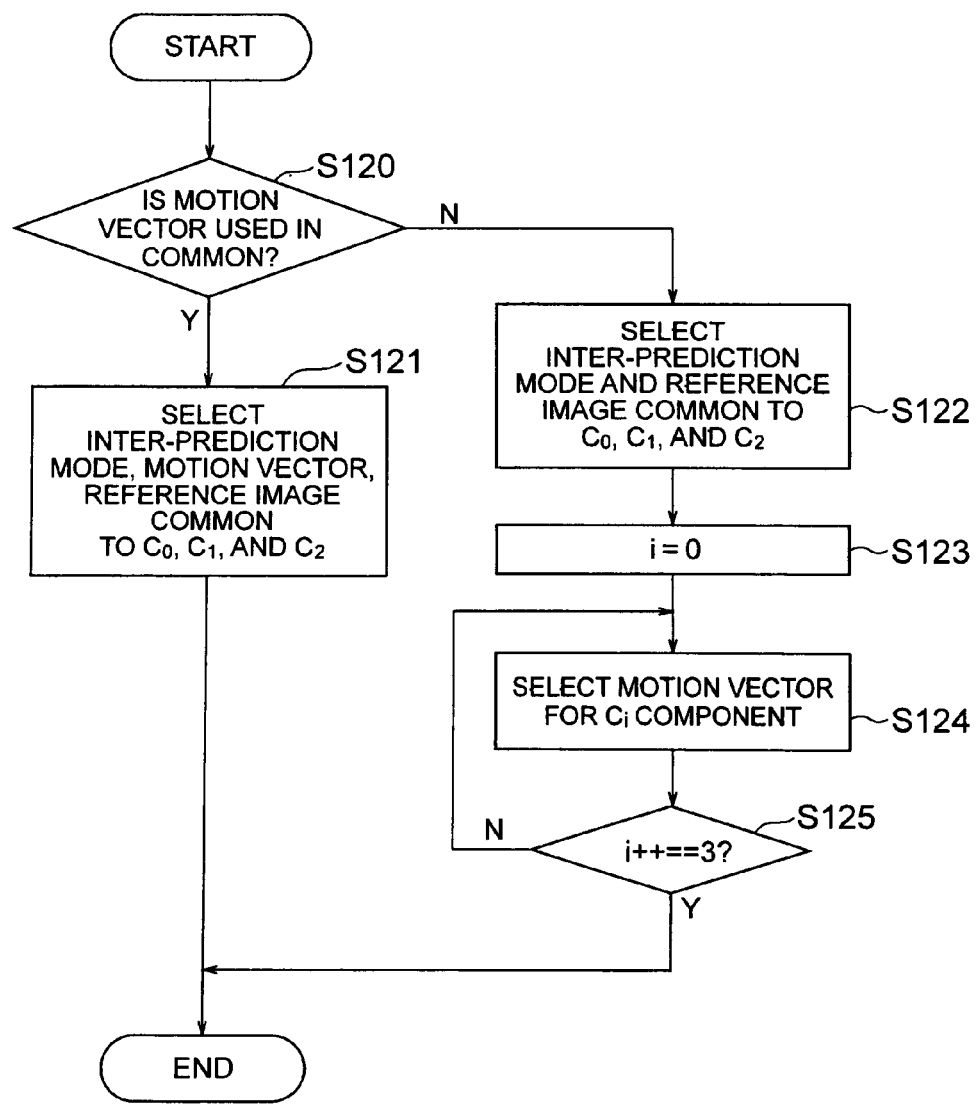
FIG. 38 is a flowchart showing a flow of inter-prediction mode judgment processing according to an eighth embodiment.

The processing is carried out by a unit of a macro-block obtained by arranging the three color components. The processing is performed mainly by the motion-compensation predicting unit 102 and the encoding-mode judging unit 5 in the encoder in FIG. 30. A flowchart showing a flow of the processing is shown in FIG. 38. Image data of three color components forming a block are hereinafter referred to as C0, C1, and C2.

First, the encoding-mode judging unit 5 receives the motion vector common-use identification flag 123b and judges, on the basis of a value of the motion vector common-use identification flag 123b, whether a common motion vector 137 is used for C0, C1, and C2 (Step S120 in FIG. 37). When the motion vector 137 is used in common, the encoding-mode judging unit 5 proceeds to Step S121 and subsequent steps. Otherwise, the encoding-mode judging unit 5 proceeds to Step S122 and subsequent steps.

When the motion vector 137 is used in common for C0, C1, and C2, the encoding-mode judging unit 5 notifies the motion-compensation predicting unit 102 of all inter-prediction modes, motion vector search ranges, and reference images that can be selected. The motion-compensation predicting unit 102 evaluates prediction efficiencies of all of the inter-prediction modes, motion vector search ranges, and reference images and selects an optimum inter-prediction mode, an optimum motion vector 137, and an optimum reference images common to C0, C1, and C2 (Step S121).

When the motion vector 137 is not used in common for C0, C1, and C2 and best motion vectors are selected for C0, C1, and C2, respectively, the encoding-mode judging unit 5 notifies the motion-compensation predicting unit 102 of all inter-prediction modes, motion vector search ranges, and reference images that can be selected. The motion-compensation predicting unit 102 evaluates prediction efficiencies of all of the inter-prediction modes, motion vector search ranges, and reference images and selects an optimum inter-prediction mode and an optimum reference image (Step 122), and further an optimum motion vector in Ci (i<=0<3) components (Steps S123, S124, and S125).

It is necessary to multiplex the motion vector common-use identification flag 123b on a bit stream and make it possible to recognize the motion vector common-use identification flag 123b on the decoder side. A data array of such a bit stream is shown in FIG. 39.

Figure 39:
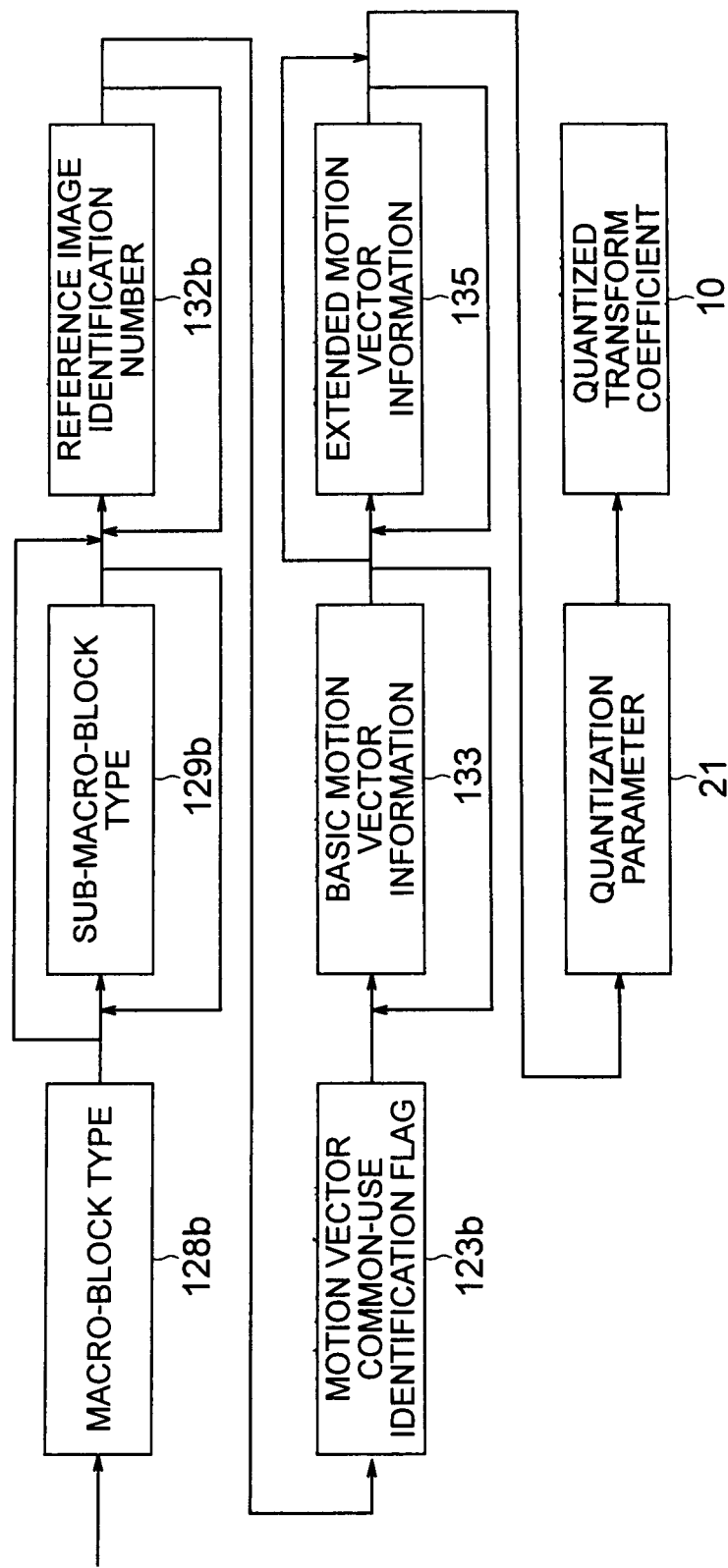
FIG. 39 is a diagram for explaining a data array of a bit stream at a level of a macro-block according to the eighth embodiment.

A data array of a bit stream at a level of a macro-block is shown in FIG. 39. A macro-block type 128b, a sub-macro-block type 129b, and a reference image identification number 132b are "common to C0, C1, and C2". When the motion vector common-use identification flag 123b indicates "common to C0, C1, and C2", basic motion vector information 133 indicates common motion vector information. Otherwise, the basic motion vector information 133 indicates motion vector information for C0. Only when the motion vector common-use identification flag 123b indicates "not common to C0, C1, and C2", extended motion vector information 135 is multiplexed for C1 and C2, respectively, and indicates motion vector information for C1 and C2. The macro-block type/submacro-block type 106 in FIGS. 30 and 31 are a general term of the macro-block type 128b and the sub-macro-block type 129b in FIG. 39.

2. Inter-Prediction Decoding Processing in the Decoder

The decoder in the eighth embodiment receives the video stream 22 conforming to the array in FIG. 39 outputted from the encoder in the eighth embodiment, performs decoding processing by a unit of a macro-block with an identical size (the 4:4:4 format) for three color components, and restores respective video frames.

Figure 40:
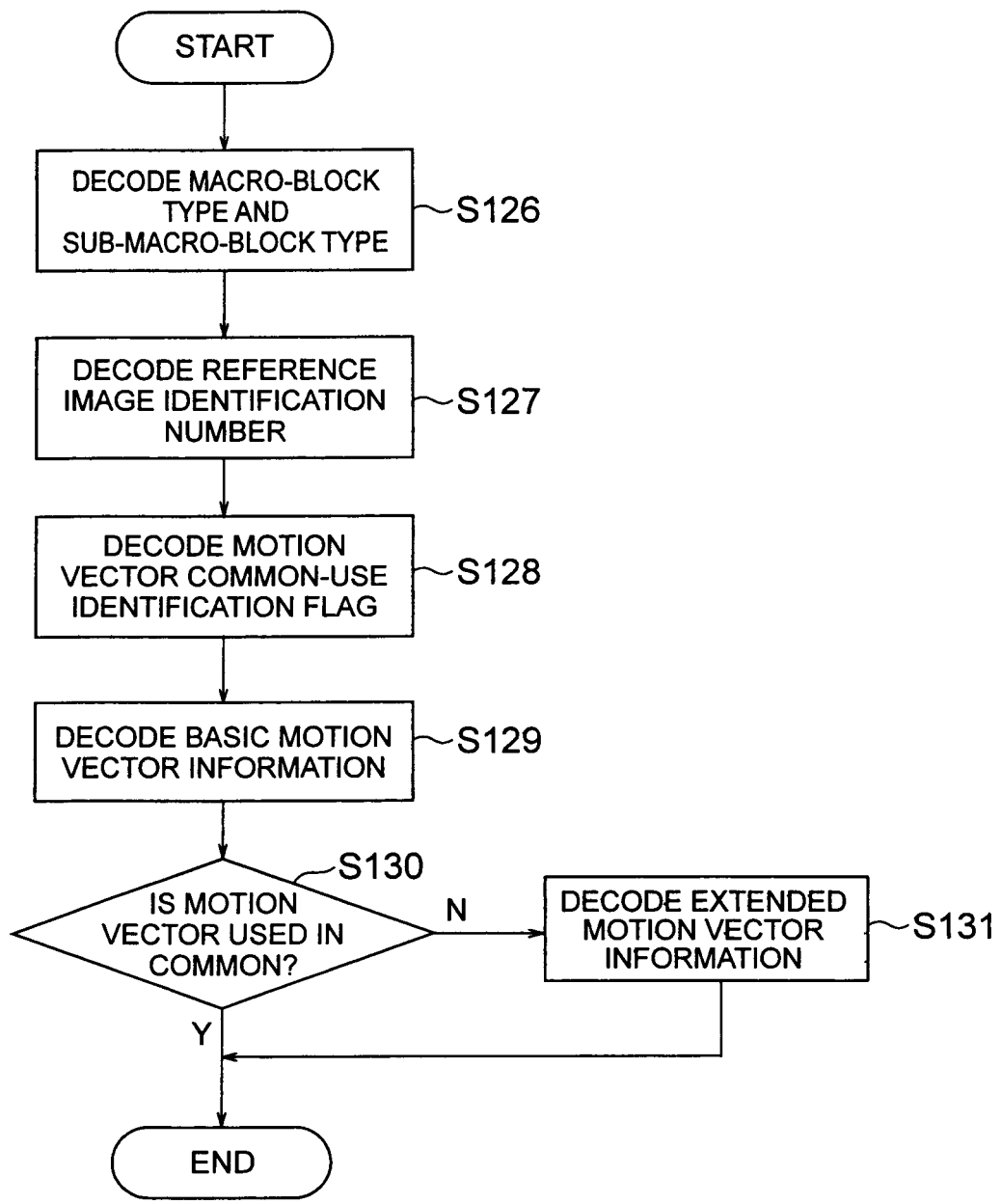
FIG. 40 is a flowchart showing a flow of inter-predicted image generation processing according to the eighth embodiment.

The inter-predicted image generation processing, which is a characteristic of the decoder in the eighth embodiment, will be described in detail focusing on processing different from the processing in the seventh embodiment. This processing is carried out by a unit of the macro-block in which three color components are arranged. The processing is performed mainly by the variable-length decoding unit 25 and the motion-compensation predicting unit 102 in the decoder in FIG. 31. A flowchart of a flow of processing performed by the variable-length decoding unit 25 of the processing is shown in FIG. 40.

The video stream 22 inputted to the variable-length decoding unit 25 conforms to the data array in FIG. 39. In Step S126, the variable-length decoding unit 25 decodes the macro-block type 128b and the sub-macro-block type 129b common to C0, C1, and C2. A block size serving as a unit of motion compensation depends on the macro-block type 128b or the sub-macro-block type 129b decoded. Thus, the variable-length decoding unit 25 decodes the reference image identification number 132b common to C0, C1, and C2 for each block serving as a unit of motion compensation (Step S127). In Step S128, the variable-length decoding unit 25 decodes the motion vector common-use identification flag 123b. Subsequently, the variable-length decoding unit 25 decodes the basic motion vector information 133 for each block serving as a unit of motion compensation (Step S129). In Step S130, the variable-length decoding unit 25 judges whether the motion vector 137 is used in common for C0, C1, and C2 using a result of the motion vector common-use identification flag 123b. When the motion vector 137 is used in common (Yes in Step S130), the variable-length decoding unit 25 uses basic motion vector information for all of C0, C1, and C2. Otherwise (No in Step S130), the variable-length decoding unit 25 uses the basic motion vector information 133 as a mode for C0 and decodes the extended motion vector information 135 for C1 and C2, respectively (Step S131). Since the macro-block type/sub-macro-block types 106, reference image identification numbers, and motion vector information for the respective color components are set through the processing steps, the variable-length decoding unit 25 outputs the macro-block type/sub-macro-block types 106, the reference image identification numbers, and the motion vector information to the motion-compensation predicting unit 102 to obtain motion compensated predicted image for the respective color components.

Figure 41:
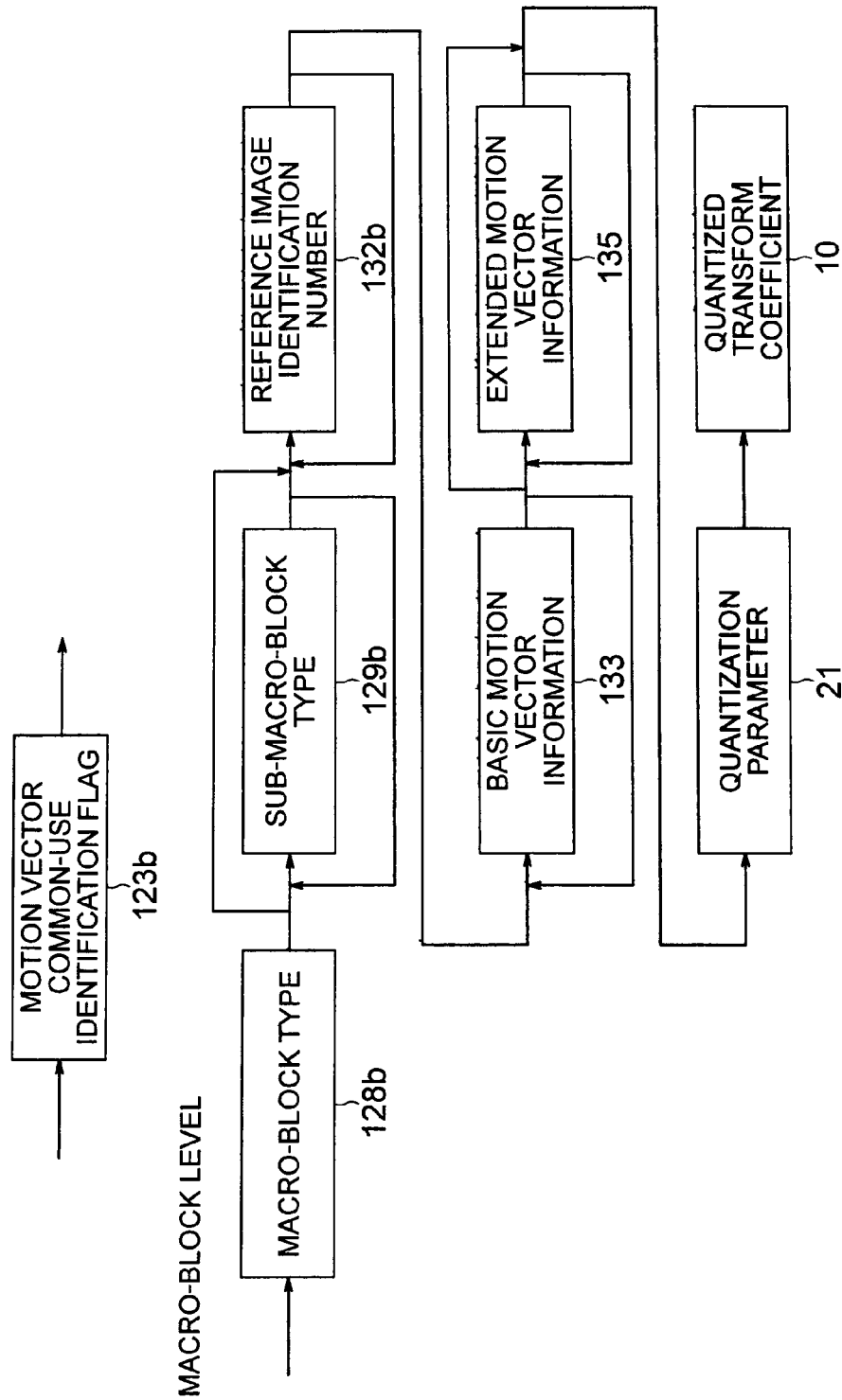
FIG. 41 is a diagram for explaining another data array of the bit stream at the level of the macro-block according to the eighth embodiment.

Variations of the bit stream data array in FIG. 39 are shown in FIG. 41. In FIG. 39, the motion vector common-use identification flag 123b is multiplexed as a flag located in an upper data layer such as a slice, a picture, or a sequence rather than a flag at a macro-block level. Consequently, when it is possible to secure sufficient prediction efficiency according to change in the upper layer equal to or higher than the slice, it is possible to reduce an overhead bit without multiplexing the motion vector common-use identification flag 123b at the macro-block level every time the processing is performed.

Figure 42:
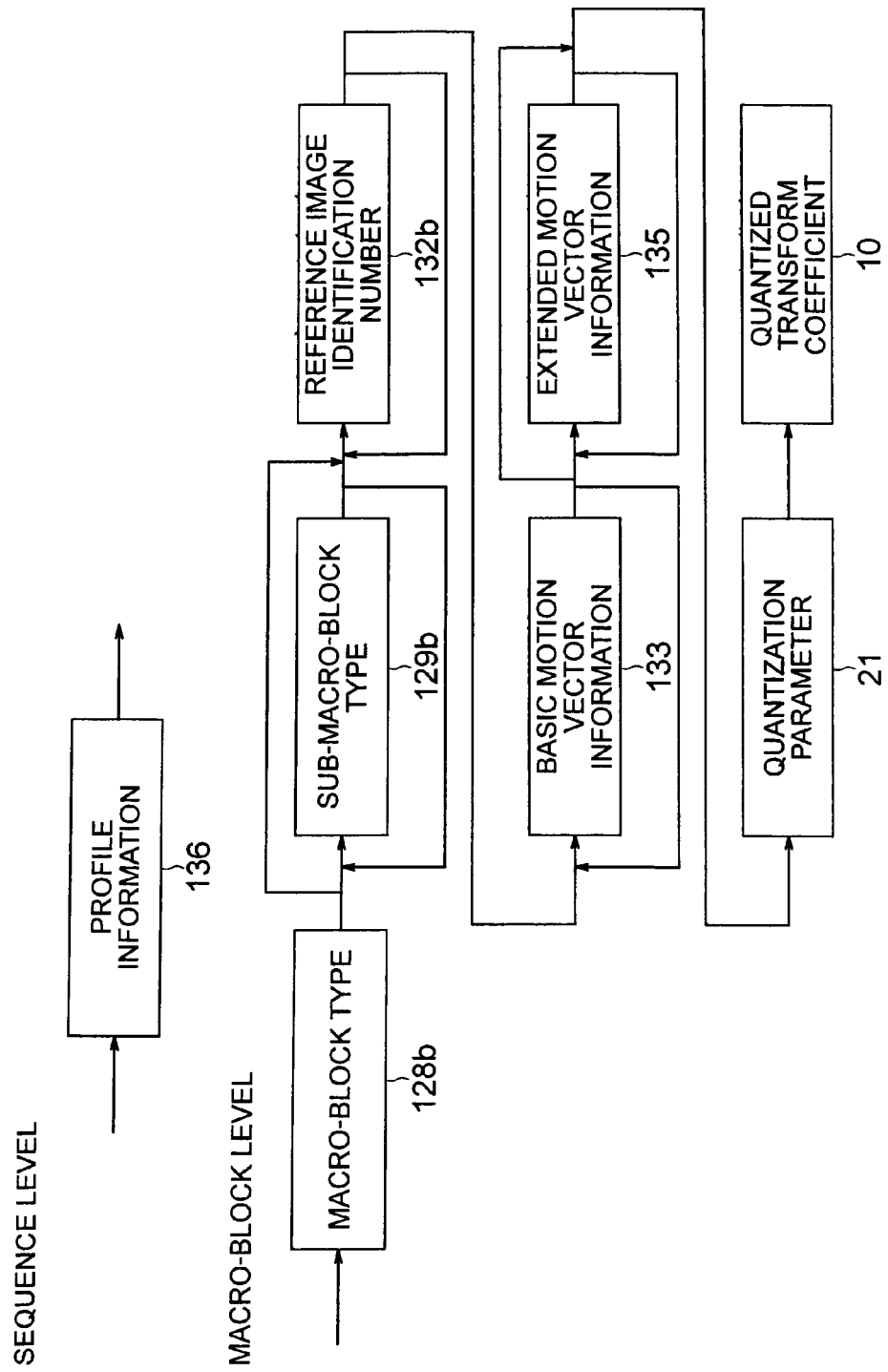
FIG. 42 is a diagram for explaining another data array of the bit stream at the level of the macro-block according to the eighth embodiment.

In FIGS. 39 and 41, the motion vector common-use identification flag 123b is multiplexed on each macro-block or an upper data layer such as a slice, a picture, or a sequence. When encoding is performed in the 4:4:4 format without multiplexing the motion vector common-use identification flag 123b, different motion vector information may always be used for the respective components. An array of bit stream data in that case is shown in FIG. 42. In FIG. 42, the motion vector common-use identification flag 123b is not present and profile information 136 indicating that an input image of the 4:4:4 format is treated is multiplexed on an upper data layer such as a sequence. The extended motion vector information 135 is multiplexed according to a result of decoding of the profile information 136.

In the eighth embodiment, the macro-block type/sub-macro-block type 106 and the reference image are common to the respective color components and only the motion vector 137 can be varied for each of the color components. Consequently, when sufficient prediction efficiency is obtained by adapting only the motion vector 137 to the respective color components, it is possible to reduce overhead bits without multiplexing the macro-block type/sub-macro-block type 106 and the reference image identification number for each of the color components.

Ninth Embodiment

In the seventh embodiment, it is possible to decide whether the macro-block type/sub-macro-block type 106, the motion vector 137, and the reference image are used in common for the three components or varied for each of the color components according to the inter-prediction mode common-use identification flag 123 or the profile information 136. However, in the ninth embodiment, assuming a 4:4:4 format image of the Y, Cb, Cr format, it is possible to decide whether different modes are used for the luminance component (Y) and the color difference component (Cb, Cr) (in this case, a common mode is used for two components of the color difference components). A video encoder and a video decoder characterized by being able to decide whether a common mode is used for the three components, different modes are used from the respective components, or different modes are used for the luminance components and the color difference components will be explained. Structures of the video encoder and the video decoder in the ninth embodiment are the same as those in FIGS. 30 and 31 in the seventh embodiment.

1. Inter-Prediction Mode Judgment Processing in the Encoder

The inter-prediction mode judgment processing, which is a characteristic of the encoder in the ninth embodiment, will be described in detail focusing on processing different from the processing in the seventh embodiment.

Figure 43:
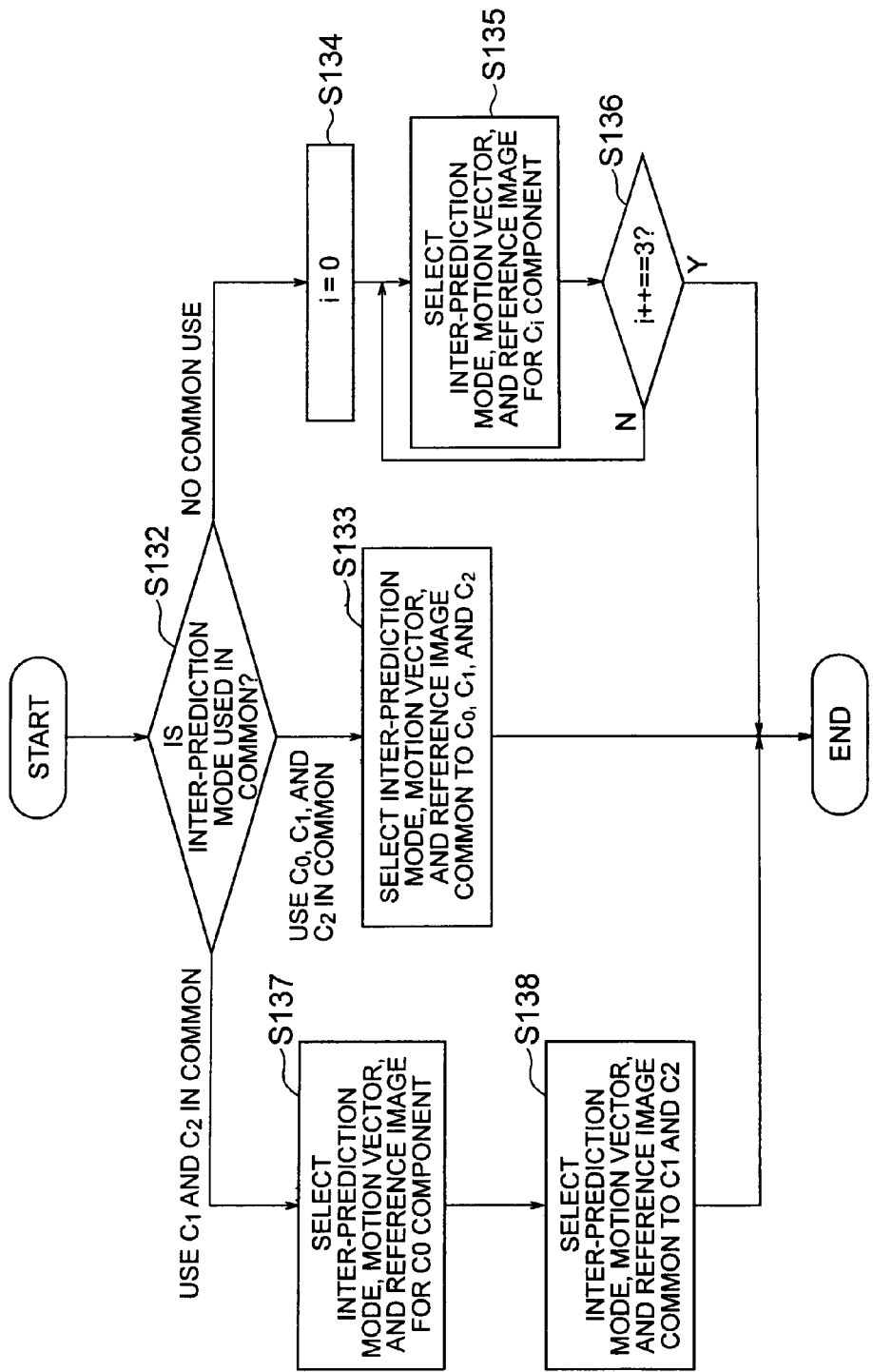
FIG. 43 is a flowchart showing a flow of inter-prediction mode judgment processing according to a ninth embodiment.

The processing is carried out by a unit of a macro-block obtained by arranging the three color components. The processing is performed mainly by the motion-compensation predicting unit 102 and the encoding-mode judging unit 5 in the encoder in FIG. 30. A flowchart showing a flow of the processing is shown in FIG. 43. Image data of three color components forming a block are hereinafter referred to as C0, C1, and C2.

First, the encoding-mode judging unit 5 receives the inter-prediction mode common-use identification flag 123 and judges, on the basis of a value of the inter-prediction mode common-use identification flag 123, whether a common inter-prediction mode, a common motion vector 137, and a common reference image are used for C0, C1, and C2 (Step S132 in FIG. 43). When the inter-prediction mode, the motion vector 137, and the reference image are used in common, the encoding-mode judging unit 5 proceeds to Step S133 and subsequent steps. Otherwise, the encoding-mode judging unit 5 proceeds to Step S134 and subsequent steps or to Step 137 and subsequent steps.

When the inter-prediction mode, the motion vector 137, and the reference image are used in common for C0, C1, and C2, the encoding-mode judging unit 5 notifies the motion-compensation predicting unit 102 of all inter-prediction modes, motion vector search ranges, and reference images that can be selected. The motion-compensation predicting unit 102 evaluates prediction efficiencies of all of the inter-prediction modes, motion vector search ranges, and reference images and selects an optimum inter-prediction mode, an optimum motion vector 137, and an optimum reference images common to C0, C1, and C2 (Step S133).

When the inter-prediction mode, the motion vector 137, and the reference image are not used in common for C0, C1, and C2 and best modes are selected for C0, C1, and C2, respectively, the encoding-mode judging unit 5 notifies the motion-compensation predicting unit 102 of all inter-prediction modes, motion vector search ranges, and reference images that can be selected for Ci (i<=0<3) components. The motion-compensation predicting unit 102 evaluates prediction efficiencies of all of the inter-prediction modes, motion vector search ranges, and reference images and selects an optimum inter-prediction mode, an optimum motion vector 137, and an optimum reference images in Ci (i<=0<3) components (Steps S134, S135, and S136).

When the inter-prediction mode, the motion vector 137, and the reference image are used in common for C1 and C2 and best modes are selected for C0 (equivalent to the luminance component) and C1 and C2 (equivalent to the color difference components), the encoding-mode judging unit 5 notifies the motion-compensation predicting unit 102 of all inter-prediction modes, motion vector search ranges, and reference images that can be selected in the C0 component. The motion-compensation predicting unit 102 evaluates prediction efficiencies of all of the inter-prediction modes, the motion vector search ranges, and the reference images and selects an optimum inter-prediction mode, an optimum motion vector 137, and an optimum reference image in the C0 component (Step S137). The encoding-mode judging unit 5 notifies the motion-compensation predicting unit 102 of all inter-prediction modes, motion vector search ranges, and reference images that can be selected in the C1 and the C2 components. The motion-compensation predicting unit 102 evaluates prediction efficiencies of all of the inter-prediction modes, the motion vector search ranges, and the reference images and selects an optimum inter-prediction mode, an optimum motion vector 137, and an optimum reference image common to C1 and C2 (Step S138).

A data array of a bit stream outputted by the encoder in the ninth embodiment is the same as that in FIG. 34. When the inter-prediction mode common-use identification flag 123 indicates "common to C1 and C2", the extended macro-block type 130, the extended sub-macro-block type 131, the extended reference identification number 134, and the extended motion vector information 135 are information common to C1 and C2.

2. Inter-Prediction Decoding Processing in the Decoder

The decoder in the ninth embodiment receives the video stream 22 conforming to the array in FIG. 34 outputted from the encoder in the ninth embodiment, performs decoding processing by a unit of a macro-block with an identical size (the 4:4:4 format) for three color components, and restores respective video frames.

Figure 44:
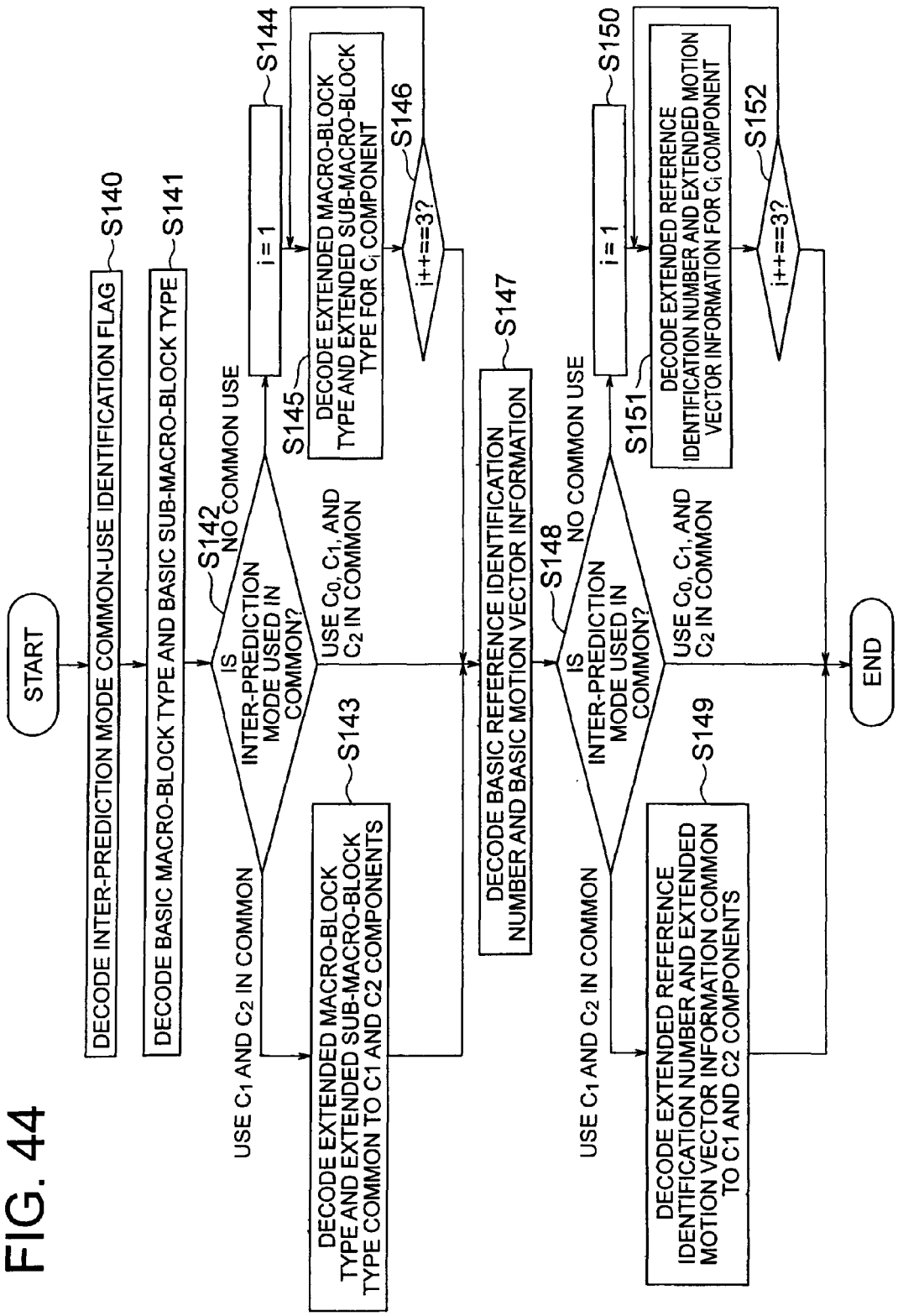
FIG. 44 is a flowchart showing a flow of inter-predicted image generation processing according to the ninth embodiment.

The inter-predicted image generation processing, which is a characteristic of the decoder in the ninth embodiment, will be described in detail focusing on processing different from the processing in the seventh embodiment. This processing is carried out by a unit of the macro-block in which three color components are arranged. The processing is performed mainly by the variable-length decoding unit 25 and the motion-compensation predicting unit 102 in the decoder in FIG. 31. A flowchart of a flow of processing performed by the variable-length decoding unit 25 of the processing is shown in FIG. 44.

The video stream 22 inputted to the variable-length decoding unit 25 conforms to a data array in FIG. 34. In Step S140, the variable-length decoding unit 25 decodes the inter-prediction mode common-use identification flag 123 of the data in FIG. 34 (Step S140). The variable-length decoding unit 25 further decodes the basic macro-block type 128 and the basic sub-macro-block type 129 (Step S141). In Step S142, the variable-length decoding unit 25 judges whether an inter-prediction mode is used in common for C0, C1, and C2 using a result of the inter-prediction mode common-use identification flag 123. When the inter-prediction mode is used in common for C0, C1, and C2, the variable-length decoding unit 25 uses the basic macro-block type 128 and the basic sub-macro-block type 129 for all of C0, C1, and C2. Otherwise, the variable-length decoding unit 25 uses the basic macro-block type 128 and the basic sub-macro-block type 129 as a mode for C0. Further, when a common mode is used for C1 and C2, the variable-length decoding unit 25 decodes the extended macro-block type 130 and the extended sub-macro-block type 131 common to C1 and C2 components (Step S143). When different modes are used for C0, C1, and C2, the variable-length decoding unit 25 decodes the extended macro-block type 130 and the extended sub-macro-block type 131 for C1 and C2, respectively (Steps S144, S145, and S146) to obtain mode information for C1 and C2. The variable-length decoding unit 25 decodes the basic reference image identification number 132 and the basic motion vector information 133 (Step S147).

When the inter-prediction mode common-use identification flag 123 indicates "used in common for C0, C1, and C2", the variable-length decoding unit 25 uses the basic reference image identification number 132 and the basic motion vector information 133 for all of C0, C1, and C2. Otherwise, the variable-length decoding unit 25 uses the basic reference image identification number 132 and the basic motion vector information 133 as information for C0. Further, when a common mode is used for C1 and C2, the variable-length decoding unit 25 decodes the extended reference image identification number 134 and the extended motion vector information 135 common to C1 and C2 components (Step 149). When different modes are used for C0, C1, and C2, the variable-length decoding unit 25 decodes the extended reference image identification number 134 and the extended motion vector information 135 for C1 and C2, respectively (Steps S150, S151, and S152). The macro-block types 106, the reference image identification numbers, and the motion vector information for the respective color components are set through the processing steps. Thus, the variable-length decoding unit 25 outputs the macro-block types 106, the reference image identification numbers, and the motion vector information to the motion-compensation predicting unit 102 to obtain motion compensated predicted images of the respective color components.

In the case of a data array of a bit stream shown in FIG. 36, similarly, when the inter-prediction mode common-use identification flag 123 indicates "common to C1 and C2", the extended macro-block type 130, the extended sub-macroblock type 131, the extended reference identification number 134, and the extended motion vector information 135 are information common to C1 and C2. Operations of a video encoder and a video decoder to which a video stream conforming to the array of data shown in FIG. 36 is inputted and from which the video stream is outputted are the same as those in the case of FIG. 34.

In the ninth embodiment, the macro-block type/sub-macro-block type 106, the motion vector 137, and the reference image can be varied for each of the color components. It is also possible that the macro-block type/sub-macro-block type 106 and the reference image are common to the respective components and only the motion vector 137 is common to the three components, varied for each of the components, or common to C1 and C2 and optimum ones are selected for C0 and C1 and C2, respectively. A data array of a bit stream in this case conforms to FIG. 39 or FIG. 41. In this case, as in the case described above, when the inter-prediction mode common-use identification flag 123 indicates "common to C1 and C2", the extended motion vector information 135 is information common to C1 and C2.

Tenth Embodiment

In the tenth embodiment, a method of encoding the motion vector 137 inputted and multiplexing the motion vector 137 on a bit stream in the variable-length encoding unit 11 of the encoder described in the seventh embodiment and a method of decoding the motion vector 137 from a bit stream in the variable-length decoding unit 25 of the decoder corresponding to the encoder will be described.

Figure 45:
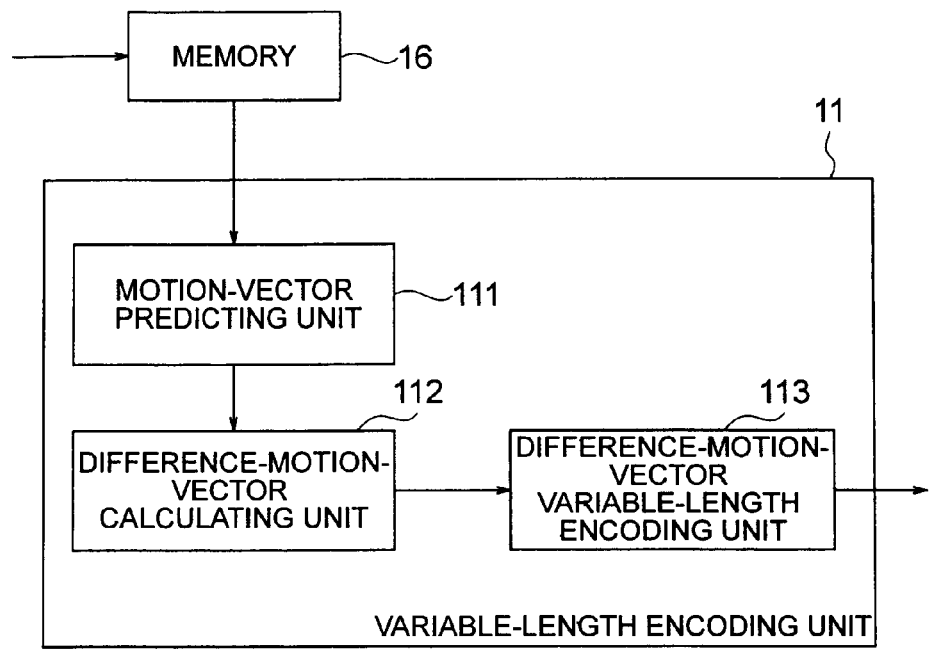
FIG. 45 is a diagram for explaining a structure of a motion vector encoding unit.

FIG. 45 is a diagram of a structure of a part of the variable-length encoding unit 11 of the encoder shown in FIG. 30, which is a motion vector encoding unit that encodes the motion vector 137.

A method of multiplexing the motion vectors 137 of the three color components (C0, C1, and C2) on a bit stream in an order of C0, C1, and C2 will be described.

Figure 46:
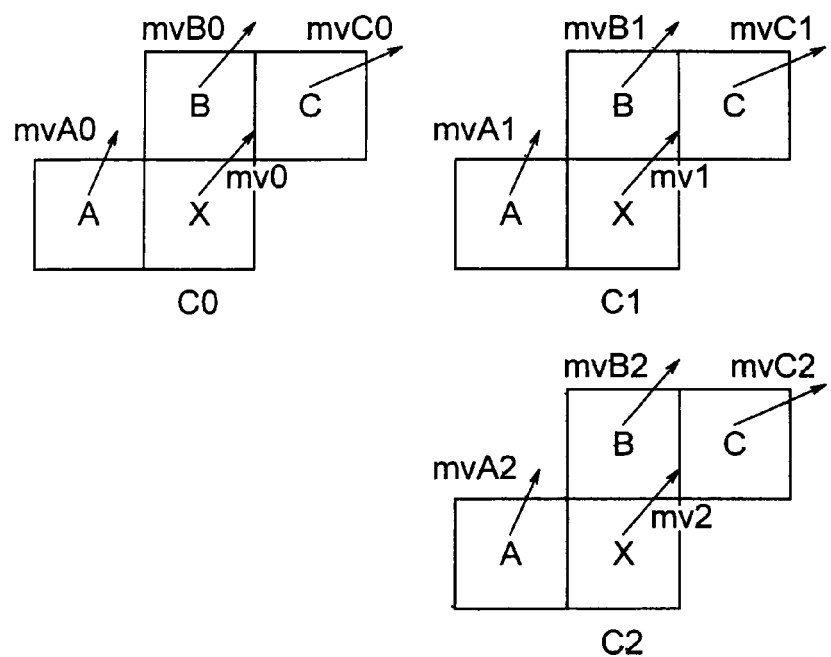
FIG. 46 is a diagram for explaining operations of the motion vector encoding unit.

The motion vector 137 of C0 is MV0. In the motion vector predicting unit 111, a predicted vector (mvp0) of the motion vector 137 of C0 is determined. As shown in FIG. 46, motion vectors (mvA0, mvB0, and mvC0) of a block (A, B, and C in FIG. 46) adjacent to a block where the motion vector (mv0) to be encoded is located are acquired from the memory. The motion vectors 137 of A, B, and C are already multiplexed on a bit stream. A median of mvA0, mvB0, and mvC0 is calculated as mvp0. The predicted vector mvp0 calculated and the motion vector mv0 to be encoded are inputted to the difference motion vector calculating unit 112. In the difference motion vector calculating unit 112, a difference motion vector (mvd0) between mv0 and mvp0 is calculated. The difference motion vector mvd0 calculated is inputted to the difference motion vector variable-length encoding unit 113 and subjected to entropy encoding by means such as the Huffman encoding or the arithmetic encoding.

A motion vector (mv1) of C1 is encoded. In the motion vector predicting unit 111, a predicted vector (mvp1) of the motion vector 137 of C1 is determined. As shown in FIG. 46, motion vectors (mvA1, mvB1, and mvC1) of a block adjacent to a block where the motion vector (mv1) to be encoded is located and a motion vector (mv0) of C0 in the same position as the block where mv1 is located are acquired from the memory 16. The motion vectors 137 of A, B, and C are already multiplexed on a bit stream. A median of mvA1, mvB1, mvC1, and mv0 is calculated as mvp1. The predicted vector mvp1 calculated and the motion vector mv1 to be encoded are inputted to the difference motion vector calculating unit 112 to calculate a difference motion vector (mvd1=mv1−mvp1) between mv1 and mvp1. The difference motion vector mvd1 calculated is inputted to the difference motion vector variable-length encoding unit 113 and subjected to entropy encoding by means such as the Huffman encoding or the arithmetic encoding.

A motion vector (mv2) of C1 is encoded. In the motion vector predicting unit 111, a predicted vector (mvp2) of the motion vector 137 of C1 is determined. As shown in FIG. 46, motion vectors (mvA2, mvB2, and mvC2) of a block adjacent to a block where the motion vector (mv2) to be encoded is located and motion vectors (mv1 and mv2) of C0 and C1 in the same position as the block where mv2 is located are acquired from the memory. A median of mvA2, mvB2, mvC2, mv0, and mv1 is calculated as mvp2. The predicted vector mvp2 calculated and the motion vector mv2 to be encoded are inputted to the difference motion vector calculating unit 112 to calculate a difference motion vector (mvd2=mv2−mvp2) between mv2 and mvp2. The difference motion vector mvd2 calculated is inputted to the difference motion vector variable-length encoding unit 113 and subjected to entropy encoding by means such as the Huffman encoding or the arithmetic encoding.

FIG. 47 shows a diagram of a structure of a part of the variable-length decoding unit 25 of the encoder shown in FIG. 31, which is a motion vector decoding unit 250 that decodes the motion vector 137.

In the motion vector decoding unit 250, the motion vectors 137 of the three color components multiplexed on the video stream 22 are decoded in an order of C0, C1, and C2.

In a difference-motion-vector variable-length decoding unit 251, the difference motion vectors (mvd0, mvd1, and mvd2) of the three color components (C0, C1, and C2) multiplexed on the video stream 22 are extracted and subjected to variable-length decoding.

In a motion-vector predicting unit 252, the predicted vectors (mvp0, mvp1, and mvp2) of the motion vectors 137 of C0, C1, and C2 are calculated. A method of calculating predicted vectors is the same as that used in the motion-vector predicting unit 111 of the encoder.

In a motion-vector calculating unit 253, the difference motion vectors and the predicted vectors are added to calculate motion vectors (mvi=mvdi+mvpi(i=0, 1, 2)). The motion vectors 137 calculated are stored in the memory 16 to be used as predicted vector candidates.

According to the tenth embodiment, in encoding and decoding motion vectors, a motion vector of an identical color component block adjacent to a block where a motion vector to be encoded is located and motion vectors of different color component blocks in the same position as the block where the motion vector to be encoded is located are used as predicted vector candidates. Thus, for example, when there is no continuity to a motion vector of an adjacent block in an identical color component in a boundary region of an object or the like, motion vectors of blocks in the same position of different color components are used as predicted vector candidates. Consequently, an effect of improving prediction efficiency of a motion vector and reducing a code amount of the motion vector is obtained.

Eleventh Embodiment

In the eleventh embodiment, examples of another encoder and another decoder derived from the encoder and the decoder described in the seventh embodiment will be described. The encoder and the decoder in the eleventh embodiment judge, according to a predetermined control signal, whether C0, C1, and C2 components in a macro-block are encoded in accordance with separate pieces of header information and multiplex information on the control signal on the video stream 22. The encoder and the decoder are characterized by providing means for multiplexing header information necessary for decoding of the C0, C1, and C2 components on the video stream 22 according to the control signal and efficiently encoding a skip (or not coded) macro-block at the time when there is no information on a motion vector that should be transmitted according to the control signal and a transform coefficient.

In the conventional MPEG video encoding system including the AVC, a case in which encoding information that should be transmitted is not present for a macro-block to be encoded is specially subjected to signaling to realize high-efficiency encoding with a code amount of the macro-bock minimized. For example, when it is attempted to encode a certain macro-block, image data in completely the same position on a reference image used for motion compensation prediction is used as a predicted image (i.e., motion vector is zero) and a predicted error signal obtained is converted and quantized. As a result, when all transform coefficients after the quantization are zero, an amplitude of a predicted error signal obtained is zero on a decoding side even if inverse quantization is performed. There is no transform coefficient data that should be transmitted to the decoder side. Moreover, when it is assumed that the motion vector is zero, it is possible to define a special macro-block type "zero motion vector and no transform coefficient data". Such a macro-block has been conventionally referred to as a skip macro-block or a not-coded macro-block and is contrived not to transmit unnecessary information by performing special signaling. In the AVC, an assumption of a motion vector is a condition "when 16×16 prediction in FIG. 32(a) is performed and when predicted values (predicted vectors mvp0, mvp1, and mvp2) used for encoding of a motion vector are equal to actual motion vectors". When there is no transform coefficient data that meets the condition and should be transmitted, a macro-block is regarded as a skip macro-block. In the conventional AVC, in encoding this skip macro-block, any one of the following two methods is selected according to a variable-length encoding system used.

Method 1: The number (RUN length) of skip macro-blocks continuing in a slice is counted and a RUN length is subjected to variable-length encoding. Method 2: A flag indicating whether each macro-block is a skip macro-block is encoded.

Bit stream syntaxes according to the respective methods are shown in FIG. 48. FIG. 48(a) is a case in which adaptive Huffman encoding is used as a variable-length encoding system (Method 1). FIG. 48(b) is a case in which adaptive arithmetic encoding is used (Method 2). In the case of the method 1, signaling for a skip macro-block is performed by mb_skip_run. In the case of the method 2, signaling for a skip macro-block is performed by mb_skip_flag. MB(n) indicates encoded data of an nth macro-block (which is not skip macro-block). Note that mb_skip_run and mb_skip_flag are allocated with a macro-block in which the C0, C1, and C2 components are collected as a unit.

On the other hand, in the encoder and the decoder in the eleventh embodiment, a method of changing header information including a motion vector and the like for each of the components C0, C1, and C2 according to a state of the control signal, that is, a signal equivalent to the inter-prediction mode common-use identification flag 123 described in the seventh embodiment and performing signaling of a skip macro-block for each of the components C0, C1, and C2 is provided. Specific examples of a bit stream syntax are shown in FIGS. 49 and 50.

Figure 49:
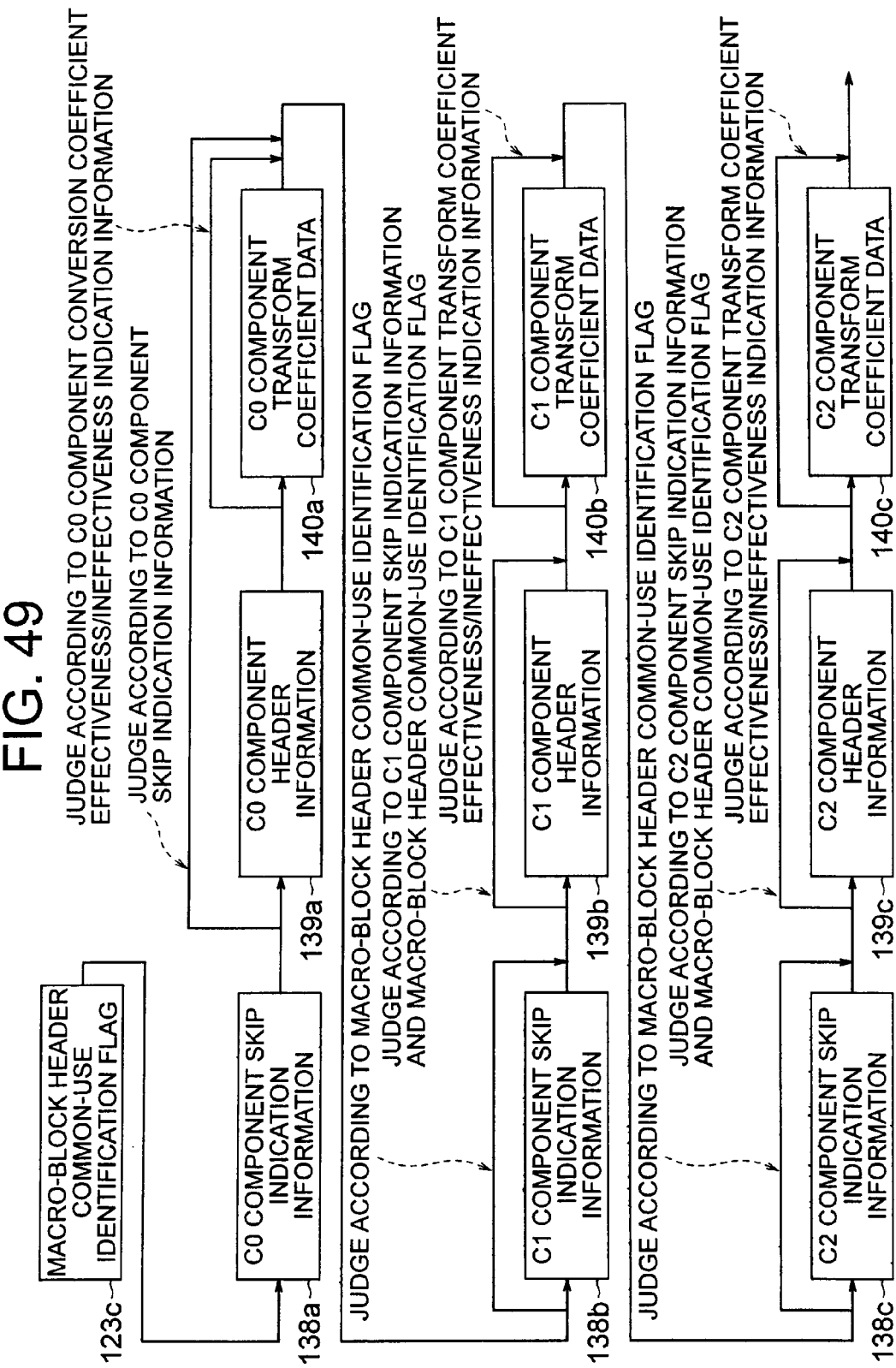
FIG. 49 is a diagram for explaining a structure of macro-block encoded data according to an eleventh embodiment.
Figure 50:
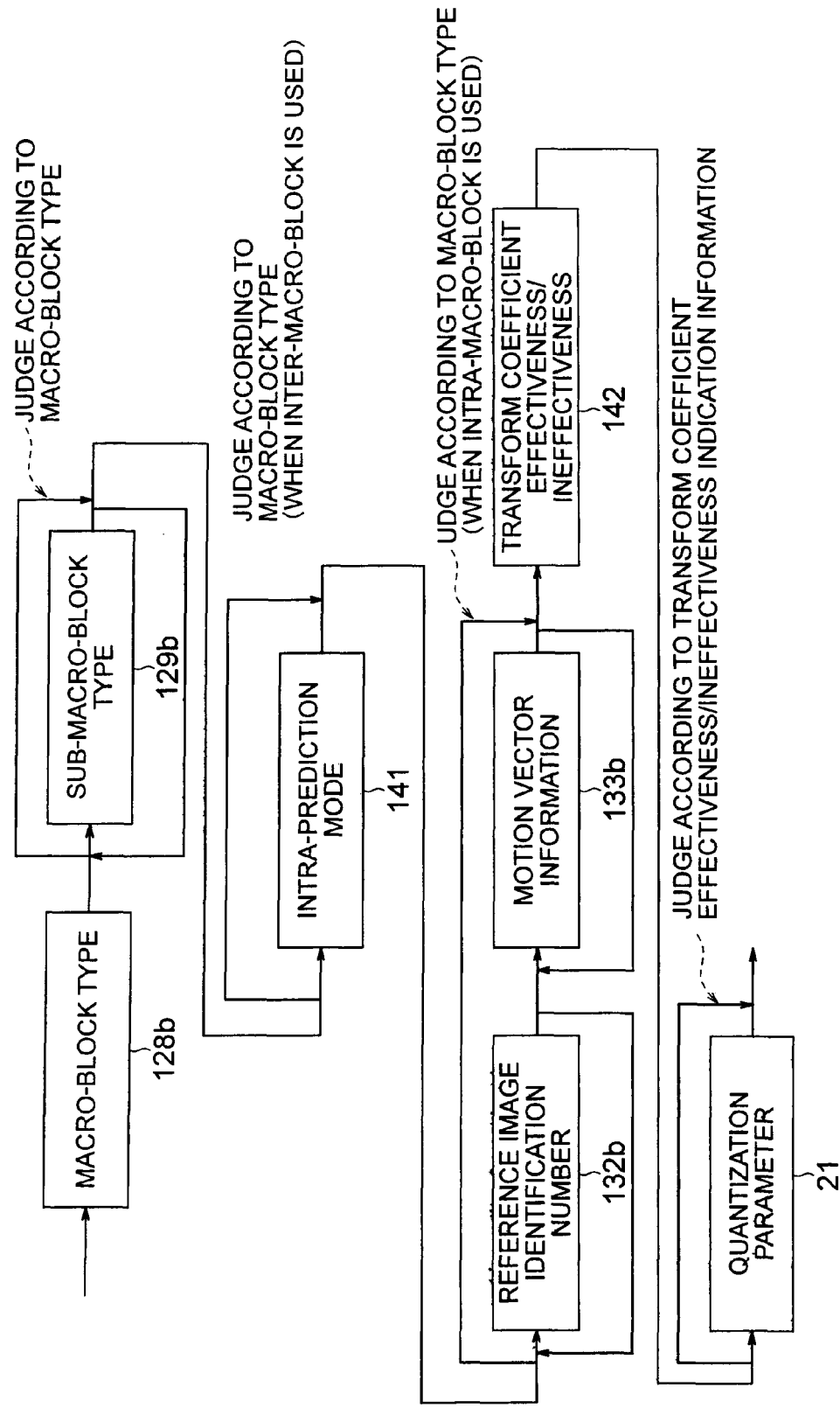
FIG. 50 is a diagram for explaining a detailed structure of encoded data of Cn component header information of FIG. 49 according to the eleventh embodiment.

A structure of macro-block encoded data outputted by the encoder in the eleventh embodiment and inputted to the decoder in the eleventh embodiment is shown in FIG. 49. A detailed structure of encoded data of Cn component header information in FIG. 49 is shown in FIG. 50. In the following description, in order to explain an effect of this bit stream structure, operations on the decoder that receives a bit stream and restores a video signal will be mainly explained. In the explanation of the operations of the decoder, FIG. 31 is referred to.

The inter-prediction mode common-use identification flag 123 in the seventh embodiment is represented as a macro-block header common-use identification flag 123c by expanding the definition thereof. The macro-block header common-use identification flag 123c is a flag that regards the C0 component header information 139a as basic macro-block header information and indicates whether only the C0 component header information 139a is multiplexed as header information used in common for both the C1 and C2 components or the C1 component header information 139b and the C2 component header information 139c are separately multiplexed as extended header information, respectively. The macro-block header common-use identification flag 123c is extracted from the video stream 22 and decoded by the variable-length decoding unit 25. When the flag indicates that only the C0 component header information 139a is multiplexed as header information used in common for both the C1 and the C2 components, decoding in which the C0 component header information 139a is used is applied to all the components C0, C1, and C2 in the macro-block. When the flag indicates that the C1 component header information 139b and the C2 component header information 139c are separately multiplexed as extended header information, decoding in which pieces of header information 139a to 139c peculiar to the respective components C0, C1, and C2 in the macro-block is applied to the component. This point will be explained later in more detail as processing in macro-block units.

1. When only the C0 Component Header Information is Multiplexed

When the macro-block header common-use identification flag 123c indicates that only the C0 component header information 139a is multiplexed as header information used in common for both the C1 and the C2 components, decoding of a macro-block is applied to all the components C0, C1, and C2 on the basis of various kinds of macro-block header information included in the C0 component header information 139a. In this case, the C0 component skip indication information 138a and the C0 component header information 139a are applied in common to both the C1 and the C2 components, the skip indication information (138b and 138c) and the header information (139b and 139c) for the C1 and the C2 components are not multiplexed in a bit stream.

First, the variable-length decoding unit 25 decodes and evaluates the C0 component skip indication information 138a. When the C0 component skip indication information 138a indicates "skip", the variable-length decoding unit 25 considers that the C0 component header information 139a is not encoded and transform coefficient effectiveness/ineffectiveness indication information 142 of the C0 component header information 139a is zero (there is no encoded transform coefficient). Consequently, the C0 to C2 component transform coefficient data (140a to 140c) is considered not encoded and quantized all transform coefficients 10 in the macro-blocks are set to zero to be outputted. Moreover, the variable-length decoding unit 25 sets the motion vectors 137 of all of the components C0, C1, and C2 or to an identical value in accordance with the definition of the skip macro-block and outputs the motion vector 137.

When the C0 component skip indication information 138$a$ indicates "not skip", the variable-length decoding unit 25 considers that the C0 component header information 139$a$ is present and performs decoding of the C0 component header information 139$a$. When the macro-block type 128$b$ in the C0 component header information 139$a$ indicates intra-encoding, the variable-length decoding unit 25 decodes an intra-prediction mode 141, the transform coefficient effectiveness/ineffectiveness indication information 142, and the quantization parameter (if the transform coefficient effectiveness/ineffectiveness indication information 142 is not 0). If the transform coefficient effectiveness/ineffectiveness indication information 142 is not zero, the variable-length decoding unit 25 decodes C0 to C2 component transform coefficient data (140$a$ to 140$c$) and outputs the C0 component transform coefficient data in a form of the quantized transform coefficient 10. When the transform coefficient effectiveness/ineffectiveness indication information 142 is zero, the variable-length decoding unit 25 considers that all C0 to C2 component transform coefficient data (140$a$ to 140$c$) are zero, and quantized all transform coefficients 10 in the macro-blocks are set to zero to be outputted. When a macro-block type 128$b$ indicates inter-encoding, the variable-length decoding unit 25 decodes a sub-macro-block type 129$b$ as required and further decodes a reference image identification number 132$b$, motion vector information 133$b$, transform coefficient effectiveness/ineffectiveness indication information 142, and a quantization parameter 21 (if the transform coefficient effectiveness/ineffectiveness indication information 142 is not 0). If the transform coefficient effectiveness/ineffectiveness indication information 142 is not zero, the variable-length decoding unit 25 decodes C0 to C2 component transform coefficient data (140$a$ to 140$c$) and outputs the C0 component transform coefficient data in a form of the quantized transform coefficient 10. When the transform coefficient effectiveness/ineffectiveness information 142 is zero, the variable-length decoding unit 25 considers that all C0 to C2 component transform coefficient data (140$a$ to 140$c$) are zero, and quantized all transform coefficients 10 in the macro-blocks are set to zero to be outputted. As in the seventh embodiment, decoding of the macro-block is performed in accordance with a predetermined processing procedure using an output from the variable-length decoding unit 25 according to the operations described above.

2. When Header Information on the Components C0, C1 and C2 are Multiplexed, Respectively When the macro-block header common-use identification flag 123$c$ indicates that the C1 component header information 139$b$ and the C2 component header information 139$c$ are multiplexed as extended header information separately from the C0 component header information 139$a$, decoding of a macro-block is applied to each of the components C0, C1, and C2 on the basis of various kinds of macro-block header information included in the C0 component header information (139$a$ to 139$c$), respectively. In this case, the skip indication information (138$b$ and 138$c$) and the header information (139$b$ and 139$c$) for the C1 and the C2 components are multiplexed in a bit stream.

First, the variable-length decoding unit 25 decodes and evaluates the C0 component skip indication information 138$a$. When the C0 component skip indication information 138$a$ indicates "skip", the variable-length decoding unit 25 considers that the C0 component header information 139$a$ is not encoded and transform coefficient effectiveness/ineffectiveness indication information 142 of the C0 component header information 139$a$ is zero (there is no encoded transform coefficient). Consequently, the C0 component transform coefficient data 140$a$ is considered not encoded and quantized all transform coefficients in the C0 components are set to zero (i.e., relation between the C0 component skip indication information 138$a$ and the transform coefficient effectiveness/ineffectiveness indication information 142 changes according to a value of the macro-block header common-use identification flag 123$c$). Moreover, the variable-length decoding unit 25 sets the motion vector 137 of the C0 component in accordance with the definition in the case of the C0 component skip and outputs the motion vector 137.

When the C0 component skip indication information 138$a$ indicates "not skip", the variable-length decoding unit 25 considers that the C0 component header information 139$a$ is present and performs decoding of the C0 component header information 139$a$. When the macro-block type 128$b$ in the C0 component header information 139$a$ indicates intra-encoding, the variable-length decoding unit 25 decodes an intra-prediction mode 141 (a mode of spatial prediction in which a near pixel of a prediction object pixel in a frame is used as a predicted value), the transform coefficient effectiveness/ineffectiveness indication information 142, and the quantization parameter 21 (if the transform coefficient effectiveness/ineffectiveness indication information 142 is not 0). If the transform coefficient effectiveness/ineffectiveness indication information 142 is not zero, the variable-length decoding unit 25 decodes C0 component transform coefficient data and outputs the C0 component transform coefficient data in a form of the quantized transform coefficient 10. When the transform coefficient effectiveness/ineffectiveness indication information is zero, the variable-length decoding unit 25 considers that all C0 component transform coefficient data are zero. When a macro-block type indicates inter-encoding, the variable-length decoding unit 25 decodes a sub-macro-block type as required and further decodes a reference image identification number, motion vector information, transform coefficient effectiveness/ineffectiveness indication information, and a quantization parameter (if the transform coefficient effectiveness/ineffectiveness indication information is not 0). If the transform coefficient effectiveness/ineffectiveness indication information is not zero, the variable-length decoding unit 25 decodes C0 component transform coefficient data and outputs the C0 component transform coefficient data in a form of the quantized transform coefficient 10. When the transform coefficient effectiveness/ineffectiveness information is zero, the variable-length decoding unit 25 considers that all C0 component transform coefficient data are zero. The variable-length decoding unit 25 performs the processing procedure for C1 and C2 in the same manner.

As in the seventh embodiment, decoding of the respective components C0, C1, and C2 in the macro-block is performed in accordance with a predetermined processing procedure using an output from the variable-length decoding unit 25 according to the operations described above.

Figure 51:
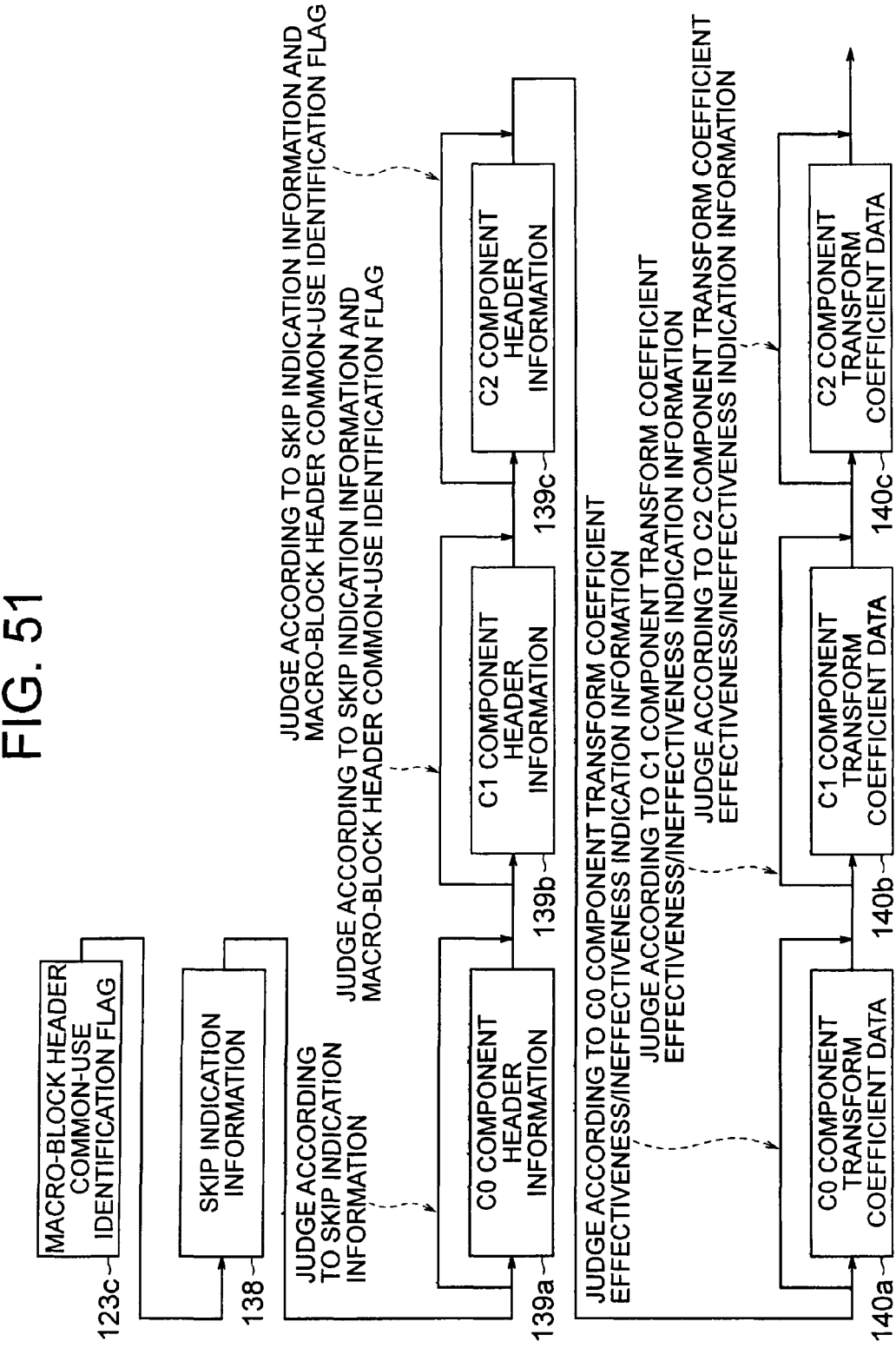
FIG. 51 is a diagram for explaining another structure of macro-block encoded data according to the eleventh embodiment.

The operations on the decoder side are mainly described above. By forming a bit stream in this way, the following effects are obtained. First, in the conventional AVC, there is only one set of usable header information (FIG. 50) per one macro-block. It is necessary to collectively perform intra/inter judgment for all the components C0 to C2 and perform encoding in accordance with this header information. When a signal component equivalent to a luminance signal, which transmits contents of an image signal, is equivalently included in three color components as in the 4:4:4 format, fluctuation in a signal characteristic due to a way of inclusion of noise or the like in input video signals to the respective components may occur. It is not always optimum to encode all the components C0 to C2 collectively. By setting the bit stream structures in FIGS. 49 and 50 in the eleventh embodiment as a condition, the encoder can select, by the macro-block header common-use identification flag 123c, an optimum encoding mode (a macro-block type including intra/inter encoding types), an optimum motion vector, and the like corresponding to a signal characteristic and perform encoding for each of the components C0 to C2 and can improve encoding efficiency. Conventionally, since encoding by a unit of a macro-block in which all the components C0 to C2 are collected is performed, a macro-block is judged as skip on condition that encoding information on all the components is not present. However, in the eleventh embodiment, since it is possible to judge presence or absence of encoding information for each of the components according to the skip indication information 138, when only a certain component is skip but other components are not skip, it is unnecessary to judge that all the components are not skip. It is possible to more efficiently perform allocation of a code amount. In the encoder, a value of the skip indication information 138 is determined by the variable-length encoding unit 11 on the basis of the quantized transform coefficient data 10, the motion vector 137, the reference image identification number 132b, and the macro-block type/sub-macro-block type 106 in accordance with the definition of a skip macro-block uniformly defined in both the encoder and the decoder described in A structure of a bit stream treated by the encoder and the decoder according to the eleventh embodiment may be as shown in FIG. 51. In this example, the skip indication information (138), the header information (139a to 139c), and the transform coefficient data (140a to 140c) of the respective components C0, C1, and C2 are collectively arranged, respectively. In this case, in the skip indication information, the respective states of C0, C1, and C2 may be arranged in 1-bit code symbols or eight states may be collectively arranged in one code symbol. When a correlation with a skip state is high among the color components, it is possible to improve encoding efficiency of the skip indication information 138 itself by collecting code symbols to appropriately define context models of arithmetic encoding (described later in a twelfth embodiment).

The macro-block header common-use identification flag 123c may be multiplexed on a bit stream by a unit of an arbitrary data layer such as a macro-block, a slice, a picture, and a sequence. When there is steadily a difference in a characteristic of a signal among the color components in an input signal, if the macro-block header common-use identification flag 123c is multiplexed by a unit of a sequence, it is possible to perform efficient encoding with less overhead information. If the macro-block header common-use identification flag 123c is multiplexed by a unit of a picture, it is possible to expect an effect of, for example, improving a balance of encoding efficiency and arithmetic operation loads by using a header in an I picture having few variations of a macro-block type in common and using a separate header for each of the color components in P and B pictures with many variations of a macro-block type. Moreover, it can be said that change in a picture layer is also desirable in terms of encoding control for a video signal, a characteristic of which changes for each picture, such as scene change. When the macro-block header common-use identification flag 123c is multiplexed by a unit of a macro-block, a code amount per one macro-block increases. On the other hand, it is possible to control whether header information is used in common on the basis of signal states of the respective color components by a unit of a macro-block. It is possible to constitute an encoder that improves compression efficiency more satisfactorily following local signal fluctuation of an image.

Figure 52:
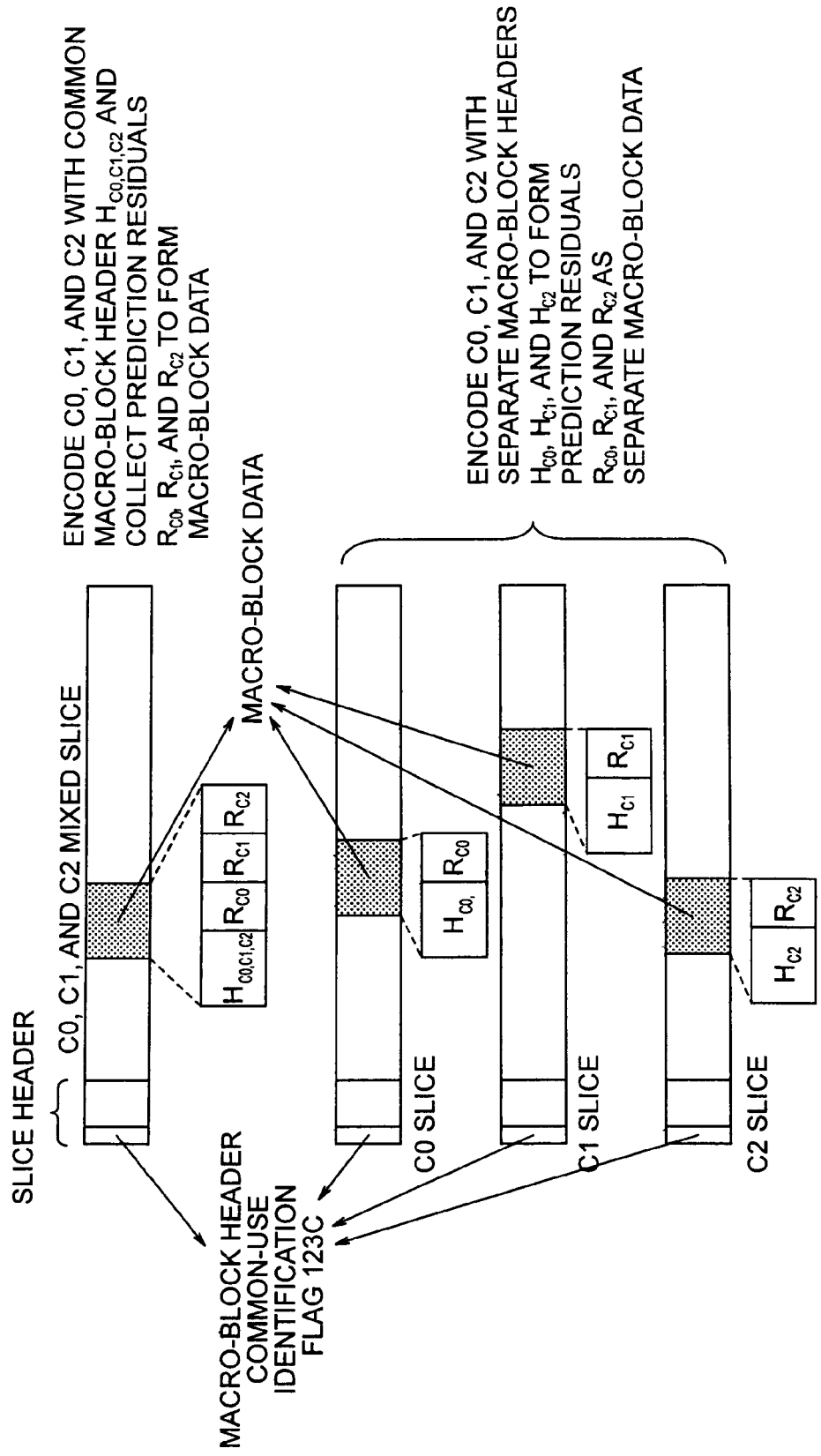
FIG. 52 is a diagram for explaining a structure of a bit stream according to the eleventh embodiment.
Figure 53:
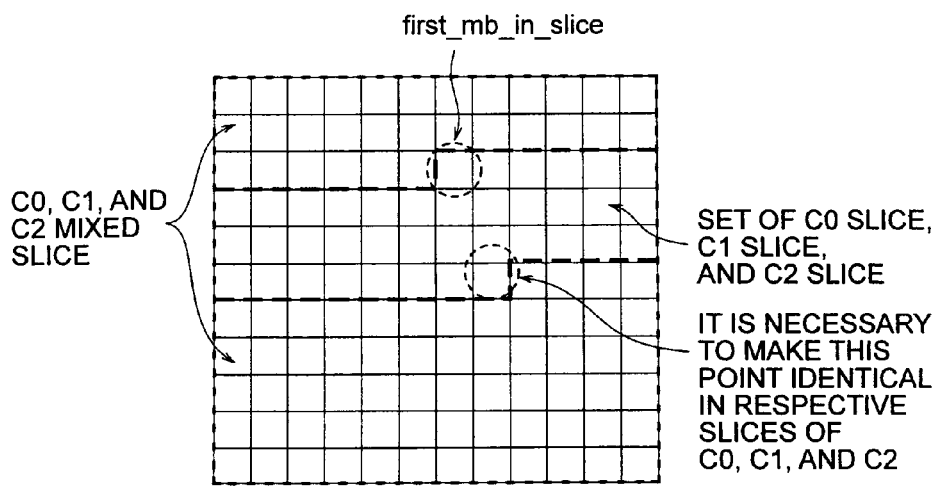
FIG. 53 is a diagram for explaining a structure of a slice according to the eleventh embodiment.

The following method is conceivable. When an encoding type equivalent to a picture type is changed at a slice level as in the AVC, the macro-block header common-use identification flag 123c is multiplexed for each slice. When the flag indicates "common to C0, C1, and C2", a bit stream is formed such that the slice includes all pieces of encoding information on the three color components. When the flag indicates "not common to C0, C1, and C2", a bit stream is formed such that one slice includes information on one color component. A state of this method is shown in FIG. 52. In FIG. 52, meaning as slice configuration identification information indicating whether "a current slice includes all pieces of encoding information on the three color components" or "a current slice includes encoding information on a specific color component" is given to the macro-block header common-use identification flag 123c. It goes without saying that such slice configuration identification information may be prepared separately from the macro-block header common-use identification flag 123c. When a slice is identified as "a current slice includes encoding information on a specific color component", the identification includes identification indicating "which of C0, C1, and C2 the color component is". When it is decided whether one macro-block header is used in common for the C0, the C1, and the C2 components (a C0, C1, and C2 mixed slice) or a macro-block header is separately multiplexed for each of the C0, the C1, and the C2 components (a C0 slice, a C1 slice, and a C2 slice) in slice units in this way, if these two kinds of slices are mixed in one picture, the C0 slice, the C1 slice, and the C2 slice are restricted to be always multiplexed on a bit stream in a set as data obtained by encoding macro-blocks in an identical position in a screen. In other words, a value of first_mb_in_slice included in a slice header and indicating a position in a picture of a leading macro-block of a slice always takes an identical value in one set of C0 slice, C1 slice, and C2 slice. The numbers of macro-blocks included in the set of C0 slice, C1 slice, and C2 slice are the same. This state is shown in FIG. 53. By providing such a restriction for a structure of a bit stream, the encoder can encode the bit stream by adaptively selecting an encoding method having higher encoding efficiency among the C0, C1, and C2 mixed slice and the set of C0 slice, C1 slice, and C2 slice according to a characteristic of a local signal in a picture. The decoder can receive the bit stream efficiently encoded in that way and reproduce a video signal. For example, if the bit stream 22 inputted to the decoder in FIG. 31 has such a configuration, the variable-length decoding unit 25 decodes slice configuration identification information from the bit stream every time slice data is inputted and sets which one of slices in FIG. 52 a slice to be decoded is. When it is judged from the slice configuration identification information that encoded data is formed as the set of C0 slice, C1 slice, and C2 slice, the variable-length decoding unit 25 only has to perform a decoding operation setting that a state of the inter-prediction mode common-use identification flag 123 (or the macro-block header common-use identification flag 123c) is "use separate inter-prediction modes or (macro-block header) in C0, C1, and C2". Since it is guaranteed that a value of first_mb_in_slice of each slice and the number of macro-blocks in the slice is equal, it is possible to perform decoding processing without causing overlap and gap on the C0, C1, and C2 mixed slice and a picture on the basis of the value.

When characteristics of signals of the respective slices of C0, C1, and C2 are substantially different, in order to prevent encoding efficiency from being deteriorated by providing such a restriction, identification information for making it possible to select at a picture level or a sequence level whether mixing of a slice having a different value of slice configuration identification information in a picture is allowed may be given.

Twelfth Embodiment

In the twelfth embodiment, examples of another encoder and another decoder derived from the encoder and the decoder described in the eleventh embodiment will be described. The encoder and the decoder in the twelfth embodiment are characterized by adaptively setting, in performing encoding of respective components of C0, C1, and C2 in a macro-block using an adaptive arithmetic encoding system, whether a symbol occurrence probability used for arithmetic encoding and a learning process of the symbol occurrence probability are shared by all the components or separated for each of the components according to indication information multiplexed in a bit stream.

In the twelfth embodiment, in the encoder, only processing in the variable-length encoding unit 11 in FIG. 30 is different from that in the eleventh embodiment. In the decoder, only processing in the variable-length decoding unit 25 in FIG. 31 is different from that in the eleventh embodiment. The other operations are the same as those in the eleventh embodiment. In the following description, arithmetic encoding and decoding processing, which are points of the twelfth embodiment, will be explained in detail.

1. Encoding Processing

Figure 54:
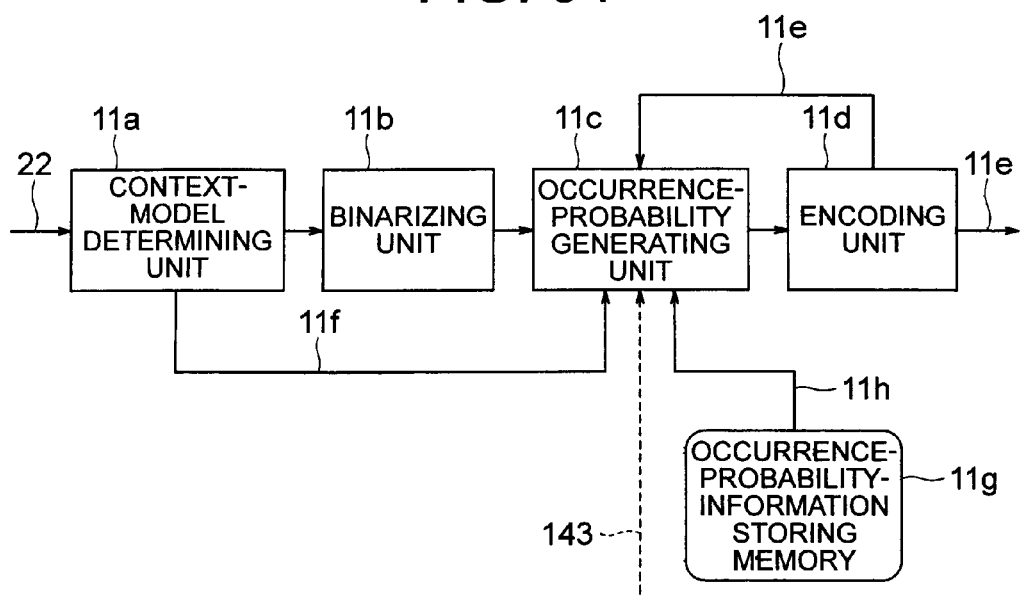
FIG. 54 is a diagram for explaining an internal structure related to arithmetic encoding processing of a variable length encoding unit 11 according to a twelfth embodiment.

An internal structure related to arithmetic encoding processing in the variable-length encoding unit 11 is shown in FIG. 54. An operation flow of the arithmetic encoding processing is shown in FIGS. 55 and 56.

The variable-length encoding unit 11 in the twelfth embodiment includes a context-model determining unit 11a that sets context models (described later) defined for respective data types such as the motion vector 137 serving as encoding object data, the reference image identification number 132b, the macro-block type/sub-macro-block type 106, the intra-prediction mode 141, and the quantized transform coefficient 10, a binarizing unit 11b that transforms multi-value data into binary data in accordance with binarization rules set for the respective encoding object data types, an occurrence-probability generating unit 11c that gives occurrence probabilities of values (0 or 1) of respective bins after binarization, an encoding unit 11d that executes arithmetic encoding on the basis of occurrence probabilities generated, and a memory 11g that stores occurrence probability information. Inputs to the context-mode determining unit 11a are various data inputted to the variable-length encoding unit 11 as encoding object data such as the motion vector 137, the reference image identification number 132b, the macro-block type/sub-macro-block type 106, the intra-prediction mode 141, and the quantized transform coefficient 10. Outputs from the encoding unit 11d are equivalent to information related to a macro-block of the video stream 22.

Figure 55:
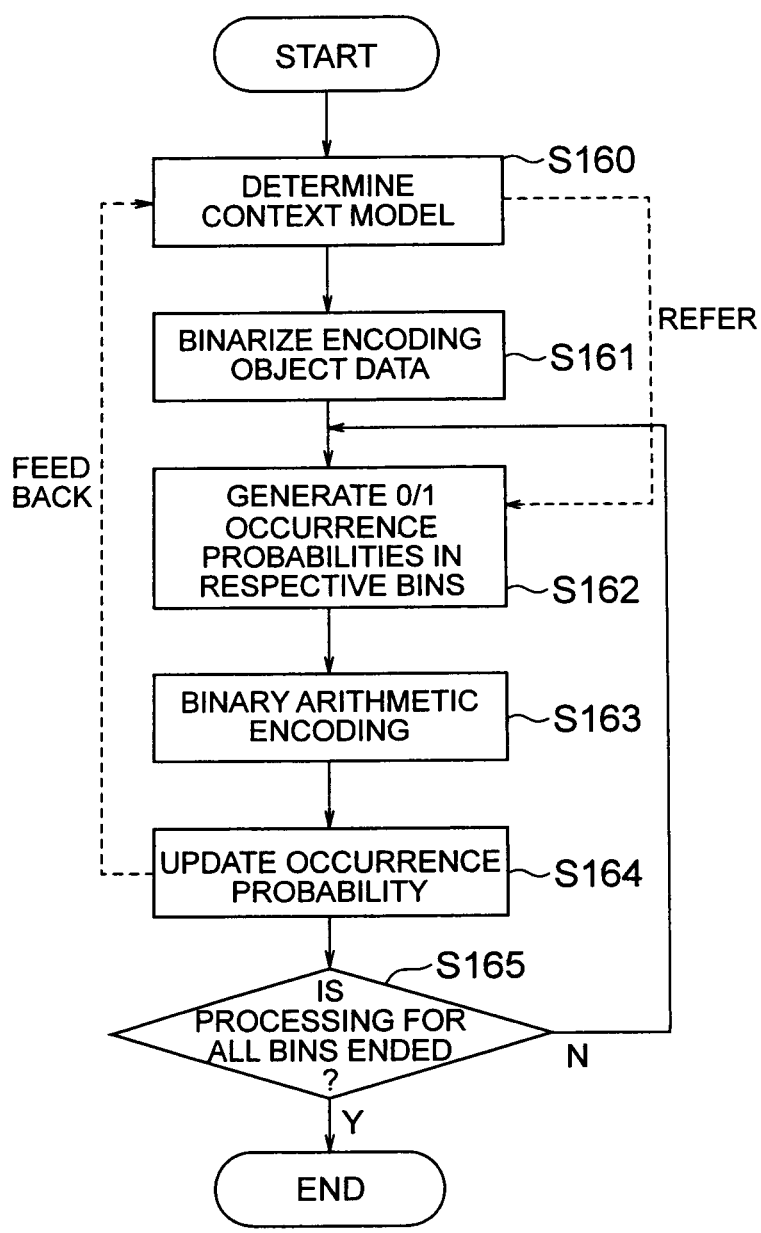
FIG. 55 is a flowchart showing a flow of the arithmetic encoding processing of the variable length encoding unit 11 according to the twelfth embodiment.
Figure 56:
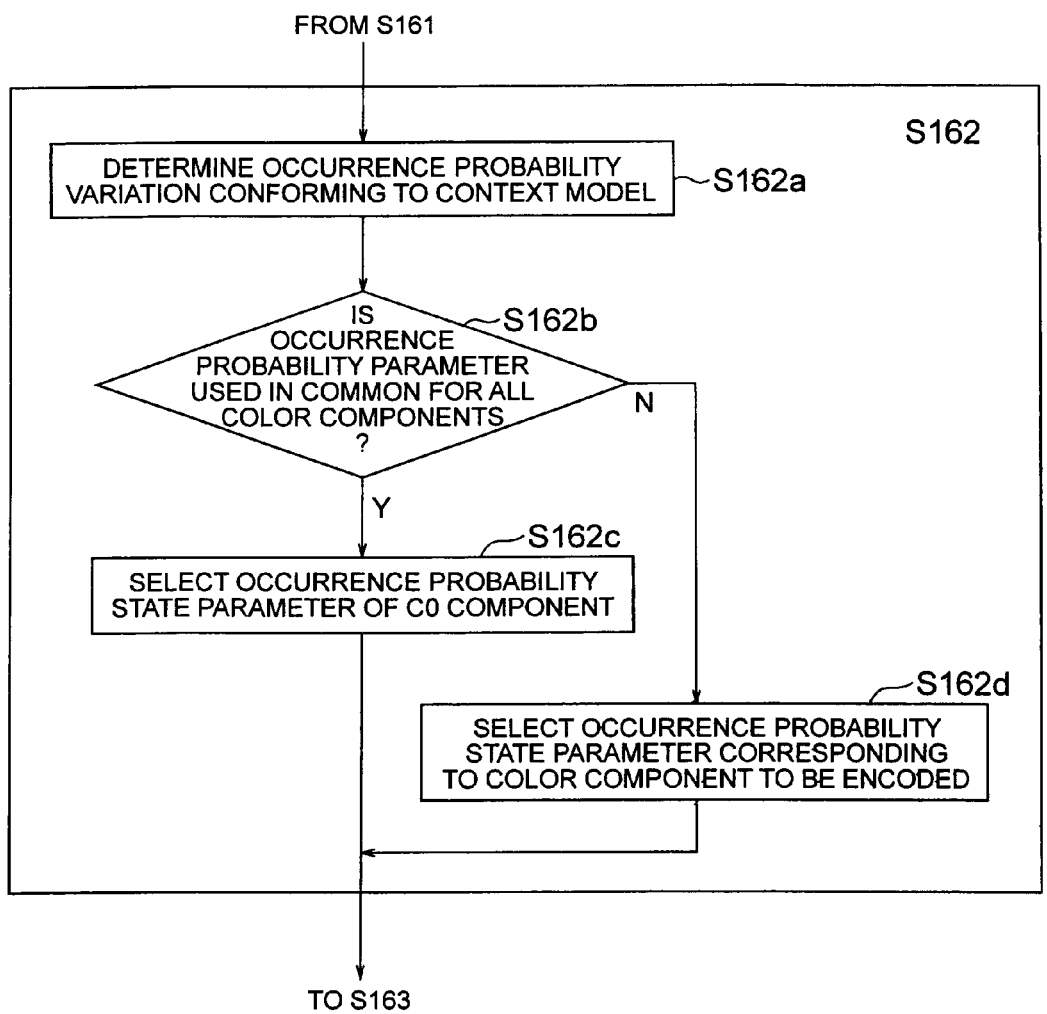
FIG. 56 is a diagram for explaining a detailed flow of processing in Step S162 of FIG. 55 according to the twelfth embodiment.

(1) Context Model Determination Processing (Step S160 in FIG. 55)

Figure 57:
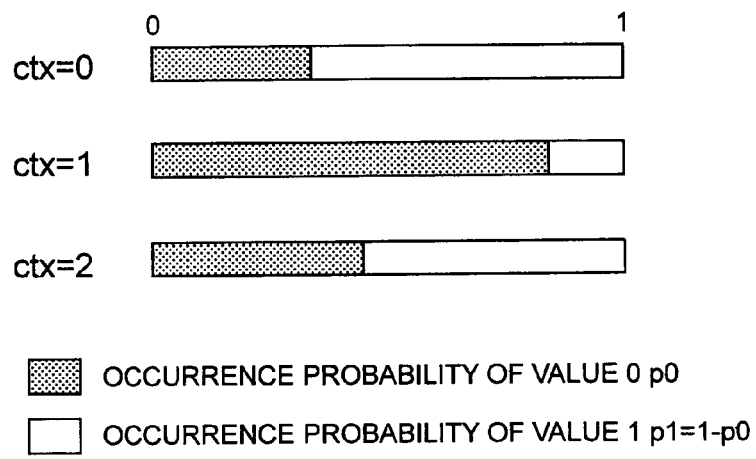
FIG. 57 is a diagram for explaining a concept of a context model (ctx)
Figure 58:
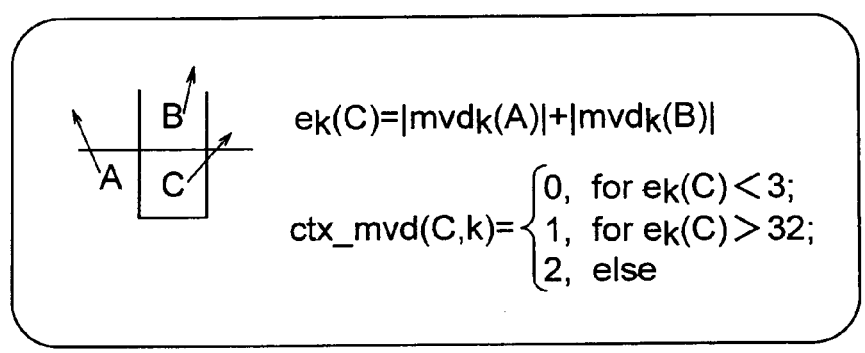
FIG. 58 is a diagram for explaining an example of a context model concerning a motion vector of a macro-block.

A context model is a model of a dependency relation of an occurrence probability of an information source symbol with other information that causes fluctuation in the occurrence probability. It is possible to perform encoding of more adapted to an actual occurrence probability of a symbol by changing a state of an occurrence probability in accordance with this dependency relation. A concept of a context model (ctx) is shown in FIG. 57. Although the information source symbol is binary in FIG. 57, the information source symbol may be multi-valued. Options 0 to 2 of ctx in FIG. 57 are defined assuming that a state of an occurrence probability of an information source symbol that uses this ctx changes according to a situation. In the video encoding in the twelfth embodiment, a value of ctx is changed according to a dependency relation between encode data in a certain macro-block and encoded data of macro-blocks around the macro-block. For example, an example of a context model concerning a motion vector of a macro-block disclosed in D. Marpe et al. "Video Compression Using Context-Based Adaptive Arithmetic Coding", International Conference on Image Processing 2001 is shown in FIG. 58. In FIG. 58, a motion vector of a block C is an encoding object (precisely, a predicted difference value $mvd_k(C)$ obtained by predicting the motion vector of the block C from the neighborhood thereof is encoded) and ctx_mvd(C,k) indicates a context model. $mvd_k(A)$ indicates a motion vector predicted difference value in a block A and $mvd_k(B)$ indicates a motion vector predicted difference value in the block B. The values $mvd_k(A)$ and $mvd_k(B)$ are used for definition of an evaluation value $e_k(C)$ of change of a context model. The evaluation value $e_k(C)$ indicates a degree of fluctuation in a motion vector in the neighborhood. In general, when this fluctuation tends to be small, $mvd_k(C)$ is small. Conversely, when $e_k(C)$ is large, $mvd_k(C)$ also tends to be large. Therefore, it is desirable that a symbol occurrence probability of $mvd_k(C)$ is adapted on the basis of $e_k(C)$. A variation set of this occurrence probability is a context model. In this case, it can be said that there are three kinds of occurrence probability variations.

Besides, context models are defined in advance for encoding object data such as the macro-block type/sub-macro-block type 106, the intra-prediction mode 141, and the quantized transform coefficient 10, respectively, and shared by the encoder and the decoder. The context-model determining unit 11a performs processing for selecting a model set in advance on the basis of a type of such encoding object data (decision concerning which occurrence probability variation among the context models corresponds to occurrence probability generation processing in (3) below).

(2) Binarization Processing (Step S161 in FIG. 55)

Encoding object data is changed to a binary sequence by the binarizing unit 11b. Context models are set according to respective bins (binary positions) of the binary sequence. As a rule of binarization, the encoding object data is converted into a variable-length binary sequence in accordance with a rough distribution of values that respective binarized data can take. Binarization has advantages that, for example, it is possible to reduce the number of divisions of probability number line by encoding the encoding object data, which can originally take multi-values, in bin units rather than directly arithmetic-encoding the encoding object data and simplify an arithmetic operation and it is possible to slim down context models.

(3) Occurrence Probability Generation Processing (Step S162 in FIG. 55 (details of Step S162 are shown in FIG. 56))

In the processes in (1) and (2) above, binarization of the multi-value encoding object data and setting of the context models applied to the respective bins are completed and preparation for encoding is finished. Subsequently, the occurrence-probability generating unit 11c performs generation processing for an occurrence probability state used for arithmetic encoding. Since variations of an occurrence probability for respective values of 0/1 are included in the respective context models, as shown in FIG. 54, the occurrence-probability generating unit 11c performs processing with reference to a context model 11*f* determined in Step S160. The occurrence-probability generating unit 11*c* sets an evaluation value for occurrence probability selection indicated by $e_k(C)$ in FIG. 58 and determines, in accordance with the evaluation value, which occurrence probability variation is used for the present encoding out of options of the context models referred to (Step S162*a* in FIG. 56). The variable-length encoding unit 11 in the twelfth embodiment includes an occurrence probability information storing memory 11*g* and includes a mechanism for storing an occurrence probability state 11*h*, which is sequentially updated in the process of encoding, for each of the color components. The occurrence-probability generating unit 11*c* selects, according to a value of an occurrence probability state parameter common-use identification flag 143, whether the occurrence probability state 11*h* used for the present encoding is selected out of occurrence probability states held for each of the color components C0 to C2 or an occurrence probability state for the C0 component is shared by C1 and C2 and determines the occurrence probability state 11*h* actually used for encoding (Steps S162*b* to S162*d* in FIG. 56).

It is necessary to multiplex the occurrence probability state parameter common-use identification flag 143 on a bit stream in order to make it possible to perform the same selection in the decoder. With such a constitution, the following effects are realized. For example, taking the case of FIG. 58, when the macro-block header common-use identification flag 123*c* indicates that the C0 component header information 139*a* is used for the other components, if the macro-block type 128*b* indicates the 16×16 prediction mode, only one $e_k(C)$ in FIG. 58 is set for one macro-block. In this case, the occurrence probability state prepared for the C0 component is always used. On the other hand, when the macro-block header common-use identification flag 123*c* indicates that header information (139*a* to 139*c*) corresponding to the respective components are used, if the macro-block type 128*b* indicates the 16×16 prediction mode in all of C0, C1, and C2, there can be three variations of $e_k(C)$ in FIG. 58 for one macro-block. The encoding unit 11*d* in the later stage can take two options, that is, whether the occurrence probability state 11*b* prepared for the C0 components is used in common and updated for the respective variations or whether the occurrence probability states 11*h* prepared for the respective color components are separately used and updated. In the former option, when the respective components C0, C1, and C2 have substantially the same motion vector distributions, the number of times of learning is increased by using and updating the occurrence probability state 11*h* in common. Thus, it is possible to more satisfactorily learn an occurrence probability of a motion vector. In the latter option, conversely, when the respective components C0, C1, and C2 have different motion vector distributions, it is possible to reduce mismatches due to learning by separately using and updating the occurrence probability states 11*h*. Thus, it is possible to more satisfactorily learn an occurrence probability of a motion vector. Since a video signal is unstationary, when such adaptive control is possible, it is possible to improve efficiency of arithmetic encoding.

(4) Encoding Processing

Since occurrence probabilities of the respective values of 0/1 on a probability number line necessary for the arithmetic encoding process are obtained according to (3), the encoding unit 11*d* performs arithmetic encoding in accordance with the process described in the conventional example (Step S163 in FIG. 55). An actual encoded value (0 or 1) 11*e* is fed back to the occurrence-probability generating unit 11*c*. The occurrence-probability generating unit 11*c* counts 0/1 occurrence frequencies for update of the occurrence probability state 11*h* used (Step S164). For example, it is assumed that, at a point when encoding processing for 100 bins is performed using a specific occurrence probability state 11*h*, occurrence probabilities of 0/1 in the occurrence probability variation are 0.25 and 0.75. When 1 is encoded using the same occurrence probability variation, an appearance frequency of 1 is updated and the occurrence probabilities of 0/1 change to 0.247 and 0.752. This mechanism makes it possible to perform efficient encoding adapted to actual occurrence probabilities. The encoded value 11*e* changes to an output from the variable-length encoding unit 11 and is outputted from the encoder as the video stream 22.

Figure 59:
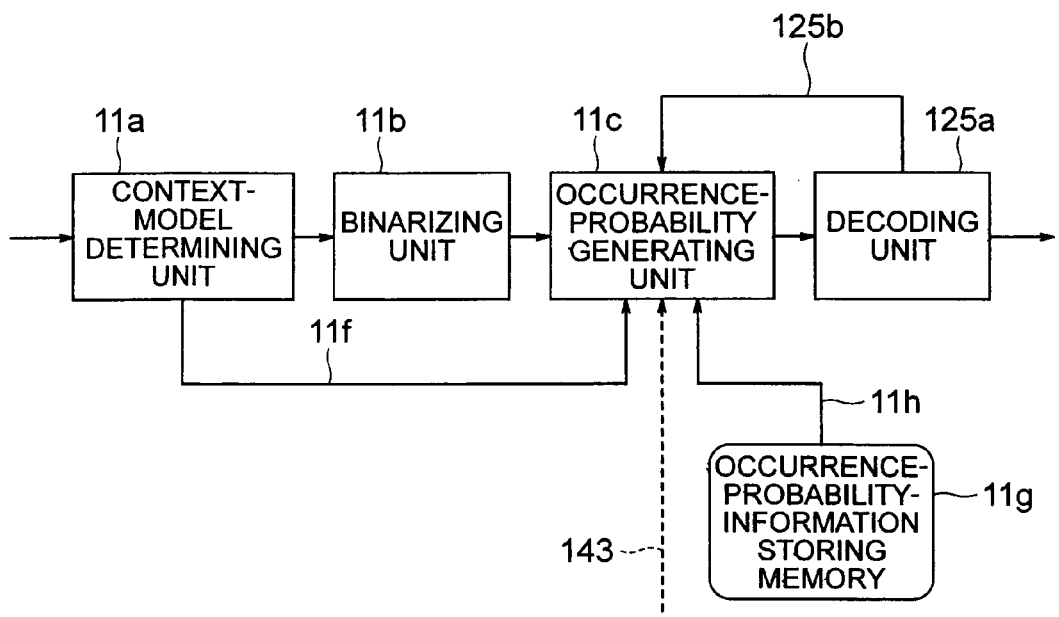
FIG. 59 is a diagram for explaining an internal structure related to arithmetic decoding processing of a variable length decoding unit 25 according to the twelfth embodiment.
Figure 60:
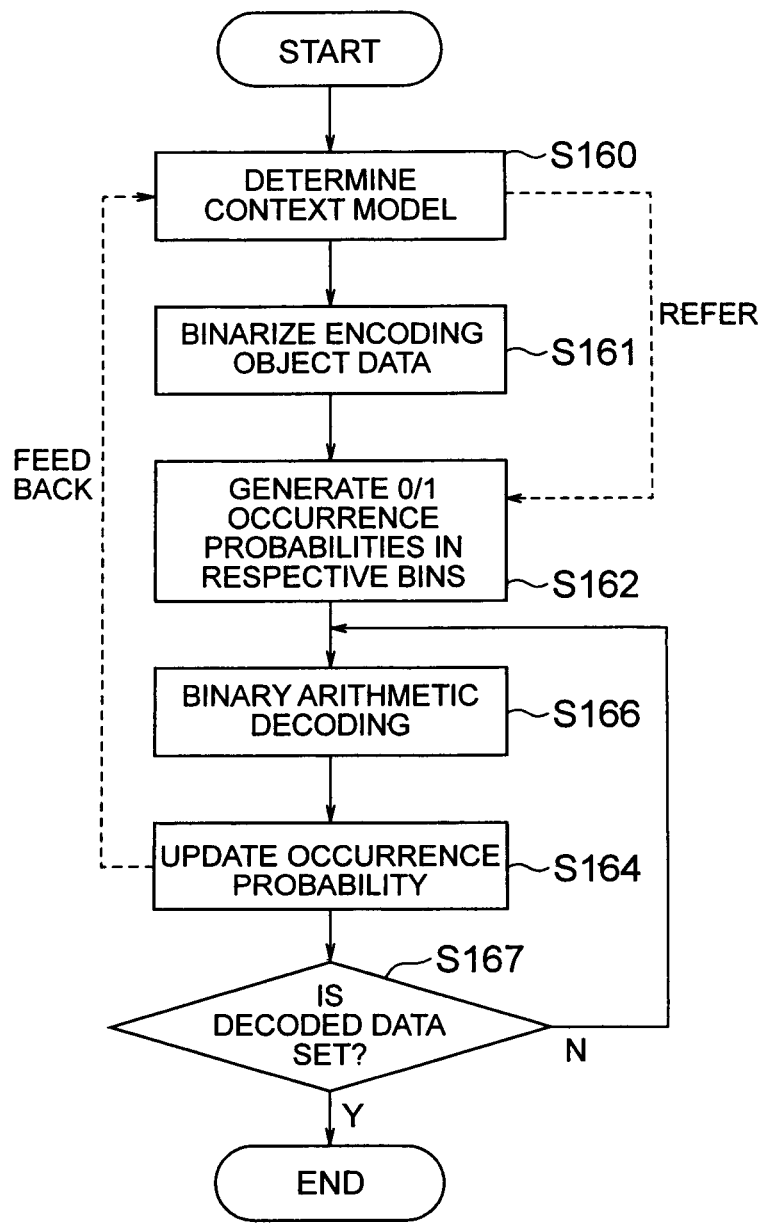
FIG. 60 is a flowchart showing a flow of the arithmetic decoding processing of the variable length decoding unit 25 according to the twelfth embodiment.

An internal structure related to arithmetic decoding processing in the variable-length decoding unit 25 is shown in FIG. 59. An operation flow of the arithmetic decoding processing is shown in FIG. 60.

The variable-length decoding unit 25 in the twelfth embodiment includes the context-model determining unit 11*a* that specifies types of respective decoding object data such as the motion vector 137, the reference image identification number 132*b*, the macro-block type/sub-macro-block type 106, the intra-prediction mode 141, and the quantized transform coefficient 10 and sets context models defined in common to the encoder for the respective types, the binarizing unit 11*b* that generates binarization rules set based on the types of the decoding object data, the occurrence-probability generating unit 11*c* that gives occurrence probabilities of the respective bins (0 or 1) in accordance with the binarization rules and the context models, a decoding unit 25*a* that executes arithmetic decoding on the basis of an occurrence probability generated and decodes data such as the motion vector 137, the reference image identification number 132*b*, the macro-block type/sub-macro-block type 106, the intra-prediction mode 141, and the quantized transform coefficient 10 according to a binary sequence obtained as a result of the arithmetic decoding and the binarization rules, and the memory 11*g* that stores occurrence probability information. The components 11*a* to 11*c* and 11*g* are identical with the internal components of the variable-length encoding unit 11 in FIG. 54.

(5) Context Model Determination Processing, Binarization Processing, and Occurrence Probability Generation Processing These processes correspond to the processes (1) to (3) on the encoder side. Although not shown in the figures, the occurrence probability state parameter common-use identification flag 143 is extracted from the video stream 22 in advance.

(6) Arithmetic Decoding Processing

Since an occurrence probability of a bin intended to be decoded is set in the processes up to (6), the decoding unit 25*a* decodes a value of the bin in accordance with a predetermined arithmetic decoding processing (Step S166 in FIG. 60). A restored value 25*b* of the bin is fed back to the occurrence-probability generating unit 11*c*. The occurrence-probability generating unit 11*c* counts 0/1 occurrence frequencies for update of the occurrence probability state 11*h* used (Step S164).

The decoding unit 25*a* checks, every time a restored value of each bin is set, matching of the restored value and binary sequence patterns set by the binarization rules and outputs a data value indicated by a matching pattern as decoding data value (Step S167). As long as decoding data is not set, the decoding unit 25*a* returns to Step S166 and continues the decoding processing.

According to the encoder and the decoder including the arithmetic encoding processing and the arithmetic decoding processing according to the constitutions described above, it is possible to perform more efficient encoding when encoded information for each of the color components is adaptively subjected to arithmetic encoding according to the macro-block header common-use identification flag 123c.

Although not specifically shown in the figures, a unit for multiplexing the occurrence probability state parameter common-use identification flag 143 may be any one of a macro-block unit, a slice unit, a picture unit, and a sequence unit. When it is possible to secure sufficient encoding efficiency with the change in an upper layer equal to or higher than a slice by multiplexing the occurrence probability state parameter common-use identification flag 143 as a flag located in an upper data layer such as a slice, a picture, or a sequence, it is possible to reduce overhead bits without multiplexing the occurrence probability state parameter common-use identification flag 143 at a macro-block level every time the processing is performed.

The occurrence probability state parameter common-use identification flag 143 may be information set in the inside of the decoder on the basis of related information included in a bit stream separate from the occurrence probability state parameter common-use identification flag 143.

Figure 61:
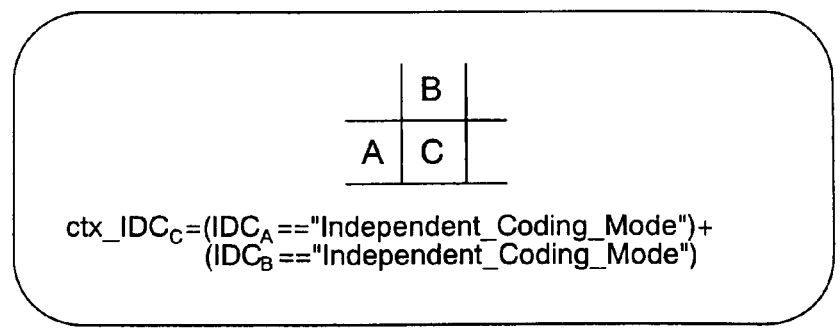
FIG. 61 is a diagram for explaining a context model 11f according to the twelfth embodiment.

In the twelfth embodiment, arithmetic-encoding the macro-block header common-use identification flag 123c in macro-block units, a model shown in FIG. 61 is used for the context model 11f. In FIG. 61, a value of the macro-block header common-use identification flag 123c in the macro-block X is $IDC_X$. When encoding of the macro-block header common-use identification flag 123c in the macro-block C is performed, the macro-blocks take the following three states on the basis of a value $IDC_A$ of the macro-block header common-use identification flag 123c of the macro-block A and a value $IDC_B$ of the macro-block header common-use identification flag 123c of the macro-block B according to an equation in the figure.

Value 0: Both A and B are in a mode for "using a common macro-block header for C0, C1, and C2"

Value 1: One of A and B is in the mode for "using a common macro-block header for C0, C1, and C2" and the other is in a mode for "using separate macro-block headers for C0, C1, and C2"

Value 2: Both A and B are in the mode for "using separate macro-block headers for C0, C1, and C2"

By encoding the macro-block header common-use identification flag 123c in this way, it is possible to perform arithmetic encoding according to an encoding state of macro-blocks in the neighborhood and improve encoding efficiency. It is obvious from the explanation of operations of the decoder in the twelfth embodiment that context models are defined in the same procedure on both the encoding side and the decoding side to perform arithmetic decoding.

Figure 62:
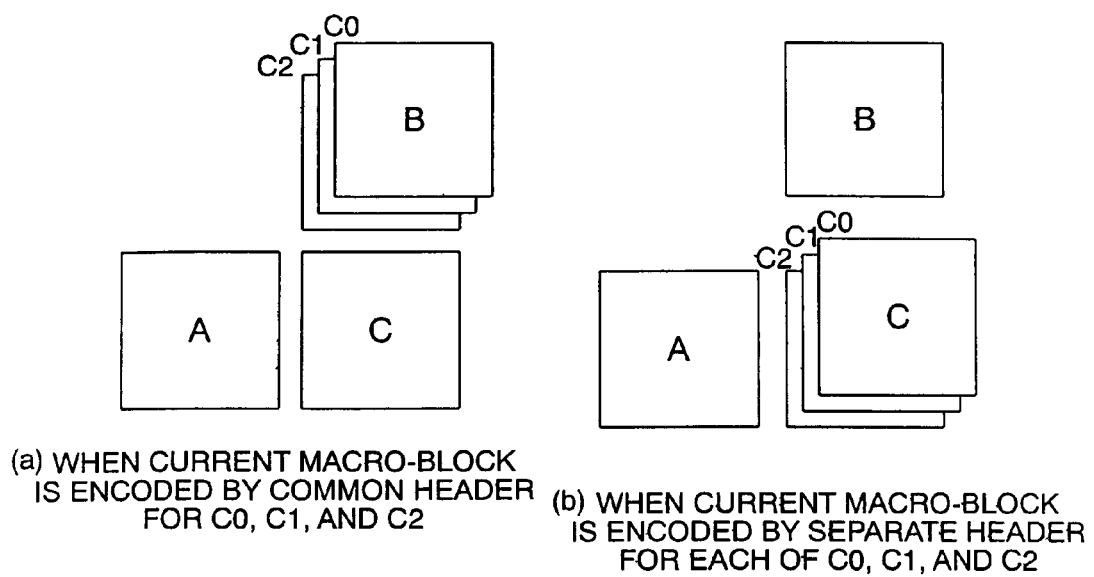
FIG. 62 is a diagram for explaining a difference in a mode of a current macro-block according to the twelfth embodiment.

In the twelfth embodiment, concerning the header information in FIG. 50 included in the macro-block header (the macro-block type, the sub-macro-block type, the intra-prediction mode, the reference image identification number, the motion vector, the transform coefficient effectiveness/ineffectiveness indication information, and the quantization parameter), arithmetic encoding is performed in context models defined for the respective information types. As shown in FIG. 62, all the context models are defined for the current macro-block C with reference to corresponding information on the macro-blocks A and B. Here, as shown in FIG. 62(*a*), when the macro-block C is in the mode for "using a common macro-block header for C0, C1, and C2" and the macro-block B is in the mode for "using separate macro-block headers for C0, C1, and C2", information on a specific color component among C0, C1, and C2 is used as reference information in defining context models.

For example, it is conceivable to adopt a method of selecting, when C0, C1, and C2 correspond to R, G, and B color components, the G component having a component closest to a luminance signal conventionally used for encoding as a signal representing a structure of an image well. This is because, even in the mode for "using a common macro-block header for C0, C1, and C2", information on a macro-block header is often set on the basis of the G component to perform encoding.

On the other hand, in the opposite case, as shown in FIG. 62(*b*), when the macro-block C is in the mode for "using separate macro-block headers for C0, C1, and C2" and the macro-block B is in the mode for "using a common macro-block header for C0, C1, and C2", it is necessary to encode and decode header information on the three color components in the macro-block C. In that case, header information on the respective color components is used as reference information in defining context models. Concerning the macro-block B, header information common to the three components is used as a value that is the same for the three components. Although it is obvious, when the macro-block header common-use identification flag 123c indicates the same value for all the macro-blocks A, B, and C, pieces of reference information corresponding to the macro-blocks are always present. Thus, the pieces of reference information are used.

It is obvious from the explanation of operations of the decoder in the twelfth embodiment that context models are defined in the same procedure on both the encoding side and the decoding side to perform arithmetic decoding. After determining to which component information a context model to be used refers to, update of an occurrence probability state associated with the context model is executed on the basis of a state of the occurrence probability state parameter common-use identification flag 143.

In the twelfth embodiment, arithmetic encoding corresponding to occurrence probability distributions of respective encoding object data is also performed for respective transform coefficient data of the C0, the C1, and the C2 components. As these data, encoded data for the three components are always included in a bit stream regardless of whether a macro-block header is used in common. In the twelfth embodiment, since intra-prediction and inter-prediction are performed on color spaces of an encoded input signal and a prediction difference signal is obtained, it is considered that a distribution of transform coefficient data obtained by integer-transforming the prediction difference signal is the same occurrence probability distribution regardless of a peripheral state such as whether a macro-block header in FIG. 62 is used in common. Thus, in the twelfth embodiment, a common context model is defined and used for encoding and decoding regardless of whether a macro-block header is used in common for the respective components C0, C1, and C2.

It is obvious from the explanation of operations of the decoder in the twelfth embodiment that context models are defined in the same procedure on both the encoding side and the decoding side to perform arithmetic decoding. After determining to which component information a context model to be used refers to, update of an occurrence probability state associated with the context model is executed on the basis of a state of the occurrence probability state parameter common-use identification flag 143.

Thirteenth Embodiment

In the thirteenth embodiment, embodiments of another encoder and another decoder derived from the encoder and the decoder described in the seventh to the twelfth embodiments will be described. The encoder and the decoder in the thirteenth embodiment are characterized by an encoder that performs color space transform processing at an input stage of the encoder described in the seventh to the twelfth embodiments, transforms color spaces of a video signal inputted to the encoder after imaging into arbitrary color spaces suitable for encoding, and multiplexes, on a bit stream, information designating inverse transform processing for returning the color spaces to color spaces at the time of imaging on the decoding side and by a constitution for extracting the information designating the inverse transform processing from the bit stream, obtains decoded image with the decoder described in the seventh to the twelfth embodiments, and then, performs inverse space transform on the basis of the information designating the inverse transform processing.

Figure 63:
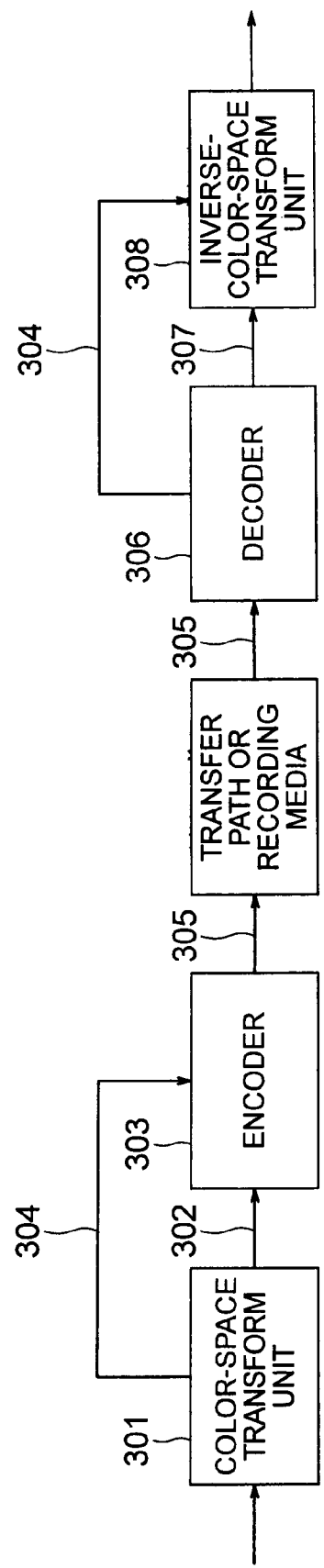
FIG. 63 is a diagram for explaining structures of an encoder and a decoder according to a thirteenth embodiment.

Structures of the encoder and the decoder in the thirteenth embodiment are shown in FIG. 63. The encoder and the decoder in the thirteenth embodiment will be explained with reference to FIG. 63.

The encoder in the thirteenth embodiment includes, in addition to an encoder 303 in the seventh to the twelfth embodiments, a color-space transform unit 301 at a pre-stage of the encoder 303. The color-space transform unit 301 includes one or a plurality of kinds of color space transform processing. The color-space transform unit 301 selects color space transform processing to be used according to characteristics of a video signal inputted, setting of a system, and the like to perform the color space transform processing on the video signal inputted and sends a converted video signal 302 obtained as a result of the color space transform processing to the encoder 303. At the same time, the color-space transform unit 301 outputs information for identifying the color space transform processing used to the encoder 303 as color space transform method identification information 304. The encoder 303 multiplexes the color space transform method identification information 304 on a bit stream 305, in which the converted video signal 302 is compression-encoded with the method described in the seventh to the twelfth embodiments as an encoding object signal, and sends the color space transform method identification information 304 to a transmission line or outputs the color space transform method identification information 304 to a recording device that performs recording in a recording medium.

As the color space transform method prepared, for example, there are transforms such as transform from RGB to YUV conventionally used as a standard,
C0=Y=0.299×R+0.587×G+0.114×B
C1=U=−0.169×R−0.3316×G+0.500×B
C2=V=0.500×R−0.4186×G−0.0813×B
prediction among color components,
C0=G'=G
C1=B'=B f(G) (f(G): filter processing result for the G component)
C2=R'=Rf(G), and
transform from RGB to YCoGg
C0=Y=R/2+G/2+B/4
C1=Co=R/2B/2
C2=Cg=−R/4+G/2B/4.
It is unnecessary to limit an input to the color-space transform unit 301 to RGB. Transform processing is not limited to the three kinds of processing described above.

The decoder in the thirteenth embodiment includes, in addition to the decoder 306 in the seventh to the twelfth embodiments, an inverse-color-space transform unit 308 on a post-stage of the decoder 306. The decoder 306 is inputted with the bit stream 305 and extracts the color space transform method identification information 304 from the bit stream 305 and outputs the color space transform method identification information 304. In addition, the decoder 306 outputs a decoded image 307 obtained by operations of the decoder described in the seventh to the twelfth embodiments. The inverse-color-space transform unit 308 includes inverse transform processing corresponding to respective color space transform methods selectable by the color-space transform unit 301. The inverse-color-space transform unit 308 performs processing for specifying transform executed by the color-space transform unit 301 on the basis of the color space transform method identification information 304 outputted from the decoder 306, applying inverse transform processing to the decoded image 307, and returning the decoded image 307 to the color spaces of the video signal inputted to the encoder in the thirteenth embodiment.

According to the encoder and the decoder in the thirteenth embodiment, optimum transform processing for color spaces is applied to a video signal to be encoded at a pre-stage of encoding and a post-stage of decoding processing to remove a correlation included in an image signal including the three color components before encoding. Thus, it is possible to perform encoding in a state in which redundancy is reduced and improve compression efficiency. In the conventional standard encoding system such as MPEG, color spaces of a signal to be encoded are limited to only YUV. However, since the encoder and the decoder include the color-space transform unit 301 and the inverse-color-space transform unit 308 and the color space transform method identification information 304 is included in the bit stream 305, it is possible to eliminate the restriction on color spaces of a video signal inputted for encoding. In addition, it is possible to encode the video signal using optimum transform selected out of a plurality of kinds of means for removing a correlation among the color components.

The thirteenth embodiment is described on condition that the color-space transform unit 301 and the inverse-color-space transform unit 308 are always actuated. However, without actuating those processing units, it is also possible to adopt a constitution for encoding, in an upper layer such as a sequence, information indicating that compatibility with the conventional standard is secured.

Figure 64:
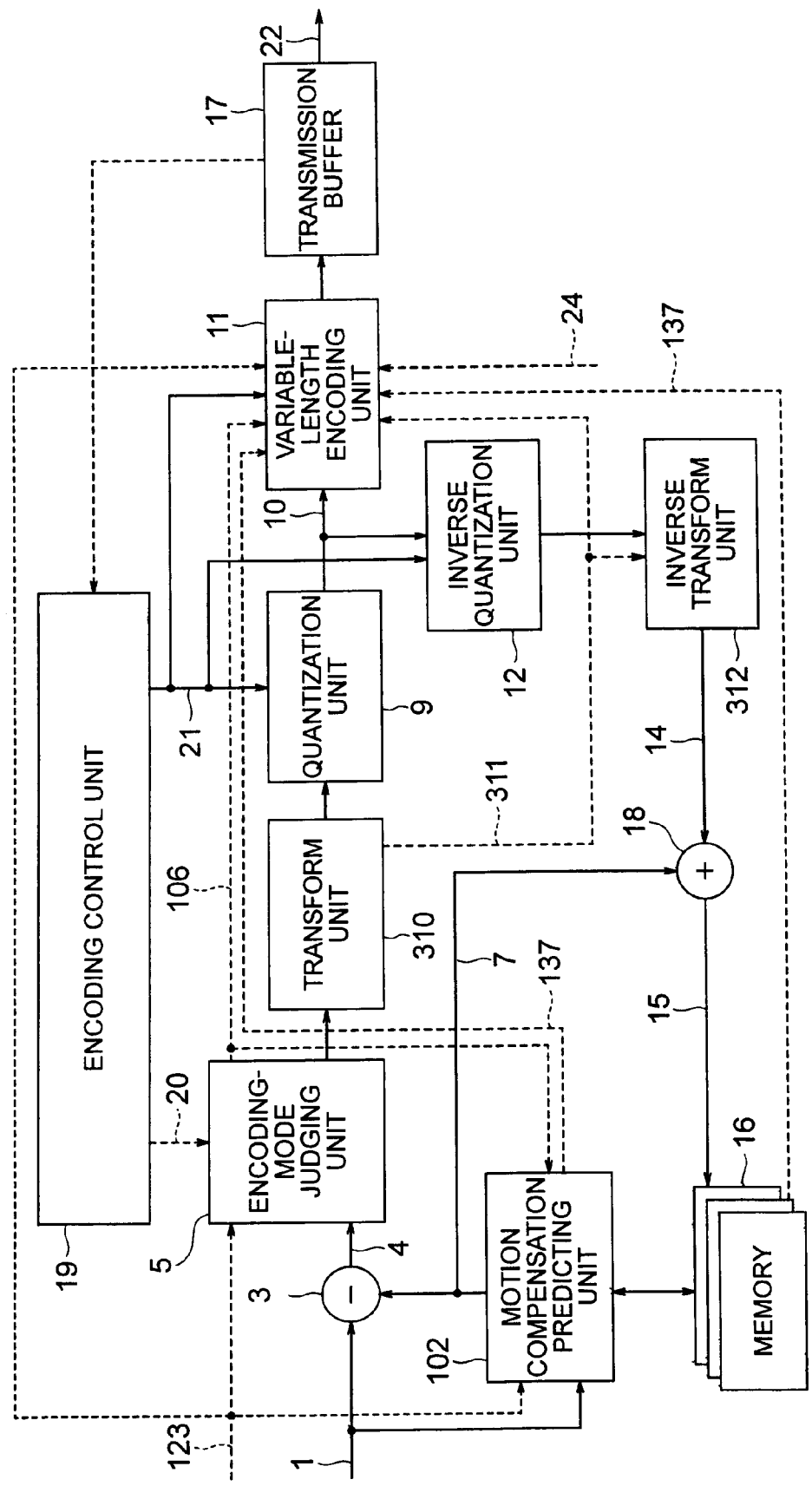
FIG. 64 is a diagram for explaining a structure of a video encoder according to the thirteenth embodiment.
Figure 65:
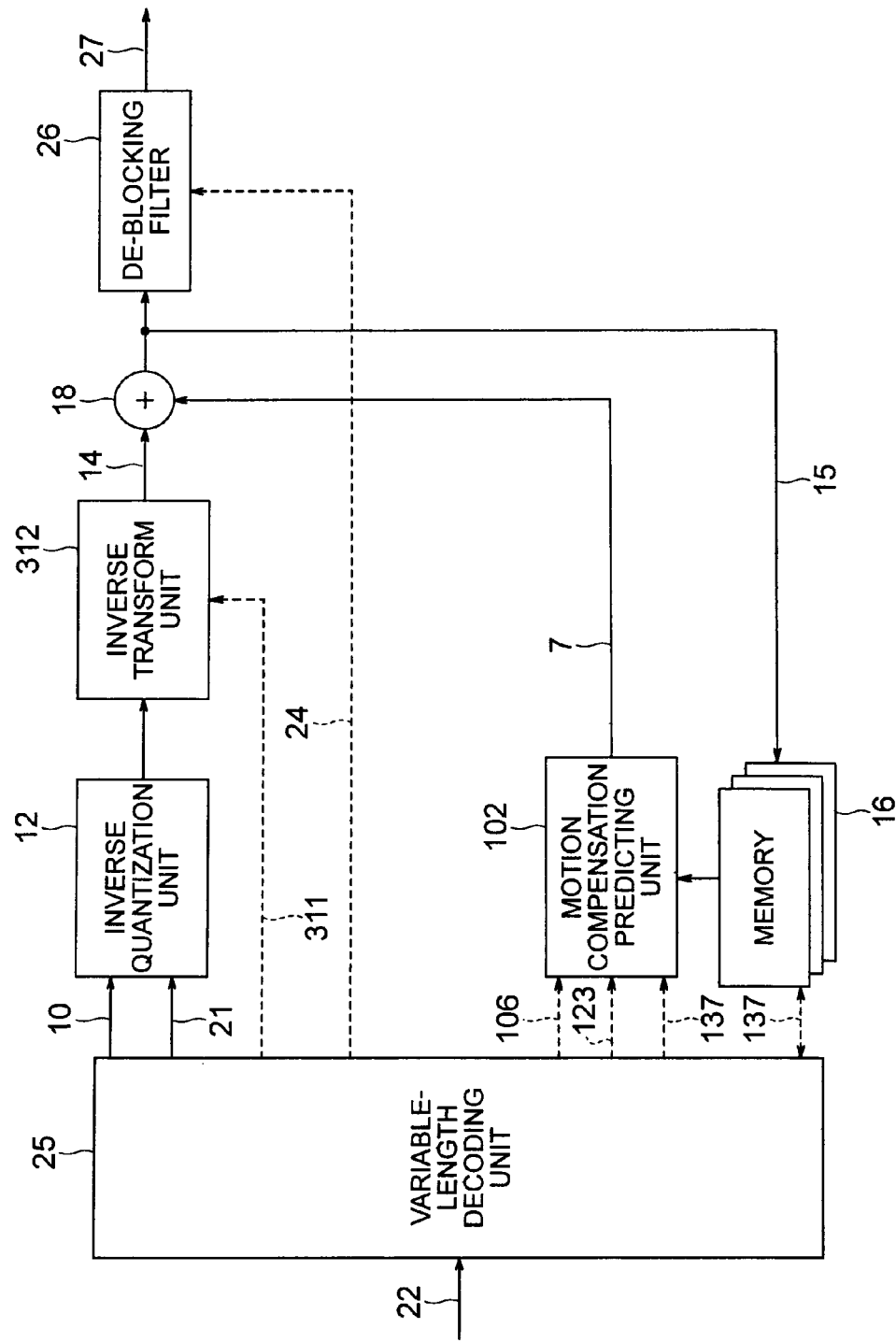
FIG. 65 is a diagram for explaining a structure of a video decoder according to the thirteenth embodiment.

It is also possible to build the color-space transform unit 301 and the inverse-color-space transform unit 308 in the thirteenth embodiment in the encoder and the decoder in the seventh to the twelfth embodiment to perform color space transform at a prediction difference signal level. An encoder and a decoder constituted in this way are shown in FIG. 64 and FIG. 65, respectively. In the encoder in FIG. 64, a transform unit 310 is provided instead of the transform unit 8 and an inverse transform unit 312 is provided instead of the inverse transform unit 13. In the decoder in FIG. 65, an inverse transform unit 312 is provided instead of the inverse transform unit 13.

First, as indicated as processing of the color-space transform unit 301, the transform unit 310 selects optimum transform processing out of a plurality of kinds of color space transform processing and executes color space transform on the prediction difference signal 4 of the C0, the C1, and the C2 components outputted from the encoding-mode judging unit 5. After that, the transform unit 310 executes transform equivalent to that of the transform unit 8 on a result of the color space transform. The transform unit 310 sends color space transform method identification information 311 indicating which transform is selected to the variable-length encoding unit 11, multiplexes the color space transform method identification information 311 on a bit stream, and outputs the bit stream as the video stream 22. The inverse transform unit 312 performs inverse transform equivalent to that of the inverse orthogonal converse unit 13 and, then, executes inverse color space transform processing using color space transform processing designated by the color space transform method identification information 311.

In the decoder, the variable-length decoding unit 25 extracts the color space transform method identification information 311 from the bit stream and sends a result of the extraction to the inverse transform unit 312 to perform processing same as the processing of the inverse transform unit 312 in the encoder. With such a constitution, when it is possible to sufficiently remove, in a predicted difference area, a correlation remaining among the color components, it is possible to execute the removal as a part of the encoding processing. Thus, there is an effect of improving encoding efficiency. However, when separate macro-block headers are used for the C0, the C1, and the C2 components, in the first place, a method of prediction varies for each of the components like intra-prediction for the C0 component and inter-prediction for the C1 component. Thus, the correlation may be less easily held in the region of the prediction difference signal 4. Therefore, when separate macro-block headers are used for the C0, the C1, and the C2 components, the transform unit 310 and the inverse transform unit 312 may be actuated not to execute color space transform. An indication on whether color space transform is executed in the region of the prediction difference signal 4 may be multiplexed on a bit stream as identification information. The color space transform method identification information 311 may be changed by a unit of any one of a sequence, a picture, a slice, and a macro-block.

In the structures of the encoder and the decoder in FIGS. 64 and 65, the respective transform coefficient data of the C0, the C1, and the C2 components have different signal definition domains of an encoding object signal according to the color space transform method identification information 311. Therefore, it is considered that, in general, a distribution of the transform coefficient data is a different occurrence probability distribution according to the color space transform method identification information 311. Thus, when the encoder and the decoder are constituted as shown in FIGS. 64 and 65, the encoder and the decoder perform encoding and decoding using context models with which a separate occurrence probability state is associated for each of the components of C0, C1, and C2 and for each of states of the color space transform method identification information 311.

It is obvious from the explanation of operations of the decoder in the twelfth embodiment that context models are defined in the same procedure on both the encoding side and the decoding side to perform arithmetic decoding. After determining to which component information a context model to be used refers to, update of an occurrence probability state associated with the context model is executed on the basis of a state of the occurrence probability state parameter common-use identification flag 143.

Fourteenth Embodiment

In the fourteenth embodiment, more specific apparatus structures will be described concerning the encoder and the decoder described in the embodiments.

In the embodiments, the operations of the encoder and the decoder are explained using the drawings based on, for example, FIGS. 1, 2, 30, and 31. In these drawings, the operations for collectively inputting an input video signal including the three color components to the encoder, performing, in the encoder, encoding while selecting whether the three color components are encoded on the basis of a common prediction mode or a macro-block header or encoded on the basis of separate prediction modes or macro-block headers, inputting a bit stream obtained as a result of the encoding to the decoder, and performing, in the decoder, decoding processing while selecting, on the basis of a flag (e.g., the intra-prediction mode common-use identification flag 23 or the inter-prediction mode common-use identification flag 123) decoded and extracted from the bit stream, whether the three color components are encoded on the basis of the prediction mode or the macro-block header or encoded on the basis of the separate prediction modes or macro-block header to obtain a reproduced video are explained. It is already clearly described that the flag may be encoded and decoded by a unit of an arbitrary data layer such as a macro-block, a slice, a picture, or a sequence. In the fourteenth embodiment of the present invention, specifically, an apparatus structure and an operation for performing encoding and decoding while changing encoding of three color component signals by a common macro-block header and encoding of the three color component signals by separate macro-block headers in a unit of one frame (or one field) will be explained on the basis of specific drawings. In the following explanation, unless specifically noted otherwise, the description "one frame" is regarded as a data unit of one frame or one field.

It is assumed that a macro-block header according to the fourteenth embodiment includes: transform block size identification flag as shown in FIG. 15; encoding and prediction mode information as shown in FIG. 50 such as a macro-block type, a sub-macro-block type, and an intra-prediction mode; motion prediction information such as a reference image identification number and a motion vector; conversation coefficient effectiveness/ineffectiveness indication information; and macro-block overhead information other than transform coefficient data such as a quantization parameter for a transform coefficient.

Figure 66:
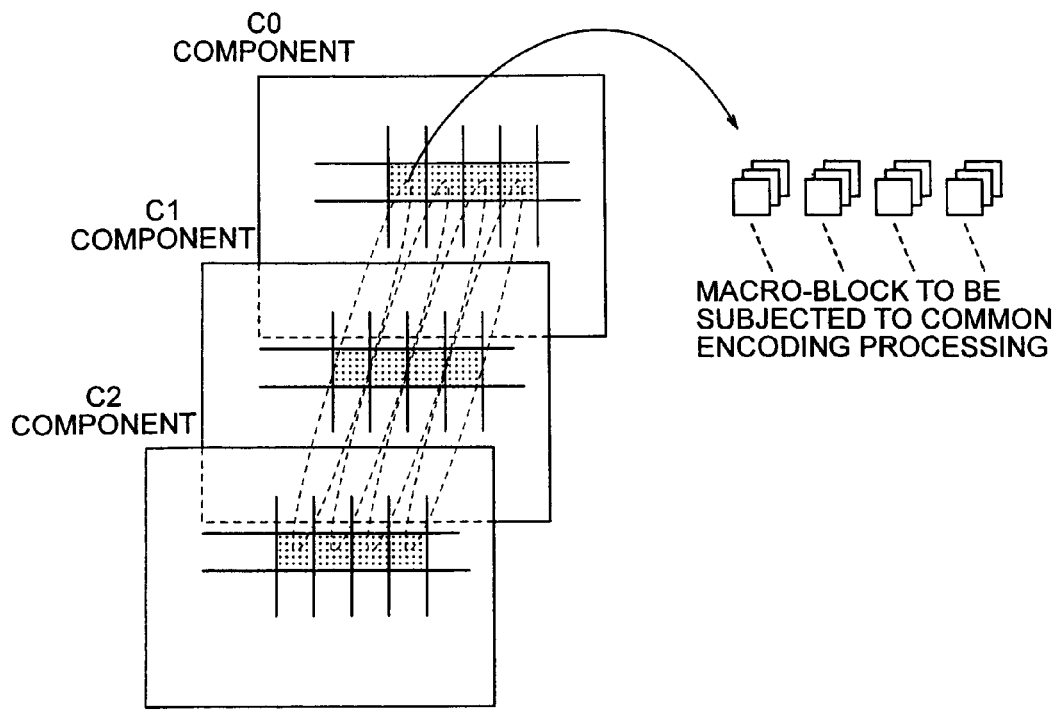
FIG. 66 is a diagram for explaining common encoding processing according to a fourteenth embodiment.
Figure 67:
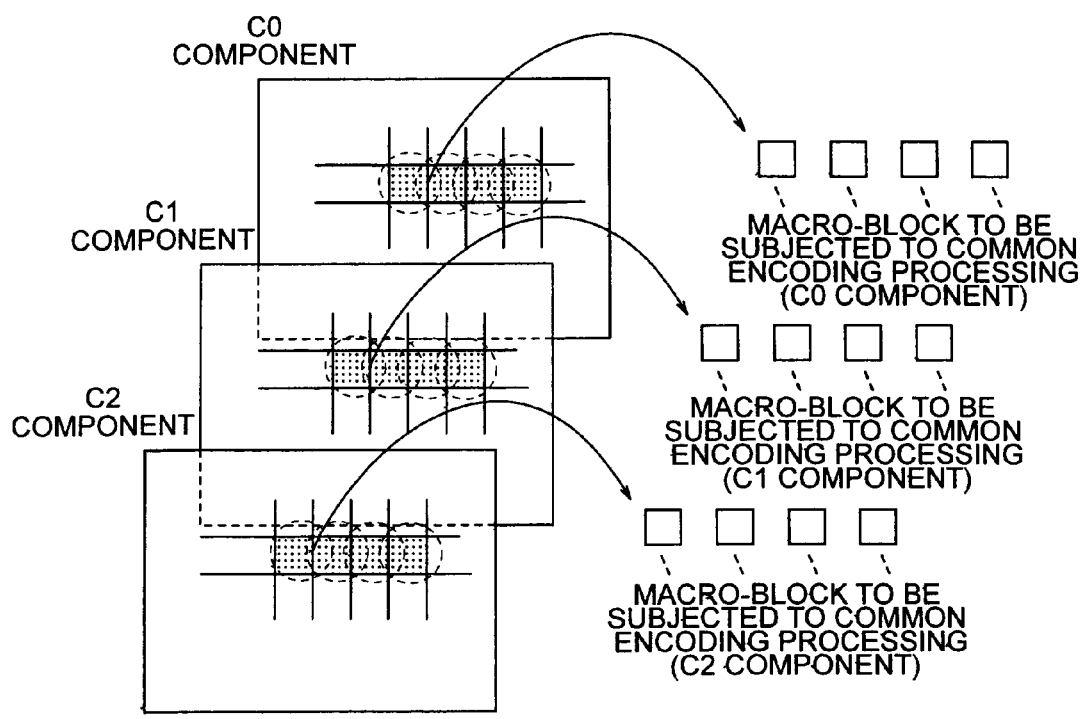
FIG. 67 is a diagram for explaining independent encoding processing according to the fourteenth embodiment.

In the following explanation, processing of encoding three color component signals of one frame with the common macro-block header is referred to as "common encoding processing" and processing of encoding three color component signals of one frame with separate independent macro-block headers is referred to as "independent encoding processing". Similarly, processing of decoding frame image data from a bit stream in which three color component signals of one frame is encoded by the common macro-block header is referred to as "common decoding processing" and processing of decoding frame image data from a bit stream in which three color component signals of one frame are encoded by separate independent macro-block headers is referred to as "independent decoding processing". In the common encoding processing according to the fourteenth embodiment, as shown in FIG. 66, an input video signal for one frame is divided into macro-blocks in a group of three color components. On the other hand, in the independent encoding processing, as shown in FIG. 67, an input video signal for one frame is separated into three color components, and the three color components are divided into macro-blocks composed of single color components. That is, respective macro-blocks to be subjected to the independent encoding processing for the respective C0 component, C1 component, and C2 component. The macro-blocks to be subjected to the common encoding processing include samples of the three color components of C0, C1, and C2. The macro-blocks to be subjected to the independent encoding processing include samples of any one of C0, C1, and C2 components.

Figure 68:
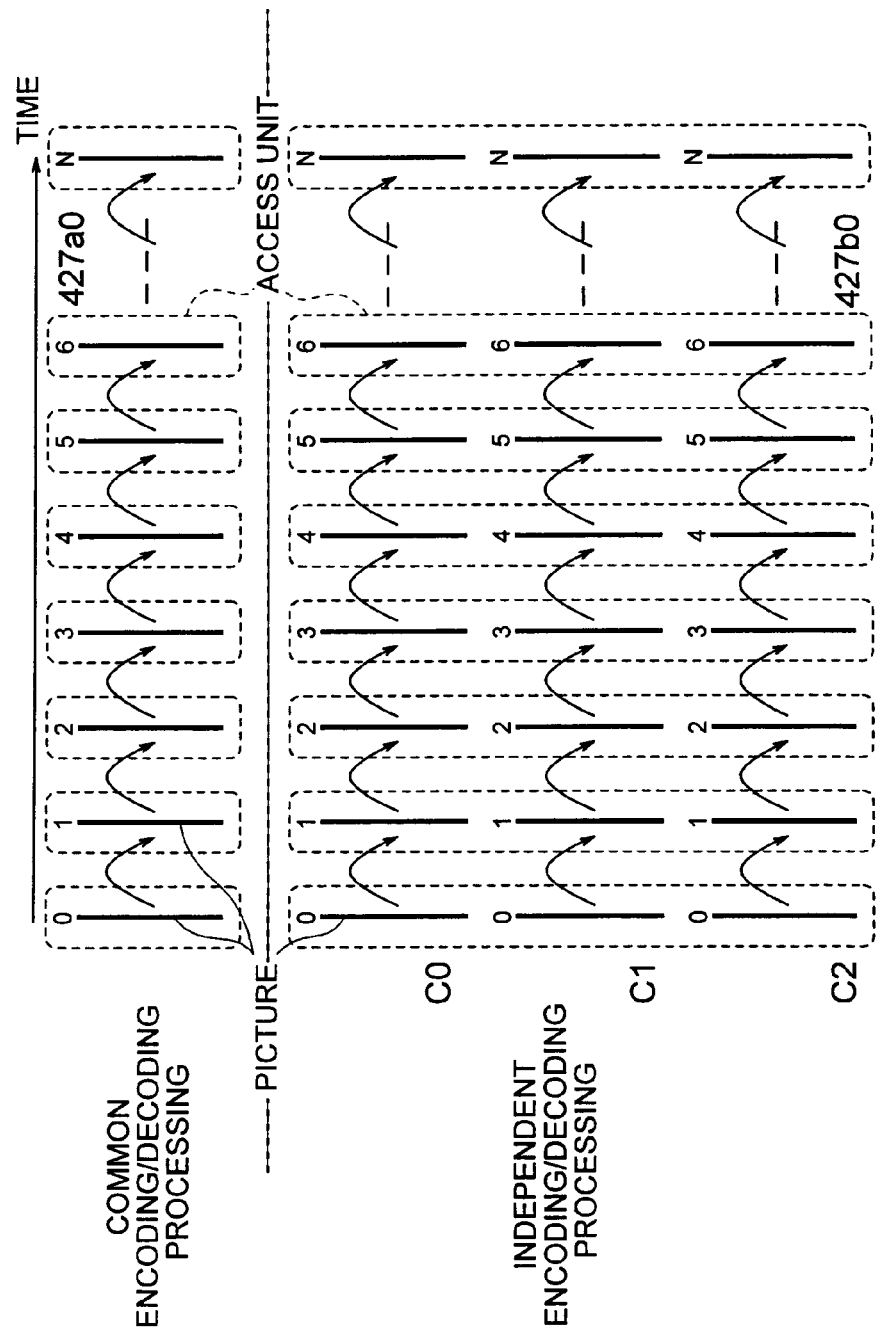
FIG. 68 is a diagram for explaining a motion prediction reference relation in a time direction between pictures in an encoder and a decoder according to the fourteenth embodiment.

FIG. 68 is a diagram for explaining a motion prediction reference relation in a time direction among pictures in an encoder and a decoder according to the fourteenth embodiment. In this example, a data unit indicated by a bold vertical bar line is set as a picture and a relation between the picture and an access unit is indicated by a surrounding dotted line. In the case of the common encoding and decoding processing, one picture is data representing a video signal for one frame in which three color components are mixed. In the case of the independent encoding and decoding processing, one picture is a video signal for one frame of any one of the color components. The access unit is a minimum data unit for giving a time stamp for synchronization with audio/sound information or the like to a video signal. In the case of the common encoding and decoding processing, data for one picture is included in one access unit (427a of FIG. 68). On the other hand, in the case of the independent encoding and decoding processing, three pictures are included in one access unit (427b of FIG. 68). This is because, in the case of the independent encoding and decoding processing, a reproduction video signal for one frame is not obtained until pictures at the identical display time for all the three color components are collected. Numbers affixed above the respective pictures indicate an order of the encoding and decoding processing in a time direction of the pictures (frame_num of the AVC). In FIG. 68, arrows among the pictures indicate a reference direction of motion prediction. In the case of the independent encoding and decoding processing, motion prediction reference among pictures included in an identical access unit and motion prediction reference among different color components are not performed. Pictures of the respective color components of C0, C1, and C2 are encoded and decoded while predicting and referencing motion only for signals of identical color components. With such the structure, in the case of the independent encoding and decoding processing according to the fourteenth embodiment, it is possible to execute encoding and decoding of the respective color components without relying on encoding and decoding processing of the other color components at all. Thus, it is easy to perform parallel processing.

In the AVC, an IDR (instantaneous decoder refresh) picture that performs intra-encoding by itself and resets contents of a reference image memory used for motion compensation prediction is defined. Since the IDR picture is decodable without relying on any other pictures, the IDR picture is used as a random access point. In an access unit in the case of the common encoding processing, one access unit is one picture. However, in an access unit in the case of the independent encoding processing, one access unit is constituted by a plurality of pictures. Thus, when a certain color component picture is an IDR picture, assuming that the other remaining color component pictures are also IDR pictures, an IDR access unit is defined to secure a random access function.

In the following explanation, identification information indicating whether encoding by the common encoding processing is performed or encoding by the independent encoding processing is performed is referred to as a common encoding/independent encoding identification signal.

Figure 69:
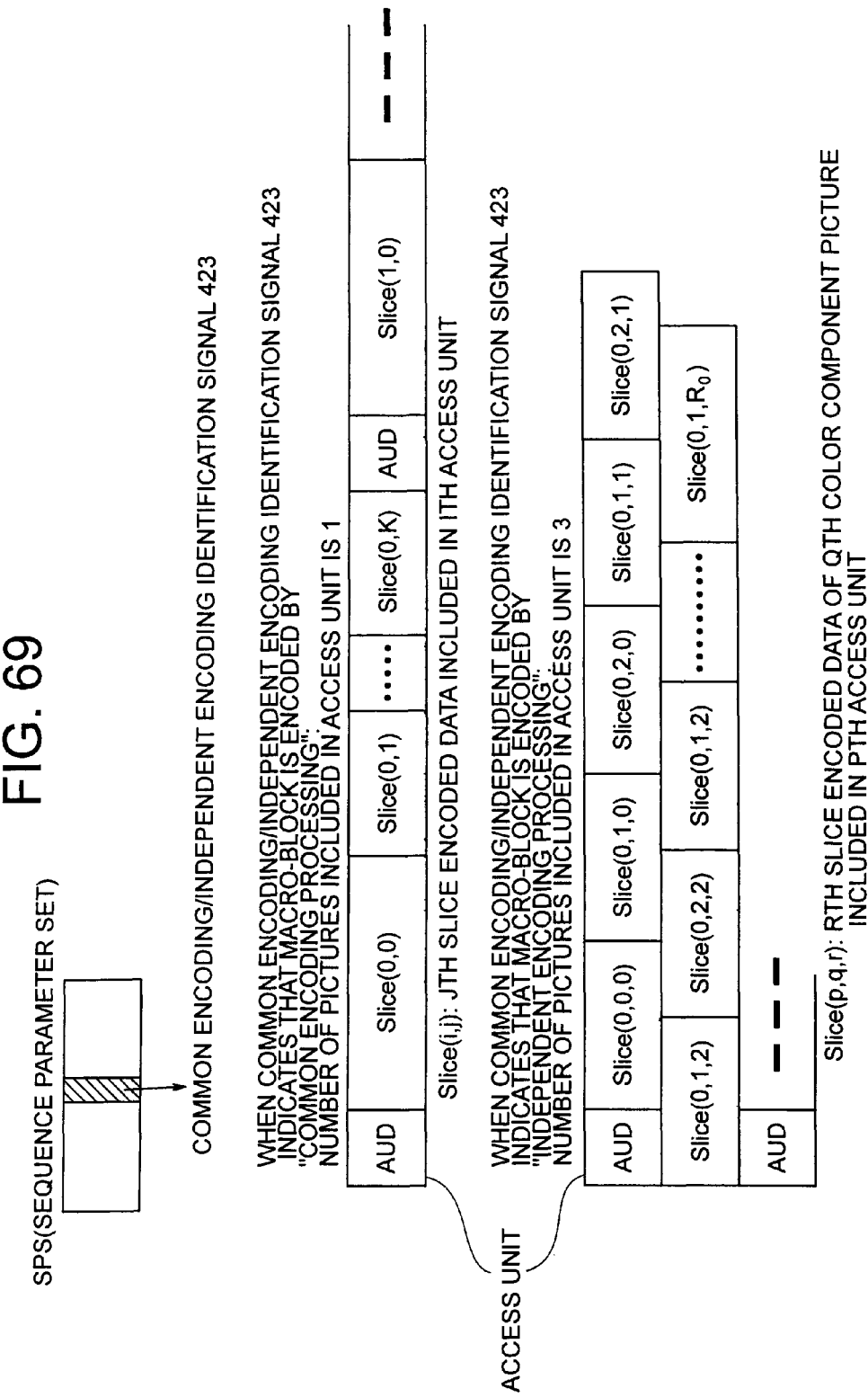
FIG. 69 is a diagram for explaining an example of a structure of a bit stream generated by the encoder according to the fourteenth embodiment and subjected to input/decoding processing by the decoder according to the fourteenth embodiment.

FIG. 69 is a diagram for explaining a structure of a bit stream that is generated by the encoder according to the fourteenth embodiment and subjected to input and decoding processing by the decoder according to the fourteenth embodiment. In FIG. 69, a bit stream structure from a sequence level to a frame level is shown. First, a common encoding/independent encoding identification signal 423 is multiplexed with an upper header of the sequence level (in the case of the AVC, sequence parameter set, etc.). Respective frames are encoded in a unit of the access unit. An AUD indicates an Access Unit Delimiter NAL unit that is a unique NAL unit for identifying a break of the access unit in the AVC. When the common encoding/independent encoding identification signal 423 indicates "picture encoding by the common encoding processing", encoded data for one picture is included in the access unit. It is assumed that the picture in this case is data representing a video signal for one frame in which three color components are mixed as described above. In this case, encoded data of an i-th access unit is constituted as a set of slice data Slice(i,j), and "j" is an index of slice data in one picture.

On the other hand, when the common encoding/independent encoding identification signal 423 indicates "picture encoding by the independent encoding processing", one picture is a video signal for one frame of any one of color components. In this case, encoded data of a p-th access unit is constituted as a set of slice data Slice(p,q,r) of a q-th picture in the access unit, and "r" is an index of slice data in one picture. In the case of a video signal constituted by three color components such as RGB, the number of values "q" may take is three. In a case, for example, where additional data such as permeability information for alpha blending is encoded and decoded as an identical access unit in addition to a video signal including the three primary colors or a case where a video signal constituted by color components (e.g., YMCK used in color printing) which are equal to or more than four components, is encoded and decoded, the number of values "q" may take is set to four or more. If the independent encoding processing is selected, the encoder and the decoder according to the fourteenth embodiment encode respective color components constituting a video signal entirely independently from one another. Thus, it is possible to freely change the number of pieces of the color components without changing the encoding and decoding processing in principle. There is an effect that, even when a signal format for performing color representation of a video signal is changed in future, it is possible to cope with the change with the independent encoding processing according to the fourteenth embodiment.

In order to realize the structure, in the fourteenth embodiment, the common encoding/independent encoding identification signal 423 is represented as a form of "the number of pictures included in one access unit and independently encoded without being subjected to motion prediction reference with one another". In this case, the common encoding/independent encoding identification signal 423 is able to be represented by the number of values the parameter q may take and the number of values the parameter may take is referred to as num_pictures_in_au below. In other words, num_pictures_in_au=1 indicates the "common encoding processing" and num_pictures_in_au=3 indicates the "independent encoding processing" according to the fourteenth embodiment. When there are four or more color components, num_pictures_in_au only has to be set to a value larger than 3. By performing such signaling, if the decoder decodes and refers to num_pictures_in_au, the decoder can not only distinguish encoded data by the common encoding processing and encoded data by the independent encoding processing but also simultaneously learn how many pictures of single color component are present in one access unit. Thus, it is possible to treat the common encoding processing and the independent encoding processing seamlessly in a bit stream while making it possible to cope with extension of color representation of a video signal in future.

Figure 70:
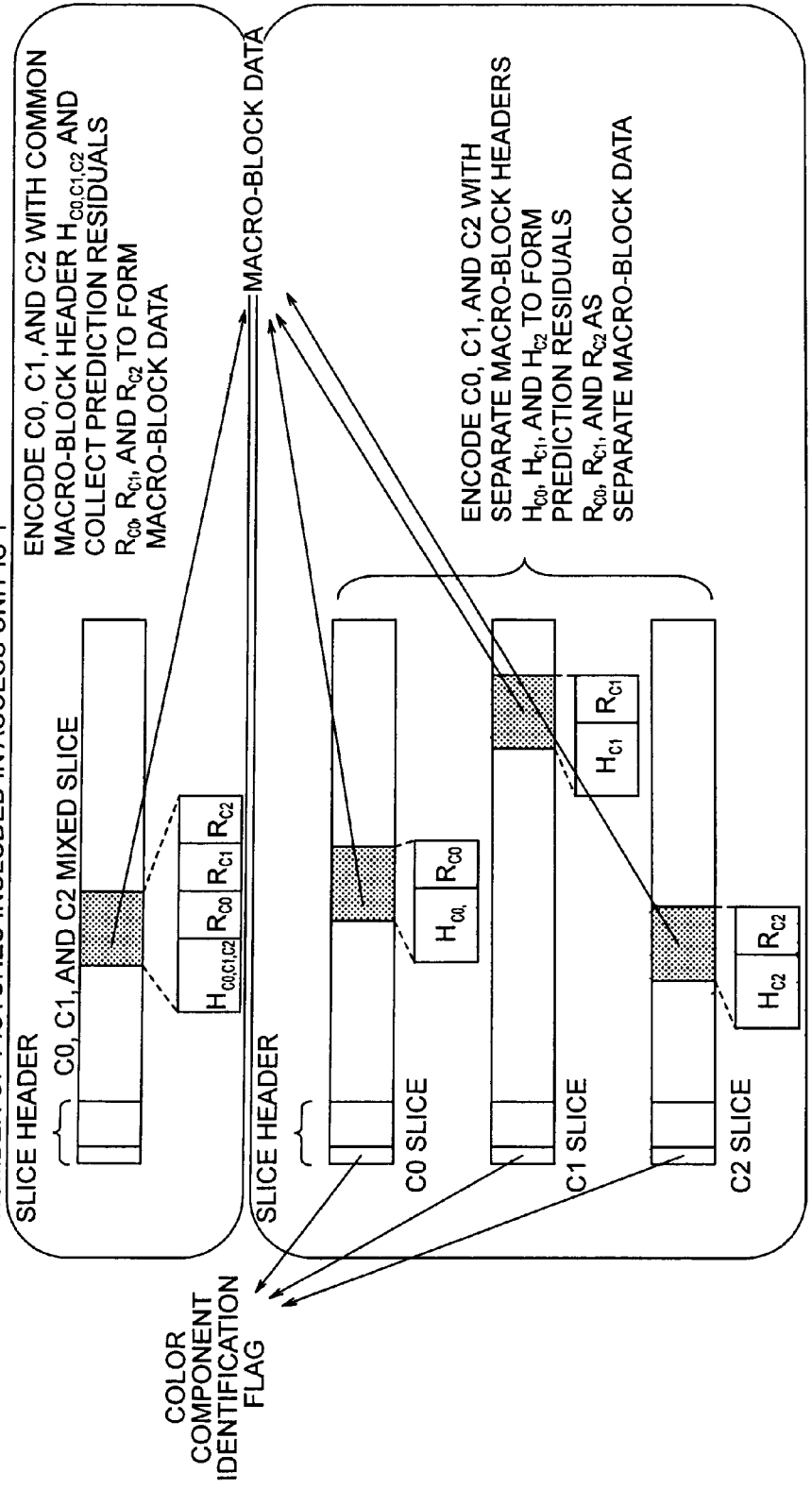
FIG. 70 is a diagram for explaining bit stream structures of slice data in the cases of common encoding processing and independent encoding processing, respectively.

FIG. 70 is a diagram for explaining bit stream structures of slice data in the case of the common encoding processing and the independent encoding processing. In a bit stream encoded by the independent encoding processing, in order to attain effects described later, a color component identification flag (color_channel_idc) is given to a header region at the top of slice data received by the decoder such that it is possible to identify to which color component picture in an access unit the slice data belongs. Color_channel_idc groups slices having the same value of color_channel_idc. In other words, among slices having different values of color_channel_idc, no dependency of encoding and decoding (e.g., motion prediction reference, context modeling/occurrence probability learning, etc. of CABAC is given. With such prescription, independence of respective pictures in an access unit in the case of the independent encoding processing is secured. Frame_num (an order of encoding and decoding processing of a picture to which a slice belongs) multiplexed with respective slice header is set to an identical value in all color component pictures in one access unit.

Figure 71:
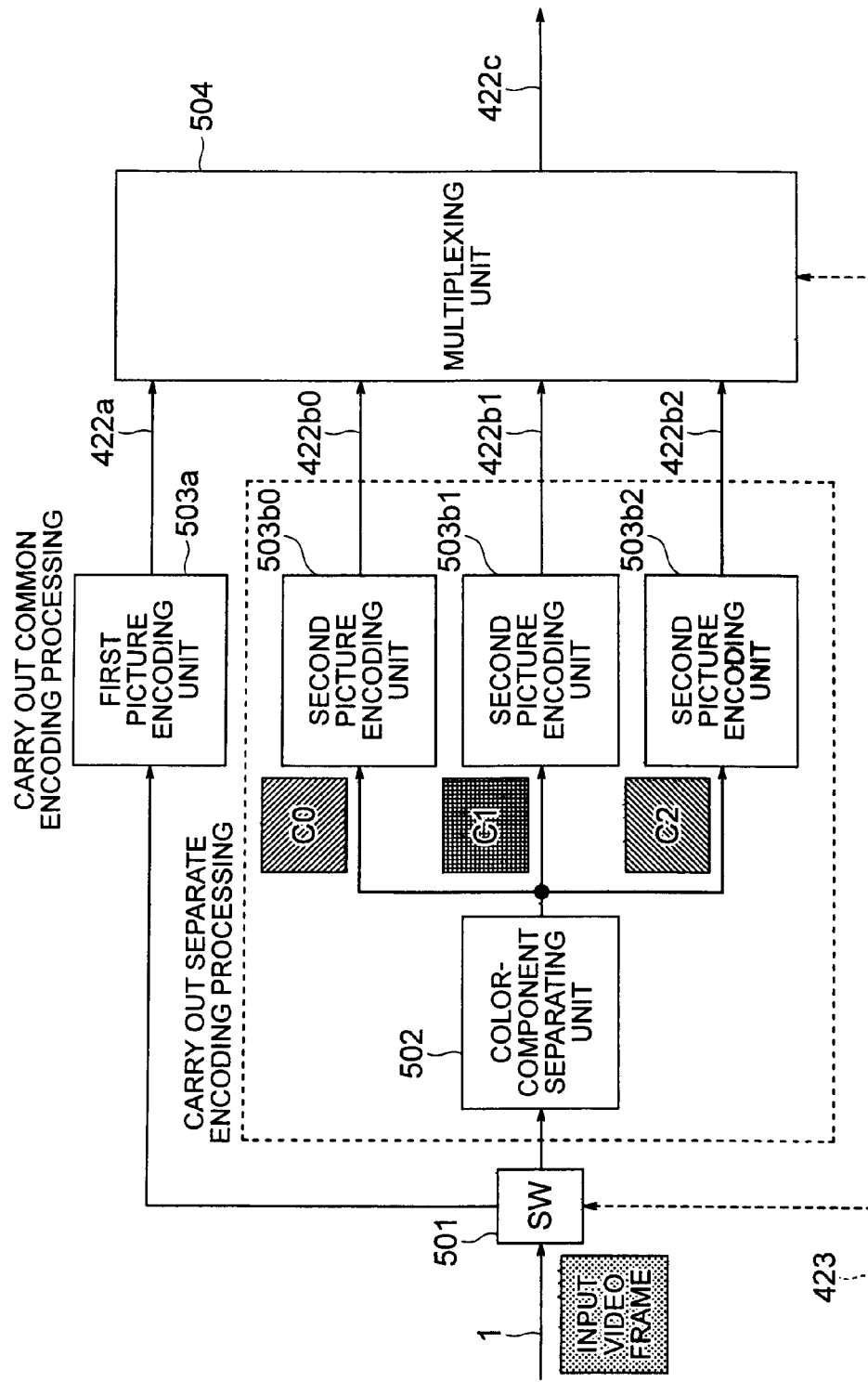
FIG. 71 is a diagram for explaining a schematic structure of the encoder according to the fourteenth embodiment.

FIG. 71 is a diagram for explaining a schematic structure of the encoder according to the fourteenth embodiment. In FIG. 71, the common encoding processing is executed in a first picture encoding unit 503a and the independent encoding processing is executed in second picture encoding units 503b0, 503b1, and 503b2 (prepared for three color components). A video signal 1 is supplied to the first picture encoding unit 503a or a color component separating unit 502 and any one of the second picture encoding units 503b0 to 503b2 for each color component by a switch (SW) 501. The switch 501 is driven by a common encoding/independent encoding identification signal 423 and supplies the input video signal 1 to a designated path. In the following, description is made on a case where the common encoding/independent encoding identification signal (num_pictures_in_au) 423 is a signal multiplexed with a sequence parameter set when an input video signal is a signal of the 4:4:4 format and used for selecting the common encoding processing and the independent encoding processing in a unit of sequence. This case exhibits the same concept as the cases of the inter-prediction mode common-use identification flag 123 described in the seventh embodiment, and the macro-block header common-use identification flag 123c described in the eleventh embodiment. When the common encoding processing is used, it is necessary to execute the common decoding processing on the decoder side. When the independent encoding processing is used, it is necessary to execute the independent decoding processing on the decoder side. Thus, it is necessary to multiplex the common encoding/independent encoding identification signal 423 with a bit stream as information designating the processing. Therefore, the common encoding/independent encoding identification signal 423 is inputted to the multiplexing unit 504. A unit of the multiplexing of the common encoding/independent encoding identification signal 423 may be any unit such as a unit of GOP (group of pictures) composed of several picture groups in a sequence as long as the unit is in a layer higher than the pictures.

In order to execute the common encoding processing, the first picture encoding unit 503a divides the input video signal 1 into the macro-blocks in a group of samples of three color components as shown in FIG. 66 and advances the encoding processing in that unit. The encoding processing in the first picture encoding unit 503a will be described later. When the independent encoding processing is selected, the input video signal 1 is separated into data for one frame of C0, C1, and C2 in the color component separating unit 502 and supplied to the second picture encoding units 503b0 to 503b2 corresponding thereto, respectively. The second picture encoding units 503b0 to 503b2 divide a signal for one frame separated for each color component into the macro-blocks of the format shown in FIG. 67 and advance the encoding processing in that unit. The encoding processing in the second picture encoding units will be described later.

A video signal for one picture composed of three color components is inputted to the first picture encoding unit 503a. Encoded data is outputted as a video stream 422a. A video signal for one picture composed of single color component is inputted to the second picture encoding units 503b0 to 503b2. Encoded data are outputted as video streams 420b0 to 422b2. These video streams are multiplexed into a format of a video stream 422c in the multiplexing unit 504 on the basis of a state of the common encoding/independent encoding identification signal 423 and outputted.

Figure 72:
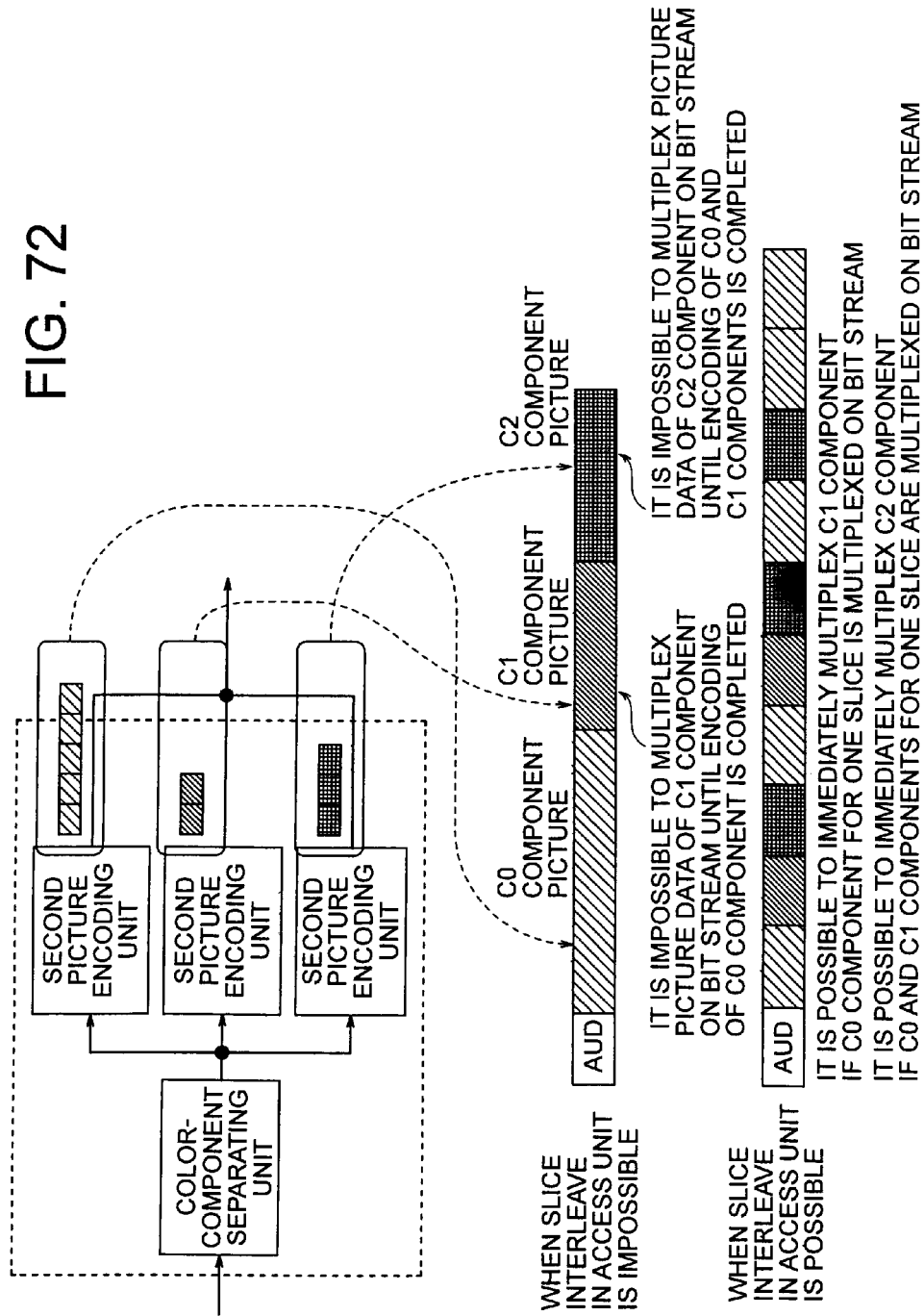
FIG. 72 is a diagram for explaining a state in which a processing delay on the encoder side is reduced.

In multiplexing of the video stream 422c, in the access unit in the case where the independent encoding processing is performed, it is possible to interleave an order of multiplexing and an order of transmission in a bit stream of slice data among pictures (respective color components) in the access unit (FIG. 72). In this case, on the decoder side, it is necessary to decide to which color component in the access unit the slice data received belongs. Therefore, a color component identification flag multiplexed with the header region of the top of the slide data as shown in FIG. 70 is used.

With the structure, as in the encoder of FIG. 71, when the encoder encodes the pictures of the three color components according to the parallel processing using three sets of each of the second picture encoding units 503b0 to 503b2 independent from one another, it is possible to transmit encoded data without waiting for completion of encoded data of the other color component pictures as soon as slice data of an own picture. In the AVC, it is possible to divide one picture into a plurality of slice data and encode the slice data. It is possible to flexibly change a slice data length and the number of macro-blocks included in a slice according to encoding conditions. Between slices adjacent to each other on an image space, since independence of decoding processing for the slices is secured, it is impossible to use near contexts such as intra-prediction and arithmetic coding. Thus, the larger the slice data length, the higher encoding efficiency is. On the other hand, when an error is mixed in a bit stream in a course of transmission and recording, return from the error is earlier as the slice data length is smaller and it is easy to suppress deterioration in quality. When the length and the structure of the slice, an order of the color components, and the like are fixed without multiplexing the color component identification flag, conditions for generating a bit stream are fixed in the encoder. Therefore, it is impossible to flexibly cope with various conditions required for encoding.

If it is possible to constitute the bit stream as shown in FIG. 72, in the encoder, it is possible to reduce a transmission buffer size necessary for transmission, that is, a processing delay on the encoder side. A state of the reduction in a processing delay is shown in FIG. 71. If multiplexing of slice data across pictures is not allowed, until encoding of a picture of a certain color component is completed, the encoder needs to buffer encoded data of the other pictures. This means that a delay on a picture level occurs. On the other hand, as shown in the lowermost section in FIG. 72, if it is possible to perform interleave on a slice level, the picture encoding unit of a certain color component can output encoded data to the multiplexing unit in a unit of slice data and can suppress the delay.

In one color component picture, slice data included in the picture may be transmitted in a raster scan order of macro-blocks or may be constituted so as to make it possible to perform interleave transmission even in one picture.

Operations of the first and the second picture encoding units will be hereinafter explained in detail.

Outline of Operations of the First Picture Encoding Unit

Figure 73:
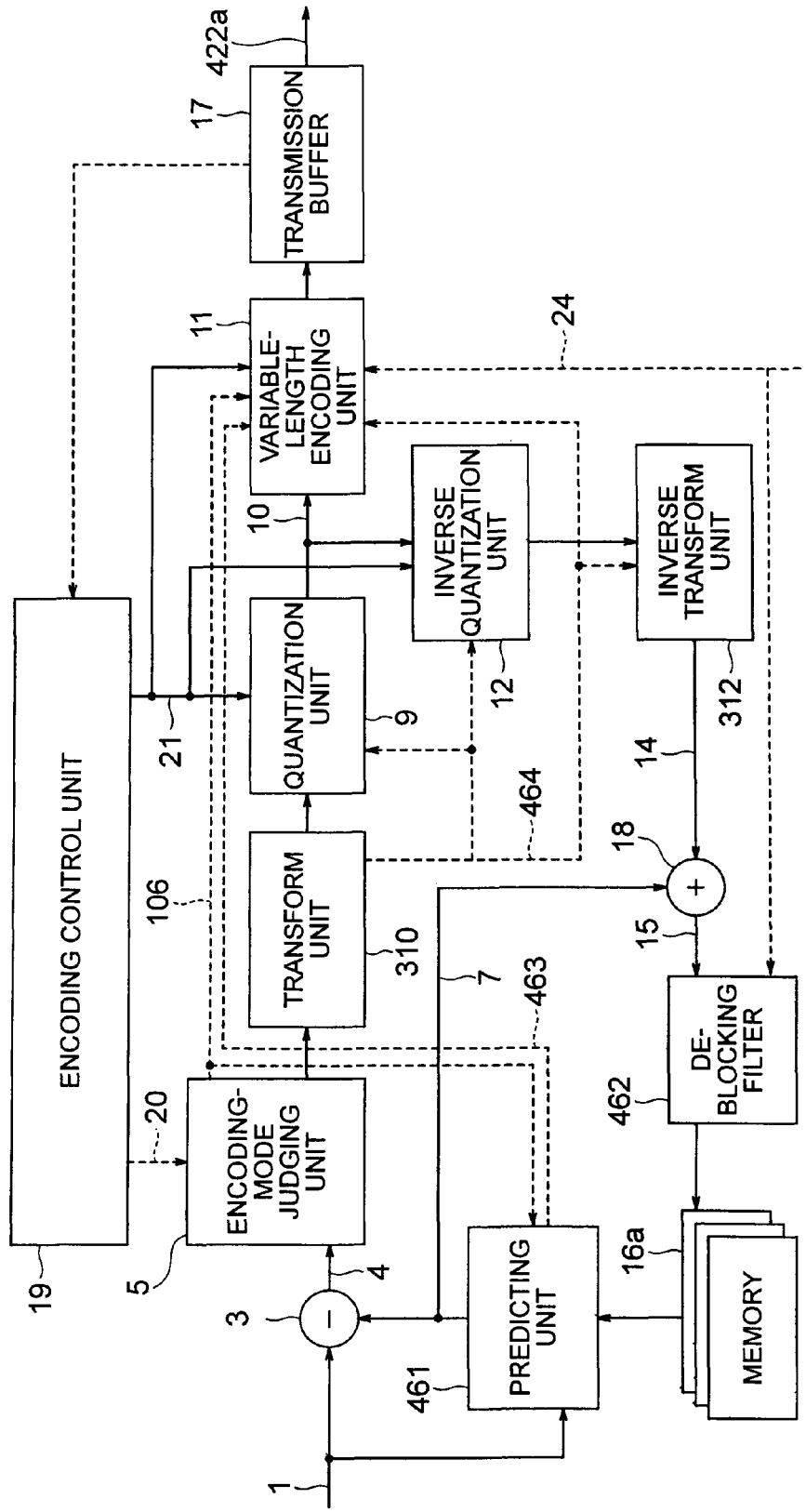
FIG. 73 is a diagram for explaining an internal structure of a first picture encoding unit.

An internal structure of the first picture encoding unit 503a is shown in FIG. 73. In FIG. 73, the input video signal 1 is inputted in the 4:4:4 format and in a unit of the macro-block in a group of three color components in the format of FIG. 66.

First, the predicting unit 461 selects a reference image out of the motion compensation prediction reference image data stored in the memory 16a and performs the motion compensation prediction processing in a unit of the macro-block. Memory 16a stores a plurality of pieces of reference image data constituted by three color components over a plurality of times. The predicting unit 461 selects an optimum reference image in a unit of the macro-block out of the reference image data and performs motion prediction. As the arrangement of the reference image data in the memory 16a, the reference image data may be separately stored for each of the color components in a plane sequential manner or samples of the respective color components may be stored in a dot sequential manner. Seven types are prepared as block sizes for performing motion compensation prediction. First, it is possible to select a size of any one of 16×16, 16×8, 8×16, and 8×8 in macro-block units as shown in FIG. 32A to FIG. 32D. Moreover, when 8×8 is selected, it is possible to select a size of any one of 8×8, 8×4, 4×8, and 4×4 for each 8×8 block as shown in FIG. 32E to FIG. 32H.

The predicting unit 461 executes, for each macro-block size, the motion compensation prediction processing on all or a part of the block sizes, the sub-block sizes, motion vectors in a predetermined search range, and one or more usable reference images. The predicting unit 461 obtains a prediction differential signal for each block serving as a motion compensation prediction unit using the motion vectors, and reference image identification number 463 and a subtracter 3 used for the prediction. Prediction efficiency of the prediction differential signal 4 is evaluated in an encoding mode judging unit 5. The encoding mode judging unit 5 outputs a macro-block type/sub-macro-block type 106 and the motion vector/reference image identification information 463, with which optimum prediction efficiency is obtained for a macro-block to be predicted, out of prediction processing executed in the predicting unit 461. All pieces of macro-block header information such as macro-block types, sub-macro-block types, reference image indexes, and motion vectors are determined as header information common to the three color components, used for encoding, and multiplexed with a bit stream. In the evaluation of optimality of prediction efficiency, for the purpose of controlling an amount of arithmetic operation, an amount of prediction error for a predetermined color component (e.g., G component of RGB or Y component of YUV) may be evaluated. Alternatively, although an amount of arithmetic operation is increased, in order to obtain optimum prediction performance, an amount of prediction error for all color components may be comprehensively evaluated. In the final selection of the macro-block type/sub-macro-block type 106, a weight coefficient 20 for each type decided in the judgment by an encoding control unit 19 may be taken into account.

Similarly, the predicting unit 461 also executes intra-prediction. When the intra-prediction is executed, intra-prediction mode information is outputted to the output signal 463. In the following explanation, when the intra-prediction and the motion compensation prediction are not specifically distinguished, as the output signal 463, the intra-prediction mode information, the motion vector information, the reference image identification number are collectively referred to as prediction overhead information. Concerning the intra-prediction, an amount of prediction error for only a predetermined color component may be evaluated or an amount of prediction error for all the color components may be comprehensively evaluated. Finally, the predicting unit 461 selects the intra-prediction or the inter-prediction of the macro-block type by evaluating the macro-block type according to prediction efficiency or encoding efficiency in the encoding mode judging unit 5.

The predicting unit 461 outputs the macro-block type/sub-macro-block type 106 selected and the prediction differential signal 4 obtained by the intra-prediction and the motion compensation prediction based on the prediction overhead information 463 to a transform unit 310. The transform unit 310 transforms the prediction differential signal 4 inputted and outputs the prediction differential signal 4 to a quantizing unit 9 as a transform coefficient. In this case, a size of a block serving as a unit for transform may be selected from 4×4 and 8×8. When the transform block size is made selectable, a block size selected at the time of encoding is reflected on a value of a transform block size designation flag 464 and the flag is multiplexed with the bit stream. The quantizing unit 9 quantizes the transform coefficient inputted on the basis of a quantization parameter 21 decided by the encoding control unit 19 and outputs the transform coefficient to a variable length encoding unit 11 as a quantized transform coefficient 10. The quantized transform coefficient 10 includes information for the three color components and entropy-encoded by means of Huffman coding, arithmetic coding, or the like in the variable length encoding unit 11. The quantized transform coefficient 10 is restored to a local decoding prediction differential signal 14 through an inverse quantizing unit 12 and an inverse transform unit 312. The quantized transform coefficient 10 is added to a predicted image 7 generated on the basis of the selected macro-block type/sub-macro-block type 106 and the prediction overhead information 463 by an adder 18. Consequently, a local decoded image 15 is generated. After being subjected to block distortion removal processing in a de-blocking filter 462, the local decoded image 15 is stored in the memory 16a to be used in the following motion compensation prediction processing. A de-blocking filter control flag 24 indicating whether a de-blocking filter is applied to the macro-block is also inputted to the variable length encoding unit 11.

The quantized transform coefficient 10, the macro-block type/sub-macro-block type 106, the prediction overhead information 463, and the quantization parameter 21 inputted to the variable length encoding unit 11 are arranged and shaped as a bit stream in accordance with a predetermined rule (syntax) and outputted to a transmission buffer 17 as NAL-unit encoded data in a unit of slice data in one or a group of a plurality of macro-blocks of the format shown in FIG. 66. The transmission buffer 17 smoothes the bit stream according to a band of a transmission line to which the encoder is connected and readout speed of a recording medium, and outputs the bit stream as a video stream 422a. The transmission buffer 17 applies feedback to the encoding control unit 19 according to an accumulation state of bit streams in the transmission buffer 17 and controls an amount of generated codes in the following encoding of video frames.

An output of the first picture encoding unit 503a is a slice of a unit of three components and is equivalent to an amount of codes in a unit of a group of access units. Thus, the transmission buffer 17 may be arranged in the multiplexing unit 504 as it is.

In the first picture encoding unit 503a according to the fourteenth embodiment, it is possible to decide that all slice data in a sequence are a slice in which C0, C1, and C2 are mixed (i.e., slice in which pieces of information of the three color components are mixed) according to the common encoding/independent encoding identification signal 423. Thus, a color component identification flag is not multiplexed with a slice header.

Outline of Operations of the Second Picture Encoding Unit

Figure 74:
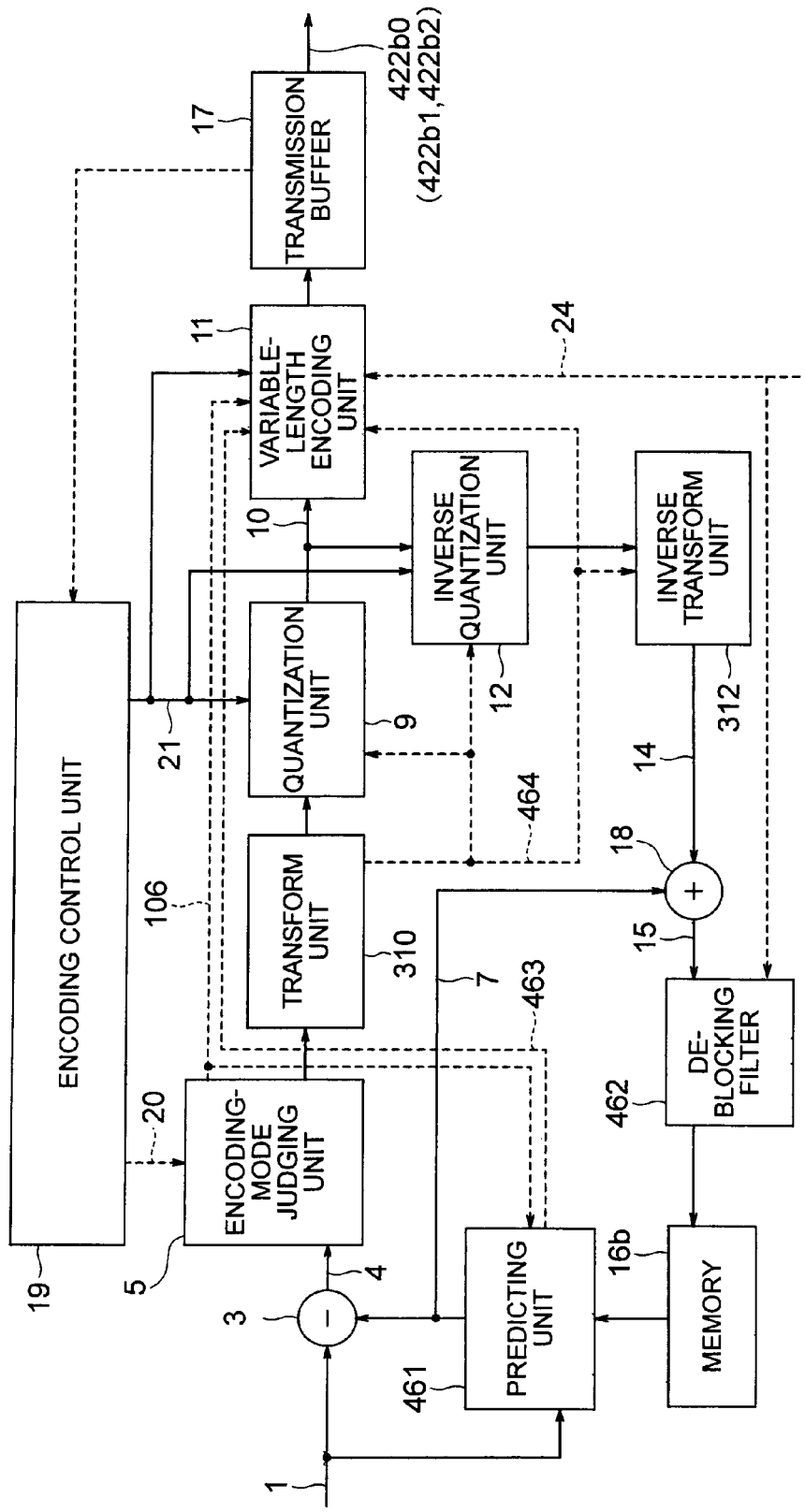
FIG. 74 is a diagram for explaining an internal structure of a second picture encoding unit.

An internal structure of the second picture encoding unit 503b0 (503b1, 503b2) is shown in FIG. 74. In FIG. 74, it is assumed that an input video signal 1a is inputted in a unit of a macro-block composed of a sample of a single color component of the format shown in FIG. 67.

First, the predicting unit 461 selects a reference image out of the motion compensation prediction reference image data stored in the memory 16b and performs the motion compensation prediction processing in a unit of the macro-block. The memory 16 can store a plurality of pieces of reference image data constituted of a single color component over a plurality of times. The predicting unit 461 selects an optimum reference image in a unit of the macro-block out of the reference image data and performs motion prediction. The memory 16b in a unit of a group of the three color components may be commonly used with the memory 16a. Seven types are prepared as block sizes for performing motion compensation prediction. First, it is possible to select a size of any one of 16×16, 16×8, 8×16, and 8×8 in macro-block units as shown in FIG. 32A to FIG. 32D. Moreover, when 8×8 is selected, it is possible to select a size of any one of 8×8, 8×4, 4×8, and 4×4 for each 8×8 block as shown in FIG. 32E to FIG. 32H.

The predicting unit 461 executes, for each macro-block size, the motion compensation prediction processing on all or a part of the block sizes, the sub-block sizes, motion vectors in a predetermined search range, and one or more usable reference images. The predicting unit 461 obtains a prediction differential signal 4 for each block serving as a motion compensation prediction unit using the motion vectors, and a reference image identification number 463 and a subtracter 3 used for the prediction. Prediction efficiency of the prediction differential signal 4 is evaluated in an encoding mode judging unit 5. The encoding mode judging unit 5 outputs a macro-block type/sub-macro-block type 106 and the motion vector information/reference image identification number 463, with which optimum prediction efficiency is obtained for a macro-block to be predicted, out of prediction processing executed in the predicting unit 461. All pieces of macro-block header information such as macro-block types, sub-macro-block types, reference image indexes, and motion vectors are determined as header information with respect to the single color component of the input video signal 1, used for encoding, and multiplexed with a bit stream. In the evaluation of optimality of prediction efficiency, only an amount of prediction error for a single color component to be subjected to encoding processing is evaluated. In the final selection of the macro-block type/sub-macro-block type 106, a weight coefficient 20 for each type decided in the judgment by an encoding control unit 19 may be taken into account.

Similarly, the predicting unit 461 also executes the intra-prediction. At the time of execution of the intra-prediction, intra-prediction mode information is outputted to the output signal 463. In the following explanation, when the intra-prediction and the motion compensation prediction is not particularly distinguished, the output signal 463 is referred to as prediction overhead information including the intra-prediction mode information, the motion vectors, and the reference image identification number. Also, concerning the intra-prediction, only an amount of prediction error for a single color component to be subjected to encoding processing is evaluated. Finally, the predicting unit 461 selects the intra-prediction or the inter-prediction of the macro-block type by evaluating the macro-block type according to prediction efficiency or encoding efficiency.

The predicting unit 461 outputs the macro-block type/sub-macro-block type 106 selected and the prediction differential signal 4 obtained by the prediction overhead information 463 to a transform unit 310. The transform unit 310 transforms the inputted prediction differential signal 4 of the single color component and outputs the prediction differential signal 4 to a quantizing unit 9 as a transform coefficient. In this case, a size of a block serving as a unit for transform may be selected from 4×4 and 8×8. When selection is made possible, a block size selected at the time of encoding is reflected on a value of a transform block size designation flag 464 and the flag is multiplexed with the bit stream. The quantizing unit 9 quantizes the transform coefficient inputted on the basis of a quantization parameter 21 decided by the encoding control unit 19 and outputs the transform coefficient to a variable length encoding unit 11 as a quantized transform coefficient 10. The quantized transform coefficient 10 includes information for the single color component and entropy-encoded by means of Huffman coding, arithmetic coding, or the like in the variable length encoding unit 11. The quantized transform coefficient 10 is restored to a local decoding prediction differential signal 14 through an inverse quantizing unit 12 and an inverse transform unit 312. The quantized transform coefficient 10 is added to a predicted image 7 generated on the basis of the selected macro-block type/sub-macro-block type 106 and the prediction overhead information 463 by an adder 18. Consequently, a local decoded image 15 is generated. After being subjected to block distortion removal processing in a de-blocking filter 462, the local decoded image 15 is stored in the memory 16b to be used in the following motion compensation prediction processing. A de-blocking filter control flag 24 indicating whether a de-blocking filter is applied to the macro-block is also inputted to the variable length encoding unit 11.

The quantized transform coefficient 10, the macro-block type/sub-macro-block type 106, the prediction overhead information 463, and the quantization parameter 21 inputted to the variable length encoding unit 11 are arranged and shaped as a bit stream in accordance with a predetermined rule (syntax) and outputted to a transmission buffer 17 as NAL-unit encoded data in a unit of slice data of one or a group of a plurality of macro-blocks of the format shown in FIG. 67. The transmission buffer 17 smoothes the bit stream according to a band of a transmission line to which the encoder is connected and readout speed of a recording medium, and outputs the bit stream as a video stream 422b0 (422b1, 422b2). The transmission buffer 17 applies feedback to the encoding control unit 19 according to an accumulation state of bit streams in the transmission buffer 17 and controls an amount of generated codes in the following encoding of video frames.

An output of each of the second picture encoding units 503b0 to 503b2 is a slice composed of only data of a single color component. When control of an amount of codes in a unit of a group of access units is necessary, a common transmission buffer in a unit of multiplexed slices of all the color components may be provided in the multiplexing unit 504 to apply feedback to the encoding control unit 19 of the respective color components on the basis of an amount of occupation of the buffer. In this case, the encoding control may be performed using only an amount of information on generation of all the color components or may be performed taking into account a state of the transmission buffer 17 of each of the color components as well. When the encoding control is performed using only an amount of information on generation of all the color components, it is also possible to realize a function equivalent to the transmission buffer 17 with the common transmission buffer in the multiplexing unit 504 and to omit the transmission buffer 17.

In the second picture encoding units 503$b$0 to 503$b$2 according to the fourteenth embodiment, it is possible to decide that all slice data in a sequence are a single color component slice (i.e., a C0 slice, a C1 slice, or a C2 slice) according to the common encoding/independent encoding identification signal 423. Thus, a color component identification flag is always multiplexed with a slice header to make it possible to decide, on the decoder side, which slice corresponds to which picture data in an access unit. Therefore, the respective second picture encoding units 503$b$0 to 503$b$2 can transmit outputs from the respective transmission buffers 17 at a point when data for one slice is accumulated without accumulating the outputs for one picture.

The common encoding/independent encoding identification signal (num_pictures_in_au) can simultaneously represent information for distinguishing encoded data by the common encoding processing from encoded data by the independent encoding processing (common encoding identification information) and information indicating how many single color component pictures are present in one access unit (the number of color components). However, the two kinds of information may be encoded as independent pieces of information.

The first picture encoding unit 503$a$ and the second picture encoding units 503$b$0 to 503$b$2 are only different in whether macro-header information is treated as information common to three components or treated as information of a single color component and in a bit stream structure of slice data. It is possible to realize most of the basic processing blocks such as the predicting units, the transforming units and the inverse transforming units, the quantizing units and the inverse quantizing units, and the de-blocking filters shown in FIGS. 73 and 74 may be realized in functional blocks common to the first picture encoding unit 503$a$ and the second picture encoding units 503$b$0 to 503$b$2 with only a difference in whether information of the three color components is processed collectively or only information of a single color component is treated. Therefore, it is possible to realize implementation of not only the completely independent encoding processing unit shown in FIG. 71 but also various encoders by appropriately combining the basic components shown in FIGS. 73 and 74. If the arrangement of the memory 16$a$ in the first picture encoding unit 503$a$ is provided in a plane sequential manner, it is possible to share the structure of the reference image storage memory between the first picture encoding unit 503$a$ and the second picture encoding units 503$b$0 to 503$b$2.

Although not shown in the figure, in the encoder according to the fourteenth embodiment, assuming the presence of an imaginary stream buffer (an encoding picture buffer) that buffers the video stream 422$c$ complying with the arrays shown in FIGS. 69 and 70 and an imaginary frame memory (a decoding picture buffer) that buffers decoded images 427$a$ and 427$b$, the video stream 422$c$ is generated to prevent an overflow or an underflow of the encoding picture buffer and a failure of the decoding picture buffer. This control is mainly performed by the encoding control unit 19. Consequently, when the video stream 422$c$ is decoded in accordance with operations (imaginary buffer models) of the encoding picture buffer and the decoding picture buffer in the decoder, it is guaranteed that a failure does not occur in the decoder. The imaginary buffer models are defined below.

Operations of the encoding picture buffer are performed in units of an access unit. As described above, when the common decoding processing is performed, encoded data of one picture are included in one access unit. When the independent decoding processing is performed, encoded data of pictures for the number of color components (for three pictures in the case of three components) are included in one access unit. Operations defined for the encoding picture buffer are time when a first bit and a last bit of the access unit are inputted to the encoding picture buffer and time when a bit of the access unit is read out from the encoding picture buffer. It is defined that readout from the encoding picture buffer is instantly performed. It is assumed that all bits of the access unit are read out from the encoding picture buffer at the same time. When a bit of the access unit is read out from the encoding picture buffer, the bit is inputted to an upper header analyzing unit. As described above, the bit is subjected to decoding processing in the first picture decoding unit or the second picture decoding unit and outputted as a color video frame bundled in units of an access unit. Processing from the readout of a bit from the encoding picture buffer and output of the image as a color video frame in units of an access unit is instantly performed in terms of the definition of the imaginary buffer model. The color video frame constituted in units of an access unit is inputted to the decoding picture buffer and output time of the color video frame from the decoding picture buffer is calculated. The output time from the decoding picture buffer is a value calculated by adding a predetermined delay time to the readout time from the encoding picture buffer. It is possible to multiplex this delay time with the bit stream to control the decoder. When the delay time is 0, that is, when output time from the decoding picture buffer is equal to readout time from the encoding picture buffer, the color video frame is inputted to the decoding picture buffer and simultaneously outputted from the decoding picture buffer. In other cases, that is, when output time from the decoding picture buffer is later than readout time from the encoding picture buffer, the color video frame is stored in the decoding picture buffer until the output time from the decoding picture buffer comes. As described above, operations from the decoding picture buffer are defined in units of an access unit.

Figure 75:
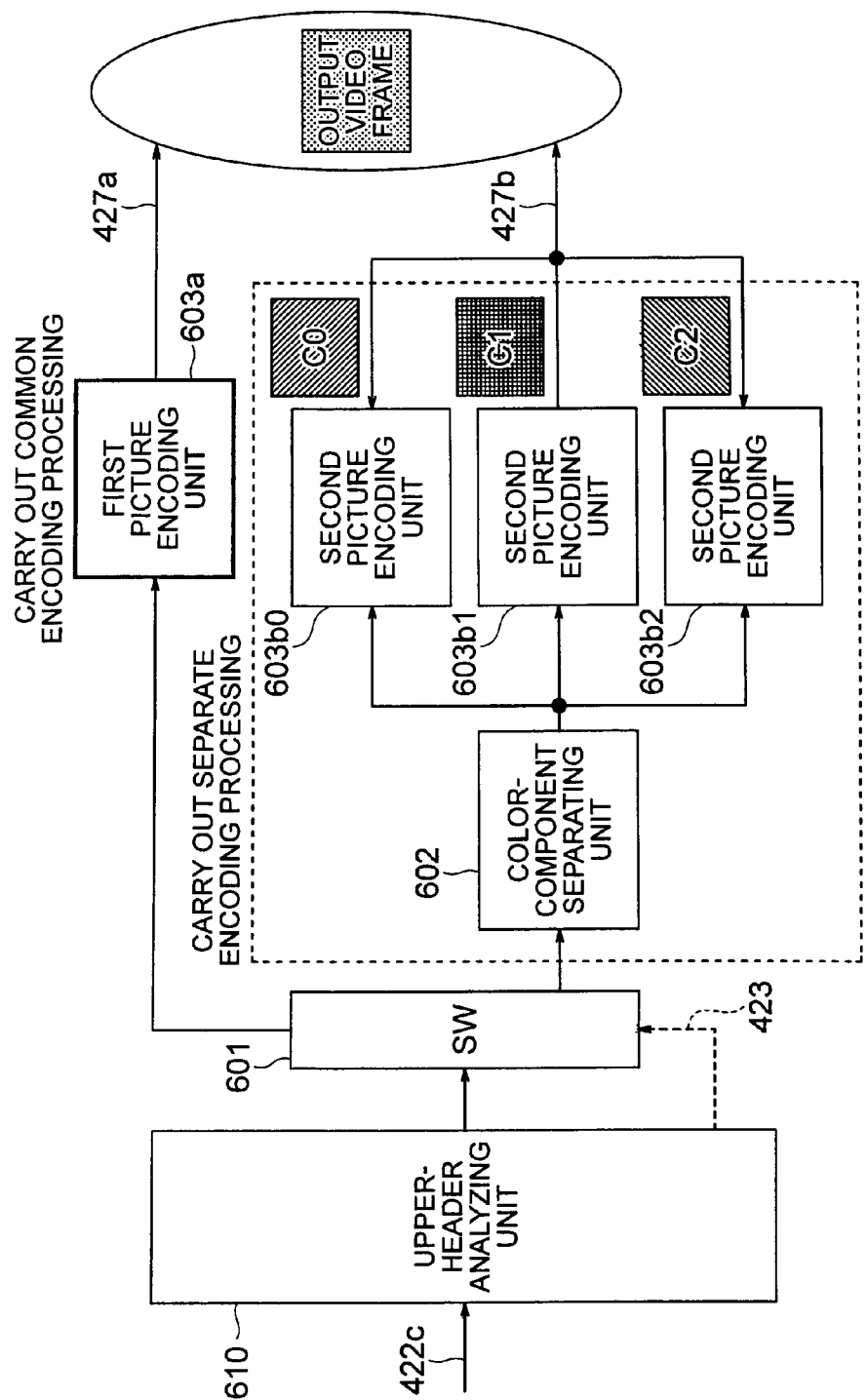
FIG. 75 is a diagram for explaining a schematic structure of the decoder according to the fourteenth embodiment.

FIG. 75 is a diagram for explaining a schematic structure of the decoder according to the fourteenth embodiment. In FIG. 75, common decoding processing is executed in a first picture decoding unit 603$a$. Independent decoding processing is executed in a color component judging unit 602 and second picture decoding units 603$b$0 (prepared for three color components).

The video stream 422$c$ is divided into units of a NAL unit in an upper header analyzing unit 610. Upper header information such as a sequence parameter set and a picture parameter set is decoded as it is and stored in a predetermined memory area in which the first picture decoding unit 603$a$, the color component judging unit 602, and the second picture decoding units 603$b$0 to 603$b$2 are capable of referring to the upper header information. The common encoding/independent encoding identification signal 423 (num_pictures_in_au) multiplexed in sequence units is decoded and held as a part of the upper header information.

The decoded num_pictures_in_au is supplied to a switch (SW) 601. If num_pictures_in_au=1, the switch 601 supplies a slice NAL unit for each picture to the first picture decoding unit 603$a$. If num_pictures_in_au=3, the switch 601 supplies the slice NAL unit to the color component judging unit 602. In other words, if num_pictures_in_au=1, the common decoding processing is performed by the first picture decoding unit 603$a$. If num_pictures_in_au=3, the independent decoding processing is performed by the three second picture decoding units 603*b*0 to 603*b*2. Detailed operations of the first and the second picture decoding units will be described later.

The color component judging unit 602 decides to which color component picture in a present access unit a slice NAL unit corresponds according to a value of the color component identification flag shown in FIG. 70 and distributes and supplies the slice NAL unit to an appropriate second picture decoding units 603*b*0 to 603*b*2. With such a structure of the decoder, there is an effect that, even if a bit stream obtained by interleaving and encoding a slice in the access unit as shown in FIG. 72 is received, it is possible to easily judge which slice belongs to which color component picture and correctly decode the bit stream.

Outline of Operations of the First Picture Decoding Unit

Figure 76:
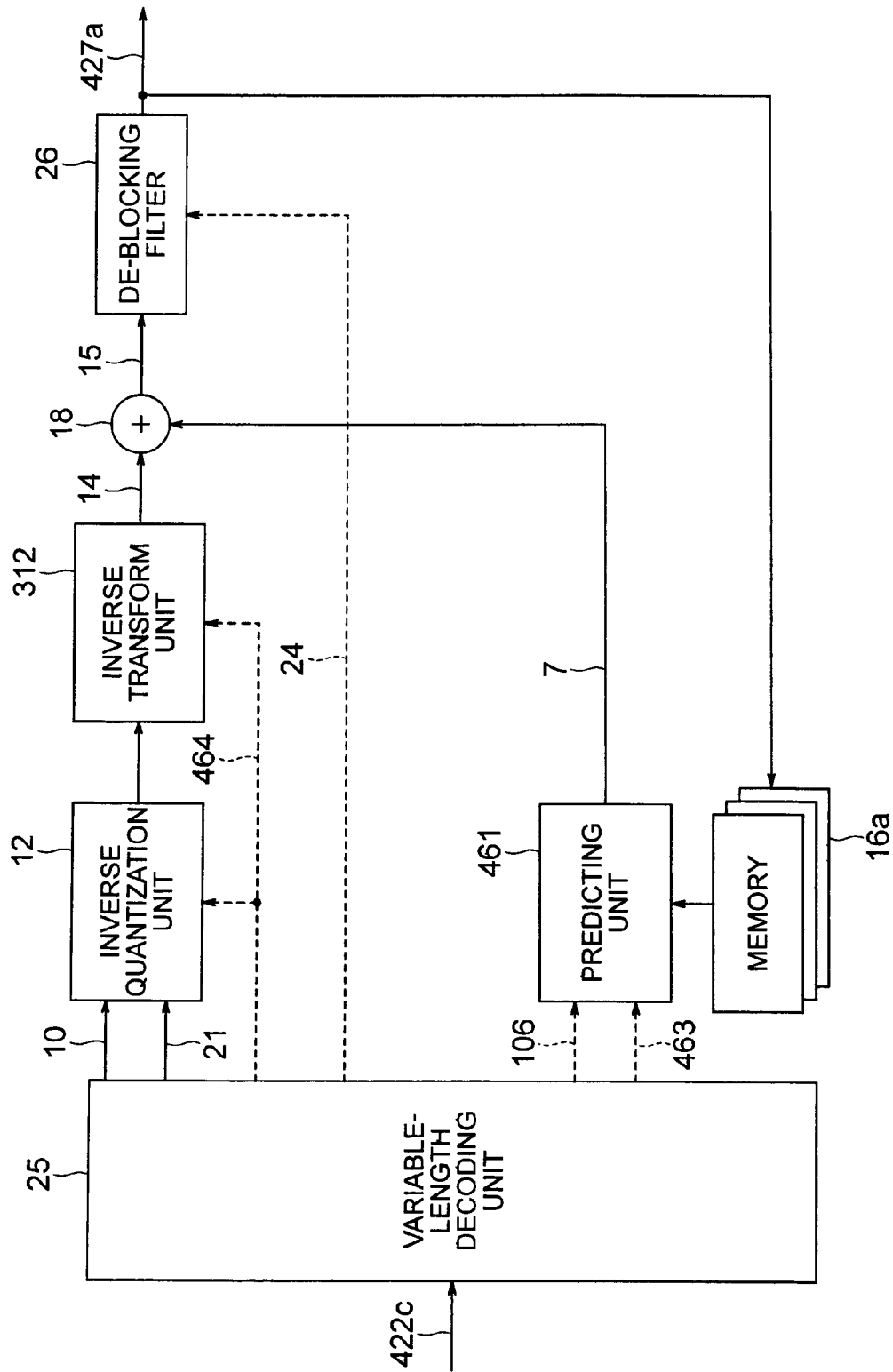
FIG. 76 is a diagram for explaining an internal structure of a first picture decoding unit.

An internal structure of the first picture decoding unit 603*a* is shown in FIG. 76. The first picture decoding unit 603*a* receives the video stream 442*c* complying with the arrays shown in FIGS. 69 and 70, which is outputted from the encoder shown in FIG. 71, in a unit of a mixed slice of C0, C1, and C2 after dividing the video stream in a unit of NAL unit. The first picture decoding unit 603*a* performs decoding processing with a macro-block composed of samples of the three color components shown in FIG. 66 and restores an output video frame.

The video stream 442*c* is inputted to a variable length decoding unit 25. The variable length decoding unit 25 interprets the video stream 442*c* in accordance with a predetermined rule (syntax) and extracts the quantized transform coefficient 10 for the three components and macro-block header information (the macro-block type/sub-macro-block type 106, the prediction overhead information 463, the transform block size designation flag 464, and the quantization parameter 21) commonly used for the three components. The quantized transform coefficient 10 is inputted to the inverse quantizing unit 12, which performs the same processing as that of the first picture encoding unit 503*a*, together with the quantization parameter 21 and subjected to inverse quantization processing. Subsequently, an output of the inverse quantizing unit 12 is inputted to the inverse transform unit 312, which performs the same processing as that of the first picture encoding unit 503*a*, and restored to the local decoding prediction differential signal 14 (if the transform block size designation flag 464 is present in the video stream 422*c*, the transform block size designation flag 464 is referred to in the inverse quantization step and the inverse transform processing step). On the other hand, only processing of referring to the prediction overhead information 463 to generate the predicted image 7 in the predicting unit 461 in the first picture encoding unit 503*a* is included in the predicting unit 461. The macro-block type/sub-macro-block type 106 and the prediction overhead information 463 are inputted to the predicting unit 461 to obtain the predicted image 7 for the three components. When the macro-block type indicates the intra-prediction, the predicted image 7 for the three components is obtained from the prediction overhead information 463 in accordance with the intra-prediction mode information. When the macro-block type indicates the inter-prediction, the predicted image 7 for the three components is obtained from the prediction overhead information 463 in accordance with the motion vector and the reference image index. The local decoding prediction differential signal 14 and the predicted image 7 are added by the adder 18 to obtain the interim decoded image 15 for the three components. Since the interim decoded image (local decoded image) 15 is used for motion compensation prediction of the following macro-blocks, after block distortion removal processing is applied to interim decoded image samples for the three components in the de-blocking filter 462, which performs the same processing as that of the first picture encoding unit 503*a*, the interim decoded image 15 is outputted as a decoded image 427*a* and stored in a memory 16*a*. In this case, de-blocking filter processing is applied to the interim decoded image 15 on the basis of an instruction of the de-blocking filter control flag 24 interpreted by the variable length decoding unit 25. A plurality of pieces of reference image data constituted by the three color components over a plurality of times are stored in the memory 16*a*. The predicting unit 461 selects a reference image indicated by a reference image index extracted from a bit stream in a unit of a macro-block out of the reference image data and generates a predicted image. As the arrangement of the reference image data in the memory 16*a*, the reference image data may be separately stored for each of the color components in a plane sequential manner or samples of the respective color components may be stored in a dot sequential manner. The decoded image 427*a* includes the three color components and is directly changed to a color video frame constituting an access unit 427*a*0 in the common decoding processing.

Outline of Operations of the Second Picture Decoding Unit

An internal structure of each of the second picture decoding units 603*b*0 to 603*b*2 is shown in FIG. 17. Each of the second picture decoding units 603*b*0 to 603*b*2 receives the video stream 442*c* complying with the arrays in FIGS. 69 and 70 outputted from the decoder shown in FIG. 71 in a unit of a C0, C1, or C2 slice NAL unit allocated by the color component judging unit 602, after the video stream is divided in a unit of the NAL unit in an upper header analyzing unit 610, performs decoding processing with the macro-block composed of the sample of the single color component shown in FIG. 67 as a unit, and restores an output video frame.

The video stream 422*c* is inputted to a variable length decoding unit 25. The variable length decoding unit 25 interprets the bit stream 422*c* in accordance with a predetermined rule (syntax) and extracts a quantized transform coefficient 10 for the single color component and macro-block header information (the macro-block type/sub-macro-block type 106, the prediction overhead information 463, a transform block size designation flag 464, and a quantization parameter 21) commonly used for the single color component. The quantized transform coefficient 10 is inputted to an inverse quantizing unit 12, which performs the same processing as that of the second picture encoding unit 503*b*0 (503*b*1, 503*b*2), together with the quantization parameter 21 and subjected to inverse quantization processing. Subsequently, an output of the inverse quantizing unit 12 is inputted to an inverse transform unit 312, which performs the same processing as that of the second picture encoding unit 503*b*0 (503*b*1, 503*b*2), and restored to a local decoding prediction differential signal 14 (if the transform block size designation flag 464 is present in the video stream 422*c*, the transform block size designation flag 464 is referred to in the inverse quantization step and the inverse transform processing step). On the other hand, only processing of referring to the prediction overhead information 463 to generate a predicted image 7 in a predicting unit 461 in the second picture encoding unit 503*b*0 (503*b*1, 503*b*2) is included in a predicting unit 461. The macro-block type/sub-macro-block type 106 and the prediction overhead information 463 are inputted to the predicting unit 461 to obtain the predicted image 7 for the single color component. When the macro-block type indicates the intra-prediction, the predicted image 7 for the single color component is obtained from the prediction overhead information 463 in accordance with the intra-prediction mode information. When the macro-block type indicates the inter-prediction, the predicted image 7 for the single color component is obtained from the prediction overhead information 463 in accordance with the motion vector and the reference image index. The local decoding prediction differential signal 14 and the predicted image 7 are added by an adder 18 to obtain a interim decoded image 15 for the single color component macro-block. Since the interim decoded image 15 is used for motion compensation prediction of the following macro-blocks, after block distortion removal processing is applied to interim decoded image samples for the single color component in a de-blocking filter 26, which performs the same processing as that of the second picture encoding unit 503b0 (503b1, 503b2), the interim decoded image 15 is outputted as a decoded image 427b and stored in a memory 16b. In this case, the de-blocking filter processing is applied to the interim decoded image 15 on the basis of an instruction of the de-blocking filter control flag 24 interpreted by the variable length decoding unit 25. The decoded image 427b includes only a sample of a single color component and is constituted as a color video frame by bundling, in units of the access unit 427b0, the decoded image 427b as outputs of the other respective second picture decoding units 603b0 to 603b2 to be subjected to parallel processing of FIG. 75.

Figure 77:
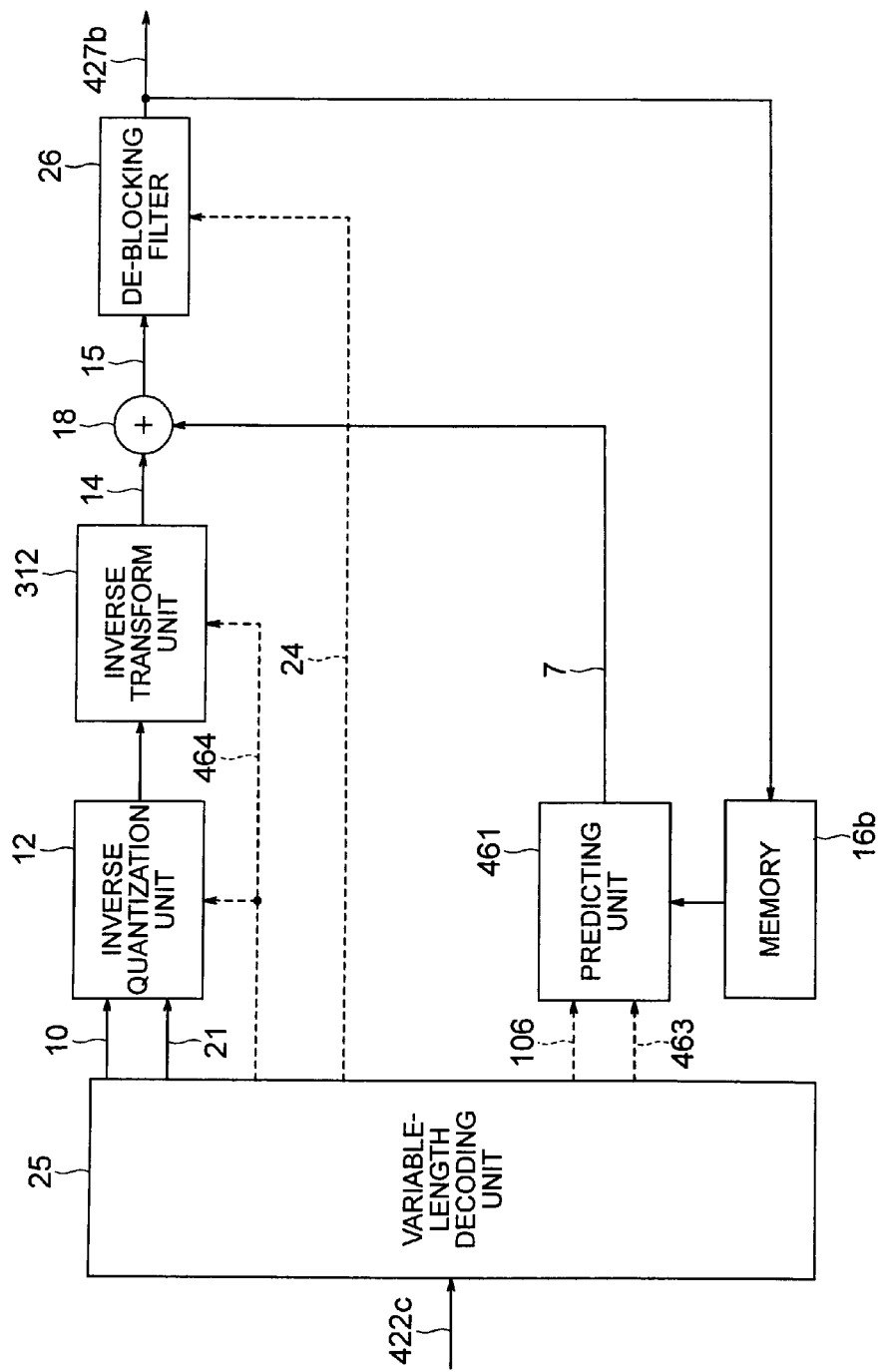
FIG. 77 is a diagram for explaining an internal structure of a second picture decoding unit.

As it is evident from the above, the first picture decoding unit 603a and the second picture decoding units 603b0 to 603b2 are only different in whether macro-block header information is treated as information common to the three components or treated as information of the single color component and in a bit stream structure of slice data. It is possible to realize most of the basic decoding processing blocks such as the motion compensation prediction processing, the inverse transform, and the inverse quantization shown in FIGS. 73 and 74 in functional blocks common to the first picture encoding unit 603a and the second picture encoding units 603b0 to 603b2. Therefore, it is possible to realize implementation of not only the completely independent decoding processing unit shown in FIG. 75 but also various decoders by appropriately combining the basic components shown in FIGS. 76 and 77. Further, if the arrangement of the memory 16a in the first picture encoding unit 603a is provided in a plane sequential manner, it is possible to share the structures of the memories 16a and 16b between the first picture decoding unit 603a and the second picture decoding units 603b0 to 603b2.

Needless to say, the decoder shown in FIG. 75 is capable of receiving and decoding a bit stream outputted from an encoder constituted to always fix the common encoding/independent encoding identification signal 423 to the "independent encoding processing" and independently encode all frames without using the first picture encoding unit 503a at all as another form of the encoder shown in FIG. 71. As another form of the decoder shown in FIG. 75, in a form of usage on condition that the common encoding/independent encoding identification signal 423 is always fixed to the "independent encoding processing", the decoder may be constituted as a decoder that does not include the switch 601 and the first picture decoding unit 603a and only performs the independent decoding processing.

The common encoding/independent encoding identification signal (num_pictures_in_au) includes information for distinguishing encoded data by the common encoding processing from encoded data by the independent encoding processing (common encoding identification information) and information indicating how many single color component pictures are present in one access unit (the number of color components). However, the two kinds of information may be encoded as independent pieces of information.

If the first picture decoding unit 603a includes a function for decoding a bit stream conforming to the AVC high profile in which the three components are collectively encoded with the conventional YUV 4:2:0 format as an object and the upper header analyzing unit 610 judges by which format a bit stream is encoded with reference to a profile identifier decoded from the bit stream 422c and communicates a result of the judgment to the switch 601 and the first picture decoding unit 603a as a part of information of a signal line of the common encoding/independent encoding identification signal 423, it is also possible to constitute a decoder that secures compatibility of the conventional YUV 4:2:0 format with the bit stream.

In the first picture encoding unit 503a in the fourteenth embodiment, the pieces of information of the three color components are mixed in the slice data and completely the same intra/inter-prediction processing is applied to the three color components. Accordingly, a signal correlation among the color components may remain in a prediction error signal space. As a contrivance for removing the signal correlation, for example, color space transform processing as described in the thirteenth embodiment may be applied to a prediction error signal. Examples of the first picture encoding unit 503a having such a structure are shown in FIGS. 78 and 79.

Figure 78:
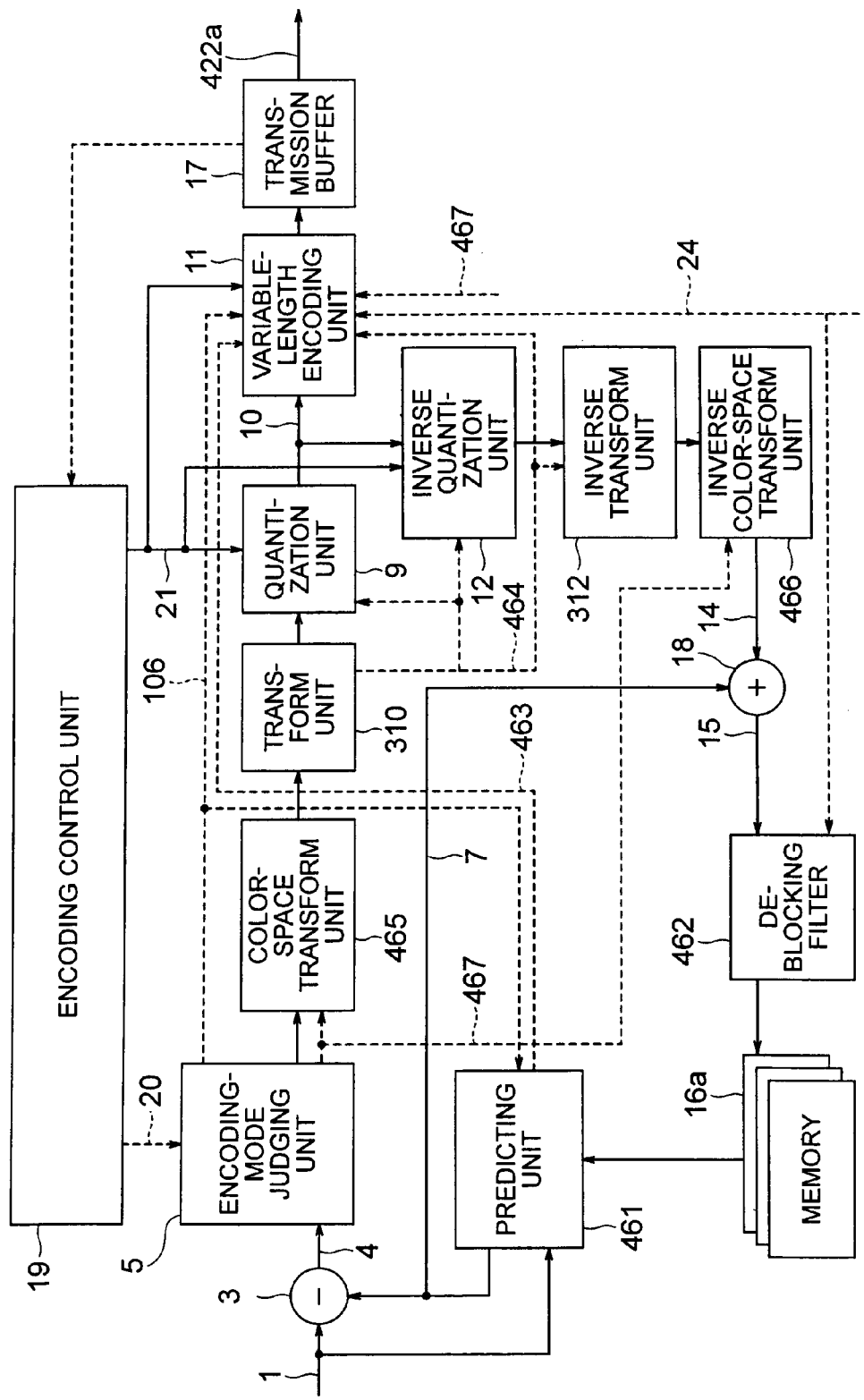
FIG. 78 is a diagram for explaining an internal structure of the first picture encoding unit subjected to color space transform processing.

FIG. 78 is an example in which the color space transform processing is carried out on a pixel level before the transform processing is performed. A color space transform unit 465 is arranged before a transform unit 310 and an inverse color space transform unit 466 is arranged behind an inverse transform unit 312. FIG. 79 is an example in which the color space transform processing is carried out while a frequency component to be processed is appropriately selected with respect to coefficient data obtained after the transform processing is performed. A color space transform unit 465 is arranged behind a transform unit 310 and an inverse color space transform unit 466 is arranged before an inverse transform unit 312. There is an effect that it is possible to control a high-frequency noise component included in a specific color component not to be propagated to other color components hardly including noise. When a frequency component to be subjected to the color space transform processing is made adaptively selectable, pieces of signaling information 467 for judging selection of encoding time are multiplexed with a bit stream on the decoding side.

In the color space transform processing, a plurality of transform systems as described in the thirteenth embodiment may be switched in macro-block units and used according to a characteristic of an image signal to be subjected to encoding or presence or absence of transform may be judged in a unit of a macro-block. It is also possible to designate types of selectable transform systems on a sequence level in advance and designate a transform system to be selected in a unit of a picture, a slice, a macro-block, or the like. It may be possible to select whether the color space transform processing is carried out before transform or after the transform. When those kinds of adaptive encoding processing are performed, it is possible to perform evaluation of encoding efficiency for all selectable options with the encoding mode judging unit 5 to select an option with highest encoding efficiency. When those kinds of adaptive encoding processing are carried out, pieces of signaling information 467 for judging selection of encoding time are multiplexed with a bit stream on the decoding side. The signaling may be designated on a level different from macro-blocks such as a slice, a picture, a GOP, and a sequence.

Figure 79:
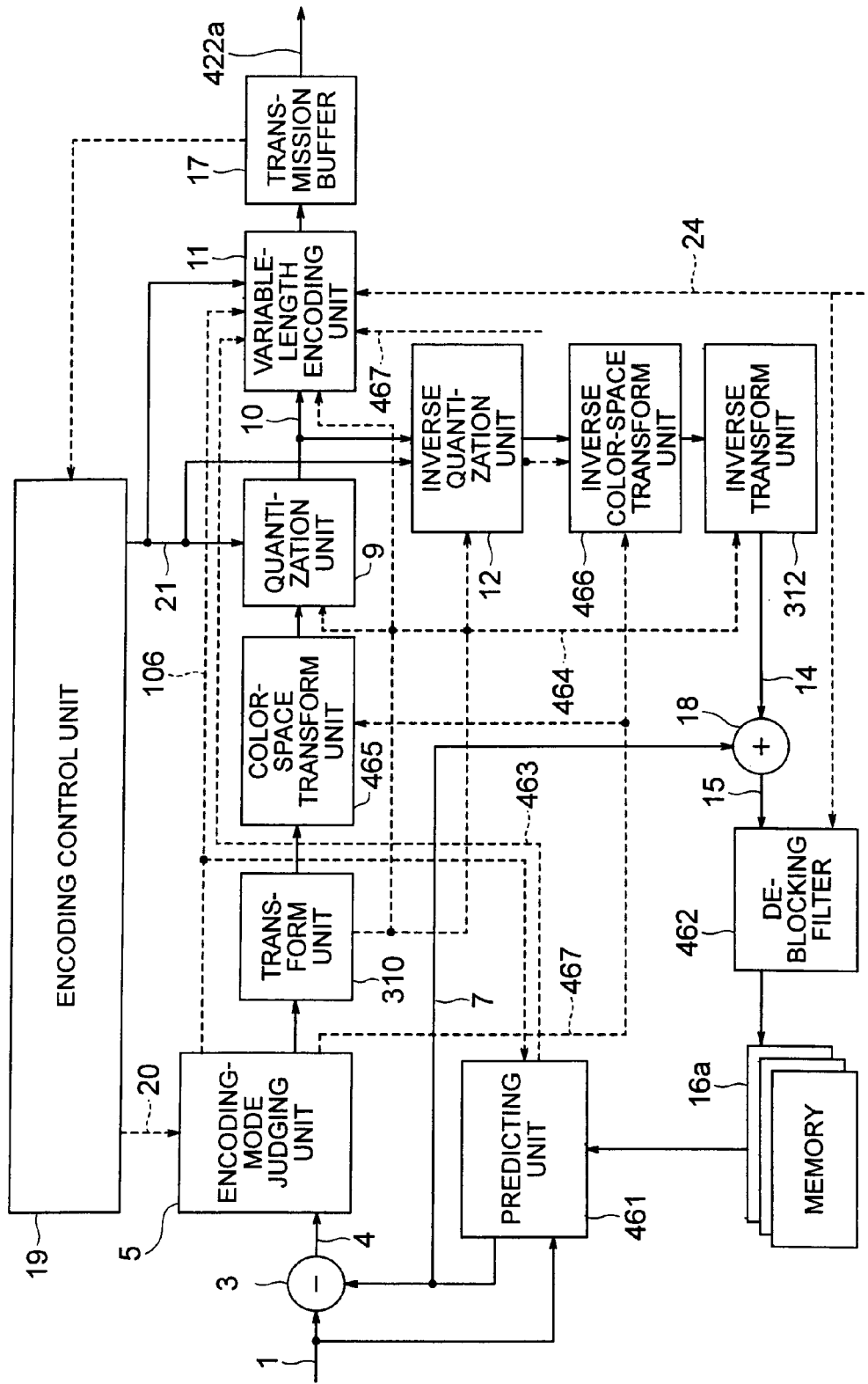
FIG. 79 is a diagram for explaining the internal structure of the first picture encoding unit subjected to the color space transform processing.
Figure 80:
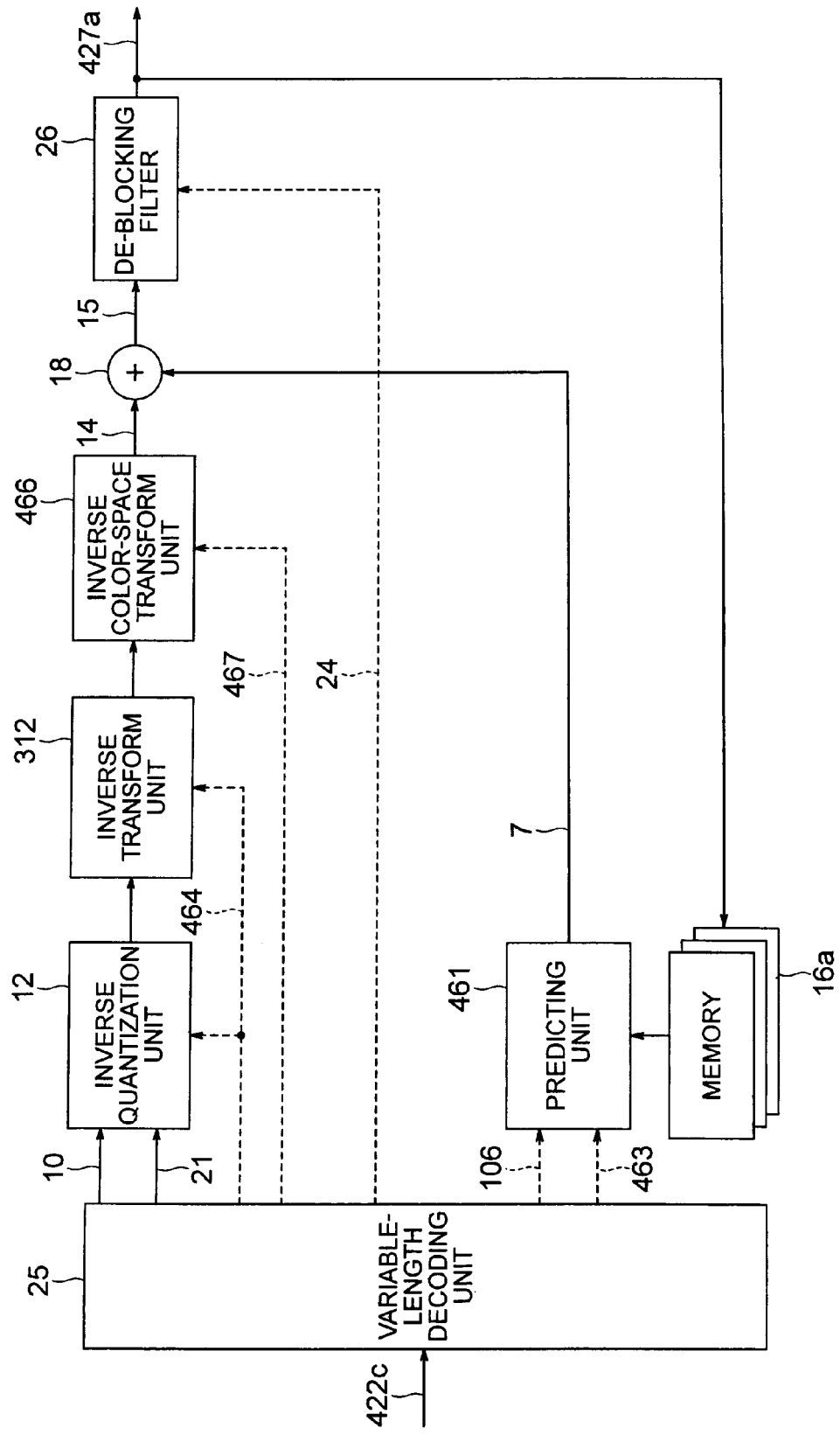
FIG. 80 is a diagram for explaining an internal structure of the first picture encoding unit subjected to inverse color space transform processing.
Figure 81:
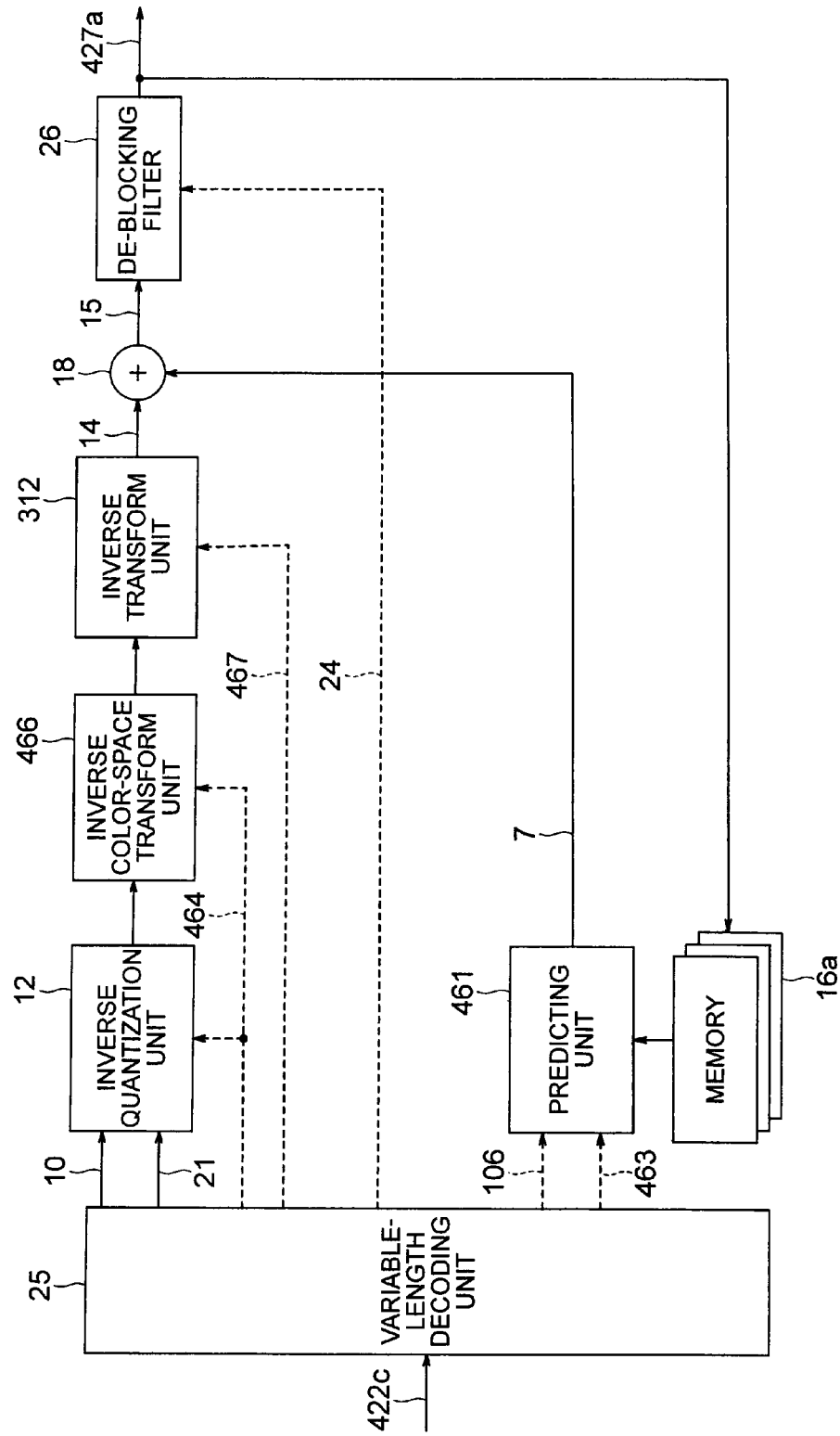
FIG. 81 is a diagram for explaining the internal structure of the first picture encoding unit subjected to the inverse color space transform processing.

Decoders corresponding to the encoders of FIGS. 78 and 79 are shown in FIGS. 80 and 81. FIG. 80 illustrates a decoder that decodes a bit stream encoded by the encoder shown in FIG. 78 by performing the color space transform before the transform processing. The variable length decoding unit 25 decodes, from the bit stream, signaling information 467 as information on presence or absence of transform for selecting whether transform is performed in the inverse color space transform unit 466 and information for selecting a transform system executable in the inverse color space transform unit 466 and supplies the information to the inverse color space transform unit 466. The decoder shown in FIG. 80 carries out, in the inverse color space transform unit 466, the color space transform processing for a prediction error signal after inverse transform on the basis of those kinds of information. FIG. 81 illustrates a decoder that decodes a bit stream encoded by the encoder shown in FIG. 79 by selecting a frequency component to be subjected to processing after the transform processing and performing the color space transform. The variable length decoding unit decodes, from the bit stream, signaling information 467 as the identification information including information on presence or absence of transform for selecting whether transform is performed in the inverse color space transform unit 466, information for selecting a transform system executed in the inverse color space transform unit, information for specifying a frequency component in which the color space transform is carried out, and the like and supplies the information to the inverse color space transform unit 466. The decoder shown in FIG. 81 carries out, in the inverse color space transform unit 466, the color space transform processing for transform coefficient data after inverse quantization on the basis of these kinds of information.

In the decoders shown in FIGS. 80 and 81, as in the decoder in FIG. 75, if the first picture decoding unit 603a includes a function for decoding a bit stream conforming to the AVC high profile in which the three components are collectively encoded with the conventional YUV 4:2:0 format as an object, and the upper header analyzing unit 610 judges by which format a bit stream is encoded with reference to a profile identifier decoded from the bit stream 422c and communicates a result of the judgment to the switch 610 and the first picture decoding unit 603a as a part of information of a signal line of the common encoding/independent encoding identification signal 423, it is also possible to constitute a decoder that secures compatibility of the conventional YUV 4:2:0 format with the bit stream.

Figure 82:
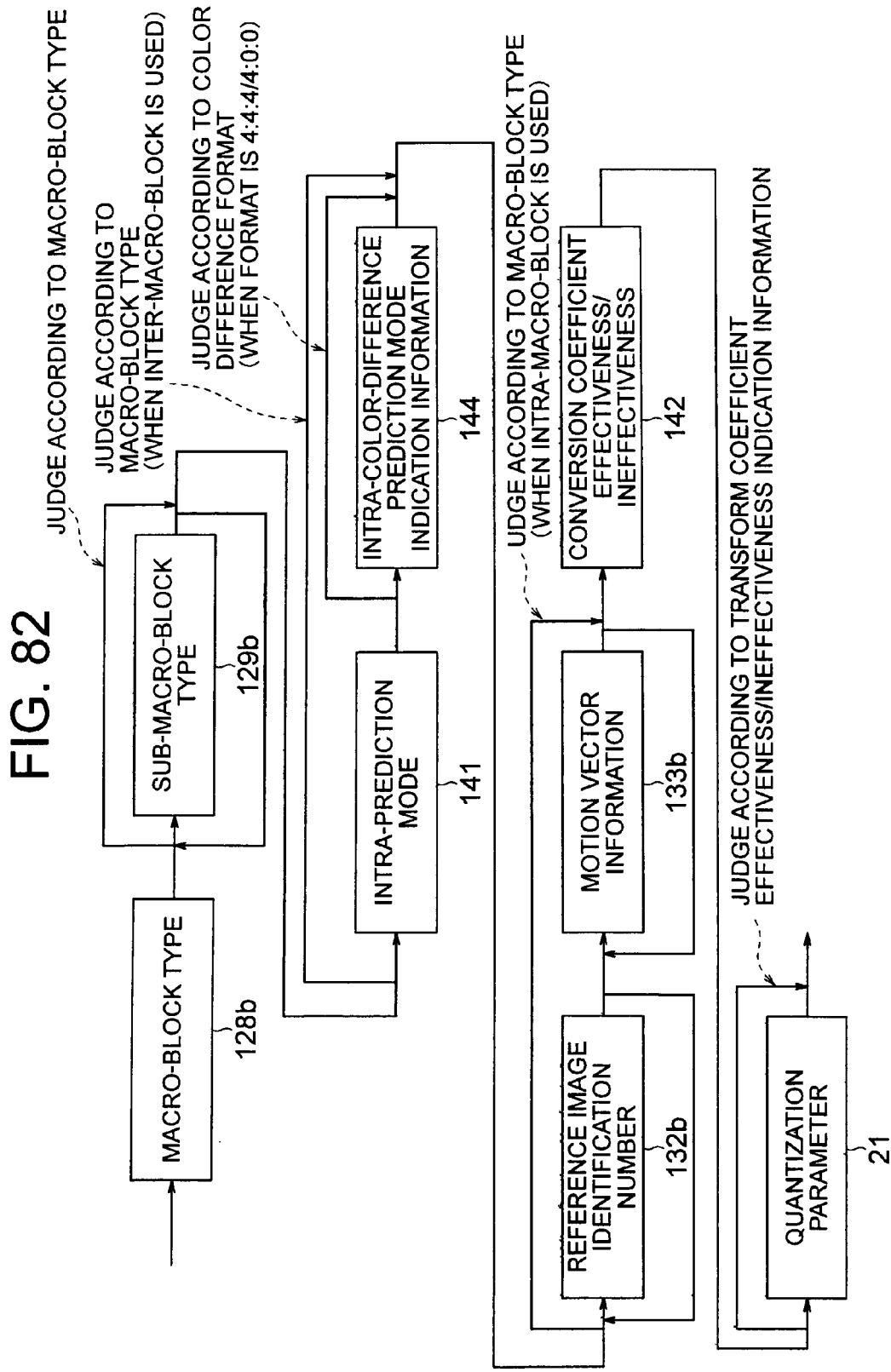
FIG. 82 is a diagram showing a structure of encoded data of macro-block header information included in a bit stream of a conventional YUV 4:2:0 format.

A structure of encoded data of macro-block header information included in a bit stream of the conventional YUV 4:2:0 format is shown in FIG. 82. The data is different from the Cn component header information shown in FIG. 50 in that, when the macro-block type is the intra-prediction, encoded data of an intra-color difference prediction mode 144 is included. When the macro-block type is the inter-prediction, although the structure of the encoded data of the macro-block header information is the same as that of the Cn component header information shown in FIG. 50, a motion vector of a color difference component is generated with a method different from that for a luminance component using a reference image identification number and motion vector information included in macro-block header information.

Operations of the decoder for securing compatibility of the conventional YUV 4:2:0 format with a bit stream will be explained. As described above, the first picture decoding unit 603a has a function for decoding a bit stream of the conventional YUV 4:2:0 format. An internal structure of the first picture decoding unit is the same as that shown in FIG. 76.

Operations of the first picture decoding unit and the variable length decoding unit 25 having the function for decoding a bit stream of the conventional YUV 4:2:0 format will be explained. When the video stream 422c is inputted to the variable length decoding unit, the variable length decoding unit decodes a color difference format indication flag. The color difference format indication flag is a flag included in a sequence parameter header of the video stream 422c and indicates whether an input video format is 4:4:4, 4:2:2, 4:2:0, or 4:0:0. The decoding processing for macro-block header information of the video stream 422c is switched according to a value of the color difference format indication flag. When the macro-block type indicates the intra-prediction and the color difference designation flag indicates 4:2:0 or 4:2:2, the intra-color difference prediction mode 144 is decoded from the bit stream. When the color difference format indication flag indicates 4:4:4, decoding of the intra-color difference prediction mode 144 is skipped. When the color difference format indication flag indicates 4:0:0, since an input video signal is a format (the 4:0:0 format) constituted by only a luminance signal, decoding of the intra-color difference prediction mode 144 is skipped. Decoding processing for macro-block header information other than the intra-color difference prediction mode 144 is the same as that in the variable length decoding unit of the first picture decoding unit 603a not including the function for decoding a bit stream of the conventional YUV 4:2:0 format. Consequently, when the video stream 422c is inputted to the variable length decoding unit 25, the variable length decoding unit 603a extracts a color difference format indication flag (not shown), a quantized transform coefficient for three components 10, and macro-block header information (a macro-block type/sub-macro-block type 106, prediction overhead information 463, a transform block size designation flag 464, and a quantization parameter 21). The color difference indication format indication flag (not shown) and the prediction overhead information 463 are inputted to the predicting unit 461 to obtain the prediction image 7 for the three components.

Figure 83:
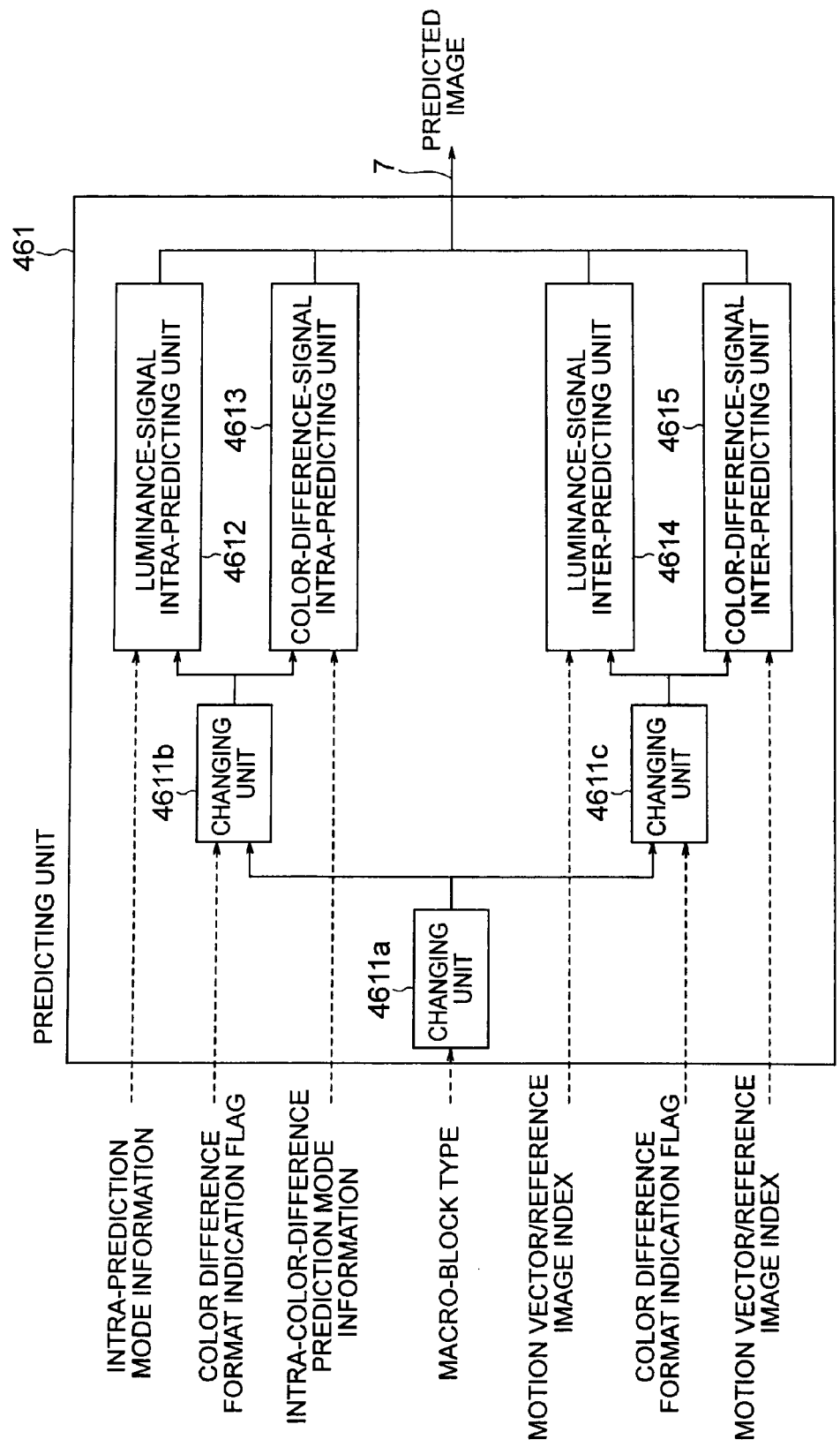
FIG. 83 is a diagram for explaining an internal structure of a predicting unit 461 of a first picture decoding unit that secures compatibility of the conventional YUV 4:2:0 format with the bit stream.

An internal structure of the predicting unit 461 of the first picture decoding unit that secures compatibility of the conventional YUV 4:2:0 format with a bit stream is shown in FIG. 83. Operations of the predicting unit will be explained.

A switching unit 4611a judges a macro-block type. When the macro-block type indicates the intra-prediction, a switching unit 4611b judges a value of the color difference format indication flag. When the value of the color difference format indication flag indicates 4:2:0 or 4:2:2, the predicting unit obtains the predicted image 7 for the three components from the prediction overhead information in accordance with the intra-prediction mode information and the intra-color difference prediction mode information. A predicted image of a luminance signal among the three components is generated in a luminance signal intra-prediction unit 4612 in accordance with the intra-prediction mode information. A predicted image of color differential signal of two components is generated in a color differential signal intra-prediction unit 4613 that performs processing different from that for the luminance component in accordance with the intra-color difference prediction mode information. When the value of the color difference format indication flag indicates 4:4:4, predicted images of all the three components are generated in the luminance signal intra-prediction unit 4612 in accordance with the intra-prediction mode information. When the value of the color difference format indication flag indicates 4:0:0, since the 4:0:0 format is constituted by only the luminance signal (one component), only a predicted image of the luminance signal is generated in the luminance signal intra-prediction unit 4612 in accordance with the intra-prediction mode information.

When the macro-block type indicates the inter-prediction in the switching unit 4611a, the switching unit 4611c judges a value of the color difference format indication flag. When the value of the color difference format indication flag indicates 4:2:0 or 4:2:2, concerning the luminance signal, a predicted image is generated from the prediction overhead information 463 in the luminance signal inter-prediction unit 4614 in accordance with a motion vector and a reference image index and in accordance with a predicted image generating method for a luminance signal set by the AVC standard. Concerning a predicted image of the color differential signal of two components, in the color differential signal inter-prediction unit 4615, a motion vector obtained from the prediction overhead information 463 is subjected to scaling on the basis of a color difference format to generate a color difference motion vector. A predicted image is generated from a reference image designated by a reference image index, which is obtained from the prediction overhead information 463, on the basis of the color difference motion vector in accordance with a method set by the AVC standard. When the value of the color difference format indication flag indicates 4:0:0, since the 4:0:0 format is constituted by only the luminance signal (one component), a predicted image of the luminance signal is generated in the luminance signal inter-prediction unit 4614 in accordance with the motion vector and the reference image index.

As described above, the means for generating a predicted image of a color differential signal of the conventional YUV 4:2:0 format is provided and the means for generation of predicted images of the three components is switched according to a value of the color difference format indication flag decoded from the bit stream. Thus, it is possible to constitute a decoder that secures compatibility of the conventional YUV 4:2:0 format with the bit stream.

If information indicating a bit stream that can be decoded even in a decoder not supporting the color space transform processing such as the decoder shown in FIG. 75 is given to the video stream 422c supplied to the decoders shown in FIGS. 80 and 81 in a unit of a sequence parameter or the like, in all the decoders of FIGS. 80, 81, and 75, it is possible to perform decoding of a bit stream corresponding to decoding performance of each of the decoders. Accordingly, compatibility of the bit stream can easily be secured.

Fifteenth Embodiment

In a fifteenth embodiment of the present invention, another embodiment in which only a structure of a bit stream to be inputted and outputted is different in the encoder and the decoder according to the fourteenth embodiment shown in FIGS. 71, 75, and the like will be described. An encoder according to the fifteenth embodiment performs multiplexing of encoded data with a bit stream structure shown in FIG. 84.

In the bit stream of the structure shown in FIG. 69, the AUD NAL unit includes information primary_pic_type as an element thereof. Table 85 shows information of a picture encoding type at the time when picture data in an access unit starting from the AUD NAL unit is encoded.

For example, when primary_pic_type=0, this indicates that a picture is entirely intra-encoded. When primary_pic_type=1, this indicates that a slice to be intra-encoded and a slice for which motion compensation prediction can be performed using only one reference picture list can be mixed in a picture. Since primary_pic_type is information defining an encoding mode with which one picture can be encoded, on the encoder side, it is possible to perform encoding suitable for various conditions such as a characteristic of an input video signal and a random access function by operating this information. In the fourteenth embodiment, since there is only one primary_pic_type for one access unit, when the independent encoding processing is performed, primary_pic_type is common to three color component pictures in the access unit. In the fifteenth embodiment, when independent encoding of each of the color component pictures is performed, primary_pic_type for the remaining two color component pictures is additionally inserted in the AUD NAL unit shown in FIG. 69 according to a value of num_pitures_in_au. Alternatively, as in the bit stream structure shown in FIG. 84, encoded data of each of the color component pictures is started from an NAL unit (Color Channel Delimiter) indicating the start of the color component picture and, in this CCD NAL unit, primary_pic_type information corresponding thereto is included. In this structure, since encoded data of the respective color component pictures for one picture is collectively multiplexed, the color component identification flag (color_channel_idc) described in the fourteenth embodiment is included in the CCD NAL unit rather than in a slice header. Consequently, it is possible to consolidate information of the color component identification flag required to be multiplexed with the respective slices into data in picture units. Thus, there is an effect that it is possible to reduce overhead information. Since the CCD NAL unit constituted as a byte string only has to be detected to verify color_channel_idc only once per one color component picture, it is possible to quickly find the top of the color component picture without performing the variable length decoding processing. Thus, on the decoder side, color_channel_idc in a slice header does not have to be verified every time in order to separate an NAL unit to be decoded for each color component. It is possible to smoothly perform data supply to the second picture decoding unit.

On the other hand, with such a structure, the effect of reducing a buffer size and a processing delay of the encoder described with reference to FIG. 72 in the fourteenth embodiment is weakened. Thus, the color component identification flag may be constituted to indicate in a higher level (sequence or GOP) whether encoded data is multiplexed in slice units or multiplexed in color component picture units. By adopting such a bit stream structure, it is possible to perform flexible implementation of the encoder according to a form of use of the encoder.

Figure 84:
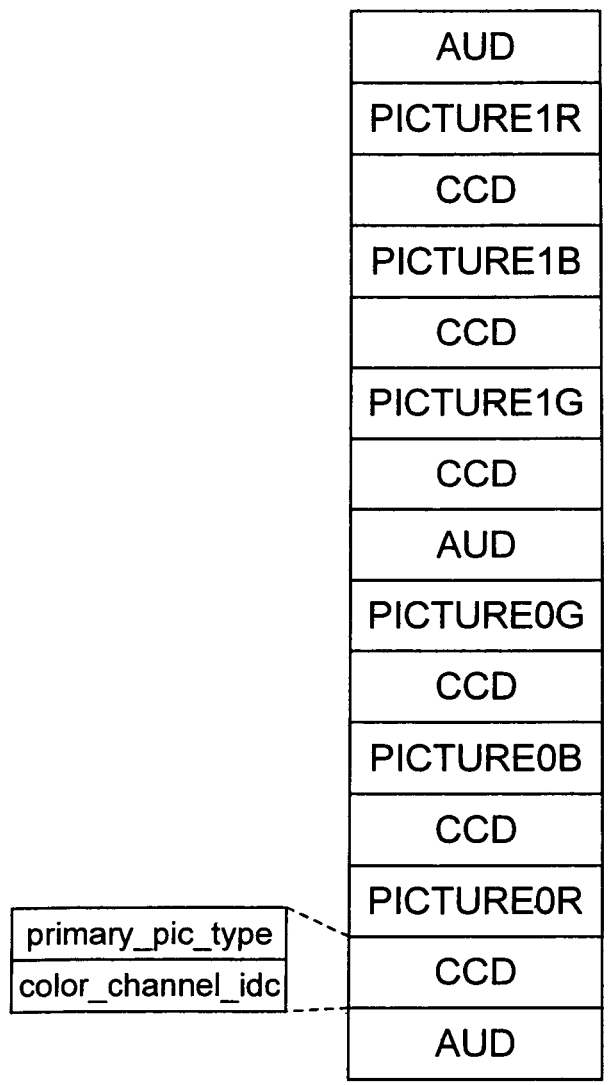
FIG. 84 is a diagram for explaining a structure of a bit stream of encoded data to be multiplexed according to a fifteenth embodiment.
Figure 86:
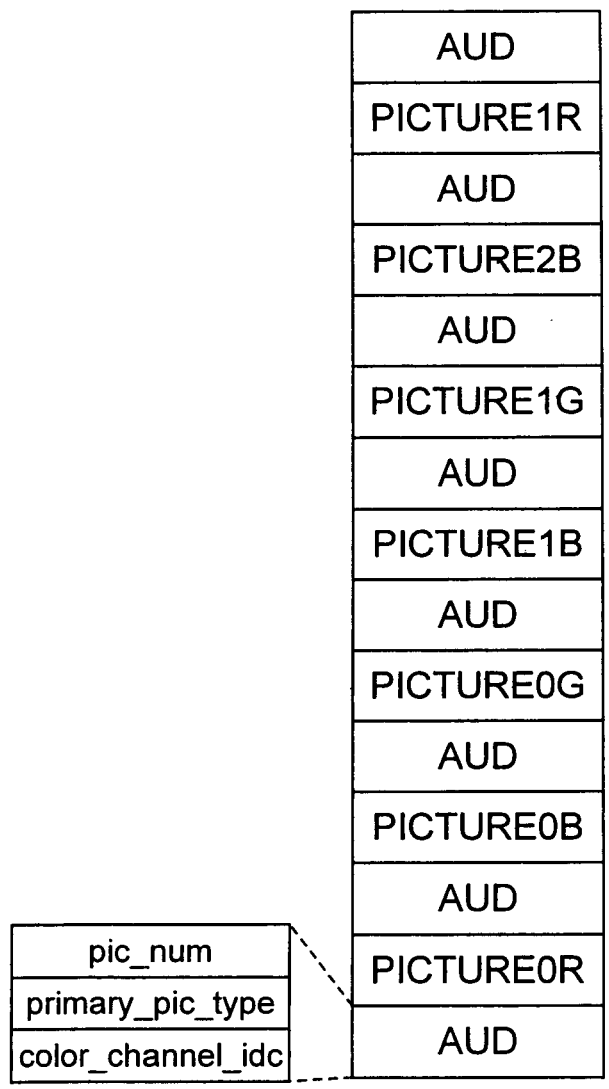
FIG. 86 is a diagram for explaining a structure of the bit stream of the encoded data to be multiplexed according to the fifteenth embodiment.

Moreover, as still another embodiment, multiplexing of encoded data may be performed with a bit stream structure shown in FIG. 86. In FIG. 86, color_channel_idc and primary_pic_type included in the CCD NAL unit shown in FIG. 84 are included in the respective AUDs. In the bit stream structure according to the fifteenth embodiment of the present invention, also in the case of the independent encoding processing, one (color component) picture is included in one access unit. With such the structure, as in the structures described above, there is the effect of reduction of overhead information because it is possible to consolidate information of the color component identification flag into data in picture units. In addition, since the AUD NAL unit constituted as a byte string only has to be detected to verify color_channel_idc only once per one picture, it is possible to quickly find the top of the color component picture without performing the variable length decoding processing. Thus, on the decoder side, color_channel_idc in a slice header does not have to be verified every time in order to separate an NAL unit to be decoded for each color component. Accordingly, it is possible to smoothly perform data supply to the second picture decoding unit. On the other hand, since an image of one frame or one field is constituted by three access units, it is necessary to designate the three access units as image data at identical time. Therefore, in the bit stream structure shown in FIG. 86, sequence numbers (encoding and decoding orders in a time direction, etc.) of respective pictures may be given to the AUDs. With such the structure, on the decoder side, it is possible to verify decoding and display orders of the respective pictures, color component attributes, propriety of an IDR, and the like without decoding slice data at all. It is possible to efficiently perform editing and special reproduction on a bit stream level.

In the bit stream structure shown in FIG. 69, 84, or 86, information designating the number of slice NAL units included in one color component picture may be stored in the regions of the AUDs or the CCDs.

Concerning all the embodiments, the transform processing and the inverse transform processing may be transform for guaranteeing orthogonality such as the DCT or may be transform such as the AVC combined with the quantization and inverse quantization processings to approximate orthogonality rather than the strict transform such as the DCT. Further, a prediction error signal may be encoded as information on a pixel level without performing transform.

INDUSTRIAL APPLICABILITY

It is possible to apply the present invention to a digital image signal encoder and a digital image signal decoder used for an image compression encoding technique, a compressed image data transmission technique, and the like.

The invention claimed is:

1. An image decoder that decodes a color image signal in 4:4:4 format based on an input of a bit stream generated by compression-encoding a color image which is formed of a plurality of color components in 4:4:4 format, the color image being compression-encoded in units of regions obtained by dividing the color image into predetermined regions, the image decoder comprising:
   a header analyzing unit that extracts common encoding/independent encoding identification information from the bit stream;
   a decoding unit that decodes, for each of the regions, an inter-prediction mode, a motion vector, and a reference image identification number included in the bit stream, and decodes a prediction error signal of each of the regions;
   a predicted-image generating unit that generates a predicted image on the basis of the inter-prediction mode, the motion vector, and the reference image number which have been decoded; and
   an adding unit that generates a decoded image by adding the decoded prediction error signal and the predicted image, wherein
   the decoding unit decodes the same inter-prediction mode, the same motion vector, and the same reference image identification number which are commonly used for all the color components, in a case where the common encoding/independent encoding identification information indicates that the regions serving as the units of encoding are encoded by a same inter-prediction mode for respective color components, and decodes a separate inter-prediction mode, a separate motion vector, and a separate reference image identification number in units of the regions for respective color components, in a case where the common encoding/independent encoding identification information indicates that the regions serving as the units of encoding are respectively encoded by a separate inter-prediction mode for respective color components, and
   the predicted-image generating unit generates a predicted image by using the inter-prediction mode, the motion vector, and the reference image identification number which have been decoded, for respective color components.

2. An image decoding method for decoding a color image signal in 4:4:4 format based on an input of obit stream generated by compression-encoding a color image which is formed of a plurality of color components in 4:4:4 format, the color image being compression-encoded in units of regions obtained by dividing the color image into predetermined regions, the image decoding method comprising:
   extracting common encoding/independent encoding identification information from the bit stream;
   decoding, for each of the regions, an inter-prediction mode, a motion vector, and a reference image identification number included in the bit stream, and decoding a prediction error signal of each of the regions;
   predicted-image generating a predicted image on the basis of the inter-prediction mode, the motion vector, and the reference image identification number which have been decoded; and generating a decoded image by adding the decoded prediction error signal and the predicted image, wherein
   the decoding step decodes the same inter-prediction mode, the same motion vector, and the same reference image identification number which are commonly used for all the color components, in a ease where the common encoding/independent encoding identification information indicates that the regions serving as the units of encoding are encoded by a same inter-prediction mode for respective color components, and decodes a separate inter-prediction mode, a separate motion vector, and a separate reference image identification number in units of the regions for respective color components, in a case where the common encoding/independent encoding identification information indicates that the regions serving as the units of encoding are respectively encoded by a separate inter-prediction mode for respective color components, and
   the predicted-image generating step generates a predicted image by using the inter-prediction mode, the motion vector, and the reference image identification number which have been decoded, for respective color components.

* * * * *